(12) United States Patent
Abhyanker

(10) Patent No.: US 9,037,516 B2
(45) Date of Patent: *May 19, 2015

(54) DIRECT MAILING IN A GEO-SPATIAL ENVIRONMENT

(71) Applicant: Raj Abhyanker, Cupertino, CA (US)

(72) Inventor: Raj Abhyanker, Cupertino, CA (US)

(73) Assignee: FATDOOR, INC., Palo Alto, CA (US)

( * ) Notice: Subject to any disclaimer, the term of this patent is extended or adjusted under 35 U.S.C. 154(b) by 18 days.

This patent is subject to a terminal disclaimer.

(21) Appl. No.: 14/262,716

(22) Filed: Apr. 26, 2014

(65) Prior Publication Data

US 2014/0237062 A1 Aug. 21, 2014

Related U.S. Application Data

(63) Continuation-in-part of application No. 11/603,442, filed on Nov. 22, 2006, now abandoned, and a continuation-in-part of application No. 11/827,834, filed on Jul. 12, 2007, now abandoned, and a (Continued)

(51) Int. Cl.
*G06Q 99/00* (2006.01)
*H04L 12/58* (2006.01)
(Continued)

(52) U.S. Cl.
CPC ........... *H04L 51/36* (2013.01); *G06F 21/31* (2013.01); *G06Q 10/087* (2013.01); *G06Q 10/10* (2013.01); *G06Q 30/02* (2013.01); *H04L 51/04* (2013.01);
(Continued)

(58) Field of Classification Search
USPC ........................................................ 705/319
See application file for complete search history.

(56) References Cited

U.S. PATENT DOCUMENTS 2,035,218 A 3/1936 Bloom
3,253,806 A 5/1966 Eickmann
(Continued)

FOREIGN PATENT DOCUMENTS

EP 1426876 A1 6/2004
KR 101069834 B1 10/2010
(Continued)

OTHER PUBLICATIONS

Benchmark-Backed Nextdoor Launches as a Private Social Network for Neighborhoods, Techcrunch Article, Oct. 26, 2011 by Leena Rao (6 Pages). http://techcrunch.com/2011/10/26/benchmark-backed-nextdoor-launches-as-a-private-social-network-for-neighborhoods/.
(Continued)

*Primary Examiner* — Huy C Ho
(74) *Attorney, Agent, or Firm* — Raj Abhyanker, P.C.

(57) ABSTRACT

A method and system of direct mailing in a geo-spatial environment are disclosed. In one embodiment, a method includes generating a community network of user profiles, each user profile associated with a verified geographic location and at least one of a contact address, associating a first user with a first user profile, selecting a mail mode, selecting a communication, generating a first display view to include a map view embodied by the community network, at least a portion of the user profiles represented at a location in the map view associated with the verified geographic location of the first user profile, selecting a second user profile from the portion of the user profiles, and generating a mailing of the communication, in a format associated with the mail mode, between the first user profile and the contact address associated with the second user profile.

34 Claims, 50 Drawing Sheets

Related U.S. Application Data continuation-in-part of application No. 14/089,779, filed on Nov. 26, 2013, and a continuation-in-part of application No. 14/144,612, filed on Dec. 31, 2013, now Pat. No. 8,738,545.

(60) Provisional application No. 60/783,226, filed on Mar. 17, 2006, provisional application No. 60/817,470, filed on Jun. 28, 2006, provisional application No. 60/853,499, filed on Oct. 19, 2006, provisional application No. 60/854,230, filed on Oct. 25, 2006.

(51) Int. Cl.

| | | |
|---|---|---|
| *G06Q 10/08* | (2012.01) | |
| *G06Q 10/10* | (2012.01) | |
| *G06Q 30/02* | (2012.01) | |
| *H04W 4/02* | (2009.01) | |
| *H04W 4/22* | (2009.01) | |
| *H04W 76/00* | (2009.01) | |
| *G06Q 50/00* | (2012.01) | |
| *G06Q 10/00* | (2012.01) | |
| *G06F 21/31* | (2013.01) | |

(52) U.S. Cl.
CPC ............... *H04W 4/021* (2013.01); *H04W 4/22* (2013.01); *H04W 76/007* (2013.01); *G06Q 30/0261* (2013.01); *G06Q 50/01* (2013.01)

(56) References Cited

U.S. PATENT DOCUMENTS

| | | | |
|---|---|---|---|
| 3,556,438 A | 1/1971 | Meditz | |
| 3,762,669 A | 10/1973 | Curci | |
| 4,161,843 A | 7/1979 | Hui | |
| 5,032,989 A | 7/1991 | Tornetta | |
| 5,325,294 A | 6/1994 | Keene | |
| 5,521,817 A | 5/1996 | Burdoin et al. | |
| 5,581,630 A | 12/1996 | Bonneau, Jr. | |
| 5,584,025 A | 12/1996 | Keithley et al. | |
| 5,590,062 A | 12/1996 | Nagamitsu et al. | |
| 5,617,319 A | 4/1997 | Arakawa et al. | |
| 5,630,103 A | 5/1997 | Smith et al. | |
| 5,671,342 A | 9/1997 | Millier et al. | |
| 5,774,133 A | 6/1998 | Neave et al. | |
| 5,805,810 A | 9/1998 | Maxwell | |
| 5,819,269 A | 10/1998 | Uomini | |
| 5,826,244 A | 10/1998 | Huberman | |
| 5,831,664 A | 11/1998 | Wharton et al. | |
| 5,835,896 A | 11/1998 | Fisher et al. | |
| 5,852,810 A | 12/1998 | Sotiroff et al. | |
| 5,905,499 A | 5/1999 | McDowall et al. | |
| 5,907,322 A | 5/1999 | Kelly et al. | |
| 5,926,765 A | 7/1999 | Sasaki | |
| 5,930,474 A | 7/1999 | Dunworth et al. | |
| 5,937,413 A | 8/1999 | Hyun et al. | |
| 5,940,806 A | 8/1999 | Danial | |
| 5,991,737 A | 11/1999 | Chen | |
| 6,024,288 A | 2/2000 | Gottlich et al. | |
| 6,029,141 A | 2/2000 | Bezos et al. | |
| 6,029,195 A | 2/2000 | Herz | |
| 6,034,618 A | 3/2000 | Tatebayashi et al. | |
| 6,036,601 A | 3/2000 | Heckel | |
| 6,047,194 A | 4/2000 | Andersson | |
| 6,047,236 A | 4/2000 | Hancock et al. | |
| 6,049,778 A | 4/2000 | Walker et al. | |
| 6,073,138 A | 6/2000 | de l'Etraz et al. | |
| 6,078,906 A | 6/2000 | Huberman | |
| 6,088,702 A | 7/2000 | Plantz et al. | |
| 6,092,076 A | 7/2000 | McDonough et al. | |
| 6,092,105 A | 7/2000 | Goldman | |
| 6,101,484 A | 8/2000 | Halbert et al. | |
| 6,108,639 A | 8/2000 | Walker et al. | |
| 6,122,592 A | 9/2000 | Arakawa et al. | |
| 6,148,260 A | 11/2000 | Musk et al. | |
| 6,175,831 B1 | 1/2001 | Weinreich et al. | |
| 6,199,076 B1 | 3/2001 | Logan et al. | |
| 6,229,533 B1 | 5/2001 | Farmer et al. | |
| 6,236,990 B1 | 5/2001 | Geller et al. | |
| 6,269,369 B1 | 7/2001 | Robertson | |
| 6,308,177 B1 | 10/2001 | Israni et al. | |
| 6,317,718 B1 | 11/2001 | Fano | |
| 6,336,111 B1 | 1/2002 | Ashby et al. | |
| 6,339,745 B1 | 1/2002 | Novik | |
| 6,356,834 B2 | 3/2002 | Hancock et al. | |
| 6,381,537 B1 | 4/2002 | Chenault et al. | |
| 6,401,085 B1 | 6/2002 | Gershman et al. | |
| 6,405,123 B1 | 6/2002 | Rennard et al. | |
| 6,408,307 B1 | 6/2002 | Semple et al. | |
| 6,453,339 B1 | 9/2002 | Schultz et al. | |
| 6,480,885 B1 | 11/2002 | Olivier | |
| 6,487,583 B1 | 11/2002 | Harvey et al. | |
| 6,498,982 B2 | 12/2002 | Bellesfield et al. | |
| 6,507,776 B1 | 1/2003 | Fox, III | |
| 6,513,069 B1 | 1/2003 | Abato et al. | |
| 6,519,629 B2 | 2/2003 | Harvey et al. | |
| 6,532,007 B1 | 3/2003 | Matsuda | |
| 6,542,813 B1 | 4/2003 | Kovacs | |
| 6,542,817 B2 | 4/2003 | Miyaki | |
| 6,542,936 B1 | 4/2003 | Mayle et al. | |
| 6,557,013 B1 | 4/2003 | Ziff et al. | |
| 6,587,787 B1 | 7/2003 | Yokota | |
| 6,597,983 B2 | 7/2003 | Hancock | |
| 6,611,751 B2 | 8/2003 | Warren | |
| 6,615,039 B1 | 9/2003 | Eldering | |
| 6,622,086 B2 | 9/2003 | Polidi | |
| 6,629,136 B1 | 9/2003 | Naidoo | |
| 6,633,311 B1 | 10/2003 | Douvikas et al. | |
| 6,636,803 B1 | 10/2003 | Hartz, Jr. et al. | |
| 6,640,187 B1 | 10/2003 | Chenault et al. | |
| 6,643,663 B1 | 11/2003 | Dabney et al. | |
| 6,647,383 B1 | 11/2003 | August et al. | |
| 6,654,800 B1 | 11/2003 | Rieger, III | |
| 6,658,410 B1 | 12/2003 | Sakamaki et al. | |
| 6,662,016 B1 | 12/2003 | Buckham et al. | |
| 6,677,894 B2 | 1/2004 | Sheynblat et al. | |
| 6,684,196 B1 | 1/2004 | Mini et al. | |
| 6,687,878 B1 | 2/2004 | Eintracht et al. | |
| 6,691,114 B1 | 2/2004 | Nakamura | |
| 6,711,414 B1 | 3/2004 | Lightman et al. | |
| 6,716,101 B1 | 4/2004 | Meadows et al. | |
| 6,719,570 B2 | 4/2004 | Tsuchioka | |
| 6,721,748 B1 | 4/2004 | Knight et al. | |
| 6,728,635 B2 | 4/2004 | Hamada et al. | |
| 6,745,196 B1 | 6/2004 | Colyer et al. | |
| 6,750,881 B1 | 6/2004 | Appelman | |
| 6,798,407 B1 | 9/2004 | Benman | |
| 6,816,850 B2 | 11/2004 | Culliss | |
| 6,819,267 B1 | 11/2004 | Edmark et al. | |
| 6,834,229 B2 | 12/2004 | Rafiah et al. | |
| 6,847,823 B2 | 1/2005 | Lehikoinen et al. | |
| 6,871,140 B1 | 3/2005 | Florance et al. | |
| 6,882,307 B1 | 4/2005 | Gifford | |
| 6,883,748 B2 | 4/2005 | Yoeli | |
| 6,889,213 B1 | 5/2005 | Douvikas et al. | |
| 6,926,233 B1 | 8/2005 | Corcoran, III | |
| 6,950,791 B1 | 9/2005 | Bray et al. | |
| 6,963,879 B2 | 11/2005 | Colver et al. | |
| 6,968,179 B1 | 11/2005 | De Vries | |
| 6,968,513 B1 | 11/2005 | Rinebold et al. | |
| 6,976,031 B1 | 12/2005 | Toupal et al. | |
| 6,983,139 B2 | 1/2006 | Dowling et al. | |
| 6,987,976 B2 | 1/2006 | Kohar et al. | |
| 7,006,881 B1 | 2/2006 | Hoffberg et al. | |
| 7,013,292 B1 | 3/2006 | Hsu et al. | |
| 7,024,397 B1 | 4/2006 | Donahue | |
| 7,024,455 B2 | 4/2006 | Yokobori et al. | |
| 7,038,681 B2 | 5/2006 | Scott et al. | |
| 7,047,202 B2 | 5/2006 | Jaipuria et al. | |
| 7,068,309 B2 | 6/2006 | Toyama et al. | |
| 7,069,308 B2 | 6/2006 | Abrams | |
| 7,072,849 B1 | 7/2006 | Filepp et al. | |
| 7,076,409 B2 | 7/2006 | Agrawala et al. | |

(56) References Cited

U.S. PATENT DOCUMENTS

| | | |
|---|---|---|
| 7,076,741 B2 | 7/2006 | Miyaki |
| 7,080,019 B1 | 7/2006 | Hurzeler |
| 7,080,096 B1 | 7/2006 | Imamura |
| 7,085,650 B2 | 8/2006 | Anderson |
| 7,099,745 B2 | 8/2006 | Ebert |
| 7,099,862 B2 | 8/2006 | Fitzpatrick et al. |
| 7,117,254 B2 | 10/2006 | Lunt et al. |
| 7,136,915 B2 | 11/2006 | Rieger, III |
| 7,158,878 B2 | 1/2007 | Rasmussen et al. |
| 7,174,301 B2 | 2/2007 | Florance et al. |
| 7,177,872 B2 | 2/2007 | Schwesig et al. |
| 7,178,720 B1 | 2/2007 | Strubbe et al. |
| 7,188,153 B2 | 3/2007 | Lunt et al. |
| 7,209,803 B2 | 4/2007 | Okamoto et al. |
| 7,228,232 B2 | 6/2007 | Bodin et al. |
| 7,233,942 B2 | 6/2007 | Nye |
| 7,249,123 B2 | 7/2007 | Elder et al. |
| 7,249,732 B2 | 7/2007 | Sanders, Jr. et al. |
| 7,251,647 B2 | 7/2007 | Hoblit |
| 7,254,559 B2 | 8/2007 | Florance et al. |
| 7,269,590 B2 | 9/2007 | Hull et al. |
| 7,293,019 B2 | 11/2007 | Dumais et al. |
| 7,296,026 B2 | 11/2007 | Patrick et al. |
| 7,306,186 B2 | 12/2007 | Kusic |
| 7,324,810 B2 | 1/2008 | Nave et al. |
| 7,343,564 B2 | 3/2008 | Othmer |
| 7,353,034 B2 | 4/2008 | Haney |
| 7,353,114 B1 | 4/2008 | Rohlf et al. |
| 7,353,199 B1 | 4/2008 | DiStefano, III |
| 7,359,871 B1 | 4/2008 | Paasche et al. |
| 7,359,894 B1 | 4/2008 | Liebman et al. |
| 7,373,244 B2 | 5/2008 | Kreft |
| 7,383,251 B2 | 6/2008 | Might |
| 7,386,542 B2 | 6/2008 | Maybury et al. |
| 7,424,438 B2 | 9/2008 | Vianello |
| 7,424,541 B2 | 9/2008 | Bourne |
| 7,433,832 B1 | 10/2008 | Bezos et al. |
| 7,433,868 B1 | 10/2008 | Satomi et al. |
| 7,437,368 B1 | 10/2008 | Kolluri et al. |
| 7,441,031 B2 | 10/2008 | Shrinivasan et al. |
| 7,447,509 B2 | 11/2008 | Cossins et al. |
| 7,447,685 B2 | 11/2008 | Nye |
| 7,447,771 B1 | 11/2008 | Taylor |
| 7,454,524 B2 | 11/2008 | Jeong |
| 7,477,285 B1 | 1/2009 | Johnson |
| 7,478,324 B1 | 1/2009 | Ohtsu |
| 7,480,867 B1 | 1/2009 | Racine et al. |
| 7,483,960 B2 | 1/2009 | Kyusojin |
| 7,487,114 B2 | 2/2009 | Florance et al. |
| 7,496,603 B2 | 2/2009 | Deguchi et al. |
| 7,500,258 B1 | 3/2009 | Eldering |
| 7,505,919 B2 | 3/2009 | Richardson |
| 7,520,466 B2 | 4/2009 | Bostan |
| 7,561,169 B2 | 7/2009 | Carroll |
| 7,562,023 B2 | 7/2009 | Yamamoto |
| 7,580,862 B1 | 8/2009 | Montelo et al. |
| 7,581,702 B2 | 9/2009 | Olson et al. |
| 7,587,276 B2 | 9/2009 | Gold et al. |
| 7,596,511 B2 | 9/2009 | Hall et al. |
| 7,599,795 B1 | 10/2009 | Blumberg et al. |
| 7,599,935 B2 | 10/2009 | La Rotonda et al. |
| 7,636,687 B2 | 12/2009 | Foster et al. |
| 7,640,204 B2 | 12/2009 | Florance et al. |
| 7,658,346 B2 | 2/2010 | Goossen |
| 7,668,405 B2 | 2/2010 | Gallagher |
| 7,669,123 B2 | 2/2010 | Zuckerberg et al. |
| 7,680,673 B2 | 3/2010 | Wheeler |
| 7,680,859 B2 | 3/2010 | Schiller |
| 7,693,953 B2 | 4/2010 | Middleton et al. |
| 7,725,492 B2 | 5/2010 | Sittig et al. |
| 7,734,254 B2 | 6/2010 | Frost et al. |
| 7,751,971 B2 | 7/2010 | Chang et al. |
| 7,761,789 B2 | 7/2010 | Erol et al. |
| 7,792,815 B2 | 9/2010 | Aravamudan et al. |
| 7,797,256 B2 | 9/2010 | Zuckerberg et al. |
| 7,801,542 B1 | 9/2010 | Stewart |
| 7,802,290 B1 | 9/2010 | Bansal et al. |
| 7,808,378 B2 | 10/2010 | Hayden |
| 7,809,709 B1 | 10/2010 | Harrison, Jr. |
| 7,809,805 B2 | 10/2010 | Stremel et al. |
| 7,810,037 B1 | 10/2010 | Edwards et al. |
| 7,812,717 B1 | 10/2010 | Cona et al. |
| 7,823,073 B2 | 10/2010 | Holmes et al. |
| 7,827,120 B1 * | 11/2010 | Evans et al. .................. 705/344 |
| 7,827,208 B2 | 11/2010 | Bosworth et al. |
| 7,827,265 B2 | 11/2010 | Cheever et al. |
| 7,831,917 B1 | 11/2010 | Karam |
| 7,840,224 B2 | 11/2010 | Vengroff et al. |
| 7,840,558 B2 | 11/2010 | Wiseman et al. |
| 7,848,765 B2 | 12/2010 | Phillips et al. |
| 7,853,518 B2 | 12/2010 | Cagan |
| 7,853,563 B2 | 12/2010 | Alvarado et al. |
| 7,860,889 B1 | 12/2010 | Martino et al. |
| 7,870,199 B2 | 1/2011 | Galli et al. |
| 7,881,864 B2 | 2/2011 | Smith |
| 7,886,024 B2 | 2/2011 | Kelly et al. |
| 7,904,366 B2 | 3/2011 | Pogust |
| 7,913,179 B2 | 3/2011 | Sheha et al. |
| 7,933,808 B2 | 4/2011 | Garcia |
| 7,933,810 B2 | 4/2011 | Morgenstern |
| 7,945,653 B2 | 5/2011 | Zuckerberg et al. |
| 7,949,714 B1 | 5/2011 | Burnim |
| 7,958,011 B1 | 6/2011 | Cretney et al. |
| 7,961,986 B1 | 6/2011 | Jing et al. |
| 7,962,281 B2 | 6/2011 | Rasmussen et al. |
| 7,966,567 B2 | 6/2011 | Abhyanker |
| 7,969,606 B2 | 6/2011 | Chu |
| 7,970,657 B2 | 6/2011 | Morgenstern |
| 7,991,703 B1 | 8/2011 | Watkins |
| 7,996,270 B2 | 8/2011 | Sundaresan |
| 8,027,943 B2 | 9/2011 | Juan et al. |
| 8,046,309 B2 | 10/2011 | Evans et al. |
| 8,051,089 B2 | 11/2011 | Gargi et al. |
| 8,060,389 B2 | 11/2011 | Johnson |
| 8,060,555 B2 | 11/2011 | Grayson et al. |
| 8,064,590 B2 | 11/2011 | Abhyanker |
| 8,065,291 B2 | 11/2011 | Knorr |
| 8,095,430 B2 | 1/2012 | Abhyanker |
| 8,103,734 B2 | 1/2012 | Galli et al. |
| 8,108,501 B2 | 1/2012 | Birnie et al. |
| 8,112,419 B2 | 2/2012 | Hancock et al. |
| 8,117,486 B2 | 2/2012 | Handley |
| 8,136,145 B2 | 3/2012 | Fetterman et al. |
| 8,145,661 B1 | 3/2012 | Billman et al. |
| 8,145,703 B2 | 3/2012 | Frishert et al. |
| 8,149,113 B2 | 4/2012 | Diem |
| 8,167,234 B1 | 5/2012 | Moore |
| 8,171,128 B2 | 5/2012 | Zuckerberg et al. |
| 8,190,357 B2 | 5/2012 | Abhyanker et al. |
| 8,190,476 B2 | 5/2012 | Urbanski et al. |
| 8,195,601 B2 | 6/2012 | Law et al. |
| 8,195,744 B2 | 6/2012 | Julia et al. |
| 8,204,776 B2 | 6/2012 | Abhyanker |
| 8,204,952 B2 | 6/2012 | Stremel et al. |
| 8,223,012 B1 | 7/2012 | Diem |
| 8,225,376 B2 | 7/2012 | Zuckerberg et al. |
| 8,229,470 B1 | 7/2012 | Ranjan et al. |
| 8,249,943 B2 | 8/2012 | Zuckerberg et al. |
| 8,271,057 B2 | 9/2012 | Levine et al. |
| 8,275,546 B2 | 9/2012 | Xiao et al. |
| 8,290,943 B2 | 10/2012 | Carbone et al. |
| 8,292,215 B2 | 10/2012 | Olm et al. |
| 8,296,373 B2 | 10/2012 | Bosworth et al. |
| 8,301,743 B2 | 10/2012 | Curran et al. |
| 8,315,389 B2 | 11/2012 | Qiu et al. |
| 8,326,091 B1 | 12/2012 | Jing et al. |
| 8,328,130 B2 | 12/2012 | Goossen |
| 8,364,757 B2 | 1/2013 | Scott et al. |
| 8,370,003 B2 | 2/2013 | So et al. |
| 8,380,638 B1 | 2/2013 | Watkins |
| 8,391,789 B2 | 3/2013 | Palin et al. |
| 8,391,909 B2 | 3/2013 | Stewart |
| 8,402,372 B2 | 3/2013 | Bosworth et al. |
| 8,402,372 B2 | 3/2013 | Gillespie et al. |

(56) References Cited

U.S. PATENT DOCUMENTS

| | | |
|---|---|---|
| 8,412,576 B2 | 4/2013 | Urbanski |
| 8,412,675 B2 | 4/2013 | Alvarado et al. |
| 8,427,308 B1 | 4/2013 | Baron, Sr. et al. |
| 8,428,565 B2 | 4/2013 | Middleton et al. |
| 8,433,609 B2 | 4/2013 | Abhyanker |
| 8,433,650 B1 | 4/2013 | Thomas |
| 8,438,156 B2 | 5/2013 | Redstone et al. |
| 8,442,923 B2 | 5/2013 | Gross |
| 8,443,107 B2 | 5/2013 | Burdette et al. |
| 8,447,810 B2 | 5/2013 | Roumeliotis et al. |
| 8,463,295 B1 | 6/2013 | Caralis et al. |
| 8,463,764 B2 | 6/2013 | Fujioka et al. |
| 8,473,199 B2 | 6/2013 | Blumberg et al. |
| 8,493,849 B2 | 7/2013 | Fuste Vilella et al. |
| 8,504,512 B2 | 8/2013 | Herzog et al. |
| 8,510,268 B1 | 8/2013 | Laforge et al. |
| 8,521,656 B2 | 8/2013 | Zimberoff et al. |
| 8,538,458 B2 | 9/2013 | Haney |
| 8,543,143 B2 | 9/2013 | Chandra et al. |
| 8,543,323 B1 | 9/2013 | Gold et al. |
| 8,548,493 B2 | 10/2013 | Rieger, III |
| 8,554,770 B2 | 10/2013 | Purdy |
| 8,554,852 B2 | 10/2013 | Burnim |
| 8,560,515 B2 | 10/2013 | Kimchi et al. |
| 8,584,091 B2 | 11/2013 | Champion et al. |
| 8,589,330 B2 | 11/2013 | Petersen et al. |
| 8,594,715 B1 | 11/2013 | Stewart |
| 8,595,292 B2 | 11/2013 | Grayson et al. |
| 8,600,602 B1 | 12/2013 | McAndrew et al. |
| 8,615,565 B2 | 12/2013 | Randall |
| 8,620,532 B2 | 12/2013 | Curtis et al. |
| 8,620,827 B1 | 12/2013 | Watkins, III |
| 8,621,374 B2 | 12/2013 | Sheha et al. |
| 8,626,699 B2 | 1/2014 | Xie et al. |
| 8,627,506 B2 | 1/2014 | Vera et al. |
| 8,649,976 B2 | 2/2014 | Kreft |
| 8,650,103 B2 | 2/2014 | Wilf et al. |
| 8,655,873 B2 | 2/2014 | Mitchell et al. |
| 8,660,541 B1 | 2/2014 | Beresniewicz et al. |
| 8,660,897 B2 | 2/2014 | Abhyanker |
| 8,666,660 B2 | 3/2014 | Sartipi et al. |
| 8,671,095 B2 | 3/2014 | Gross |
| 8,671,106 B1 | 3/2014 | Lee et al. |
| 8,683,342 B2 | 3/2014 | Van Riel |
| 8,688,594 B2 | 4/2014 | Thomas et al. |
| 8,694,605 B1 | 4/2014 | Burrell et al. |
| 8,695,919 B2 | 4/2014 | Shachor et al. |
| 8,712,441 B2 | 4/2014 | Haney |
| 8,713,055 B2 | 4/2014 | Callahan et al. |
| 8,713,143 B2 | 4/2014 | Centola et al. |
| 8,718,910 B2 | 5/2014 | Guéziec |
| 8,723,679 B2 | 5/2014 | Whisenant |
| 8,732,091 B1 | 5/2014 | Abhyanker |
| 8,732,155 B2 | 5/2014 | Vegnaduzzo et al. |
| 8,732,219 B1 | 5/2014 | Ferries et al. |
| 8,732,846 B2 | 5/2014 | D'Angelo et al. |
| 8,738,545 B2 | 5/2014 | Abhyanker |
| 8,775,405 B2 | 7/2014 | Gross |
| D710,454 S | 8/2014 | Barajas et al. |
| 8,794,566 B2 | 8/2014 | Hutson |
| 8,799,253 B2 | 8/2014 | Valliani et al. |
| 8,832,556 B2 | 9/2014 | Steinberg |
| 2001/0005829 A1 | 6/2001 | Raveis |
| 2001/0020955 A1 | 9/2001 | Nakagawa et al. |
| 2001/0029426 A1 | 10/2001 | Hancock et al. |
| 2001/0029501 A1 | 10/2001 | Yokobori et al. |
| 2001/0036833 A1 | 11/2001 | Koshima et al. |
| 2001/0037721 A1 | 11/2001 | Hasegawa et al. |
| 2001/0042087 A1 | 11/2001 | Kephart et al. |
| 2001/0049616 A1 | 12/2001 | Khuzadi et al. |
| 2001/0049636 A1 | 12/2001 | Hudda et al. |
| 2002/0019739 A1 | 2/2002 | Juneau et al. |
| 2002/0023018 A1 | 2/2002 | Kleinbaum |
| 2002/0026388 A1 | 2/2002 | Roebuck |
| 2002/0029350 A1 | 3/2002 | Cooper et al. |
| 2002/0030689 A1 | 3/2002 | Eichel et al. |
| 2002/0038225 A1 | 3/2002 | Klasky et al. |
| 2002/0046243 A1 | 4/2002 | Morris et al. |
| 2002/0049617 A1 | 4/2002 | Lencki et al. |
| 2002/0059201 A1 | 5/2002 | Work |
| 2002/0059379 A1 | 5/2002 | Harvey et al. |
| 2002/0065691 A1 | 5/2002 | Twig et al. |
| 2002/0065739 A1 | 5/2002 | Florance et al. |
| 2002/0070967 A1 | 6/2002 | Tanner et al. |
| 2002/0072848 A1 | 6/2002 | Hamada et al. |
| 2002/0077060 A1 | 6/2002 | Lehikoinen et al. |
| 2002/0077901 A1 | 6/2002 | Katz |
| 2002/0078171 A1 | 6/2002 | Schneider |
| 2002/0087260 A1 | 7/2002 | Hancock et al. |
| 2002/0087506 A1 | 7/2002 | Reddy |
| 2002/0090996 A1 | 7/2002 | Maehiro |
| 2002/0091556 A1 | 7/2002 | Fiala et al. |
| 2002/0097267 A1 | 7/2002 | Dinan et al. |
| 2002/0099693 A1 | 7/2002 | Kofsky |
| 2002/0103813 A1 | 8/2002 | Frigon |
| 2002/0103892 A1 | 8/2002 | Rieger |
| 2002/0124009 A1 | 9/2002 | Hoblit |
| 2002/0124053 A1 | 9/2002 | Adams et al. |
| 2002/0130906 A1 | 9/2002 | Miyaki |
| 2002/0133292 A1 | 9/2002 | Miyaki |
| 2002/0143462 A1 | 10/2002 | Warren |
| 2002/0147638 A1 | 10/2002 | Banerjee et al. |
| 2002/0156782 A1 | 10/2002 | Rubert |
| 2002/0156917 A1 | 10/2002 | Nye |
| 2002/0160762 A1 | 10/2002 | Nave et al. |
| 2002/0161666 A1 | 10/2002 | Fraki et al. |
| 2002/0169662 A1 | 11/2002 | Claiborne |
| 2002/0184496 A1 | 12/2002 | Mitchell et al. |
| 2003/0004802 A1 | 1/2003 | Callegari |
| 2003/0005035 A1 | 1/2003 | Rodgers |
| 2003/0018521 A1 | 1/2003 | Kraft et al. |
| 2003/0023489 A1 | 1/2003 | McGuire et al. |
| 2003/0023586 A1 | 1/2003 | Knorr |
| 2003/0033176 A1 | 2/2003 | Hancock |
| 2003/0036963 A1 | 2/2003 | Jacobson et al. |
| 2003/0055983 A1 | 3/2003 | Callegari |
| 2003/0061503 A1 | 3/2003 | Katz et al. |
| 2003/0063072 A1 | 4/2003 | Brandenberg et al. |
| 2003/0064705 A1 | 4/2003 | Desiderio |
| 2003/0065716 A1 | 4/2003 | Kyusojin |
| 2003/0069002 A1 | 4/2003 | Hunter et al. |
| 2003/0069693 A1 | 4/2003 | Snapp et al. |
| 2003/0078897 A1 | 4/2003 | Florance et al. |
| 2003/0088520 A1 | 5/2003 | Bohrer et al. |
| 2003/0145093 A1 | 7/2003 | Oren et al. |
| 2003/0154020 A1 | 8/2003 | Polidi |
| 2003/0154213 A1 | 8/2003 | Ahn |
| 2003/0158668 A1 | 8/2003 | Anderson |
| 2003/0177019 A1 | 9/2003 | Santos et al. |
| 2003/0177192 A1 | 9/2003 | Umeki et al. |
| 2003/0200192 A1 | 10/2003 | Bell et al. |
| 2003/0218253 A1 | 11/2003 | Avanzino et al. |
| 2003/0220807 A1 | 11/2003 | Hoffman et al. |
| 2003/0222918 A1 | 12/2003 | Coulthard |
| 2003/0225632 A1 | 12/2003 | Tong et al. |
| 2003/0225833 A1 | 12/2003 | Pilat et al. |
| 2004/0002871 A1 | 1/2004 | Geranio |
| 2004/0003283 A1 | 1/2004 | Goodman et al. |
| 2004/0021584 A1 | 2/2004 | Hartz et al. |
| 2004/0024846 A1 | 2/2004 | Randall et al. |
| 2004/0030525 A1 | 2/2004 | Robinson et al. |
| 2004/0030741 A1 | 2/2004 | Wolton et al. |
| 2004/0039581 A1 | 2/2004 | Wheeler |
| 2004/0054428 A1 | 3/2004 | Sheha et al. |
| 2004/0088177 A1 | 5/2004 | Travis et al. |
| 2004/0109012 A1 | 6/2004 | Kraus et al. |
| 2004/0111302 A1 | 6/2004 | Falk et al. |
| 2004/0122693 A1 | 6/2004 | Hatscher et al. |
| 2004/0128215 A1 | 7/2004 | Florance et al. |
| 2004/0135805 A1 | 7/2004 | Gottsacker et al. |
| 2004/0139034 A1 | 7/2004 | Farmer |
| 2004/0139049 A1 | 7/2004 | Hancock et al. |
| 2004/0145593 A1 | 7/2004 | Berkner et al. |
| 2004/0146199 A1 | 7/2004 | Berkner et al. |

(56) References Cited

U.S. PATENT DOCUMENTS

| | | |
|---|---|---|
| 2004/0148275 A1 | 7/2004 | Achlioptas |
| 2004/0153466 A1 | 8/2004 | Ziff et al. |
| 2004/0157648 A1 | 8/2004 | Lightman |
| 2004/0158488 A1 | 8/2004 | Johnson |
| 2004/0162064 A1 | 8/2004 | Himmelstein |
| 2004/0166878 A1 | 8/2004 | Erskine et al. |
| 2004/0167787 A1 | 8/2004 | Lynch et al. |
| 2004/0172280 A1 | 9/2004 | Fraki et al. |
| 2004/0186766 A1 | 9/2004 | Fellenstein et al. |
| 2004/0210661 A1 | 10/2004 | Thompson |
| 2004/0215559 A1 | 10/2004 | Rebenack et al. |
| 2004/0217884 A1 | 11/2004 | Samadani et al. |
| 2004/0217980 A1 | 11/2004 | Radburn et al. |
| 2004/0220903 A1 | 11/2004 | Shah et al. |
| 2004/0220906 A1 | 11/2004 | Gargi et al. |
| 2004/0236771 A1 | 11/2004 | Colver et al. |
| 2004/0257340 A1 | 12/2004 | Jawerth |
| 2004/0260604 A1 | 12/2004 | Bedingfield |
| 2004/0267625 A1 | 12/2004 | Feng et al. |
| 2005/0015488 A1 | 1/2005 | Bayyapu |
| 2005/0018177 A1 | 1/2005 | Rosenberg et al. |
| 2005/0021750 A1 | 1/2005 | Abrams |
| 2005/0027723 A1 | 2/2005 | Jones et al. |
| 2005/0034075 A1 | 2/2005 | Riegelman et al. |
| 2005/0044061 A1 | 2/2005 | Klemow |
| 2005/0049971 A1 | 3/2005 | Bettinger |
| 2005/0055353 A1 | 3/2005 | Marx et al. |
| 2005/0086309 A1 | 4/2005 | Galli et al. |
| 2005/0091027 A1 | 4/2005 | Zaher et al. |
| 2005/0091175 A9 | 4/2005 | Farmer |
| 2005/0091209 A1 | 4/2005 | Frank et al. |
| 2005/0096977 A1 | 5/2005 | Rossides |
| 2005/0097319 A1 | 5/2005 | Zhu et al. |
| 2005/0108520 A1 | 5/2005 | Yamamoto et al. |
| 2005/0114527 A1 | 5/2005 | Hankey et al. |
| 2005/0114759 A1 | 5/2005 | Williams et al. |
| 2005/0114783 A1 | 5/2005 | Szeto |
| 2005/0120084 A1 | 6/2005 | Hu et al. |
| 2005/0131761 A1 | 6/2005 | Trika et al. |
| 2005/0137015 A1 | 6/2005 | Rogers et al. |
| 2005/0143174 A1 | 6/2005 | Goldman et al. |
| 2005/0144065 A1 | 6/2005 | Calabria et al. |
| 2005/0149432 A1 | 7/2005 | Galey |
| 2005/0154639 A1 | 7/2005 | Zetmeir |
| 2005/0159970 A1 | 7/2005 | Buyukkokten et al. |
| 2005/0171799 A1 | 8/2005 | Hull et al. |
| 2005/0171832 A1 | 8/2005 | Hull et al. |
| 2005/0171954 A1 | 8/2005 | Hull et al. |
| 2005/0171955 A1 | 8/2005 | Hull et al. |
| 2005/0177385 A1 | 8/2005 | Hull et al. |
| 2005/0187823 A1 | 8/2005 | Howes |
| 2005/0192859 A1 | 9/2005 | Mertins et al. |
| 2005/0192912 A1 | 9/2005 | Bator et al. |
| 2005/0192999 A1 | 9/2005 | Cook et al. |
| 2005/0193410 A1 | 9/2005 | Eldering |
| 2005/0197775 A1 | 9/2005 | Smith |
| 2005/0197846 A1 | 9/2005 | Pezaris et al. |
| 2005/0198020 A1 | 9/2005 | Garland et al. |
| 2005/0198031 A1 | 9/2005 | Pezaris et al. |
| 2005/0198305 A1 | 9/2005 | Pezaris et al. |
| 2005/0203768 A1 | 9/2005 | Florance et al. |
| 2005/0203769 A1 | 9/2005 | Weild |
| 2005/0203807 A1 | 9/2005 | Bezos et al. |
| 2005/0209781 A1 | 9/2005 | Anderson |
| 2005/0216186 A1 | 9/2005 | Dorfman et al. |
| 2005/0216300 A1 | 9/2005 | Appelman et al. |
| 2005/0216550 A1 | 9/2005 | Paseman et al. |
| 2005/0219044 A1 | 10/2005 | Douglass et al. |
| 2005/0235062 A1 | 10/2005 | Lunt et al. |
| 2005/0240580 A1 | 10/2005 | Zamir et al. |
| 2005/0251331 A1 | 11/2005 | Kreft |
| 2005/0256756 A1 | 11/2005 | Lam et al. |
| 2005/0259648 A1 | 11/2005 | Kodialam et al. |
| 2005/0270299 A1 | 12/2005 | Rasmussen et al. |
| 2005/0273346 A1 | 12/2005 | Frost |
| 2005/0283497 A1 | 12/2005 | Nurminen et al. |
| 2005/0288957 A1 | 12/2005 | Eraker et al. |
| 2005/0288958 A1 | 12/2005 | Eraker et al. |
| 2005/0289650 A1 | 12/2005 | Kalogridis |
| 2006/0004680 A1 | 1/2006 | Robarts et al. |
| 2006/0004703 A1 | 1/2006 | Spivack et al. |
| 2006/0004734 A1 | 1/2006 | Malkin et al. |
| 2006/0022048 A1 | 2/2006 | Johnson |
| 2006/0023881 A1 | 2/2006 | Akiyama et al. |
| 2006/0026147 A1 | 2/2006 | Cone et al. |
| 2006/0036588 A1 | 2/2006 | Frank et al. |
| 2006/0036748 A1 | 2/2006 | Nusbaum et al. |
| 2006/0041543 A1 | 2/2006 | Achlioptas |
| 2006/0042483 A1 | 3/2006 | Work et al. |
| 2006/0047825 A1 | 3/2006 | Steenstra et al. |
| 2006/0048059 A1 | 3/2006 | Etkin |
| 2006/0052091 A1 | 3/2006 | Onyon et al. |
| 2006/0058952 A1 | 3/2006 | Cooper et al. |
| 2006/0059023 A1 | 3/2006 | Mashinsky |
| 2006/0064431 A1 | 3/2006 | Kishore et al. |
| 2006/0075335 A1 | 4/2006 | Gloor |
| 2006/0080613 A1 | 4/2006 | Savant |
| 2006/0085419 A1 | 4/2006 | Rosen |
| 2006/0089882 A1 | 4/2006 | Shimansky |
| 2006/0100892 A1 | 5/2006 | Ellanti |
| 2006/0113425 A1 | 6/2006 | Rader |
| 2006/0123053 A1 | 6/2006 | Scannell |
| 2006/0136127 A1 | 6/2006 | Coch et al. |
| 2006/0136419 A1 | 6/2006 | Brydon et al. |
| 2006/0143066 A1 | 6/2006 | Calabria |
| 2006/0143067 A1 | 6/2006 | Calabria |
| 2006/0143183 A1 | 6/2006 | Goldberg et al. |
| 2006/0149624 A1 | 7/2006 | Baluja et al. |
| 2006/0161599 A1 | 7/2006 | Rosen |
| 2006/0178972 A1 | 8/2006 | Jung et al. |
| 2006/0184578 A1 | 8/2006 | La Rotonda et al. |
| 2006/0184617 A1 | 8/2006 | Nicholas et al. |
| 2006/0184997 A1 | 8/2006 | La Rotonda et al. |
| 2006/0190279 A1 | 8/2006 | Heflin |
| 2006/0190281 A1 | 8/2006 | Kott et al. |
| 2006/0194186 A1 | 8/2006 | Nanda |
| 2006/0200384 A1 | 9/2006 | Arutunian et al. |
| 2006/0217885 A1 | 9/2006 | Crady et al. |
| 2006/0218225 A1 | 9/2006 | Hee Voon et al. |
| 2006/0218226 A1 | 9/2006 | Johnson et al. |
| 2006/0223518 A1 | 10/2006 | Haney |
| 2006/0226281 A1 | 10/2006 | Walton |
| 2006/0229063 A1 | 10/2006 | Koch |
| 2006/0230061 A1 | 10/2006 | Sample et al. |
| 2006/0238383 A1 | 10/2006 | Kimchi et al. |
| 2006/0242139 A1 | 10/2006 | Butterfield et al. |
| 2006/0242178 A1 | 10/2006 | Butterfield et al. |
| 2006/0242581 A1 | 10/2006 | Manion et al. |
| 2006/0247940 A1 | 11/2006 | Zhu et al. |
| 2006/0248573 A1 | 11/2006 | Pannu et al. |
| 2006/0251292 A1 | 11/2006 | Gokturk et al. |
| 2006/0253491 A1 | 11/2006 | Gokturk et al. |
| 2006/0256008 A1 | 11/2006 | Rosenberg |
| 2006/0264209 A1 | 11/2006 | Atkinson et al. |
| 2006/0265277 A1 | 11/2006 | Yasinovsky et al. |
| 2006/0265417 A1 | 11/2006 | Amato et al. |
| 2006/0270419 A1 | 11/2006 | Crowley et al. |
| 2006/0270421 A1 | 11/2006 | Phillips et al. |
| 2006/0271287 A1 | 11/2006 | Gold et al. |
| 2006/0271472 A1 | 11/2006 | Cagan |
| 2006/0293976 A1 | 12/2006 | Nam |
| 2006/0294011 A1 | 12/2006 | Smith |
| 2007/0002057 A1 | 1/2007 | Danzig et al. |
| 2007/0003182 A1 | 1/2007 | Hunn |
| 2007/0005683 A1 | 1/2007 | Omidyar |
| 2007/0005750 A1 | 1/2007 | Lunt et al. |
| 2007/0011148 A1 | 1/2007 | Burkey et al. |
| 2007/0011617 A1 | 1/2007 | Akagawa et al. |
| 2007/0016689 A1 | 1/2007 | Birch |
| 2007/0027920 A1 | 2/2007 | Alvarado et al. |
| 2007/0032942 A1 | 2/2007 | Thota |
| 2007/0033064 A1 | 2/2007 | Abrahamsohn |
| 2007/0033182 A1 | 2/2007 | Knorr |
| 2007/0038646 A1 | 2/2007 | Thota |

(56) References Cited

U.S. PATENT DOCUMENTS

| | | |
|---|---|---|
| 2007/0043947 A1 | 2/2007 | Mizikovsky et al. |
| 2007/0050360 A1 | 3/2007 | Hull et al. |
| 2007/0061128 A1 | 3/2007 | Odom et al. |
| 2007/0061405 A1 | 3/2007 | Keohane et al. |
| 2007/0067219 A1 | 3/2007 | Altberg et al. |
| 2007/0078747 A1 | 4/2007 | Baack |
| 2007/0078772 A1 | 4/2007 | Dadd |
| 2007/0099609 A1 | 5/2007 | Cai |
| 2007/0105536 A1 | 5/2007 | Tingo |
| 2007/0106627 A1 | 5/2007 | Srivastava et al. |
| 2007/0112645 A1 | 5/2007 | Traynor et al. |
| 2007/0112729 A1 | 5/2007 | Wiseman et al. |
| 2007/0118430 A1 | 5/2007 | Wiseman et al. |
| 2007/0118525 A1 | 5/2007 | Svendsen |
| 2007/0150375 A1 | 6/2007 | Yang |
| 2007/0150603 A1 | 6/2007 | Crull et al. |
| 2007/0156429 A1 | 7/2007 | Godar |
| 2007/0159651 A1 | 7/2007 | Disario et al. |
| 2007/0162432 A1 | 7/2007 | Armstrong et al. |
| 2007/0162458 A1 | 7/2007 | Fasciano |
| 2007/0162547 A1 | 7/2007 | Ross |
| 2007/0162942 A1 | 7/2007 | Hamynen et al. |
| 2007/0167204 A1 | 7/2007 | Lyle et al. |
| 2007/0168852 A1 | 7/2007 | Erol et al. |
| 2007/0168888 A1 | 7/2007 | Jawerth |
| 2007/0174389 A1 | 7/2007 | Armstrong et al. |
| 2007/0179905 A1 | 8/2007 | Buch et al. |
| 2007/0185906 A1 | 8/2007 | Humphries et al. |
| 2007/0192299 A1 | 8/2007 | Zuckerberg et al. |
| 2007/0203644 A1 | 8/2007 | Thota et al. |
| 2007/0207755 A1 | 9/2007 | Julia et al. |
| 2007/0208613 A1 | 9/2007 | Backer |
| 2007/0208802 A1 | 9/2007 | Barman et al. |
| 2007/0208916 A1 | 9/2007 | Tomita |
| 2007/0214141 A1 | 9/2007 | Sittig et al. |
| 2007/0219659 A1 | 9/2007 | Abhyanker et al. |
| 2007/0219712 A1 | 9/2007 | Abhyanker |
| 2007/0220174 A1 | 9/2007 | Abhyanker |
| 2007/0226314 A1 | 9/2007 | Eick et al. |
| 2007/0233291 A1 | 10/2007 | Herde et al. |
| 2007/0233367 A1 | 10/2007 | Chen et al. |
| 2007/0233375 A1 | 10/2007 | Garg et al. |
| 2007/0233582 A1 | 10/2007 | Abhyanker |
| 2007/0239352 A1 | 10/2007 | Thota et al. |
| 2007/0239552 A1 | 10/2007 | Sundaresan |
| 2007/0239648 A1 | 10/2007 | Thota |
| 2007/0245002 A1 | 10/2007 | Nguyen et al. |
| 2007/0250321 A1 | 10/2007 | Balusu |
| 2007/0250511 A1 | 10/2007 | Endler et al. |
| 2007/0255785 A1 | 11/2007 | Hayashi et al. |
| 2007/0255831 A1 | 11/2007 | Hayashi et al. |
| 2007/0258642 A1 | 11/2007 | Thota |
| 2007/0259654 A1 | 11/2007 | Oijer |
| 2007/0260599 A1 | 11/2007 | McGuire et al. |
| 2007/0261071 A1 | 11/2007 | Lunt et al. |
| 2007/0266003 A1 | 11/2007 | Wong et al. |
| 2007/0266097 A1 | 11/2007 | Harik et al. |
| 2007/0266118 A1 | 11/2007 | Wilkins |
| 2007/0270163 A1 | 11/2007 | Anupam et al. |
| 2007/0271367 A1 | 11/2007 | Yardeni et al. |
| 2007/0273558 A1 | 11/2007 | Smith et al. |
| 2007/0281689 A1 | 12/2007 | Altman et al. |
| 2007/0281690 A1 | 12/2007 | Altman et al. |
| 2007/0281716 A1 | 12/2007 | Altman et al. |
| 2007/0282621 A1 | 12/2007 | Altman et al. |
| 2007/0282987 A1 | 12/2007 | Fischer et al. |
| 2007/0288164 A1 | 12/2007 | Gordon et al. |
| 2007/0288621 A1 | 12/2007 | Gundu et al. |
| 2007/0294357 A1 | 12/2007 | Antoine |
| 2008/0005076 A1 | 1/2008 | Payne et al. |
| 2008/0005231 A1 | 1/2008 | Kelley et al. |
| 2008/0010343 A1 | 1/2008 | Escaffi et al. |
| 2008/0016051 A1 | 1/2008 | Schiller |
| 2008/0020814 A1 | 1/2008 | Kernene |
| 2008/0032666 A1 | 2/2008 | Hughes et al. |
| 2008/0032703 A1 | 2/2008 | Krumm et al. |
| 2008/0033641 A1 | 2/2008 | Medalia |
| 2008/0033652 A1 | 2/2008 | Hensley et al. |
| 2008/0033739 A1 | 2/2008 | Zuckerberg et al. |
| 2008/0033776 A1 | 2/2008 | Marchese |
| 2008/0040370 A1 | 2/2008 | Bosworth et al. |
| 2008/0040428 A1 | 2/2008 | Wei et al. |
| 2008/0040474 A1 | 2/2008 | Zuckerberg et al. |
| 2008/0040475 A1 | 2/2008 | Bosworth et al. |
| 2008/0040673 A1 | 2/2008 | Zuckerberg et al. |
| 2008/0043020 A1 | 2/2008 | Snow et al. |
| 2008/0043037 A1 | 2/2008 | Carroll |
| 2008/0046976 A1 | 2/2008 | Zuckerberg |
| 2008/0048065 A1 | 2/2008 | Kuntz |
| 2008/0051932 A1 | 2/2008 | Jermyn et al. |
| 2008/0059992 A1 | 3/2008 | Amidon et al. |
| 2008/0065321 A1 | 3/2008 | DaCosta |
| 2008/0065611 A1 | 3/2008 | Hepworth et al. |
| 2008/0070593 A1 | 3/2008 | Altman et al. |
| 2008/0070697 A1 | 3/2008 | Robinson et al. |
| 2008/0071929 A1 | 3/2008 | Motte et al. |
| 2008/0077581 A1 | 3/2008 | Drayer et al. |
| 2008/0077642 A1 | 3/2008 | Carbone et al. |
| 2008/0077708 A1 | 3/2008 | Scott et al. |
| 2008/0086368 A1 | 4/2008 | Bauman et al. |
| 2008/0086458 A1 | 4/2008 | Robinson et al. |
| 2008/0091461 A1 | 4/2008 | Evans et al. |
| 2008/0091723 A1 | 4/2008 | Zuckerberg et al. |
| 2008/0097999 A1 | 4/2008 | Horan |
| 2008/0098090 A1 | 4/2008 | Geraci et al. |
| 2008/0098313 A1 | 4/2008 | Pollack |
| 2008/0103959 A1 | 5/2008 | Carroll et al. |
| 2008/0104227 A1 | 5/2008 | Birnie et al. |
| 2008/0109718 A1 | 5/2008 | Narayanaswami |
| 2008/0115082 A1 | 5/2008 | Simmons et al. |
| 2008/0115226 A1 | 5/2008 | Welingkar et al. |
| 2008/0117928 A1 | 5/2008 | Abhyanker |
| 2008/0125969 A1 | 5/2008 | Chen et al. |
| 2008/0126355 A1 | 5/2008 | Rowley |
| 2008/0126411 A1 | 5/2008 | Zhuang et al. |
| 2008/0126476 A1 | 5/2008 | Nicholas et al. |
| 2008/0126478 A1 | 5/2008 | Ferguson et al. |
| 2008/0133495 A1 | 6/2008 | Fischer |
| 2008/0133649 A1 | 6/2008 | Pennington |
| 2008/0134035 A1 | 6/2008 | Pennington et al. |
| 2008/0148156 A1 | 6/2008 | Brewer et al. |
| 2008/0154733 A1 | 6/2008 | Wolfe |
| 2008/0155019 A1 | 6/2008 | Wallace et al. |
| 2008/0162211 A1 | 7/2008 | Addington |
| 2008/0162260 A1 | 7/2008 | Rohan et al. |
| 2008/0168068 A1 | 7/2008 | Hutheesing |
| 2008/0168175 A1 | 7/2008 | Tran |
| 2008/0172173 A1 | 7/2008 | Chang et al. |
| 2008/0172244 A1 | 7/2008 | Coupal et al. |
| 2008/0172288 A1 | 7/2008 | Pilskalns et al. |
| 2008/0189292 A1 | 8/2008 | Stremel et al. |
| 2008/0189380 A1 | 8/2008 | Bosworth et al. |
| 2008/0189768 A1 | 8/2008 | Callahan et al. |
| 2008/0195483 A1 | 8/2008 | Moore |
| 2008/0201156 A1 | 8/2008 | Abhyanker |
| 2008/0208956 A1 | 8/2008 | Spiridellis et al. |
| 2008/0208969 A1 | 8/2008 | Van Riel |
| 2008/0215994 A1 | 9/2008 | Harrison et al. |
| 2008/0221846 A1 | 9/2008 | Aggarwal et al. |
| 2008/0221984 A1 | 9/2008 | Abhyanker |
| 2008/0222140 A1 | 9/2008 | Lagad et al. |
| 2008/0222308 A1 | 9/2008 | Abhyanker |
| 2008/0228719 A1 | 9/2008 | Abhyanker et al. |
| 2008/0228775 A1 | 9/2008 | Abhyanker et al. |
| 2008/0229424 A1 | 9/2008 | Harris et al. |
| 2008/0231630 A1 | 9/2008 | Shenkar et al. |
| 2008/0238941 A1 | 10/2008 | Kinnan et al. |
| 2008/0240397 A1 | 10/2008 | Abhyanker |
| 2008/0242317 A1 | 10/2008 | Abhyanker |
| 2008/0243598 A1 | 10/2008 | Abhyanker |
| 2008/0243667 A1 | 10/2008 | Lecomte |
| 2008/0243830 A1 | 10/2008 | Abhyanker |
| 2008/0250025 A1 | 10/2008 | Abhyanker |
| 2008/0255759 A1 | 10/2008 | Abhyanker |

(56) References Cited

U.S. PATENT DOCUMENTS

| | | |
|---|---|---|
| 2008/0256230 A1 | 10/2008 | Handley |
| 2008/0263460 A1 | 10/2008 | Altberg et al. |
| 2008/0270158 A1 | 10/2008 | Abhyanker |
| 2008/0270366 A1 | 10/2008 | Frank |
| 2008/0270615 A1 | 10/2008 | Centola et al. |
| 2008/0270945 A1 | 10/2008 | Abhyanker |
| 2008/0281854 A1 | 11/2008 | Abhyanker |
| 2008/0288277 A1 | 11/2008 | Fasciano |
| 2008/0288612 A1 | 11/2008 | Kwon |
| 2008/0294678 A1 | 11/2008 | Gorman et al. |
| 2008/0294747 A1 | 11/2008 | Abhyanker |
| 2008/0300979 A1 | 12/2008 | Abhyanker |
| 2008/0301565 A1 | 12/2008 | Abhyanker |
| 2008/0306754 A1 | 12/2008 | Abhyanker |
| 2008/0307053 A1 | 12/2008 | Mitnick et al. |
| 2008/0307066 A1 | 12/2008 | Amidon et al. |
| 2008/0307320 A1 | 12/2008 | Payne et al. |
| 2008/0316021 A1 | 12/2008 | Manz et al. |
| 2008/0319778 A1 | 12/2008 | Abhyanker |
| 2008/0319806 A1 | 12/2008 | Abhyanker |
| 2009/0003265 A1 | 1/2009 | Agarwal et al. |
| 2009/0006177 A1 | 1/2009 | Beaver et al. |
| 2009/0006473 A1 | 1/2009 | Elliott et al. |
| 2009/0007195 A1 | 1/2009 | Beyabani |
| 2009/0018850 A1 | 1/2009 | Abhyanker |
| 2009/0018925 A1 | 1/2009 | Abhyanker |
| 2009/0019004 A1 | 1/2009 | Abhyanker |
| 2009/0019085 A1 | 1/2009 | Abhyanker |
| 2009/0019122 A1 | 1/2009 | Abhyanker |
| 2009/0019366 A1 | 1/2009 | Abhyanker |
| 2009/0019373 A1 | 1/2009 | Abhyanker |
| 2009/0024740 A1 | 1/2009 | Abhyanker |
| 2009/0029672 A1 | 1/2009 | Manz |
| 2009/0030927 A1 | 1/2009 | Cases et al. |
| 2009/0031006 A1 | 1/2009 | Johnson |
| 2009/0031245 A1 | 1/2009 | Brezina et al. |
| 2009/0031301 A1 | 1/2009 | D'Angelo et al. |
| 2009/0043650 A1 | 2/2009 | Abhyanker et al. |
| 2009/0044254 A1 | 2/2009 | Tian |
| 2009/0048922 A1 | 2/2009 | Morgenstern et al. |
| 2009/0049018 A1 | 2/2009 | Gross |
| 2009/0049037 A1 | 2/2009 | Gross |
| 2009/0049070 A1 | 2/2009 | Steinberg |
| 2009/0049127 A1 | 2/2009 | Juan et al. |
| 2009/0061883 A1 | 3/2009 | Abhyanker |
| 2009/0063252 A1 | 3/2009 | Abhyanker |
| 2009/0063467 A1 | 3/2009 | Abhyanker |
| 2009/0063500 A1 | 3/2009 | Zhai et al. |
| 2009/0064011 A1 | 3/2009 | Abhyanker |
| 2009/0064144 A1 | 3/2009 | Abhyanker |
| 2009/0069034 A1 | 3/2009 | Abhyanker |
| 2009/0070334 A1 | 3/2009 | Callahan et al. |
| 2009/0070435 A1 | 3/2009 | Abhyanker |
| 2009/0077100 A1 | 3/2009 | Hancock et al. |
| 2009/0102644 A1 | 4/2009 | Hayden |
| 2009/0132504 A1 | 5/2009 | Vegnaduzzo et al. |
| 2009/0132644 A1 | 5/2009 | Frishert et al. |
| 2009/0171950 A1 | 7/2009 | Lunenfeld |
| 2009/0177577 A1 | 7/2009 | Garcia |
| 2009/0228305 A1 | 9/2009 | Gustafsson et al. |
| 2009/0254971 A1 | 10/2009 | Herz et al. |
| 2009/0271417 A1 | 10/2009 | Toebes et al. |
| 2009/0271524 A1 | 10/2009 | Davi et al. |
| 2009/0282353 A1 | 11/2009 | Halbherr et al. |
| 2009/0284530 A1 | 11/2009 | Lester et al. |
| 2009/0287682 A1 | 11/2009 | Fujioka et al. |
| 2010/0011081 A1 | 1/2010 | Crowley et al. |
| 2010/0023388 A1 | 1/2010 | Blumberg et al. |
| 2010/0024045 A1 | 1/2010 | Sastry et al. |
| 2010/0051740 A1 | 3/2010 | Yoeli |
| 2010/0057555 A1 | 3/2010 | Butterfield et al. |
| 2010/0064007 A1 | 3/2010 | Randall |
| 2010/0082683 A1 | 4/2010 | Law et al. |
| 2010/0083125 A1 | 4/2010 | Zafar et al. |
| 2010/0088015 A1 | 4/2010 | Lee |
| 2010/0094548 A1 | 4/2010 | Tadman et al. |
| 2010/0100937 A1 | 4/2010 | Tran |
| 2010/0106731 A1 | 4/2010 | Cartmell et al. |
| 2010/0108801 A1 | 5/2010 | Olm et al. |
| 2010/0118025 A1 | 5/2010 | Smith et al. |
| 2010/0120422 A1 | 5/2010 | Cheung et al. |
| 2010/0138259 A1 | 6/2010 | Delk |
| 2010/0138318 A1 | 6/2010 | Chun |
| 2010/0191798 A1 | 7/2010 | Seefeld et al. |
| 2010/0198684 A1 | 8/2010 | Eraker et al. |
| 2010/0214250 A1 | 8/2010 | Gillespie et al. |
| 2010/0231383 A1 | 9/2010 | Levine et al. |
| 2010/0243794 A1 | 9/2010 | Jermyn |
| 2010/0275033 A1 | 10/2010 | Gillespie et al. |
| 2010/0306016 A1 | 12/2010 | Solaro et al. |
| 2011/0001020 A1 | 1/2011 | Forgac |
| 2011/0015954 A1 | 1/2011 | Ward |
| 2011/0022540 A1 | 1/2011 | Stern et al. |
| 2011/0040681 A1 | 2/2011 | Ahroon |
| 2011/0040692 A1 | 2/2011 | Ahroon |
| 2011/0041084 A1 | 2/2011 | Karam |
| 2011/0061018 A1 | 3/2011 | Piratla et al. |
| 2011/0066588 A1 | 3/2011 | Xie et al. |
| 2011/0066648 A1 | 3/2011 | Abhyanker et al. |
| 2011/0078012 A1 | 3/2011 | Adamec |
| 2011/0078270 A1 | 3/2011 | Galli et al. |
| 2011/0082747 A1 | 4/2011 | Khan et al. |
| 2011/0087667 A1 | 4/2011 | Hutheesing |
| 2011/0093340 A1 | 4/2011 | Kramer et al. |
| 2011/0093498 A1 | 4/2011 | Lunt et al. |
| 2011/0099142 A1 | 4/2011 | Karjalainen et al. |
| 2011/0106658 A1 | 5/2011 | Britt |
| 2011/0112976 A1* | 5/2011 | Ryan et al. .................. 705/319 |
| 2011/0128144 A1 | 6/2011 | Baron, Sr. et al. |
| 2011/0131172 A1 | 6/2011 | Herzog et al. |
| 2011/0151898 A1 | 6/2011 | Chandra et al. |
| 2011/0174920 A1 | 7/2011 | Yoeli |
| 2011/0181470 A1 | 7/2011 | Qiu et al. |
| 2011/0184643 A1 | 7/2011 | Abhyanker |
| 2011/0202426 A1 | 8/2011 | Cretney et al. |
| 2011/0219318 A1 | 9/2011 | Abhyanker |
| 2011/0231268 A1 | 9/2011 | Ungos |
| 2011/0246258 A1 | 10/2011 | Cragun et al. |
| 2011/0256895 A1 | 10/2011 | Palin et al. |
| 2011/0258028 A1 | 10/2011 | Satyavolu et al. |
| 2011/0264692 A1 | 10/2011 | Kardell |
| 2011/0289011 A1* | 11/2011 | Hull et al. .................. 705/319 |
| 2011/0291851 A1 | 12/2011 | Whisenant |
| 2012/0023196 A1 | 1/2012 | Grayson et al. |
| 2012/0047102 A1 | 2/2012 | Petersen et al. |
| 2012/0047448 A1 | 2/2012 | Amidon et al. |
| 2012/0077523 A1 | 3/2012 | Roumeliotis et al. |
| 2012/0084289 A1 | 4/2012 | Hutheesing |
| 2012/0096098 A1 | 4/2012 | Balassanian |
| 2012/0123667 A1 | 5/2012 | Guéziec |
| 2012/0138732 A1 | 6/2012 | Olm et al. |
| 2012/0163206 A1 | 6/2012 | Leung et al. |
| 2012/0166935 A1 | 6/2012 | Abhyanker |
| 2012/0191606 A1 | 7/2012 | Milne |
| 2012/0209775 A1 | 8/2012 | Milne |
| 2012/0246024 A1 | 9/2012 | Thomas et al. |
| 2012/0254774 A1 | 10/2012 | Patton |
| 2012/0259688 A1 | 10/2012 | Kim |
| 2012/0264447 A1 | 10/2012 | Rieger, III |
| 2012/0270567 A1 | 10/2012 | Johnson |
| 2012/0278743 A1 | 11/2012 | Heckman et al. |
| 2012/0331002 A1 | 12/2012 | Carrington |
| 2013/0005307 A1 | 1/2013 | Kim et al. |
| 2013/0024108 A1 | 1/2013 | Grün |
| 2013/0041862 A1 | 2/2013 | Yang et al. |
| 2013/0054317 A1 | 2/2013 | Abhyanker |
| 2013/0055163 A1 | 2/2013 | Matas et al. |
| 2013/0068876 A1 | 3/2013 | Radu |
| 2013/0072114 A1 | 3/2013 | Abhyanker |
| 2013/0073375 A1 | 3/2013 | Abhyanker |
| 2013/0073474 A1 | 3/2013 | Young et al. |
| 2013/0080217 A1 | 3/2013 | Abhyanker |
| 2013/0103437 A1 | 4/2013 | Nelson |
| 2013/0105635 A1 | 5/2013 | Alzu'bi et al. |

(56) References Cited

U.S. PATENT DOCUMENTS

| | | |
|---|---|---|
| 2013/0110631 A1 | 5/2013 | Mitchell et al. |
| 2013/0151455 A1 | 6/2013 | Odom et al. |
| 2013/0159127 A1 | 6/2013 | Myslinski |
| 2013/0254670 A1 | 9/2013 | Eraker et al. |
| 2013/0282842 A1 | 10/2013 | Blecon et al. |
| 2013/0297589 A1 | 11/2013 | Work et al. |
| 2013/0301405 A1 | 11/2013 | Vilella et al. |
| 2013/0303197 A1 | 11/2013 | Chandra et al. |
| 2013/0317999 A1 | 11/2013 | Zimberoff et al. |
| 2014/0032034 A1 | 1/2014 | Raptopoulos et al. |
| 2014/0040179 A1 | 2/2014 | Herzog et al. |
| 2014/0067167 A1 | 3/2014 | Levien et al. |
| 2014/0067704 A1 | 3/2014 | Abhyanker |
| 2014/0074736 A1 | 3/2014 | Carrington |
| 2014/0087780 A1 | 3/2014 | Abhyanker et al. |
| 2014/0095293 A1 | 4/2014 | Abhyanker |
| 2014/0100900 A1 | 4/2014 | Abhyanker |
| 2014/0108540 A1 | 4/2014 | Crawford |
| 2014/0108556 A1 | 4/2014 | Abhyanker |
| 2014/0108613 A1 | 4/2014 | Randall |
| 2014/0114866 A1 | 4/2014 | Abhyanker |
| 2014/0115671 A1 | 4/2014 | Abhyanker |
| 2014/0123246 A1 | 5/2014 | Abhyanker |
| 2014/0123247 A1 | 5/2014 | Abhyanker |
| 2014/0130140 A1 | 5/2014 | Abhyanker |
| 2014/0135039 A1 | 5/2014 | Siamak Sartipi et al. |
| 2014/0136328 A1 | 5/2014 | Abhyanker |
| 2014/0136414 A1 | 5/2014 | Abhyanker |
| 2014/0136624 A1 | 5/2014 | Abhyanker |
| 2014/0142848 A1 | 5/2014 | Chen et al. |
| 2014/0143061 A1 | 5/2014 | Abhyanker |
| 2014/0149244 A1 | 5/2014 | Abhyanker |
| 2014/0149508 A1 | 5/2014 | Middleton et al. |
| 2014/0165091 A1 | 6/2014 | Abhyanker |
| 2014/0172727 A1 | 6/2014 | Abhyanker et al. |
| 2014/0222908 A1 | 8/2014 | Park et al. |
| 2014/0254896 A1 | 9/2014 | Zhou et al. |
| 2014/0277834 A1 | 9/2014 | Levien et al. |

FOREIGN PATENT DOCUMENTS

| | | |
|---|---|---|
| KR | 1020120121376 A | 7/2012 |
| WO | 9808055 A1 | 2/1998 |
| WO | 9956143 A1 | 11/1999 |
| WO | 0054170 A2 | 9/2000 |
| WO | 0163423 A1 | 8/2001 |
| WO | 0201455 A2 | 1/2002 |
| WO | 0219236 A1 | 3/2002 |
| WO | 0241115 A2 | 5/2002 |
| WO | 03058540 A1 | 7/2003 |
| WO | 2005103624 A2 | 11/2005 |
| WO | 2006020471 A1 | 2/2006 |
| WO | 2007108927 A2 | 9/2007 |
| WO | 2007108928 A2 | 9/2007 |
| WO | 2007113844 A1 | 10/2007 |
| WO | 2008103149 A1 | 8/2008 |
| WO | 2008105766 A1 | 9/2008 |
| WO | 2008108772 A1 | 9/2008 |
| WO | 2008118119 A1 | 10/2008 |
| WO | 2008123851 A1 | 10/2008 |
| WO | 2008111929 A3 | 11/2008 |
| WO | 2009138559 A1 | 11/2009 |
| WO | 2010103163 A1 | 9/2010 |
| WO | 2013188762 A1 | 12/2013 |
| WO | 2014121145 A1 | 8/2014 |

OTHER PUBLICATIONS

Case No. 111-CV-212924 *Abhyanker v. Benchmark Capital Partners L.P.*, Superior Court of California, County of Santa Clara, Nov. 10, 2011 (pp. 78). http://www.scribd.com/doc/72441873/Stamped-COMPLAINT-Abhyanker-v-Benchmark-Capital-Et-Al-FILED-PUBLIC.

Neighbors Stop Diaper and Formula Thief in his Tracks, Nextdoor Blog, Aug. 15, 2014, by Anne Dreshfield (pp. 12) http://blog.nextdoor.com/.

Case No. 5:14-cv-03844-PSG, *Complaint Fatdoor, Inc. v. IP Analytics LLC and Google Inc.*, Northern District of California, Aug. 25, 2014, (pp. 16).

Screenshot of My Neighbourhoods on Crunch Base, Aug. 27, 2014 (pp. 2) http://www.crunchbase.com/organization/my-neighbourhoods.

Facebook Engineers bring Google-30 Circles to Facebook, Article on ZDNet by Emil Protalinski, Jul. 3, 2011, (pp. 2) http://www.zdnet.com/blog/facebook/facebook-engineers-bring-google-circles-to-facebook/1885.

http://www.zdnet.com/news/perspective-social-networking-for-all/149441.

http://www.remax.com/advancedsearch/.

http://global.remax.com/AdvancedListingSearch.aspx.

http://www.magicbricks.com/property-requirement-to-buy-rent/residential-commercial.

http://www.mapmyindia.com/solutions/tracking-lbs/vehicle-tracking.

http://www.mapmyindia.com/solutions/tracking-lbs/asset-tracking.

http://www.mapmyindia.com/solutions/enterprises/geo-tagging.

http://www.zillow.com/.

http://www.zillow.com/homes/for_rent/.

http://www.zillow.com/homes/for_sale/days_sort/53.409532,-64.072266,19.352611,-129.550781_rect/3_zm/.

http://www.trulia.com/home_prices/.

http://www.trulia.com/for_rent/New_York,NY.

http://www.realtor.com/rentals.

http://www.realtor.com/realestateforsale.

http://www.househunt.com/.

http://www.coldwellbanker.com/real_estate_search;jsessionid=S8ok3kaZtBh5GKHoo-Yzo28Z.sky-node04.

http://www.switchboard.com/.

http://www.anywho.com/whitepages.

http://wp.superpages.com/.

http://www.whitepages.com/.

http://www-personal.umich.edu/~ladamic/papers/socialsearch/adamicsocialsearch.pdf.

http://cs.wellesley.edu/~cs315/315_PPTs/L19-SocialNetworks/Stuff/wellesley.pdf.

http://citeseerx.ist.psu.edu/viewdoc/download?doi=10.1.1.98.5230&rep=rep1&type=pdf.

http://www.ece.lsu.edu/xinli/Research/HeatMap_TVCG06.pdf.

http://www.usa-people-search.com/.

https://www.i-neighbors.org/.

"Friends and Neighbors on the Web", 2001 by Lada A. Adamic et al. (pp. 9) http://www.hpl.hp.com/research/idl/papers/web10/fnn2.pdf.

"A social influence model of consumer participation in network-and small-group-based virtual communities", International Journal of Research in Marketing, 2004 by Utpal M, Dholakia et al. (pp. 23) http://www-bcf.usc.edu/~douglast/620/bettina1.pdf.

"BuzzMaps: a prototype social proxy for predictive utility", ACM Digital Library, 2003 by Azzari Caillier Jarrett et al. (Pages) http://dl.acm.org/citation.cfm?id=948547&dl=ACM&coll=DL&CFID=456946313&CFTOKEN=50139062.

"Direct Annotation: A Drag-and-Drop Strategy for Labeling Photos", University of Maryland, 2000 by Ben Shneiderman et al. (pp. 8) http://hcil2.cs.umd.edu/trs/2000-6/2000-06.pdf.

"Notification for Shared Annotation of Digital Documents", Technical Report MSR-TR-2001-87, Sep. 19, 2001 by A. J. Bernheim Brush et al. (pp. 9) http://research.microsoft.com/pubs/69880/tr-2001-87.pdf.

"HT06, Tagging Paper, Taxonomy, Flickr, Academic Article, ToRead", Yahoo Research Berkeley, CA, 2006 by Cameron Marlow et al. (pp. 9) http://www.danah.org/papers/Hypertext2006.pdf.

"Computer Systems and the Design of Organizational Interaction", by Fernando Flores et al. (pp. 20) http://cpe.njit.edu/dlnotes/CIS/CIS735/ComputerSystemsandDesign.pdf.

"ChipIn—the easy way to collect money", Louis' Really Useful Finds, Mar. 12. (p. 1) http://reallyusefulthings.tumblr.com/post/28688782/chipin-the-easy-way-to-collect-money.

(56) References Cited

OTHER PUBLICATIONS

Benchmark-Backed Nextdoor Launches As A Private Social Network for Neighborhoods, Techcrunch Article, Oct. 26, 2011 by Leena Rao (6 pages) http://techcrunch.com/2011/10/26/benchmark-backed-nextdoor-launches-as-a-private-social-network-for-neighborhoods/, Oct. 26, 2011.
Fatdoor Founder Sues Benchmark Capital, Saying It Stole His Idea for Nextdoor, All Things Digital Article, Nov. 11, 2011, by Liz Gannes (7 pages) http://allthingsd.com/20111111/fatdoor-founder-sues-benchmark-capital-saying-it-stole-his-idea-for-nextdoor/.
Fatdoor CEO Talks About Balancing Security with Community, Wired Magazine, May 31, 2007, by Terrence Russell (2 pages) http://www.wired.com/2007/05/fatdoor_ceo_tal/.
Fatdoor Launches Social Network for Your Neighborhood, Mashable Article, May 28, 2007, by Kristen Nicole (3 pages) http://mashable.com/2007/05/28/fatdoor/.
Screenshots of Nextdoor website and its features—as submitted in Case5:14-cv-02335-BLF on Jul. 15, 2014 (pp. 19) http://www.nextdoor.com/.
Fatdoor turns neighborhoods into online social networks, VentureBeat News Article, May 28, 2007, by Dan Kaplan (pp. 4) http://venturebeat.com/2007/05/28/fatdoor-turns-neighborhoods-into-online-social-networks/.
Halloween Just Got Easier: Nextdoor Debuts Halloween Treat Map, Nextdoor Blog, Oct. 17, 2013, by Anne Dreshfield (pp. 6) http://blog.nextdoor.com/2013/10/17/halloween-just-got-easier-nextdoor-debuts-halloween-treat-map/.
Helping Neighbors Connect, Screenshot from FrontPorchForum website—screenshots of Aug. 21, 2014 (3 Pages) http://frontporchforum.com/.
Advocacy Strategy for the Age of Connectivity, Netcentric Advocacy: fatdoor.com (alpha), Jun. 23, 2007 (p. 1) http://www.network-centricadvocacy.net/2007/06/fatdoorcom-alph.html.
Silicon Valley venture capital and legal globalization Blog, WayBack Machine Blogs Apr. 8, 2008, by Raj V. Abhyanker (pp. 2) https://web.archive.org/web/20080706001509/http:/abhyanker.blogspot.com/.
Frontporchforum. screenshots. Jul. 19, 2006 webarchive.org 1-15 (herein FrontPorch) (pp. 15).
Fatdoor where 2.0 Launch Coverage Report, Jun. 21, 2007, by Sterling Communications (pp. 24).
Screenshot of Fatdoor on Wikipedia, Apr. 12, 2007 (p. 1).
Case No. 5-14-cv-02335-BLF *Complaint Fatdoor* v. *Nextdoor*, Northern District of California, with Exhibits A, B and C {Part 1 (pp. 258)} and Exhibits D, E, F, G and H {Part 2 (pp. 222)}, Jul. 15, 2014.
Expert Report—Forensics of Jon Berryhill, Report, Nextdoor v. Abhyanker, Aug. 8, 2014, by Berryhill Computer forensics Inc. (pp. 23).
Case No. 3:12-cv-05667-*EMC Complaint Nextdoor* v. *Abhyanker*, Northern District of California, Nov. 5, 2012 (pp. 46).
Expert Report—Patent of Jeffrey G. Sheldon, Nextdoor v. Abhyanker, Aug. 8, 2014 (pp. 7).
Exhibits of Expert Report—Patent of Jeffrey G. Sheldon, *Nextdoor* v. *Abhyanker*, with Attachments A, B, C, D and E (1/2) {Part 1 (pp. 46)} and Attachments E (2/2) and F {Part 2 (pp. 41)}.
Case No. 111-CV-212924 *Abhyanker* v. *Benchmark Capital Partners L.P.*, Superior Court of California, County of Santa Clara, Nov. 10, 2011 (pp. 78) http://www.scribd.com/doc/72441873/Stamped-COMPLAINT-Abhyanker-v-Benchmark-Capital-Et-Al-FILED-PUBLIC.
Neighbors Stop Diaper and Formula Thief in his Tracks, Nextdoor Blog, Aug. 15, 2014, by Anne Dreshfield (pp. 12). http://blog.nextdoor.com/.
Screenshot of Fatdoor website with its features—Aug. 21, 2014 (pp. 6) http://www.fatdoor.com/.
Screenshot of AirBnB website with its features—Aug. 21, 2014 (pp. 4) http://www.airbnb.com/.
Wikipedia entry AirBnB website—Aug. 21, 2014 (pp. 16) http://en.wikipedia.org/wiki/Airbnb.
AirBed&Breakfast for Connecting '07—Oct. 10, 2007 (1 Page) http://www.core77.com/blog/events/airbed_breakfast_for_connecting_07_7715.asp.
Case No. 5:14-cv-03844-PSG, Complaint *Fatdoor, Inc.* v. *IP Analytics LLC* and *Google Inc.*, Northern District of California, Aug. 25, 2014, (pp. 16).
Screenshot of Meetey on CrunchBase, Aug. 27, 2014, (pp. 3) http://www.crunchbase.com/organization/meetey.
Wikipedia entry Patch Media website—Aug. 27, 2014 (pp. 2) http://en.wikipedia.org/wiki/Patch_Media.
Wikipedia entry Yahoo! Groups website—Aug. 27, 2014 (pp. 7) http://en.wikipedia.org/wiki/Yahoo_groups.
Palo Alto News on Topix, Aug. 27, 2014, (pp. 3) http://www.topix.com/palo-alto.
Screenshot of My Neighbourhoods on CrunchBase, Aug. 27, 2014 (pp. 2) http://www.crunchbase.com/organization/my-neighbourhoods.
Screenshot of Dehood website, Aug. 27, 2014, (p. 1) http://www.dehood.com/home.
Wikipedia entry The Freecycle Network website—Aug. 27, 2014 (pp. 3) http://en.wikipedia.org/wiki/The_Freecycle_Network.
eDirectree Brings Group Wiki Twist to Social Networking, Techcrunch Article, Feb. 1, 2008 by Mark Hendrickson, (pp. 2) http://techcrunch.com/2008/02/01/edirectree-brings-group-wiki-twist-to-social-networking/.
Wikipedia entry Meetup website—Aug. 27, 2014 (p. 1) http://en.wikipedia.org/wiki/Meetup_(website).
Wikipedia entry Google Maps website—Aug. 27, 2014 (p. 18) http://en.wikipedia.org/wiki/Google_Maps.
Screenshot of Facebook website for groups, Aug. 27, 2014, (p. 1) https://www.facebook.com/about/groups.
Facebook Engineers bring Google+Circles to Facebook, Article on ZDNet by Emil Protalinski, Jul. 3, 2011, (pp. 2) http://www.zdnet.com/blog/facebook/facebook-engineers-bring-google-circles-to-facebook/1885.
Screenshot of Uber website, Aug. 27, 2014, (pp. 5) https://www.uber.com/.
Screenshot of Lyft website, Aug. 27, 2014, (pp. 5) https://www.lyft.com/.
Wikipedia entry Google driverless car—Aug. 27, 2014 (pp. 4) http://en.wikipedia.org/wiki/Google_driverless_car.
Wikipedia entry Uber (company)—Aug. 27, 2014 (pp. 7) http://en.wikipedia.org/wiki/Uber_(company).
Wikipedia entry Autonomous car—Aug. 27, 2014 (pp. 15) http://en.wikipedia.org/wiki/Autonomous_car.
Screenshot of sidecar website, Aug. 27, 2014 (p. 1) http://www.sidecar.com/.
Screenshot of patch media website, Aug. 27, 2014 (pp. 6) http://patch.com/.
Screenshot of i-neighbors website, Aug. 27, 2014 (pp. 3) https://www.i-neighbors.org/howitworks.php.

* cited by examiner

USER: PIZZA HEAVEN
21577 MORRISON ST.
SAN FRANCISCO, CA
95014
UNITED STATES
PIZZAHEAVEN@PIZZAHEAVEN.COM
DETAILS

SCHEDULE, PAY, AND SEND

SCHEDULE, PAY, AND SEND MENU 1002

SCHEDULE:
ONCE ONLY ON

FROM:
TO: JANUARY 2007
JUNE 2007
NUMBER OF TIMES(S): 1
○ ○ ● ○
PER:
DAY
WEEK
MONTH
YEAR

FOR HOW LONG?

GO

PAY:
POSTAGE:
26 RECIPIENTS @ $0.30: $5.20
SERVICE CHARGE:
$50.00

SUBTOTAL:
$55.20

X NO. OF MAILINGS: 7

TOTAL: $386.40

CHARGE MY ACCOUNT

PAY USING ONLINE PAYMENT SYSTEM

GO

SEND:
PAYMENT CONFIRMED
TRANSACTION CONFIRMATION NO.:
23923235

FIRST MAILING SENT WITH CONFIRM-
SENT TO:
PIZZAHEAVEN@PIZZAHEAVEN.COM

RETURN TO PROFILE

USER INTERFACE VIEW
1000

FIGURE 10

| USERS 1102 | MAILING SCHEDULED 1104 | TOTAL RECIPIENTS 1106 | DEMOGRAPHICS 1108 | ONLINE PAYMENT 1110 |
|---|---|---|---|---|
| PIZZA HEAVEN | 7 | 26 | YES | YES |
| JANE DOE | 0 | 0 | NO | NO |
| HARRY CARY | 1 | 250 | NO | YES |
| • • • | • • • | • • • | • • • | • • • |

TABLE VIEW 1100

CLAIM YOUR GEOGRAPHIC LOCATION

WHICH ADDRESS ARE CLAIMING :

[201 BENSON AVE] ~1502

DO YOU WANT TO SEE ADJACENT NEIGHBORHOODS [NO ▶] ~1504
ABOUT YOU

UPLOAD PICTURE [FAMILY PIC ▶]

PLEASE NOTE : YOU WILL NEED TO SUBMIT PROOF OF OWNERSHIP/ RESIDENCE IF DISPUTED ~1506

CLAIM VIEW
1550

FIGURE 15

| USER 3500 | VERIFIED? 3502 | RANGE 3504 | PRINCIPAL ADDRESS 3506 | LINKS 3508 | CONTRIBUTED? 3510 | OTHERS 3512 |
|---|---|---|---|---|---|---|
| JOE | YES | 5 MILES | 500 CLIFFORD, CUPERTINO CA | 859, BETTE, 854 BETTE | 858, BETTE, CUPERTINO, CA, FARALLONE, CA | CITY, STATE, ZIP, OTHER |
| JANE | NO | NOT ENABLED | 500 JOHNSON, CUPERTINO CA | 851 BETTE, 2900 STEVEN'S ROAD | 500 HAMILTON, PALO ALTO, CA 1905 E. UNIVERSITY | - - - |
| ● | ● | ● | ● | ● | ● | ● |
| ● | ● | ● | ● | ● | ● | ● |
| ● | ● | ● | ● | ● | ● | ● |

TABLE 3550

FIGURE 35

DIRECT MAILING IN A GEO-SPATIAL ENVIRONMENT

CLAIMS OF PRIORITY

This patent application is a Continuation in Part of:
1) U.S. Continuation-in-Part patent application Ser. No. 14/203,531, titled 'GEO-SPATIALLY CONSTRAINED PRIVATE NEIGHBORHOOD SOCIAL NETWORK' filed on Mar. 10, 2014, now issuing as U.S. Pat. No. 8,775,328 on Jul. 8, 2014, and which itself is a Continuation-in-Part application of two applications:
   a) U.S. Continuation-in-Part patent application Ser. No. 11/653,194 titled 'LODGING AND REAL PROPERTY IN A GEO-SPATIAL MAPPING ENVIRONMENT' filed on Jan. 12, 2007, and
   b) U.S. Utility patent application Ser. No. 11/603,442 titled 'MAP BASED NEIGHBORHOOD SEARCH AND COMMUNITY CONTRIBUTION' filed on Nov. 22, 2006, which further depends on 60/853,499 filed on Oct. 19, 2006 and 60/854,230 filed on Oct. 25, 2006.
2) U.S. Utility patent application Ser. No. 14/089,779 titled 'EMERGENCY INCLUDING CRIME BROADCAST IN A NEIGHBORHOOD SOCIAL NETWORK', filed on Nov. 26, 2013.

FIELD OF TECHNOLOGY

This disclosure relates generally to the technical field of communications and in one example embodiment, to a method and system of direct mailing in a geo-spatial environment.

BACKGROUND

People use real mail and physical mail (e.g., postal mail, courier service) to contact others. Real mail may be difficult to use, however, if an intended recipient's email address is not easily ascertainable. For example, the intended recipient may not be a member of a social network providing member email addresses or the intended recipient's email address may be private.

Physical mail may also be difficult to use. A sender may produce the physical item to be mailed, locate an address for the intended recipient, buy and affix postage to the item, and find a mailbox or other depository to dispatch the item.

Bulk mail to multiple intended recipients may present additional issues. The sender may not know the addresses of multiple intended recipients. The sender may purchase address list(s) of the multiple intended recipients. The sender may expend time and effort producing multiple copies of the items to be mailed. The sender may expend time and effort to address and post each of the items to each of the multiple recipients. Alternatively, the sender may incur costs hiring a company to procure address lists, produce the items, and deliver the items.

SUMMARY

A method and system of direct mailing in a geo-spatial environment are disclosed. In one aspect, a method includes generating a community network of user profiles, each user profile of the user profiles associated with a verified geographic location and a contact address. The method includes associating a first user with a first user profile of the user profiles, selecting a mail mode, and selecting a communication. The method further includes generating a first display view to include a map view embodied by the community network, at least a portion of the user profiles represented at a location in the map view associated with the verified geographic location of the first user profile of the user profiles. The method includes selecting a second user profile from the at least a portion of the user profiles, and generating a mailing of the communication, in a format associated with the mail mode, between the first user profile of the user profiles and the contact address associated with the second user profile of the user profiles, wherein the contact address is based on the mail mode.

The selecting the mail mode may include selecting a physical mail mode, a facsimile mode, an email mode, and/or an instant message mode. The contact address may be selected from a group including: a physical mailing address associated with the verified geographic location of the user profile, a facsimile number, an email address, and/or an instant message user identifier. A physical mail mode may be selected. The mailing of the communication may be generated in a physical format associated with the physical mail mode, between the first user profile of the user profiles and the contact address associated with the second user profile of the user profiles. The contact address may be based on a physical address associated with the second user profile of the user profiles. A facsimile mode may be selected. The mailing of the communication may be generated in a facsimile format associated with the facsimile mode, between the first user profile of the user profiles and the contact address associated with the second user profile of the user profiles. The contact address may be based on the facsimile number associated with the second user profile of the user profiles.

An email mode may be selected. The mailing of the communication may be generated in an email format associated with the email mode, between the first user profile of the user profiles and the contact address associated with the second user profile of the user profiles. The contact address may be based on the email address associated with the second user profile of the user profiles. An instant message mode may be selected. The mailing of the communication may be generated in an instant message format associated with the instant message mode, between the first user profile of the user profiles and the contact address associated with the second user profile of the user profiles. The contact address may be based on the instant message user identifier associated with the second user profile of the user profiles.

The location may be selected in the map view from a group including: a street address, a city, a county, a state, and/or a country. A radius associated with the location in the map view may be selected. User profiles of the at least a portion of the user profiles having verified geographic locations included in the radius may be selected. Demographics associated with the community network may be provided. The demographics may be associated with each user profile of the user profiles. At least one demographic of the demographics may be selected. The user profiles of the at least a portion of the user profiles having verified geographic locations included in the radius and having the at least one demographic of the demographics may be selected.

The demographics may include an age, an age range, a gender, an occupation, an ethnicity, a location of a residence, a location of a business, a marital status, an ownership status, a language, mobility, income, a life cycle, a socioeconomic status, and/or a lifestyle. An online commerce transaction associated with the mailing of the communication may be generated. The generating the online commerce transaction may include generating an online transaction associated with payment of postage, and/or generating an online transaction associated with payment of services related to the mailing of the communication.

The mailing of the communication may be scheduled. The scheduling the mailing of the communication may include determining a number of mailings, determining a time period, and/or generating the number of mailings within the time period. The communication may be created. The method may be in a form of a machine-readable medium embodying a set of instructions that, when executed by a machine, causes the machine to perform the method.

In another aspect, a system includes a geo-spatial environment, a community network algorithm of the geo-spatial environment, to include user profiles, using a processor and a memory, each user profile of the user profiles to include a verified geographic location and a contact address.

The system includes a map algorithm of the geo-spatial environment to include map data which serves as a basis to render a map view in the geo-spatial environment which identifies residences, businesses, and civic structures having verified geographic locations. The system further includes a mail mode algorithm of the geo-spatial environment to determine a mail mode, a communication algorithm of the geo-spatial environment to select a communication, and a display algorithm of the geo-spatial environment to generate a first display view to include a map view embodied by a community network, at least a portion of the user profiles represented at locations in the map view associated with the verified geographic locations of the at least a portion of the user profiles. The system also includes a recipient algorithm of the geo-spatial environment to select a user profile from the at least a portion of the user profiles and a mail communication algorithm of the geo-spatial environment to generate a mailing of the communication, in a format associated with the mail mode, to a contact address associated with the user profile of the user profiles.

A commerce transaction algorithm of the geo-spatial environment may generate a commerce transaction associated with elements. A postage algorithm of the geo-spatial environment may generate an online transaction associated with payment of postage and/or a service payment algorithm of the geo-spatial environment may generate an online transaction associated with payment of services related to mailing the communication. A location algorithm may select the location. The location may be selected from a group including: a street address, a city, a county, a state, and/or a country.

A radius algorithm may determine a radius based on the location and to display the at least a portion of the user profiles having verified geographic locations included in the radius. A demographic algorithm may provide demographics associated with the user profiles, select demographic of the demographics, and/or determine a group of user profiles of the at least a portion of the user profiles. The demographics may be associated with each user profiles of the group of user profiles. The demographic may be selected from a group including an age, an age range, a gender, an occupation, an ethnicity, a location of a residence, a location of a business, a marital status, an ownership status, a language, mobility, income, a life cycle, a socioeconomic status, and a lifestyle.

A scheduler algorithm may schedule the mailing. The schedule may be based on a selected number of mailings per a predetermined time period. A document creation algorithm may enable creation of a document. A letter creation algorithm may enable creation of letters and/or a marketing brochure creation algorithm may enable creation of marketing brochures. The mail mode may be selected from a group including a physical mail mode, a facsimile mode, an email mode, and/or an instant message mode. The contact address may be selected from a group including a physical mailing address associated with the verified geographic location of the user profile, a facsimile number, an email address, and/or an instant message user identifier.

In yet another aspect, a geo-spatial environment includes a first instruction set to enable, using a processor and a memory, a community network to include a map database associated with map data and a user database associated with user profiles, each user profile of the user profiles associated with a verified geographic location identifiable in the map data and a contact address. The geo-spatial environment includes a second instruction set integrated with the first instruction set to display a map view, embodied by the community network, to include representations of a portion of the user profiles. Each representation of a user profile of the portion of the user profiles is displayed at a location in the map view corresponding to the verified geographic location associated with the user profile. The geo-spatial environment also includes a third instruction set integrated with the first instruction set and the second instruction set to determine a second user profile of the portion of the user profiles, a communication, and a mail mode. The geo-spatial environment further includes a fourth instruction set integrated with the first instruction set and the second instruction set and the third instruction set to generate a mailing of the communication, in a format associated with the mail mode, to the contact address associated with the second user profile of the user profiles, wherein the contact address is based on the mail mode.

A fifth instruction set may generate a commerce transaction associated with the mailing of the communication. A sixth instruction set may schedule the mailing of the communication. A seventh instruction set may enable creation of the communication.

The methods, systems, and apparatuses disclosed herein may be implemented in any means for achieving various aspects, and may be executed in a form of a machine-readable medium embodying a set of instructions that, when executed by a machine, cause the machine to perform any of the operations disclosed herein. Other features will be apparent from the accompanying drawings and from the detailed description that follows.

BRIEF DESCRIPTION OF THE DRAWINGS

Example embodiments are illustrated by way of example and not limitation in the figures of the accompanying drawings, in which like references indicate similar elements and in which:

FIG. 10 is a user interface view of scheduling, sending mails and making transactions associated with payment of services related to the mailing of the communication, according to one embodiment.

FIG. 15 is a user interface view of claim view, according to one embodiment.

FIG. 35 is a table view of user address details, according to one embodiment.

Other features of the present embodiments will be apparent from the accompanying drawings and from the detailed description that follows.

DETAILED DESCRIPTION

A method and system of direct mailing in a geo-spatial environment are disclosed. In the following description, for the purposes of explanation, numerous specific details are set forth in order to provide a thorough understanding of the various embodiments. It will be evident, however to one skilled in the art that the various embodiments may be practiced without these specific details.

Figure 4:
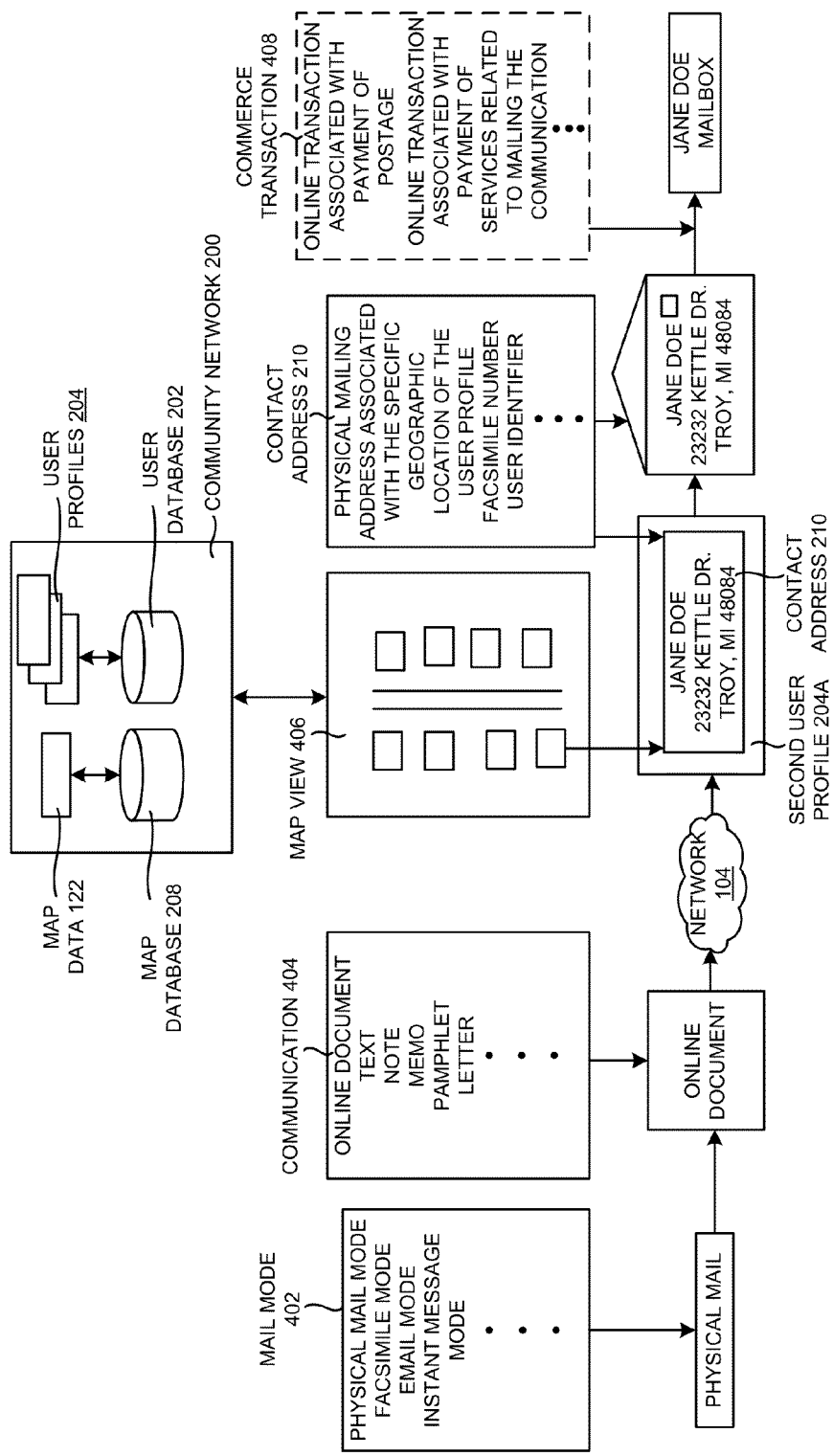
FIG. 4 is schematic representation of data communication between the first user and the contact address associated with the second user profile, according to one embodiment.

In one embodiment, a method includes generating a community network (e.g., the community network 200 of FIG. 2) of user profiles (e.g., the user profiles 204 of FIG. 2), each user profile 204 associated with a verified geographic location (e.g., the verified geographic location 206 of FIG. 2) and a contact address (e.g., the contact address 210, of FIG. 2), associating a first user (e.g., of the users 102 of FIG. 1) with a first user profile 204, and selecting a mail mode (e.g., the mail mode 402 of FIG. 4), selecting a communication (e.g., the communication 404 of FIG. 4).

The method also includes generating a first display view to include a map view (e.g., the map view 406 of FIG. 4) embodied by the community network 200, a portion of the user profiles 204 represented at a location in the map view 406 associated with the specific geographic location 206 of the first user profile 204, selecting a second user profile 204A from the portion of the user profiles 204, and generating a mailing of the communication 404, in a format associated with the mail mode 402, between the first user profile 204 and the contact address 210 (e.g., the contact address 210 may be based on the mail mode 402) associated with the second user profile 204A.

In another embodiment, a system includes a geo-spatial environment (e.g., the geo-spatial environment 100 of FIG. 1), a community network algorithm (e.g., the community network algorithm 106 of FIG. 1) of the geo-spatial environment 100, to include user profiles 204, each user profile 204 to include a verified geographic location 206 and a contact address 210, a map algorithm (e.g., the map algorithm 108 of FIG. 1) of the geo-spatial environment 100 to include map data (e.g., the map data 122 of FIG. 1) which serves as a basis to render a map view 406 in the geo-spatial environment 100 which identifies residences, businesses, and/or civic structures having verified geographic locations 206, a mail mode algorithm (e.g., the mail mode algorithm 112 of FIG. 1) of the geo-spatial environment 100 to determine a mail mode 402, and a communication algorithm (e.g., the communication algorithm 110 of FIG. 1) of the geospatial environment 100 to select a communication (e.g., the communication 404 of FIG. 4).

The system also includes a display algorithm (e.g., the display algorithm 114 of FIG. 1) of the geo-spatial environment 100 to generate a first display view to include a map view 406 embodied by a community network 200, a portion of the user profiles 204 represented at locations in the map view 406 associated with the verified geographic locations 206 of the portion of the user profiles 204, a recipient algorithm (e.g., the recipient algorithm 116 of FIG. 1) of the geo-spatial environment 100 to select a user profile 204 from the portion of the user profiles 204, and a mail communication algorithm (e.g., the mail communication algorithm 118 of FIG. 1) of the geo-spatial environment 100 to generate a mailing of the communication 404, in a format associated with the mail mode 402, to a contact address 210 associated with the user profile 204.

In yet another embodiment, a geo-spatial environment 100 includes a first instruction set to enable a community network (e.g., the community network 200 of FIG. 2), to include a map database (e.g., the map database 208 of FIG. 2) associated with the map data 122 and a user database (e.g., the user database 202 of FIG. 2) associated with user profiles 204, each user profile 204 associated with a specific geographic location (e.g., the verified geographic location 206 of FIG. 2) identifiable in the map data 122 and a contact address (e.g., the contact address 210 of FIG. 2), and a second instruction set integrated with the first instruction set to display a map view 406, embodied by the community network 200, to include representations of a portion of the user profiles 204 (e.g., each representation of the user profile 204 may be displayed at a location in the map view 406 corresponding to the verified geographic location 206 associated with the user profile 204).

The geo-spatial environment 100 also includes a third instruction set integrated with the first instruction set and the second instruction set to determine a second user profile 204A of the portion of the user profiles 204, a communication (e.g., the communication 404 of FIG. 4), and a mail mode (e.g., the mail mode 402 of FIG. 4), and a fourth instruction set integrated with the first instruction set, the second instruction set and the third instruction set to generate a mailing of the communication 404, in a format associated with the mail mode 402, to the contact address 210 (e.g., the contact address 210 may be based on the mail mode 402) associated with the second user profile 204A.

Figure 1:
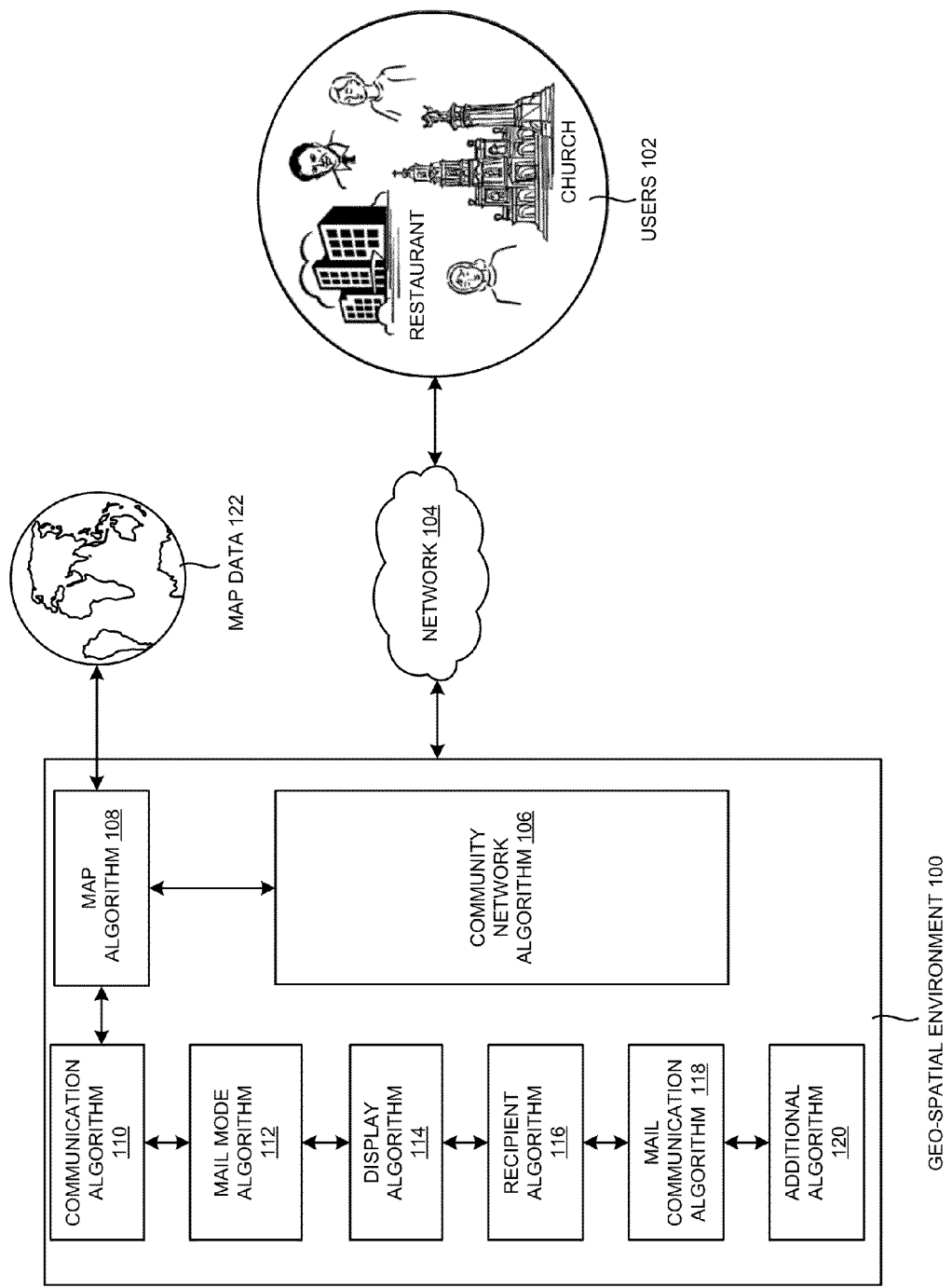
FIG. 1 is a system view of a geo-spatial environment communicating with users through a network, according to one embodiment.

FIG. 1 is a system view of a geo-spatial environment 100 communicating with users 102 through a network 104, according to one embodiment. Particularly, FIG. 1 illustrates the geo-spatial environment 100, the users 102, the network 104, a community network algorithm 106, a map algorithm 108, a communication algorithm 110, a mail mode algorithm 112, a display algorithm 114, a recipient algorithm 116, a mail communication algorithm 118, additional algorithms 120 and map data 122, according to one embodiment.

The geo-spatial environment 100 may enable the users 102 to directly mail and communicate with each other. The users 102 may be registered and/or unregistered users associated with user profiles 204 communicating through a mail mode 402 (e.g., a physical mail mode, facsimile mail mode, an email mode and/or instant message mode, etc.) in the geo-spatial environment 100. The network 104 may facilitate communication between the users 102 and the geo-spatial environment 100. The community network algorithm 106 may generate a community network (e.g., the community network 200 of FIG. 2) of the user profiles 204 associated with verified geographic locations 206 and contact addresses 210 in the geo-spatial environment 100.

The map algorithm 108 may generate a map view (e.g., the map view 406 of FIG. 4) that renders the verified geographic location(s) 206 of the user profile(s) 204 (e.g., the location may be associated with the first user profile 204 and the second user profile 204A) associated with the communication 404 adjacent to the other profiles 204 using the map data 122 in the geo-spatial environment 100.

The communication algorithm 110 may enable selection and/or generation of the communication 404 associated with a user profile 204 having specific geographic locations 206. The mail mode algorithm 112 may determine a mail mode (e.g., a physical mail mode, a facsimile mode, an email mode, an instant message mode, etc.) for mailing of the communication 404 in a format associated with the mail mode 402. The display algorithm 114 may generate a first display view which includes the map view 406 embodied by the community network 200 in the geo-spatial environment 100. The recipient algorithm 116 may enable selection of a user profile 204 associated with the contact address 210 for mailing of the communication 404 through a particular mail mode in the geo-spatial environment 100.

The mail communication algorithm 118 may generate the mailing of the communication 404 between the first user profile 204 and the contact address 210 associated with the second user profile 204A, in a format associated with the mail mode 402 (e.g., the physical mail mode, the facsimile mode, the email mode, the instant message mode, etc.). The additional algorithms 120 may generate additional processes to enable the communication 404 through a mail mode 402. The map data 122 may include details of maps of any region, area and/or neighborhood in the geo-spatial environment 100 which serves as a basis to identify residences, businesses, and/or civic structures having verified geographic locations 206 in the map view 406.

In the example embodiment illustrated in FIG. 1, the users 102 communicate with the geo-spatial environment 100 through the network 104. The geo-spatial environment 100 includes the community network algorithm 106, the map algorithm 108, the communication algorithm 110, the mail mode algorithm 112, the display algorithm 114, the recipient algorithm 116, the mail communication algorithm 118 and the additional algorithms 120 communicating with each other. In addition, the map algorithm 108 communicates with the map data 122.

The community network algorithm 106 of the geo-spatial environment 100 may include the user profiles 204, each user profile 204 to include a specific geographic location 206 and a contact address 210. The map algorithm 108 of the geo-spatial environment 100 may include map data 122 which serves as a basis to render the map view 406 in the geo-spatial environment 100 which identifies the residences, the businesses, and/or the civic structures having specific geographic locations 206. The mail mode algorithm 112 of the geo-spatial environment 100 may determine a mail mode (e.g., the mail mode 402 of FIG. 4). The communication algorithm 110 of the geo-spatial environment 100 may select a communication (e.g., the communication 404 of FIG. 4).

The display algorithm 114 of the geo-spatial environment 100 may generate the first display view to include the map view 406 embodied by the community network 200, a portion of the user profiles 204 represented at locations in the map view 406 associated with the verified geographic locations 206 of the portion of the user profiles 204. The recipient algorithm 116 of the geo-spatial environment 100 may select the user profile 204 from the portion of the user profiles 204. The mail communication algorithm 118 of the geo-spatial environment 100 may generate the mailing of the communication 404, in a format associated with the mail mode 402, to a contact address (e.g., the contact address 210 of FIG. 2) associated with the user profile 204.

Figure 2:
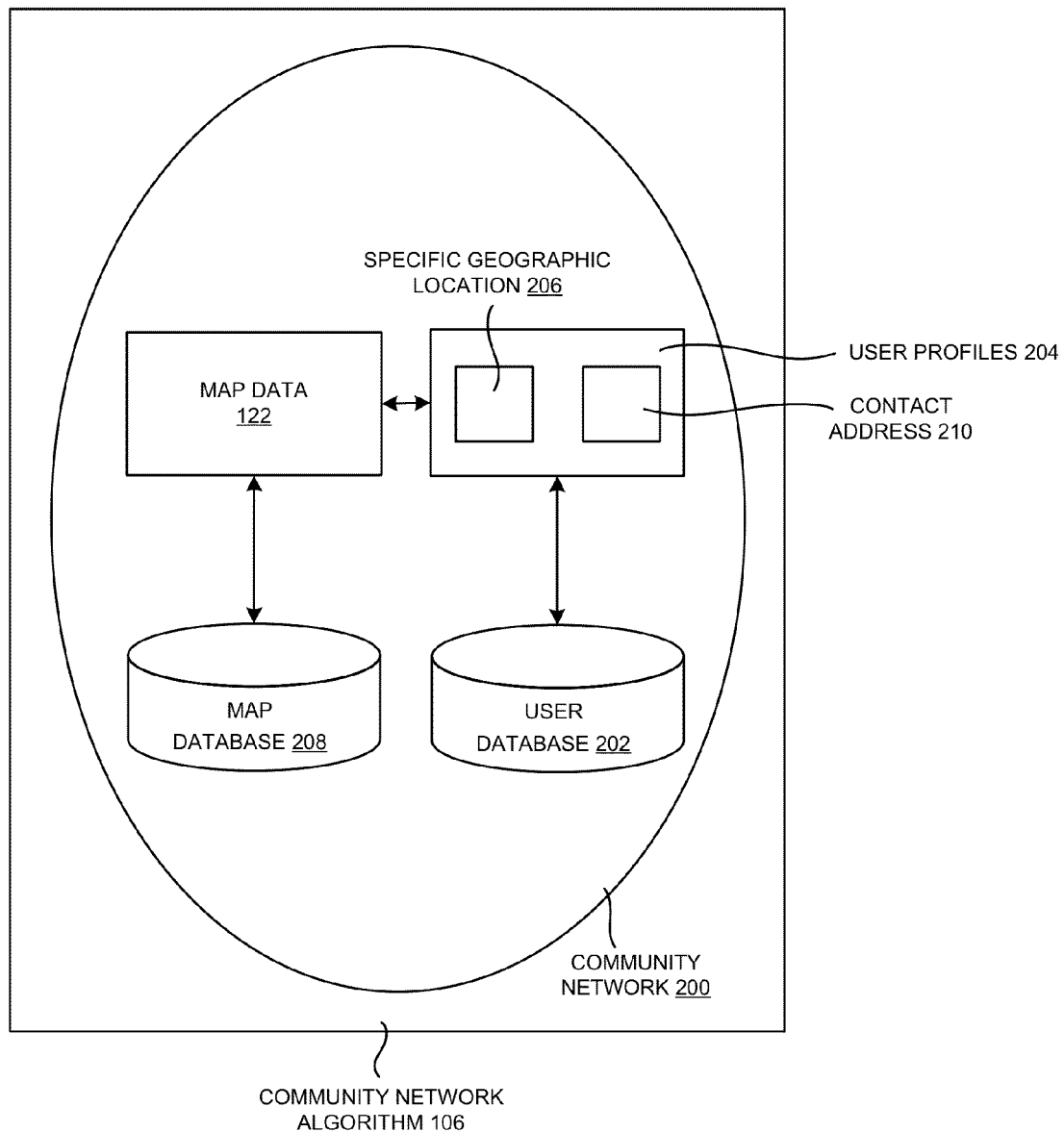
FIG. 2 is an exploded view of the community network algorithm of FIG. 1, according to one embodiment.

FIG. 2 is an exploded view of the community network algorithm 106 of FIG. 1, according to one embodiment. Particularly, FIG. 2 illustrates the map data 122, a community network 200, a user database 202, user profiles 204, a specific geographic location 206, a map database 208 and a contact address 210, according to one embodiment.

The community network 200 may be a network of people, places and/or businesses in the geo-spatial environment 100 associated with the user profiles 204, each user profile 204 having a verified geographic location (e.g., the specific geographic location 206 of FIG. 2) and a contact address (e.g., the contact address 210 of FIG. 2). The user database 202 may include the user profiles 204 associated with the specific geographic location 206 and the contact address 210 in the community network 200. The user profiles 204 may refer to the user profiles (e.g., including age data, interest data, occupation data, etc.) which are associated with the verified geographic location 206 involved in the communication 404 through the mail mode 402.

The verified geographic location 206 may refer to the specific location of the users 102 associated with the user profile 204. The map database 208 may include the map data 122 of any area, region and/or neighborhood of the users 102 associated with the user profiles 204. The contact address 210 may be a physical mailing address (e.g., associated with a verified geographic location 206 of a user profile 204), a facsimile number, an email address, and/or an instant message user identifier used for the communication 404 based on the mail mode 402.

In the example embodiment illustrated in FIG. 2, the community network algorithm 106 includes the community network 200 including the map database 208 and the user database 202 communicating with each other. In addition, the user database 202 includes the user profiles 204, the verified geographic location 206 and the contact address 210, according to the example embodiment illustrated in FIG. 2.

The community network 200 of the user profiles 204 may be generated, each user profile 204 associated with the verified geographic location 206 and the contact address 210. The contact address 210 may be selected from a group including a physical mailing address associated with the verified geographic location 206 of the user profile 204, a facsimile number, an email address, and/or an instant message user identifier, etc. The first user 102 may be associated with a first user profile 204. The communication 404 may be created.

The geo-spatial environment 100 may include a first instruction set to enable the community network 200 that includes the map database 208 associated with the map data 122 and the user database 202 associated with user profiles 204. Each user profile 204 may be associated with the verified geographic location 206 identifiable in the map data 122 and the contact address 210.

Figure 3:
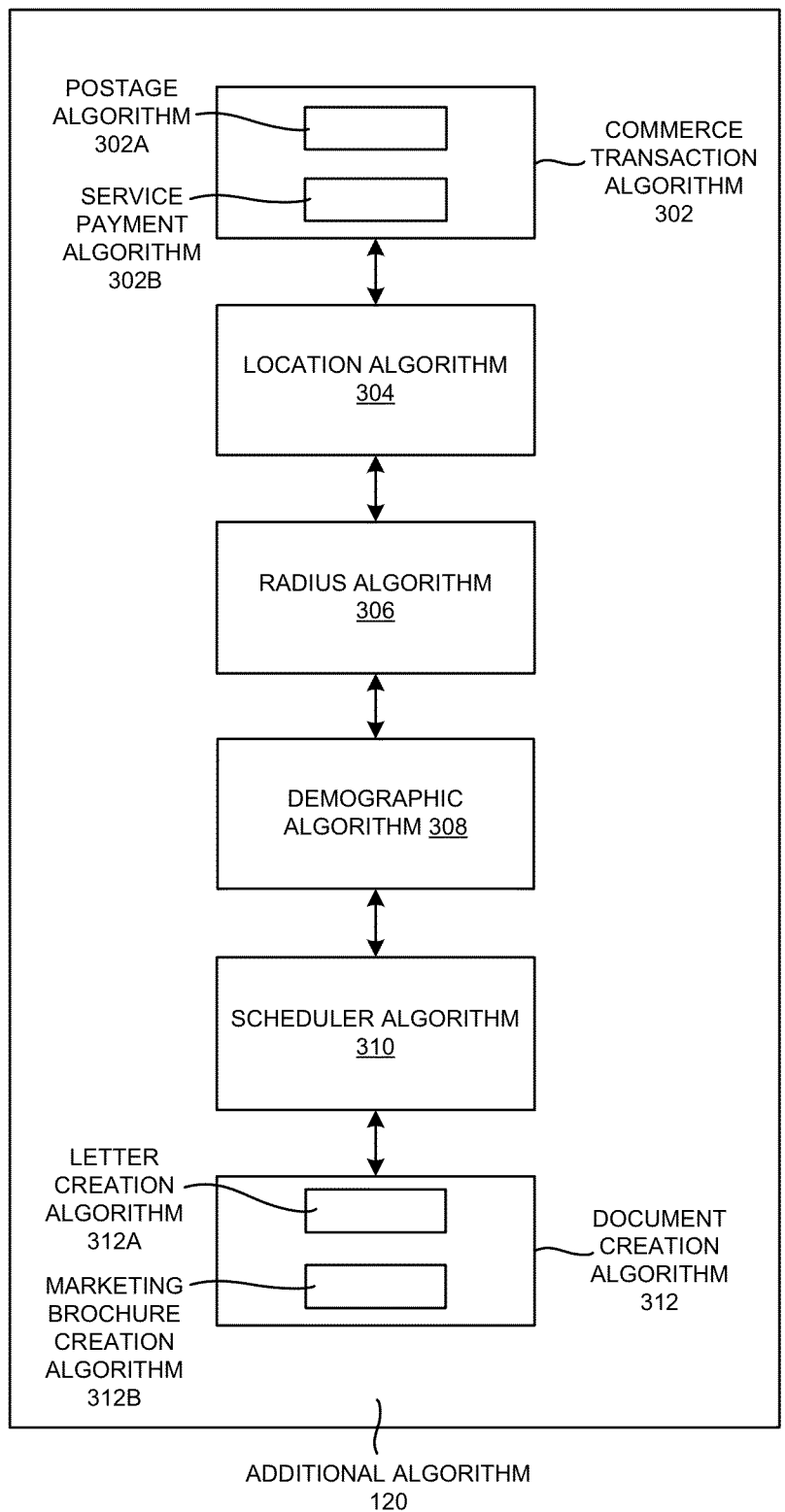
FIG. 3 is an exploded view of the additional algorithms of FIG. 1, according to one embodiment.

FIG. 3 is an exploded view of the additional algorithms 120 of FIG. 1, according to one embodiment. Particularly, FIG. 3 illustrates a commerce transaction algorithm 302, a postage algorithm 302A, a service payment algorithm 302B, a location algorithm 304, a radius algorithm 306, a demographic algorithm 308, a scheduler algorithm 310, a document creation algorithm 312, a letter creation algorithm 312A and a marketing brochure creation algorithm 312B, according to one embodiment.

The commerce transaction algorithm 302 may generate a commerce transaction (e.g., the commerce transaction 408 of FIG. 4) associated with elements related to mailing of the communication 404. The postage algorithm 302A may generate the online transaction associated with payment of postages. The service payment algorithm 302B may generate the online transaction associated with payment of services related to the mailing of the communication 404. The location algorithm 304 may represent a location (e.g., a street address, a city, a county, a state, a country, etc.) associated with the user profile 204 in the geo-spatial environment (e.g., the geo-spatial environment 100 of FIG. 1).

The radius algorithm 306 may determine a radius based on the location and/or display a portion the user profiles 204 having verified geographic locations 206 within a threshold radius. The demographic algorithm 308 may provide demographics (e.g., an age, an age range, a gender, an occupation, an ethnicity, a location of a residence, a location of a business, a martial status, an ownership status, a language, mobility, income, a life cycle, a socioeconomic status, a lifestyle, etc.) associated with the user profiles 204, select a demographic (e.g., the demographic may be associated with each user profile 204 of the group of user profiles 204), and/or determine a group of user profiles 204 of the portion of the user profiles 204. The scheduler algorithm 310 may schedule the mailing of the communication 404 between the first user profile 204 and the contact address 210 associated with the second user profile 204A.

The document creation algorithm 312 may generate the document associated with the communication 404 between the first user profile 204 and contact address 210 of the second user profile 204A. The letter creation algorithm 312A may enable the users 102 to create letters for communication 404 between the first user profile 204 and the contact address 210 associated with the second user profile 204A. The marketing brochure creation algorithm 312B may enable creation of marketing brochures (e.g., the brochures 704 of FIG. 7) in the geo-spatial environment (e.g., the geo-spatial environment 100 of FIG. 1).

In the example embodiment illustrated in FIG. 3, the additional algorithms 120 include the commerce transaction algorithm 302, the location algorithm 304, the radius algorithm 306, the demographic algorithm 308, the scheduler algorithm 310 and the document creation algorithm 312 communicating with each other. In addition, the commerce transaction algorithm 302 includes the postage algorithm 302A and the service payment algorithm 302B. The document creation algorithm 312 includes the letter creation algorithm 312A and the marketing brochure creation algorithm 312B, according to the example embodiment illustrated in FIG. 3.

The commerce transaction algorithm 302 of the geo-spatial environment 100 may generate the commerce transaction 408 associated with the elements. The postage algorithm 302A of the geo-spatial environment 100 may generate an online transaction associated with payment of postage. The service payment algorithm 302B of the geospatial environment 100 may generate an online transaction associated with payment of services related to mailing the communication 404. The location algorithm 304 may select the location (e.g., a street address, a city, a county, a state and/or a country, etc.) associated with the user profile 204.

The radius algorithm 306 may determine a radius based on the location and/or display a portion of the user profiles 204 having verified geographic locations 206 of FIG. 2) included in the radius. The demographic algorithm 308 may provide demographics (e.g., age, age range, gender, occupation, ethnicity, location of a residence, location of a business, marital status, ownership status, language, mobility, income, life cycle, socioeconomic status, and/or lifestyle, etc.) associated with the user profiles 204, to select demographic (e.g., may be associated with each user profile 204), and/or determine a group of user profiles 204. The scheduler algorithm 310 may schedule (e.g., based on a selected number of mailings per a predetermined time period) the mailing. The document creation algorithm 312 may enable creation of a document. The letter creation algorithm 312A may enable creation of letters. The marketing brochure creation algorithm 312B may enable creation of marketing brochures (e.g., the brochures 704 of FIG. 7).

FIG. 4 is a schematic representation of data communication between the first user 102 and the contact address 210 associated with the second user profile 204A, according to one embodiment. Particularly, FIG. 4 illustrates the network 104, the map data 122, the community network 200, the user database 202, the user profiles 204, the second user profile 204A, the contact address 210, a mail mode 402, a communication 404, a map view 406 and a commerce transaction 408, according to one embodiment.

The mail mode 402 may enable mailing of the communication 404 between the first user 102 associated with the first user profile 204 and the contact address 210 of the second user 102 associated with the second user profile 204A of the user profiles 204 through the mail mode 402 (e.g., a physical mode, a facsimile mode, an email mode, and/or an instant message mode, etc.). The communication 404 may be in the form of an online document, a text, a note, a memo, a pamphlet and/or a letter, etc. The map view 406 may enable the users 102 to view neighbor's profiles and their contact addresses (e.g., the contact address 210 of FIG. 2). The commerce transaction 408 may enable the users 102 to perform online transactions associated with payment of postages and/or payment of services related to mailing of the communication 404.

In the example embodiment illustrated in FIG. 4, the map view 406 may enable the users 102 to view their neighborhood profiles (e.g., the user profiles 204 of FIG. 2) and/or mail of the communication 404 through the mail mode 402. For example, a first user 102 associated with the first user profile 204 may communicate with the contact address 210 (e.g., 23232 Kettle Dr., Troy, Mich. 48084) of the second user profile 204A (e.g., Jane Doe's profile) through a physical mail mode by an online document through the network 104. In addition, the user 102 may make online transactions associated with payment of postages and services related to the mailing of the communication 404 through the commerce transaction option 408.

The mail mode 402 may be selected by the mail mode algorithm 112 and/or the communication 404 may be selected by the communication algorithm 110. A first display view may be generated (e.g., using the display algorithm 114 of FIG. 1) to include the map view 406 embodied by the community network 200, a portion of the user profiles 204 represented at a location in the map view 406 associated with the verified geographic location 206 of the first user profile 204 of the user profiles 204. A second user profile 204A may be selected from the portion of the user profiles 204 and the mailing of the communication 404 may be generated, in a format associated with the mail mode 402, between the first user profile 204 and the contact address 210 associated with the second user profile 204A, in which the contact address 210 is based on the mail mode 402 (e.g., a physical mail mode, a facsimile mode, a email mode, and/or an instant message mode, etc.).

The physical mail mode (e.g., the mail mode 402 of FIG. 4) may be selected and the mailing of the communication 404 may be generated, in a physical format associated with the physical mail mode, between the first user profile 204 and the contact address 210 (e.g., the contact address 210 may be based on a physical address) associated with the second user profile 204A. The facsimile mode may be selected and the mailing of the communication 404 may be generated, in a facsimile format associated with the facsimile mode, between the first user profile 204 and the contact address 210 (e.g., the contact address 210 may be based on a facsimile number) associated with the second user profile 204A.

The email mode may be selected and the mailing of the communication 404 may be generated, in an email format associated with the email mode, between the first user profile 204 and the contact address 210 (e.g., the contact address 210 may be based on an email address) associated with the second user profile 204A. The instant message mode may be selected (e.g., using the mail mode algorithm 112 of FIG. 1). A mailing of the communication 404 may be generated, in an instant message format associated with the instant message mode, between the first user profile 204 and the contact address 210 (e.g., the contact address 210 may be based on an instant message user identifier) associated with the second user profile 204A.

The location in the map view 406 may be selected from a group including a street address, a city, a county, a state, and/or a country, etc. The online commerce transaction 408 (e.g., payment of postage, payment of services, etc.) associated with the mailing of the communication 404 may be generated. The geo-spatial environment (e.g., the geo-spatial environment 100 of FIG. 1) may include a third instruction set integrated with the first instruction set and the second instruction set to determine a second user profile 204A of the portion of the user profiles 204, a communication (e.g., the communication 404 of FIG. 4), and/or a mail mode (e.g., the mail mode 402 of FIG. 4).

The geo-spatial environment (e.g., the geo-spatial environment 100 of FIG. 1) may include a fourth instruction set integrated with the first instruction set, the second instruction set and the third instruction set to generate a mailing of the communication 404, in a format associated with the mail mode 402, to the contact address 210 associated with the second user profile 204A, in which the contact address 210 is based on the mail mode 402. A fifth instruction set may generate a commerce transaction 408 associated with the mailing of the communication 404. A seventh instruction set may enable creation of the communication 404.

Figure 5:
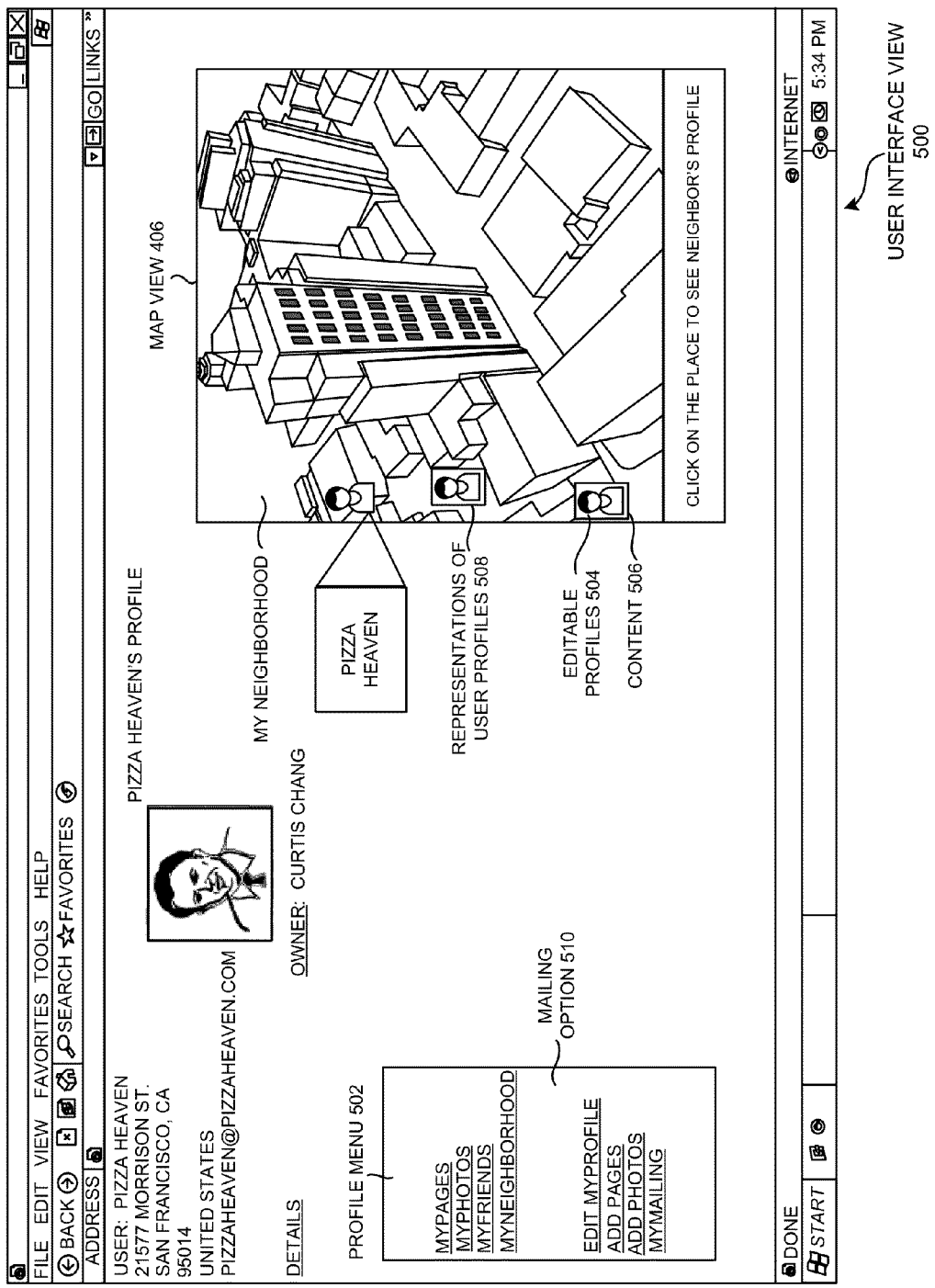
FIG. 5 is a user interface view of Pizza Heaven's profile, according to one embodiment.

FIG. 5 is a user interface view 500 of Pizza Heaven's profile, according to one embodiment. Particularly, FIG. 5 illustrates a profile menu option 502, editable profiles 504, content 506, representations of user profiles 508 and a mailing option 510, according to one embodiment.

The profile menu option 502 may enable a user (e.g., the users 102 of FIG. 1) to view his/her pages, photos, friends and/or neighborhood. The editable profiles 504 may display profile information of the users 102 associated with a particular group in the map view 406. The content option 506 may provide information of the users 102 associated with the editable profile 504 in his/her neighborhood. The representations of user profiles 508 may display profiles associated with the users 102 on the map view 406. The mailing option 510 may enable the users 102 to generate the mailing of the communication 404 through different mail modes (e.g., the mail mode 402 of FIG. 4).

In the example embodiment illustrated in FIG. 5, the user interface view 500 displays editable profiles 504, the verified geographic location 206 associated with the user profile 204 involved in communication 404 and the representation of other profiles 204 in the map view 406. The user interface view 500 may enable the user 102 (e.g., Pizza Heaven) to view and/or edit content 506 in the profile 204, pages, photos, etc. using profile menu option 502.

Figure 6:
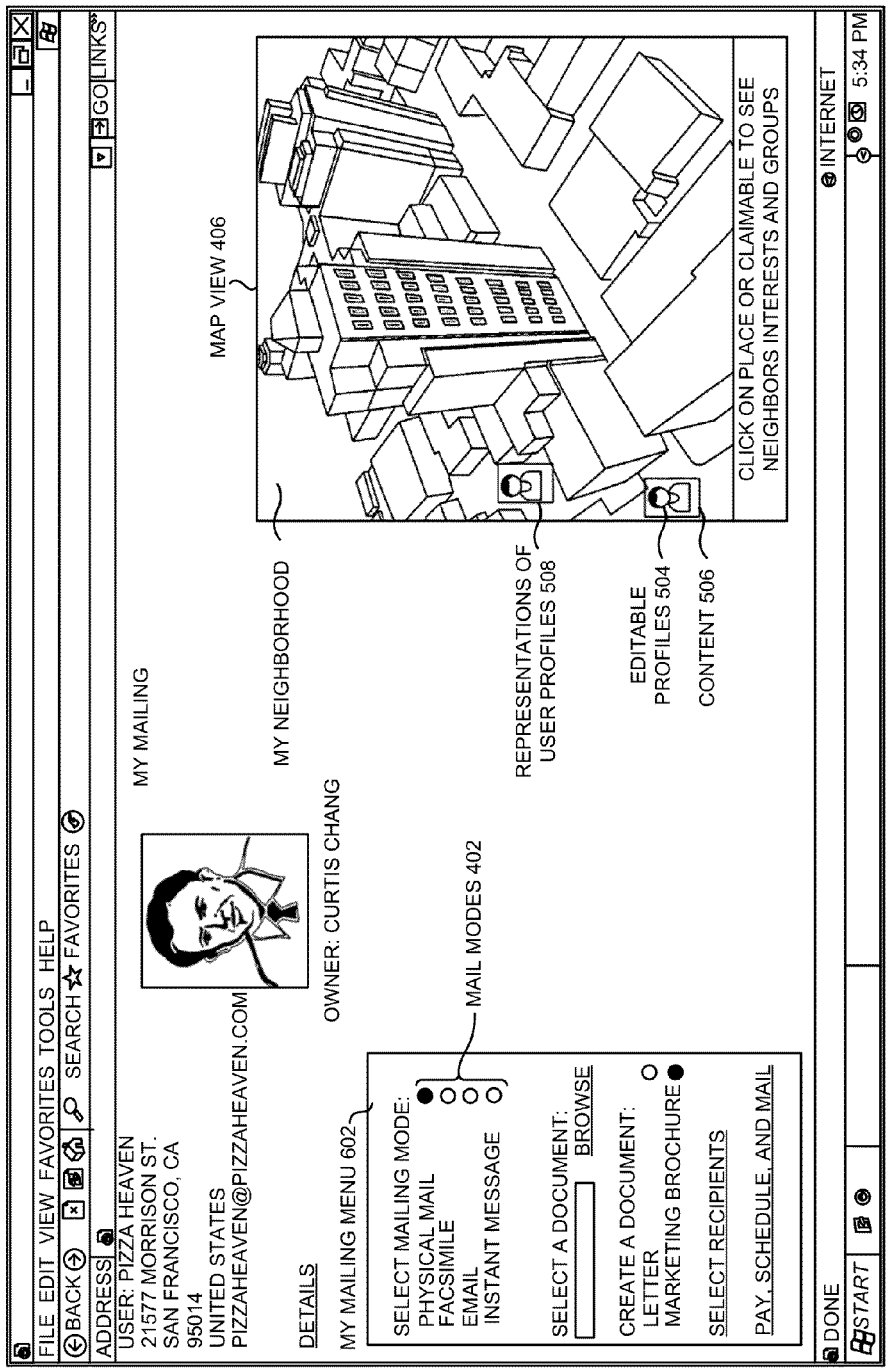
FIG. 6 is a user interface view of my mailing menu, according to one embodiment.

FIG. 6 is a user interface view 600 of a my mailing option 602, according to one embodiment. Particularly, FIG. 6 illustrates the mail modes 402, the map view 406, the editable profiles 504, the content 506, the representations of user profiles 508 and a my mailing menu option 602, according to one embodiment. The my mailing menu option 602 may enable the users 102 to send/receive mails by selecting mail modes 402 (e.g., a physical mail mode, a facsimile mode, an email mode, an instant message, etc.). The my mailing menu option 602 may enable the users 102 to create documents, letters and/or marketing brochures (e.g., the brochures 704 of FIG. 7) associated with mailing of the communication 404 through mail modes (e.g., the mail mode 402 of FIG. 4).

In the example embodiment illustrated in FIG. 6, the user interface view 600 may enable the user 102 (e.g., Pizza Heaven) to send/receive mails through the selected mail modes 402. In addition, the user 102 may create a document (e.g., letter, marketing brochure, etc.), pay for postages, make payment of services related to the mailing of the communication 404 and/or schedule a mail to be sent to the recipients through a pay, schedule and mail link. The user interface view 600 may also enable the users 102 to select the desired recipients involved in the mailing of the communication 404 through a select recipient link of the my mailing menu option 602. In addition, the user interface view 600 displays the map view 406 which represents the editable profiles 504 and/or the representations of user profiles 508.

Figure 7:
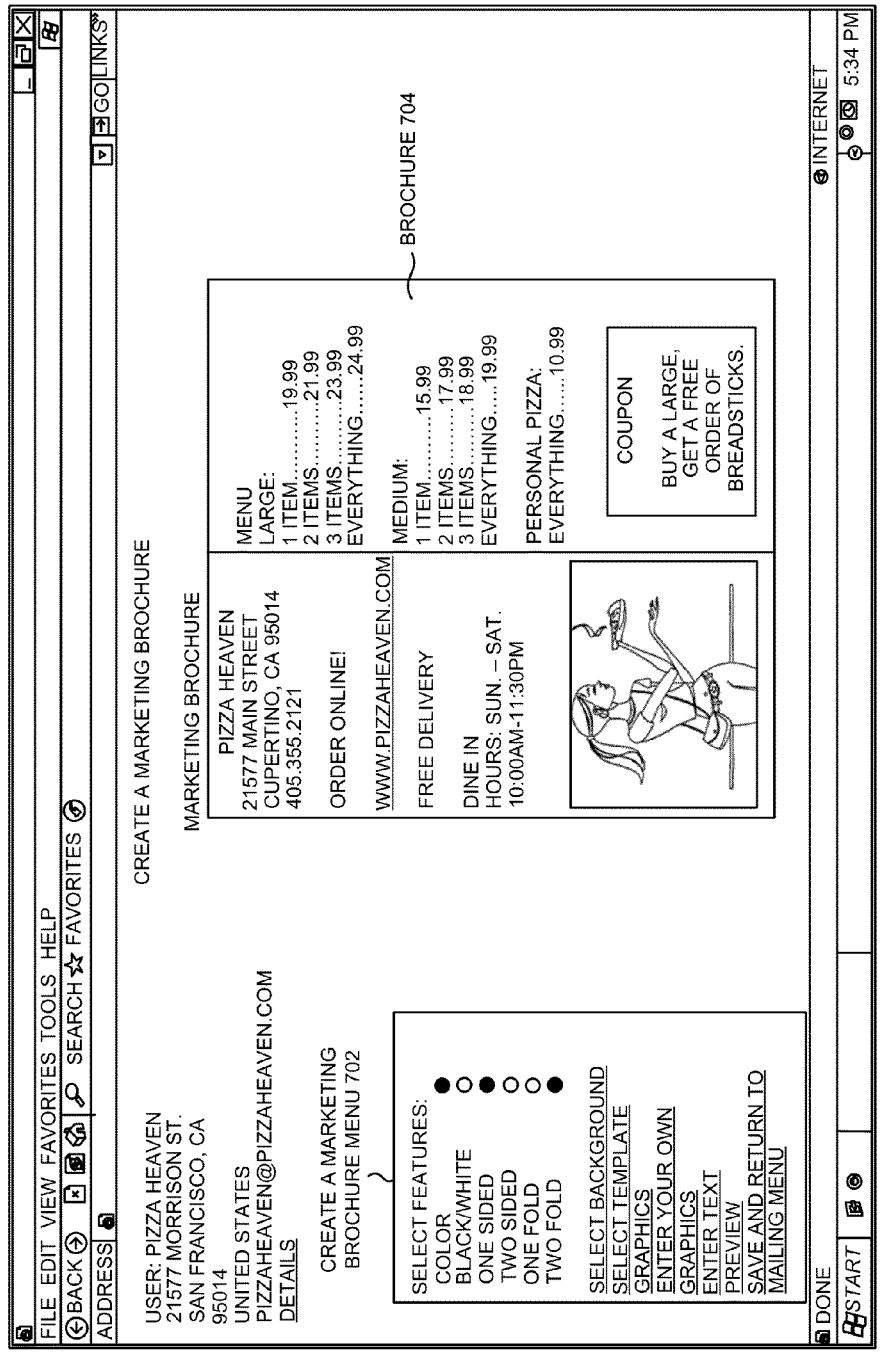
FIG. 7 is a user interface view of the marketing brochure creation algorithm of FIG. 3, according to one embodiment.

FIG. 7 is a user interface view 700 of the marketing brochure creation algorithm 312B of FIG. 3, according to one embodiment. Particularly, FIG. 7 illustrates a create a marketing brochure menu option 702 and a brochure 704, according to one embodiment. The create a marketing brochure menu option 702 may enable the users 102 to create a brochure 704 by selecting features (e.g., color, black/white, one sided, two sided, one fold and/or two fold). The brochure 704 may displays a preview of the marketing brochure created by the users 102 using the create a marketing brochure menu option 702.

In the example embodiment illustrated in FIG. 7, the user interface view 700 displays selected options for a color, one sided, and two fold marketing brochure created by the user 102 (e.g., Pizza Heaven) using the create a marketing brochure menu option 702. The user interface view 700 may enable the users 102 to select background and/or template graphics through a select background link and/or a select template graphics link of the create a marketing brochure menu option 702. In addition, the user interface view 700 may provide a preview link to view the preview of the brochure 704 created by Pizza Heaven. A save and return to mailing menu link of the create a marketing brochure menu option 702 may enable the user 102 to save the created brochure 704 and return to the my mailing page. Additionally, an enter your own graphics link and an enter text link displayed in the create a marketing brochure menu option 702 may enable the users 102 to insert the graphics, and/or the text.

Figure 8:
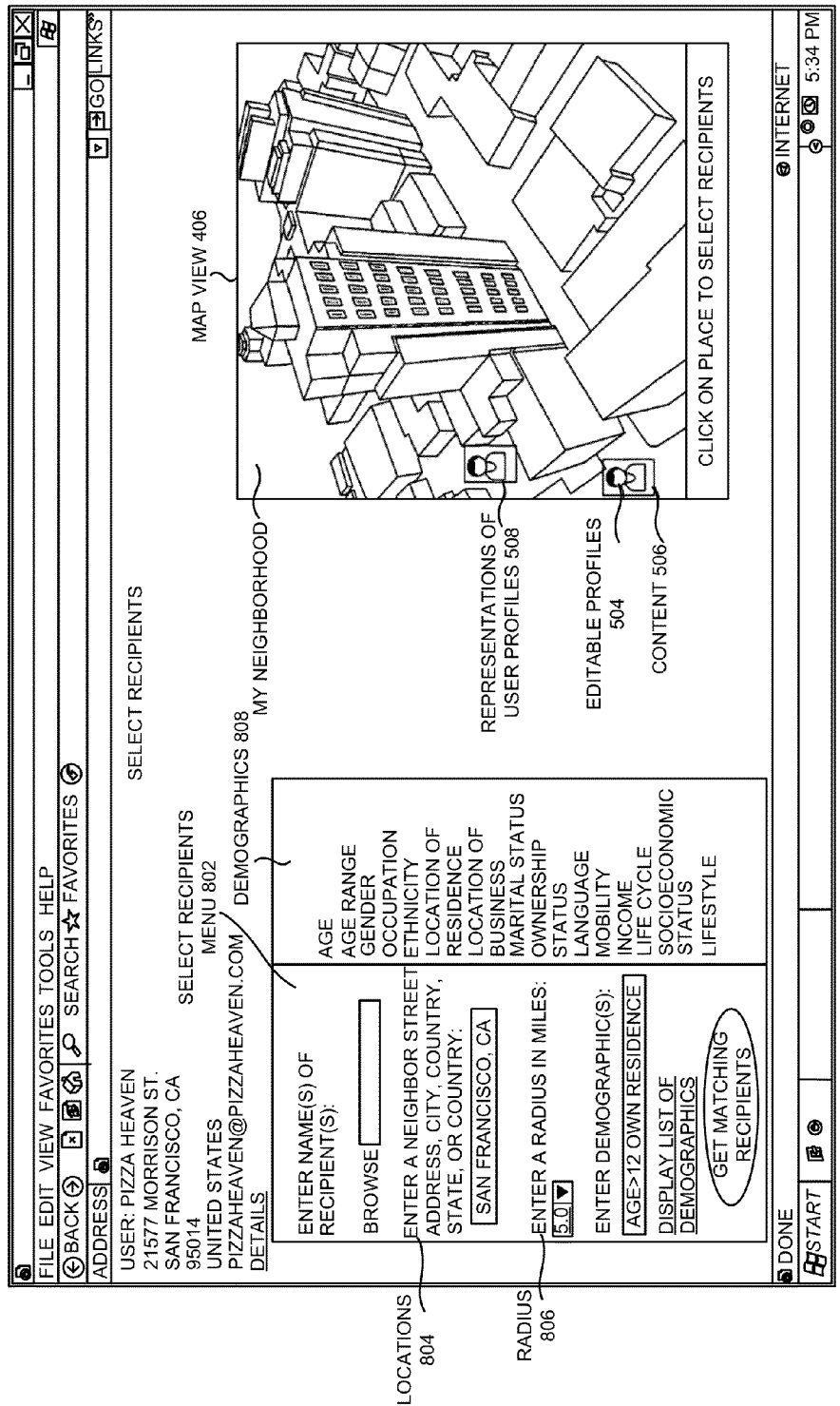
FIG. 8 is a user interface view of the recipient algorithm of FIG. 1, according to one embodiment.

FIG. 8 is a user interface view 800 of the recipient algorithm 116 of FIG. 1, according to one embodiment. Particularly, FIG. 8 illustrates the map view 406, the editable profiles 504, the content 506, the representations of user profiles 508, a select recipients menu option 802, a location field 804, a radius field 806 and demographics option 808, according to one embodiment.

The select recipients menu option 802 may enable the users 102 to communicate by selecting recipients having verified geographic locations 206 within a radius. The location field 804 may enable the users 102 to select the locations associated with the recipient(s) from a group including a street address, a city, a county, a state and a country. The radius field 806 may enable the users 102 to select the recipients located a threshold radius away from the user 102. The demographics option 808 may enable the users 102 to determine a group of user profiles 204 based on age, age range, gender, occupation, ethnicity, location of a residence, location of a business, martial status, ownership status, language, mobility, income, life cycle, socioeconomic status, and/or lifestyle, etc. associated with the recipient(s).

In the example embodiment illustrated in FIG. 8, the user interface view 800 may enable the user 102 (e.g., Pizza Heaven) to select recipients from the select recipients menu option 802 based on a name, a location (e.g., San Francisco), a radius (e.g., 5 miles) and/or demographics (e.g., age, residence). In addition, the user interface view 800 may enable the users 102 to view various demographics using a display list of demographics link of the select recipients menu option 802.

A get menu link displayed in the select recipients menu option 802 facilitates the users 102 to find matching recipients by selecting the demographics (e.g., age >12, own residence) from the demographics option 808. The user interface view 800 may enable the users 102 to select the desired recipients involved in the mailing of the communication 404 through selecting the locations of the recipients displayed in the map view 406. In addition, the user interface view 800 also displays in the map view 406, the editable profiles 504 and/or the representations of user profiles 508.

The radius 806 associated with a location in the map view 406 may be selected (e.g., using the radius algorithm 306 of FIG. 3), the user profiles 204 of the portion of the user profiles 204 having verified geographic locations 206 included in the radius 806 may be selected (e.g., using the location algorithm 304 of FIG. 3), and/or the demographics 808 associated with the community network 200 may be provided (e.g., through the demographic algorithm 308 of FIG. 3). The demographics 808 may be associated with each user profile 204. A demographic 808 may be selected, and/or the user profiles 204 having verified geographic locations 206 included in the radius 806 and having the demographic (e.g., age, age range, gender, occupation, ethnicity, location of a residence, location of a business, marital status, ownership status, language, mobility, income, life cycle, socioeconomic status, and/or lifestyle, etc.) may be selected.

The geo-spatial environment (e.g., the geo-spatial environment 100 of FIG. 1) may include a second instruction set integrated with the first instruction set to display a map view 406, embodied by the community network 200, to include representations of a portion of the user profiles 204, in which each representation of a user profile 204 is displayed at a location in the map view 406 corresponding to the verified geographic location 206 associated with the user profile 204.

Figure 9:
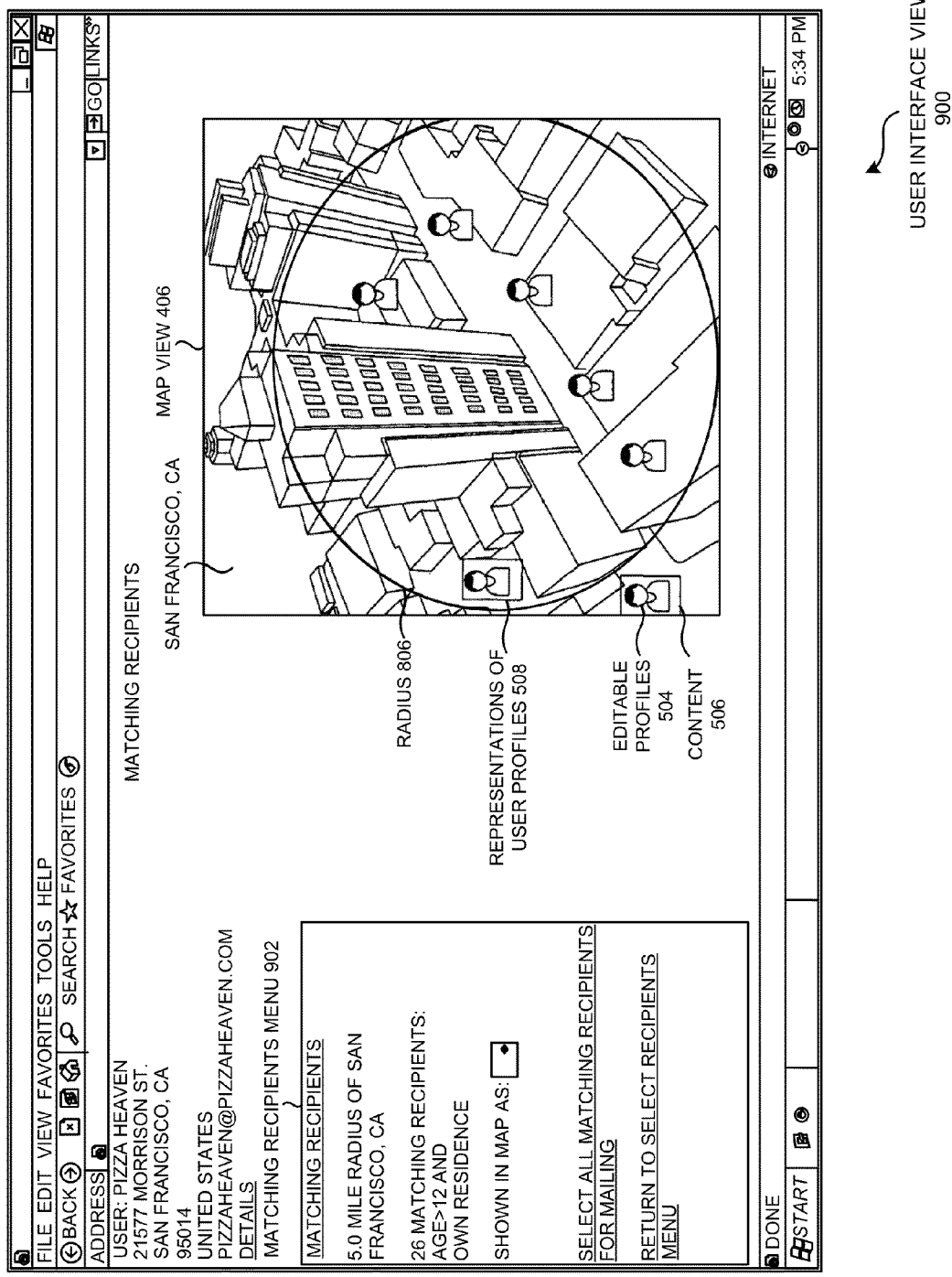
FIG. 9 is a user interface view of selecting matching recipients for mailing of communication, according to one embodiment.

FIG. 9 is a user interface view 900 of selecting the matching recipients for mailing of the communication 404, according to one embodiment. Particularly, FIG. 9 illustrates the map view 406, the editable profiles 504, the content 506, the representations of user profiles 508, the radius 806 and a matching recipients menu option 902, according to one embodiment. The matching recipients menu option 902 may enable the users 102 to select the recipient(s) having matching demographic(s) (e.g., an age, a residence, and/or an age range, etc.) and located within the radius 806 associated with the geographic location specified by the users 102.

In the example embodiment illustrated in FIG. 9, the user interface view 900 displays in the map view 406, the matching recipients located within the radius 806 associated with the geographic location adjacent to the other user profiles 204. The matching recipients menu option 902 of user interface view 900 displays numbers of recipients having matching demographic(s) 808 (e.g., age >12 and own residence, etc.) and located within the radius 806 (e.g., 5 miles) associated with the location (e.g., San Francisco, Calif.).

In addition, the user interface view 900 may enable the user 102 (e.g., Pizza Heaven) to select all the matching recipients for mailing of the communication 404 using a select all matching recipients for mailing link of the matching recipients menu option 902. (The user interface view 900 displays in the map view 406, the editable profiles 504, the content 506 associated with the editable profiles 504 and the representations of user profiles 508 adjacent to the profiles 204 associated with the matching recipients.

FIG. 10 is a user interface view 1000 of scheduling, sending mails and making transactions associated with payment of services related to mailing of the communication 404, according to one embodiment. Particularly, FIG. 10 illustrates a schedule, pay, and send menu option 1002, according to one embodiment. The schedule, pay, and send menu option 1002 may enable the user 102 to schedule a time period for mailing and making transactions associated with the payment of postages and/or the payment of services related to mailing of the communication 404.

In the example embodiment illustrated in FIG. 10, the user interface view 1000 displays the scheduled time period (e.g., per week, for a period of 6 months, etc.) for mailing of the communication 404 and transaction details associated with the payment of postage and/or services. The user interface view 1000 may enable the user 102 (e.g., Pizza Heaven) to schedule (e.g., from January 2007 to June 2007, weekly, monthly, daily, yearly, number of times, etc.) the mailing to the recipient(s).

In addition, a pay using online payment system link of the schedule, pay, and send menu option 1002 may enable the user 102 to make online transactions associated with the payment of postages and/or services. The users 102 may make online payment of postages (e.g., @ $0.30 per recipient for a total of 26 matching recipients) and/or payment of services (e.g., @ $50.00) related to the mailing of the communication 404 to the recipients. The users 102 may send any number of mailings per a predetermined time period (e.g., per day, week, month and/or year).

The user 102 (e.g., Pizza Heaven) may send mails to the recipients upon receiving a transaction confirmation number (e.g., 23923235) associated with confirmation of payment. The user interface view 1000 also displays delivery status of the mailings to the recipients in the schedule, pay, and send menu option 1002. A return to profile option may enable the users 102 to revisit the profile 204 associated with the user 102. The mailing of the communication 404 may be scheduled (e.g., by determining a number of mailings, a time period and/or generating the number of mailings within the time period). The geo-spatial environment (e.g., the geo-spatial environment 100 of FIG. 1) may include a sixth instruction set to schedule the mailing of the communication 404.

Figure 11:
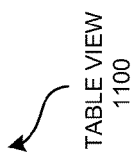
FIG. 11 is a table view showing details of the mailing of the communication associated with the users, according to one embodiment.

FIG. 11 is a table view 1100 showing details of mailing of the communication 404 associated with the users 102, according to one embodiment. Particularly, FIG. 11 illustrates a users field 1102, a mailing scheduled field 1104, a total recipients field 1106, a demographics field 1108 and an online payment field 1110, according to one embodiment.

The users field 1102 may display the names of users (e.g., the users 102 of FIG. 1) associated with the mailing of the communication 404 through the mail mode 402. The mailing scheduled field 1104 may display the number of mailings scheduled within a time period by a particular user 102. The total recipients field 1106 may display total number of recipients scheduled to be mailed by the users 102. The demographics field 1108 may display the status of the demographics (e.g., the demographics 808 of FIG. 8) associated with the user 102. The online payment field 1110 may display an online transaction status associated with the payment of postages and/or services related to mailing the communication 404.

In the example embodiment illustrated in FIG. 11, the users field 1102 displays "Pizza Heaven" in the first row, "Jane Doe" in the second row and "Harry Cary" in the third row of the users field 1102 column. The mailing scheduled field 1104 displays "7" in the first row, "0" in the second row, and "1" in the third row of the mailing scheduled field 1104 column (e.g., 7 mailings scheduled by Pizza Heaven, no mailings scheduled by Jane Doe and 1 mailing scheduled by Harry Cary). The total recipients field 1106 displays "26" recipients for Pizza Heaven in the first row, "0" recipients for Jane Doe in the second row and "250" recipients for Harry Cary in the third row of the total recipients field 1106 column. The demographics field 1108 displays "Yes" in the first row, "No7" in the second row and "No" in the third row of the demographics field 1108 column (e.g., Pizza Heaven has demographics while Jane Doe and Harry Cary do not have demographics). The online payment field 1110 displays "Yes" in the first row, "No" in the second row and "Yes" in the third row of the online payment field 1110 column (e.g., Pizza Heaven and Harry Cary make online payments and Jane Doe does not make online payments).

Figure 12:
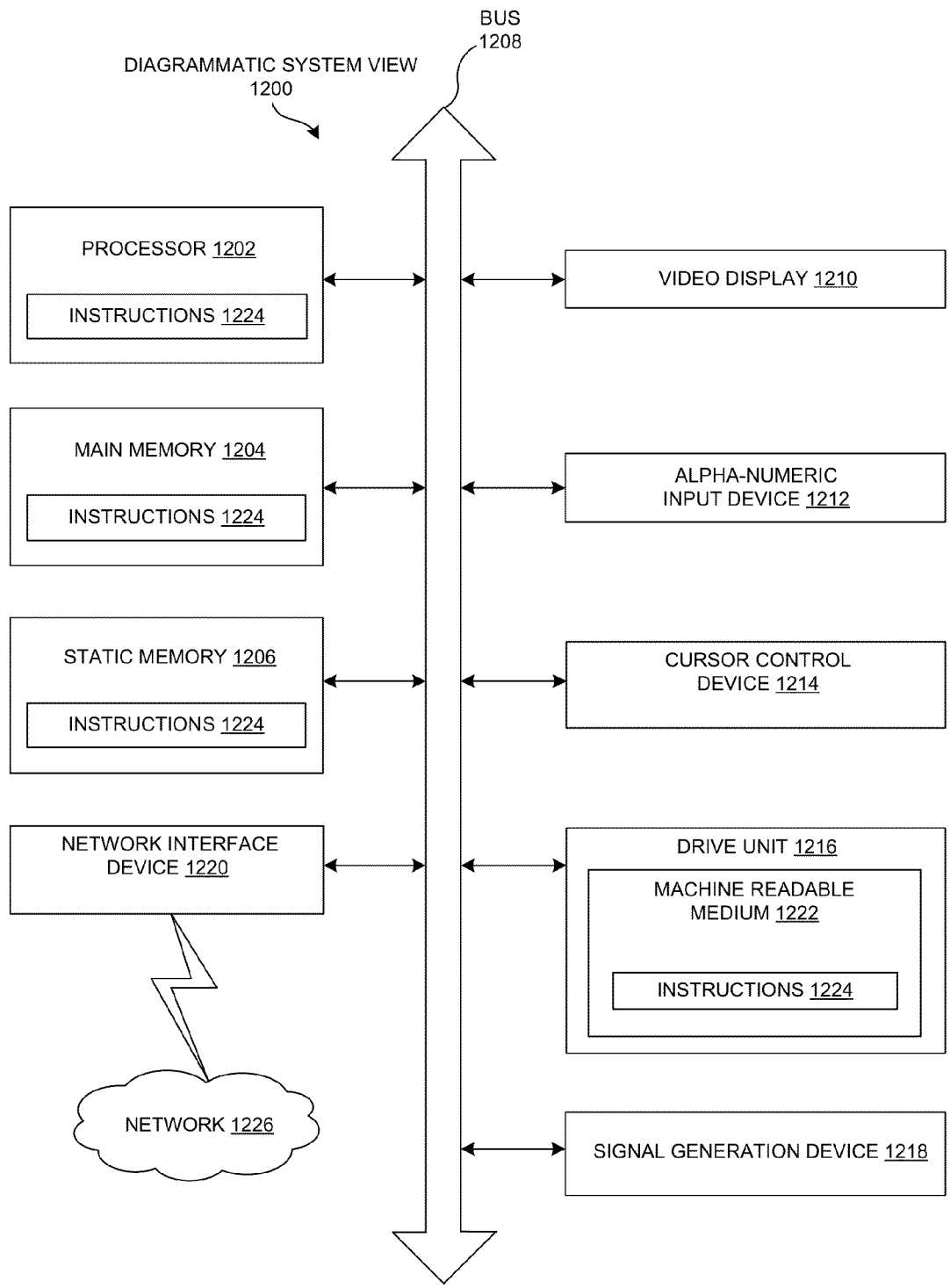
FIG. 12 is a diagrammatic system view of a data processing system in which any of the embodiments disclosed herein may be performed, according to one embodiment.

FIG. 12 is a diagrammatic system view 1200 of a data processing system in which any of the embodiments disclosed herein may be performed, according to one embodiment. Particularly, the system view 1200 of FIG. 12 illustrates a processor 1202, a main memory 1204, a static memory 1206, a bus 1208, a video display 1210, an alpha-numeric input device 1212, a cursor control device 1214, a drive unit 1216, a signal generation device 1218, a network interface device 1220, a machine readable medium 1222, instructions 1224 and a network 1226, according to one embodiment.

The diagrammatic system view 1200 may indicate a personal computer and/or a data processing system in which one or more operations disclosed herein may be performed. The processor 1202 may be a microprocessor, a state machine, an application-specific integrated circuit, a field programmable gate array, etc. (e.g., Intel@ Pentium® processor). The main memory 1204 may be a dynamic random access memory and/or a primary memory of a computer system. The static memory 1206 may be a hard drive, a flash drive, and/or other memory information associated with the data processing system.

The bus 1208 may be an interconnection between various circuits and/or structures of the data processing system. The video display 1210 may provide graphical representation of information on the data processing system. The alpha-numeric input device 1212 may be a keypad, a keyboard and/or any other input device of text (e.g., a special device to aid the physically challenged). The cursor control device 1214 may be a pointing device such as a mouse.

The drive unit 1216 may be the hard drive, a storage system, and/or other longer term storage subsystem. The signal generation device 1218 may be a bios and/or a functional operating system of the data processing system. The network interface device 1220 may be a device that may perform interface functions such as code conversion, protocol conversion and/or buffering required for communication to and from the network 1226. The machine readable medium 1222 may provide instructions on which any of the methods disclosed herein may be performed. The instructions 1224 may provide source code and/or data code to the processor 1202 to enable any one/or more operations disclosed herein.

Figure 13A:
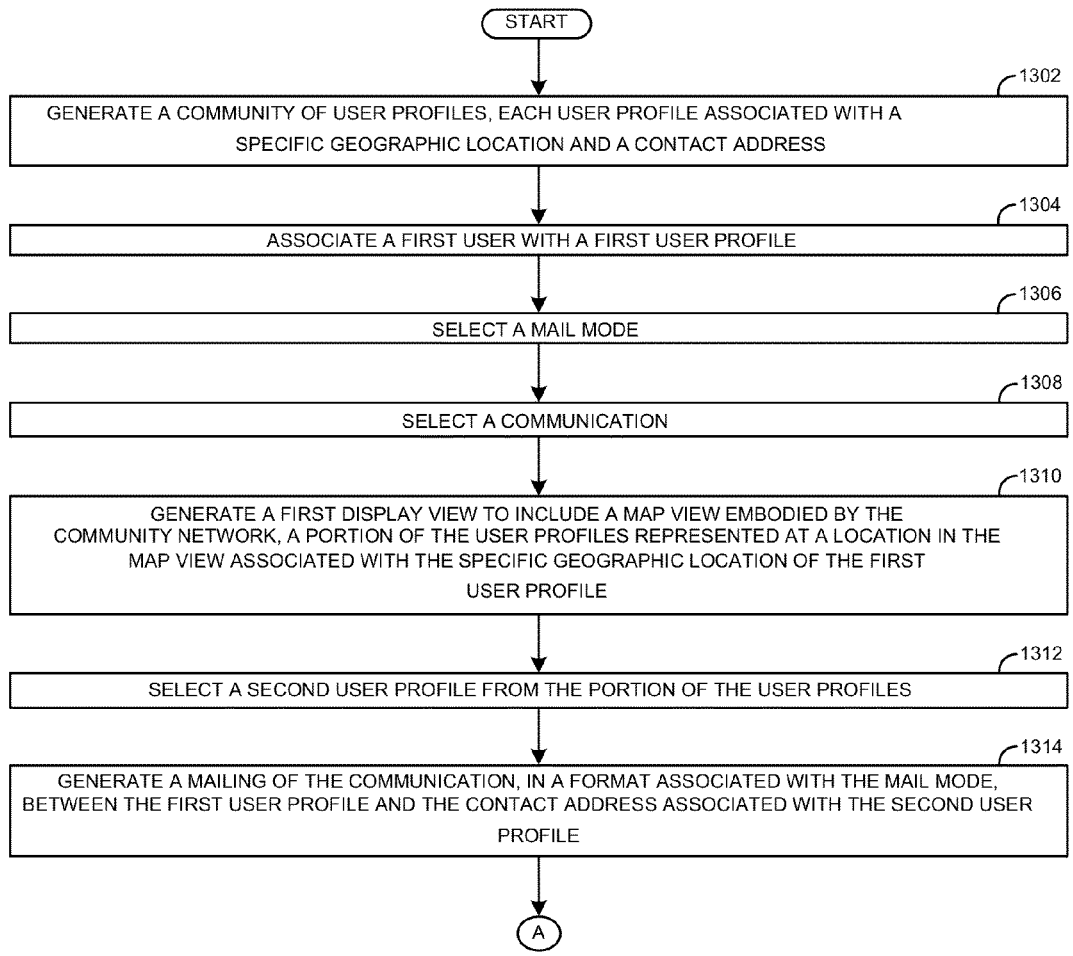
FIG. 13A is a process flow of direct mailing based on selection of mailing modes, according to one embodiment.

FIG. 13A is a process flow of direct mailing based on the selection of mailing modes, according to one embodiment. In operation 1302, a community network (e.g., the community network 200 of FIG. 2) of user profiles (e.g., the user profiles 204 of FIG. 2) may be generated (e.g., using the community network algorithm 106 of FIG. 1), each user profile 204 associated with a verified geographic location (e.g., the specific geographic location 206 of FIG. 2) and/or a contact address (e.g., the contact address 210 of FIG. 2). In operation 1304, a first user 102 may be associated with a first user profile 204. In operation 1306, a mail mode 402 may be selected (e.g., using the mail mode algorithm 112 of FIG. 1). In operation 1308, a communication (e.g., the communication 404 of FIG. 4) may be selected (e.g., through the communication algorithm 110 of FIG. 1).

In operation 1310, a first display view may be generated (e.g., through the display algorithm 114 of FIG. 1), to include a map view (e.g., the map view 406 of FIG. 4) embodied by the community network 200, a portion of the user profiles 204 represented at a location in the map view 406 associated with the verified geographic location 206 of the first user profile 204. In operation 1312, a second user profile 204A may be selected from the portion of the user profiles 204. In operation 1314, a mailing of the communication 404 may be generated (e.g., using the mail communication algorithm 118 of FIG. 1), in a format associated with the mail mode 402, between the first user profile 204 and the contact address 210 associated with the second user profile 204A.

Figure 13B:
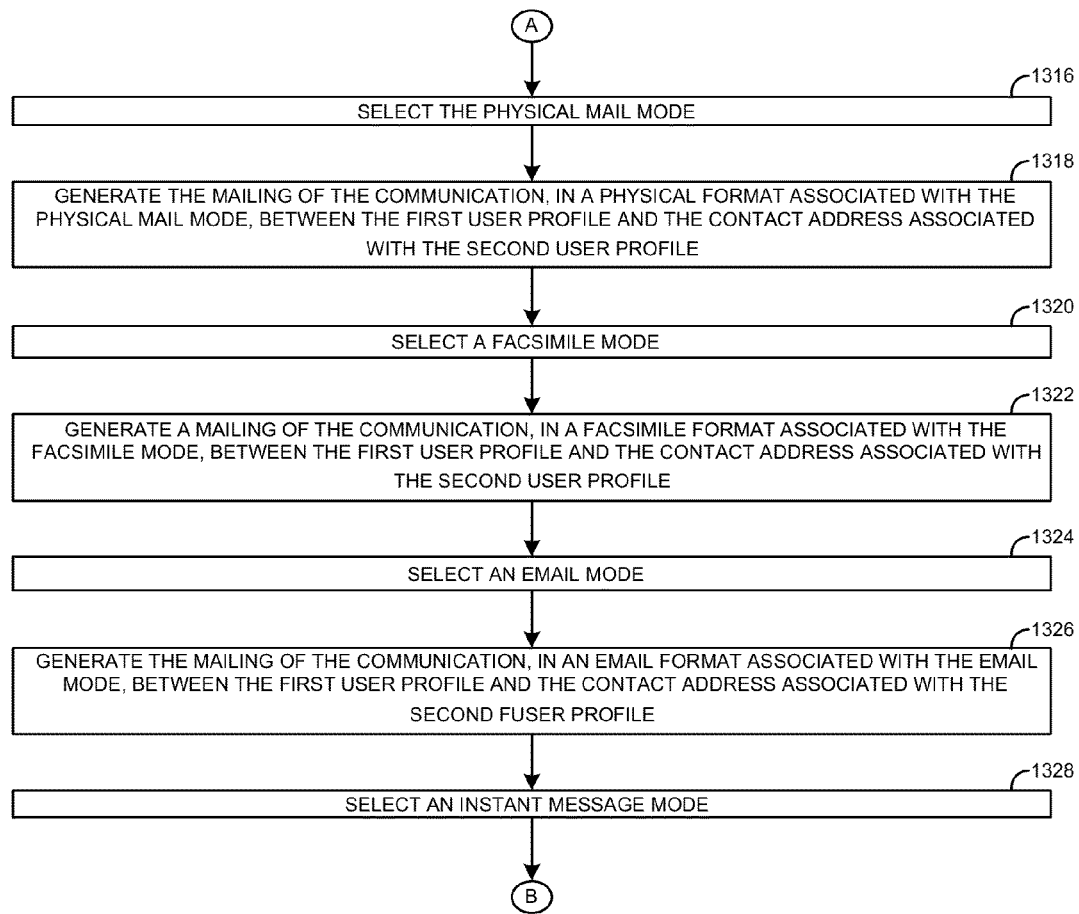
FIG. 13B is a continuation of the process flow of FIG. 13A illustrating additional processes, according to one embodiment.

FIG. 13B is a continuation of the process flow of FIG. 13A illustrating additional processes, according to one embodiment. In operation 1316, the physical mail mode (e.g., the mail mode 402 of FIG. 4) may be selected (e.g., using the mail mode algorithm 112 of FIG. 1). In operation 1318, the mailing of the communication 404 may be generated (e.g., using the mail communication algorithm 118 of FIG. 1), in a physical format associated with the physical mail mode, between the first user profile 204 and the contact address 210 associated with the second user profile 204A.

In operation 1320, a facsimile mode may be selected (e.g., through the mail mode algorithm 112 of FIG. 1). In operation 1322, a mailing of the communication 404 may be generated (e.g., using the mail communication algorithm 118 of FIG. 1), in a facsimile format associated with the facsimile mode, between the first user profile 204 and the contact address 210 associated with the second user profile 204A. In operation 1324, an email mode may be selected (e.g., using the mail mode algorithm 112 of FIG. 1). In operation 1326, the mailing of the communication may be generated (e.g., through the mail communication algorithm 118 of FIG. 1), in an email format associated with the email mode, between the first user profile 204 and the contact address 210 associated with the second user profile 204A. In operation 1328, an instant message mode may be selected (e.g., through the mail mode algorithm 112 of FIG. 1).

Figure 13C:
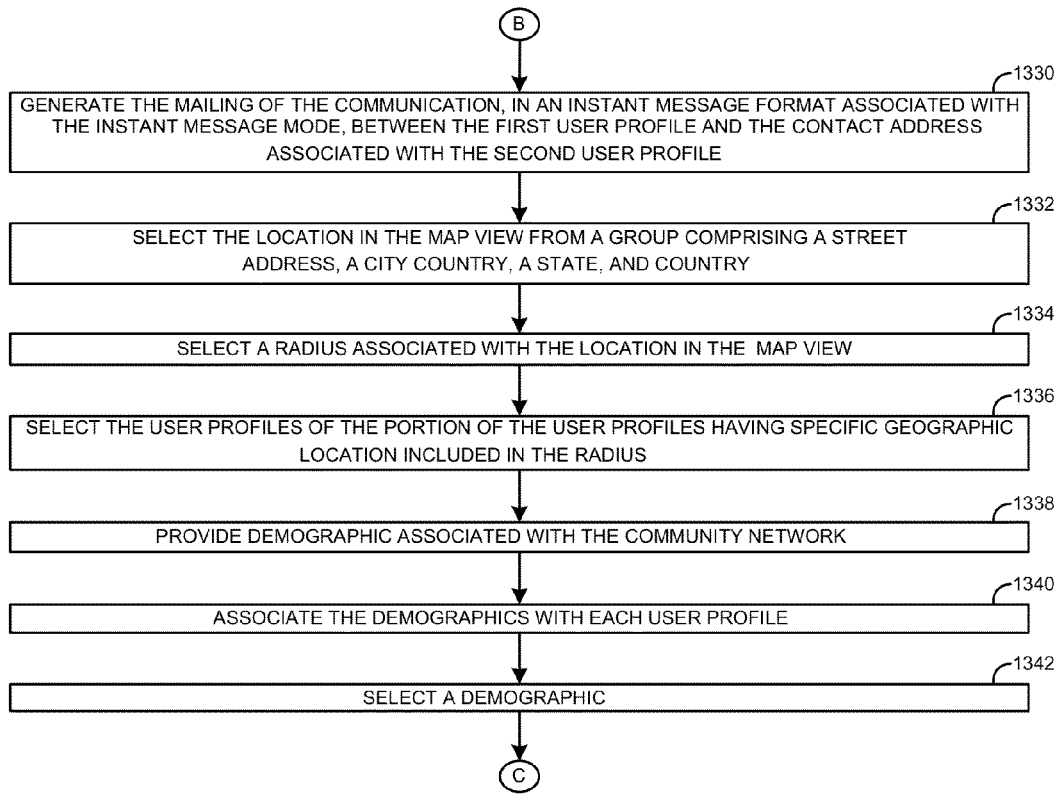
FIG. 13C is a continuation of the process flow of FIG. 13B illustrating additional processes, according to one embodiment.

FIG. 13C is a continuation of the process flow of FIG. 13B illustrating additional processes, according to one embodiment. In operation 1330, the mailing of the communication (e.g., the communication 404 of FIG. 4) may be generated (e.g., using the mail communication algorithm 118 of FIG. 1), in an instant message format associated with the instant message mode, between the first user profile 204 and the contact address 210 associated with the second user profile 204A. In operation 1332, the location in the map view 406 may be selected (e.g., using the location algorithm 304 of FIG. 3) from a group including a street address, a city, a county, a state, and/or a country, etc.

In operation 1334, a radius (e.g., the radius 806 of FIG. 8) associated with the location in the map view 406 may be selected (e.g., using the radius algorithm 306 of FIG. 3). In operation 1336, the user profiles 204 having specific geographic locations 206 included in the radius 806 may be selected (e.g., using the recipient algorithm 116 of FIG. 1). In operation 1338, demographics associated with the community network 200 may be provided (e.g., through the demographic algorithm 308 of FIG. 3). In operation 1340, the demographics 808 may be associated with each user profile 204. In operation 1342, a demographic 808 may be selected (e.g., using the demographic algorithm 308 of FIG. 3).

Figure 13D:
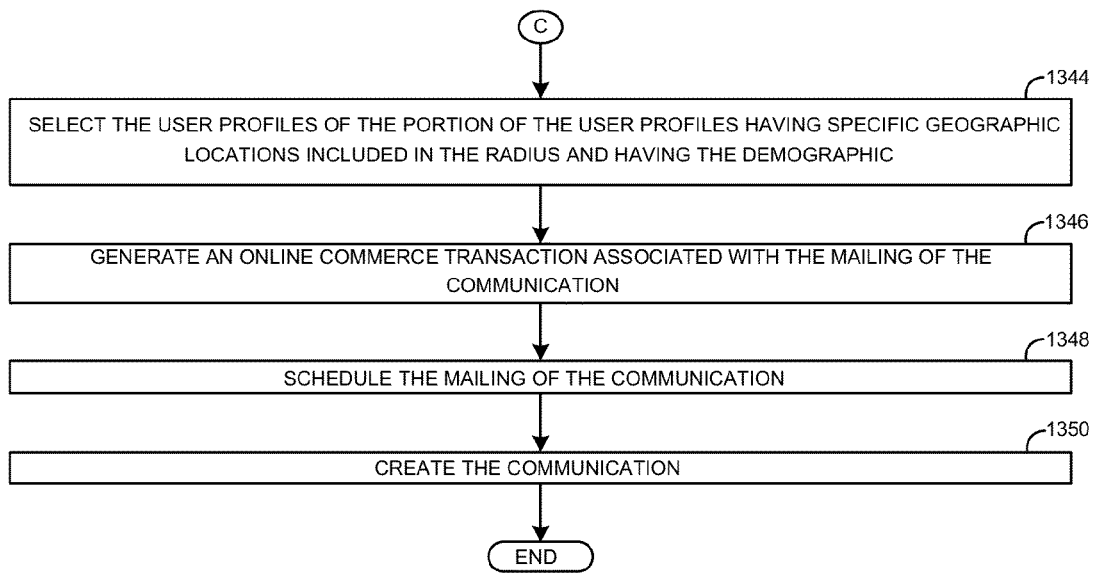
FIG. 13D is a continuation of the process flow of FIG. 13C illustrating additional processes, according to one embodiment.

FIG. 13D is a continuation of the process flow of FIG. 13C, illustrating additional processes, according to one embodiment. In operation 1344, the user profiles 204 having the verified geographic locations 206 included in the radius 806 and having the demographic 808 may be selected (e.g., using the recipient algorithm 116 of FIG. 1). In operation 1346, an online commerce transaction (e.g., the commerce transaction 408 of FIG. 4) associated with the mailing of the communication (e.g., the communication 404 of FIG. 4) may be generated (e.g., through commerce transaction algorithm 302 of FIG. 2). In operation 1348, the mailing of the communication 404 may be scheduled (e.g., using the scheduler algorithm 310 of FIG. 3). In operation 1350, the communication 404 may be created (e.g., using document creation algorithm 312 of FIG. 3).

Although the present embodiments have been described with reference to specific example embodiments, it will be evident that various modifications and changes may be made to these embodiments without departing from the broader spirit and scope of the various embodiments. For example, the various devices, algorithms, analyzers, generators, etc. described herein may be enabled and operated using hardware circuitry (e.g., CMOS based logic circuitry), firmware, software and/or any combination of hardware, firmware, and/or software (e.g., embodied in a machine readable medium).

For example, the various electrical structure and methods may be embodied using transistors, logic gates, and electrical circuits (e.g., Application Specific Integrated Circuitry (ASIC) and/or in Digital Signal Processor (DSP) circuitry). For example, the community network algorithm 106, the map algorithm 108, the communication algorithm 110, the mail mode algorithm 112, the display algorithm 114, the recipient algorithm 116, the mail communication algorithm 118, the additional algorithms 120, the commerce transaction algorithm 302, the postage algorithm 302A, the service payment algorithm 302B, the location algorithm 304, the radius algorithm 306, the demographic algorithm 308, the scheduler algorithm 310, the document creation algorithm 312, the letter creation algorithm 312A, the marketing brochure creation algorithm 312B, and other algorithms of FIGS. 1-13 may be enabled using a community network circuit, a map circuit, a communication circuit, a mail mode circuit, a display circuit, a recipient circuit, a mail communication circuit, additional circuits, a commerce transaction circuit, a postage circuit, a service payment circuit, a location circuit, a radius circuit, a demographic circuit, a scheduler circuit, a document creation circuit, a letter creation circuit, a marketing brochure creation circuit, and other circuits using one or more of the technologies described herein.

In addition, it will be appreciated that the various operations, processes, and methods disclosed herein may be embodied in a machine-readable medium and/or a machine accessible medium compatible with a data processing system (e.g., a computer system), and may be performed in any order. Accordingly, the specification and drawings are to be regarded in an illustrative rather than a restrictive sense.

Figure 14:
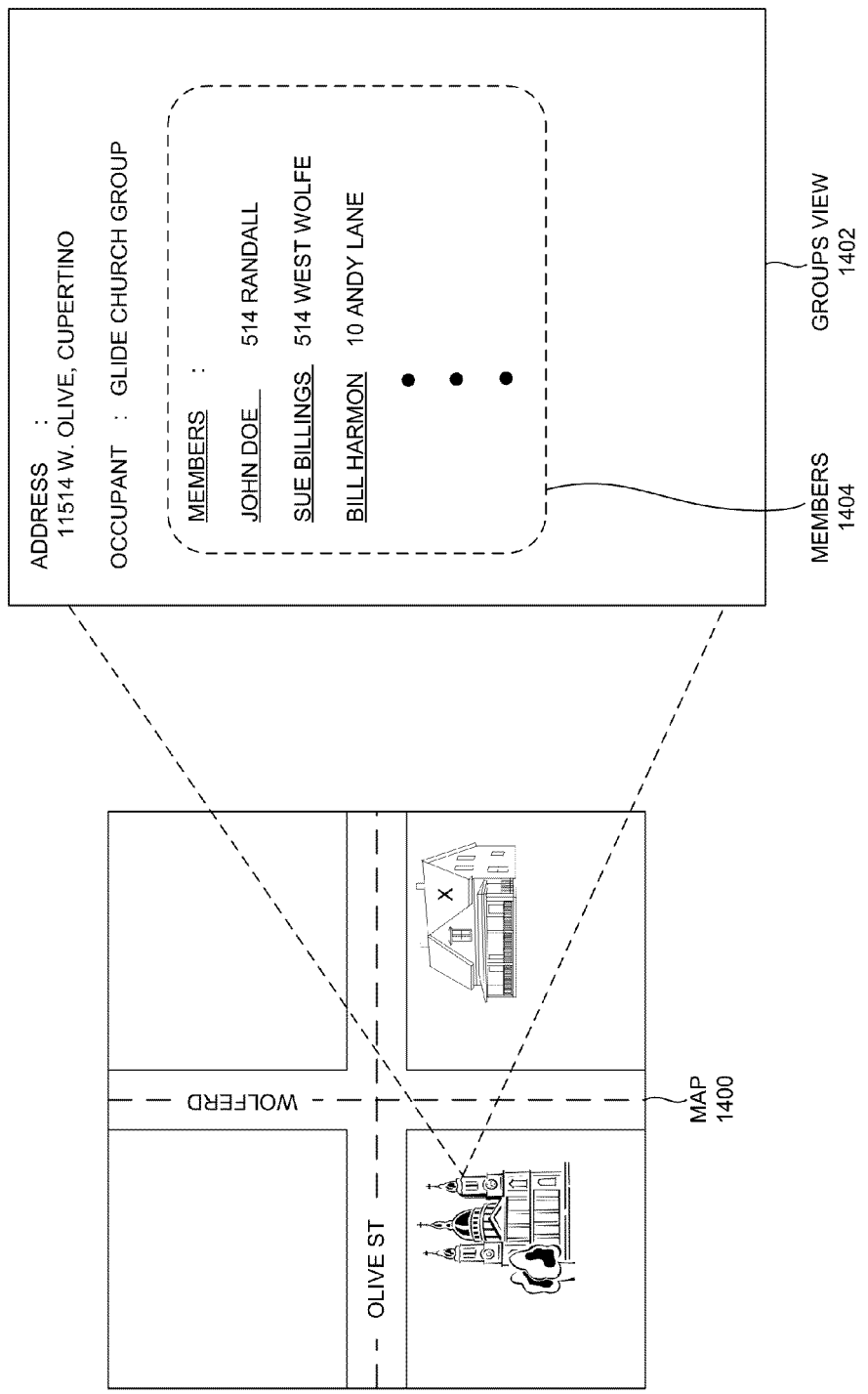
FIG. 14 is a user interface view of a group view associated with particular geographical location, according to one embodiment.

FIG. 14 is a user interface view of a group view 1402 associated with particular geographical location, according to one embodiment. Particularly FIG. 14 illustrates, a map 1400, a groups view 1402, according to one embodiment. In the example embodiment illustrated in FIG. 14, the map view 1400 may display map view of the geographical location of the specific group of the global neighborhood environment 1800 (e.g., the privacy server 2900 of FIG. 29). The groups view 1402 may contain the information (e.g., address, occupant, etc.) associated with the particular group of the specific geographical location (e.g., the geographical location displayed in the map 1400) of the global neighborhood environment 1800 (e.g., the privacy server 2900 of FIG. 29). The members 1404 may contain the information about the members associated with the group (e.g., the group associated with geographical location displayed in the map) of the global neighborhood environment 1800 (e.g., the privacy server 2900 of FIG. 29).

FIG. 15 is a user interface view of claim view 1550, according to one embodiment. The claim view 1550 may enable the user to claim the geographical location of the registered user. Also, the claim view 1550 may facilitate the user of the global neighborhood environment 1800 (e.g., the privacy server 2900 of FIG. 29) to claim the geographical location of property under dispute.

In the example embodiment illustrated in FIG. 15, the operation 1502 may allow the registered user of the global neighborhood environment 1800 (e.g., the privacy server 2900 of FIG. 29) to claim the address of the geographic location claimed by the registered user. The operation 1504 illustrated in example embodiment of FIG. 15, may enable the user to delist the claim of the geographical location. The operation 1506 may offer information associated with the document to be submitted by the registered users of the global neighborhood environment 1800 (e.g., the privacy server 2900 of FIG. 29) to claim the geographical location.

Figure 16:
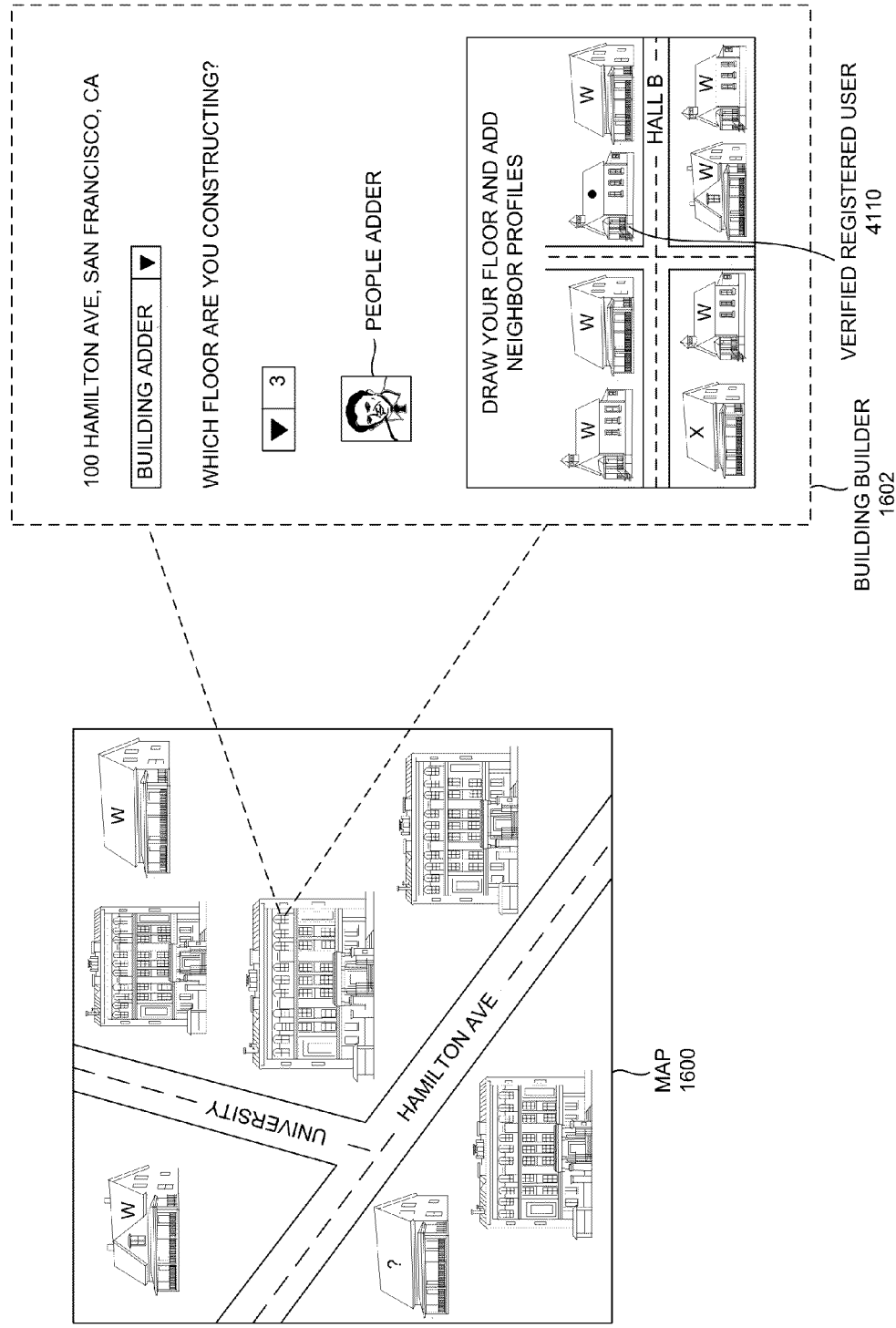
FIG. 16 is a user interface view of a building builder, according to one embodiment.

FIG. 16 is a user interface view of a building builder 1602, according to one embodiment. Particularly the FIG. 16 illustrates, a map 1600, a building builder 1602, according to one embodiment. The map 1600 may display the geographical location in which the verified registered user (e.g., the verified registered user 4110 of FIG. 41A-B) may create and/or modify empty claimable profiles (e.g., the claimable profile 4006 of FIG. 40B-41A (e.g., the editable profile 504 of FIG. 5), the claimable profile 4102 of FIG. 41A, the claimable profile 1704 of FIG. 17), building layouts, social network pages, and floor levels structures housing residents and businesses in the neighborhood (e.g., the neighborhood 2902A-N of FIG. 29). The building builder 1602 may enable the verified registered users (e.g., the verified registered user 4110 of FIG. 41A-B) of the global neighborhood environment 1800 (e.g., the privacy server 2900 of FIG. 29) to draw floor level structures, add neighbor's profiles and/or may also enable to select the floor number, claimable type, etc. as illustrated in example embodiment of FIG. 16.

The verified registered user 4110 may be verified registered user of the global neighborhood environment 1800 (e.g., the privacy server 2900 of FIG. 29) interested in creating and/or modifying claimable profiles (e.g., the claimable profile 4006 of FIG. 40B-41A, the claimable profile 4102 of FIG. 41A, the claimable profile 1704 of FIG. 17), building layouts, social network pages, and floor level structure housing residents and businesses in the neighborhood (e.g., the neighborhood 2902A-N of FIG. 29) in the building builder 1602.

Figure 29:
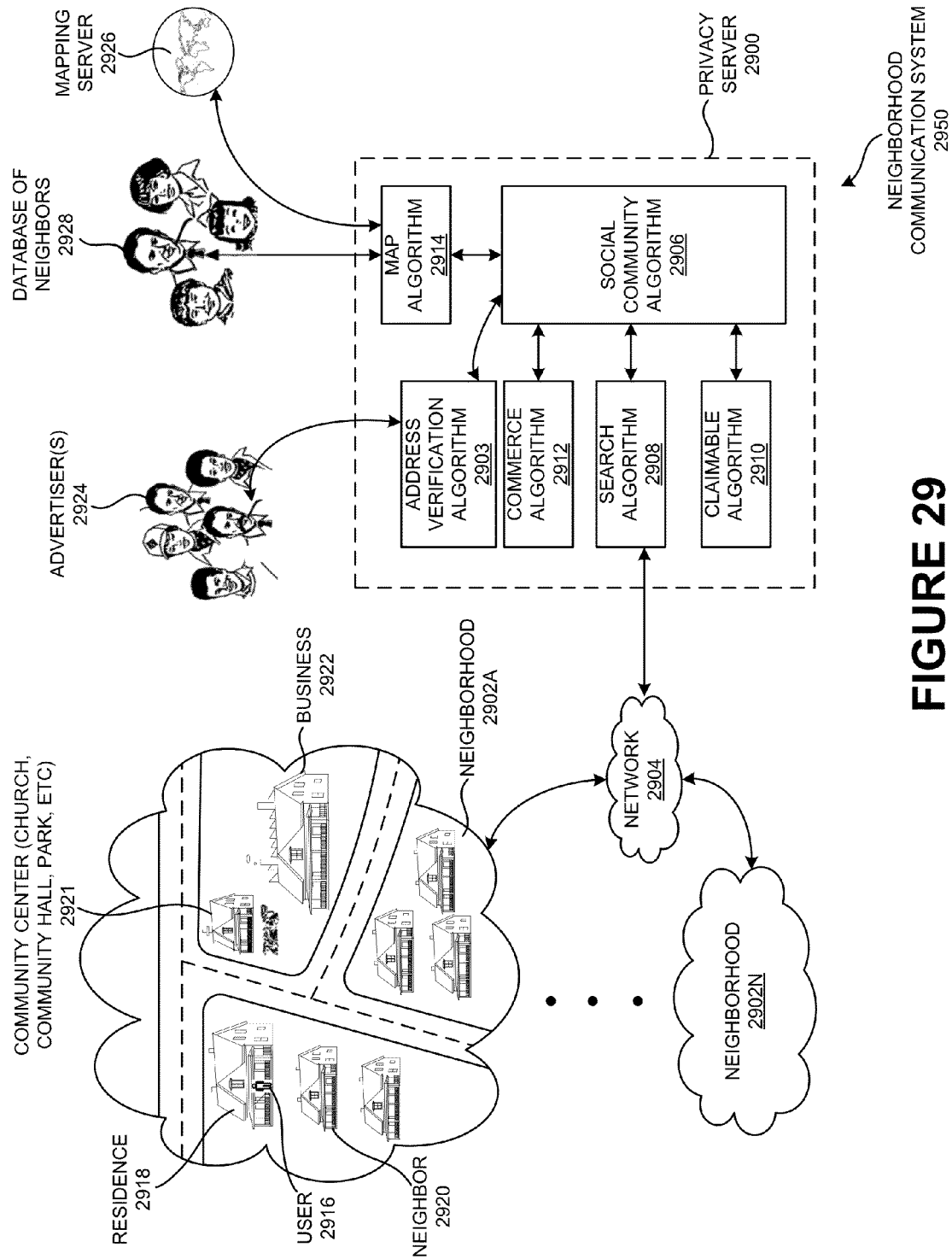
FIG. 29 is a system view of a global neighborhood environment 1800 communicating with the neighborhood(s) through a network, an advertiser(s), a global map data and an occupant data according to one embodiment.

For example, a social community algorithm (e.g., a social community algorithm 2906 of FIG. 29) of the global neighborhood environment 1800 (e.g., the privacy server 2900 of FIG. 29) may generate a building creator (e.g., the building builder 1602 of FIG. 16) in which the registered users may create and/or modify empty claimable profiles (e.g., the claimable profile 4006 of FIG. 40B-41A, the claimable profile 4102 of FIG. 41A, the claimable profile 1704 of FIG. 17), building layouts, social network pages, and floor levels structures housing residents and/or businesses in the neighborhood (e.g., the neighborhood 2902A-N of FIG. 29).

Figure 17:
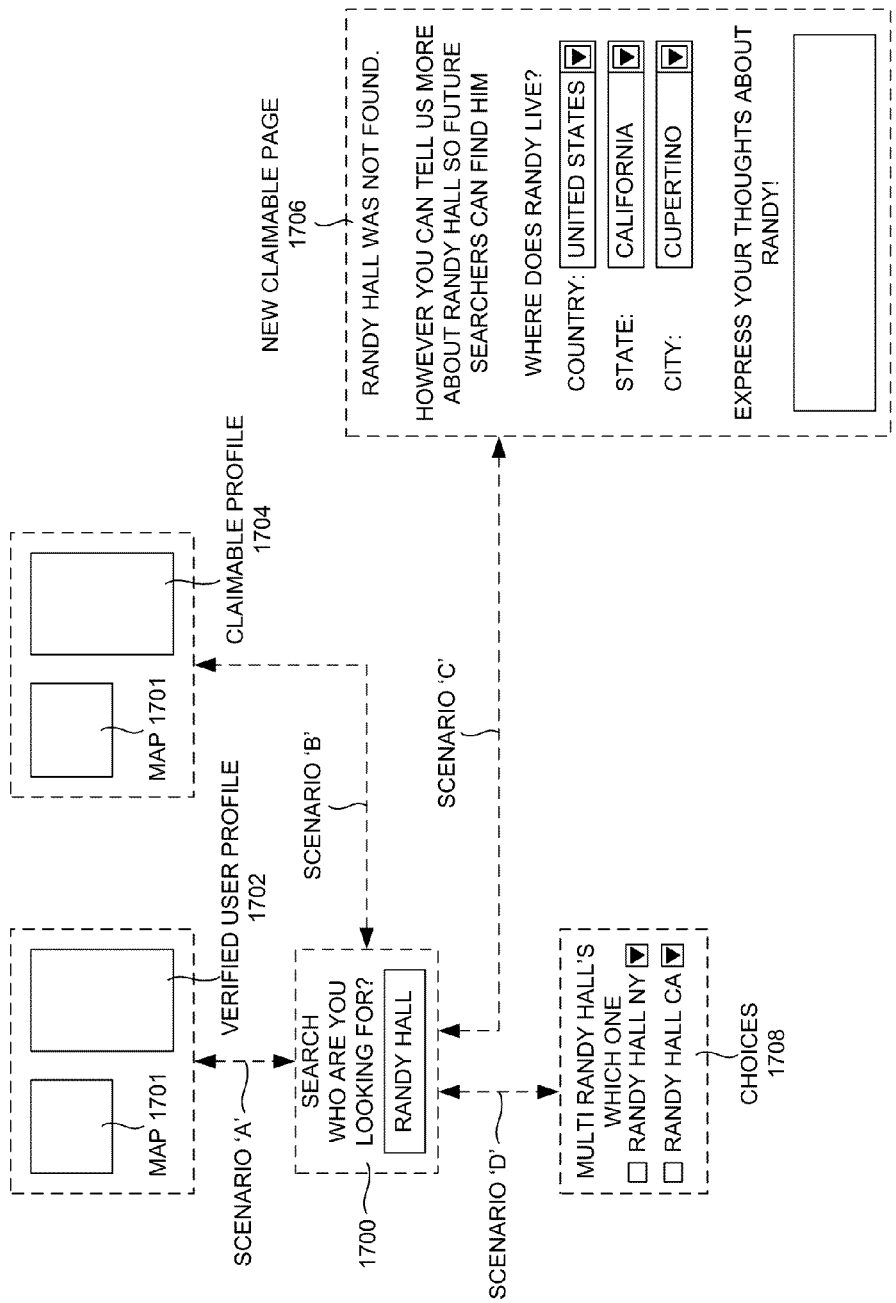
FIG. 17 is a systematic view of communication of claimable data, according to one embodiment.

FIG. 17 is a systematic view of communication of claimable data, according to one embodiment. Particularly FIG. 17 illustrates a map 1701, verified user profile 1702, choices 1708 and a new claimable page 1706, according to one embodiment. The map 1701 may locate the details of the address of the registered user of the global neighborhood environment 1800 (e.g., the privacy server 2900 of FIG. 29). The verified user profile 1702 may store the profiles of the verified user of the global neighborhood environment 1800 (e.g., the privacy server 2900 of FIG. 29. The claimable profile 1704 may be the profiles of the registered user who may claim them in the global neighborhood environment 1800 (e.g., the privacy server 2900 of FIG. 29).

In operation 1700 the search for the user profile (e.g., the user profile 29200 of FIG. 40A) is been carried whom the registered user may be searching. The new claimable page 1706 may solicit for the details of a user whom the registered user is searching for in the global neighborhood environment 1800 (e.g., the privacy server 2900 of FIG. 29). The choices 1708 may ask whether the requested search is any among the displayed names. The new claimable page 1706 may request for the details of location such as country, state and/or city. The operation 1700 may communicate with the choices 1708, and the new claimable page 1706.

For example, a no-match algorithm (e.g., a no-match algorithm 3112 of FIG. 31) of the search algorithm (e.g., the search algorithm 2908 of FIG. 29) to request additional information from the verified registered user about a person, place, and business having no listing in the global neighborhood environment 1800 (e.g., the privacy server 2900 of FIG. 29) when no matches are found in a search query of the verified registered user (e.g., the verified registered user 4110 of FIGS. 41A-B), and to create a new claimable page 1706 based on a response of the verified registered user 1702 about the at least one person, place, and business not previously indexed in the global neighborhood environment 1800 (e.g., the privacy server 2900 of FIG. 29).

Figure 18:
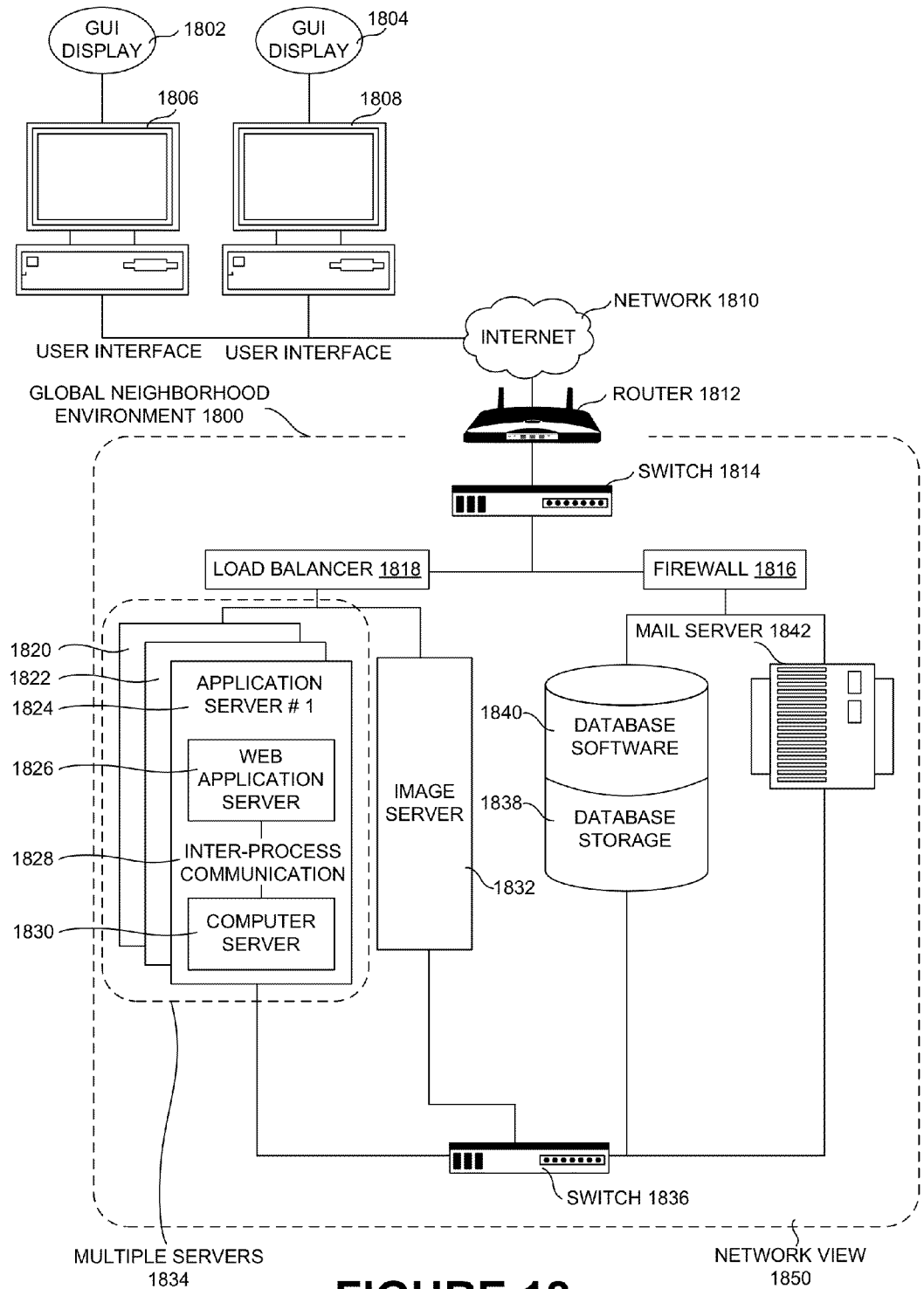
FIG. 18 is a systematic view of a network view, according to one embodiment.

FIG. 18 is a systematic view of a network view 1850, according to one embodiment. Particularly it may include a GUI display 1802, a GUI display 1804, device 1806, a device 1808, a network 1810, a router 1812, a switch 1814, a firewall 1816, a load balancer 1818, an application server #3 1820, an application server #2 1822, an application server #1 1824, a web application server 1826, an inter-process communication 1828, a computer server 1830, an image server 1832, a multiple servers 1834, a switch 1836, a database storage 1838, database software 1840 and a mail server 1842, according to one embodiment.

The GUI display 1802 and GUI display 1804 may display particular case of user interface for interacting with a device capable of representing data (e.g., computer, cellular telephones, television sets etc.) which employs graphical images and widgets in addition to text to represent the information and actions available to the user (e.g., the user 2916 of FIG. 29). The device 1806 and device 1808 may be any device capable of presenting data (e.g., computer, cellular telephones, television sets etc.). The network 1810 may be any collection of networks (e.g., internet, private networks, university social system, private network of a company etc.) that may transfer any data to the user (e.g., the user 2916 of FIG. 29) and the global neighborhood environment 1800 (e.g., the privacy server 2900 of FIG. 29).

The router 1812 may forward packets between networks and/or information packets between the global neighborhood environment 1800 (e.g., the privacy server 2900 of FIG. 29) and registered user over the network (e.g., internet). The switch 1814 may act as a gatekeeper to and from the network (e.g., internet) and the device. The firewall 1816 may provides protection (e.g., permit, deny or proxy data connections) from unauthorized access to the global neighborhood environment 1800 (e.g., the privacy server 2900 of FIG. 29. The load balancer 1818 may balance the traffic load across multiple mirrored servers in the global neighborhood environment 1800 (e.g., the privacy server 2900 of FIG. 29) and may be used to increase the capacity of a server farm beyond that of a single server and/or may allow the service to continue even in the face of server down time due to server failure and/or server maintenance.

The application server #2 1822 may be server computer on a computer network dedicated to running certain software applications of the global neighborhood environment 1800 (e.g., the privacy server 2900 of FIG. 29). The web application server 1826 may be server holding all the web pages associated with the global neighborhood environment 1800 (e.g., the privacy server 2900 of FIG. 29). The inter-process communication 1828 may be set of rules for organizing and un-organizing factors and results regarding the global neighborhood environment 1800 (e.g., the privacy server 2900 of FIG. 29). The computer server 1830 may serve as the application layer in the multiple servers of the global neighborhood environment 1800 (e.g., the privacy server 2900 of FIG. 29) and/or may include a central processing unit (CPU), a random access memory (RAM) temporary storage of information, and/or a read only memory (ROM) for permanent storage of information regarding the global neighborhood environment 1800 (e.g., the privacy server 2900 of FIG. 29).

The image server 1832 may store and provide digital images of the registered user of the global neighborhood environment 1800 (e.g., the privacy server 2900 of FIG. 29). The multiple servers 1834 may be multiple computers or devices on a network that may manage network resources connecting the registered user and the global neighborhood environment 1800 (e.g., the privacy server 2900 of FIG. 29). The database storage 1838 may store software, descriptive data, digital images, system data and any other data item that may be related to the user (e.g., the user 2916 of FIG. 29) of the global neighborhood environment 1800 (e.g., the privacy server 2900 of FIG. 29). The database software 1840 may be provided a database management system that may support the global neighborhood environment 1800 (e.g., the neighborhood environment 2900 of FIG. 29. The mail server 1842 may be provided for sending, receiving and storing mails. The device 1806 and 1808 may communicate with the GUI display(s) 1802 and 1804, the router 1812 through the network 1810 and the global neighborhood environment 1800 (e.g., the privacy server 2900 of FIG. 29).

Figure 19:
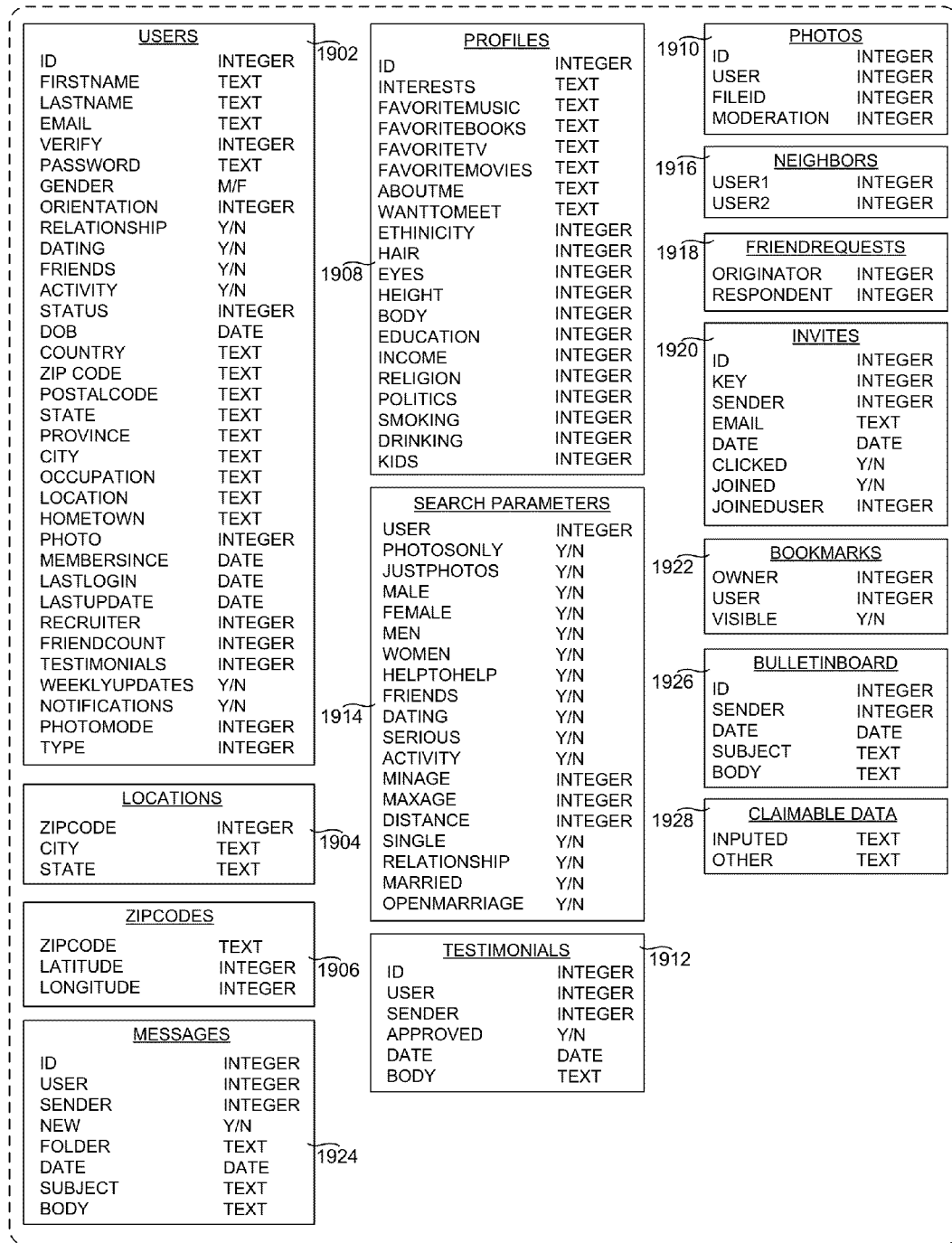
FIG. 19 is a block diagram of a database, according to one embodiment.

FIG. 19 is a block diagram of a database, according to one embodiment. Particularly the block diagram of the database 1900 of FIG. 19 illustrates a user data 1902, a location data, a zip codes data 1906, a profiles data 1908, a photos data 1910, a testimonials data 1912, a search parameters data 1914, a neighbor data 1916, a friends requests data 1918, a invites data 1920, a bookmarks data 1922, a messages data 1924 and a bulletin board data 1926, according to one embodiment.

The database 1900 be may include descriptive data, preference data, relationship data, and/or other data items regarding the registered user of the global neighborhood environment 1800 (e.g., the privacy server 2900 of FIG. 29.

The user data 1902 may be a descriptive data referring to information that may describe a user (e.g., the user 2916 of FIG. 29). It may include elements in a certain format for example Id may be formatted as integer, Firstname may be in text, Lastname may be in text, Email may be in text, Verify may be in integer, Password may be in text, Gender may be in m/f, Orientation may be in integer, Relationship may be in y/n, Dating may be in y/n, Friends may be in y/n, Activity may be in y/n, Status may be in integer, Dob may be in date, Country may be in text, Zip code may be in text, Postalcode may be in text, State may be in text, Province may be in text, City may be in text, Occupation may be in text, Location may be in text, Hometown may be in text, Photo may be in integer, Membersince may be in date, Lastlogin may be in date, Lastupdate may be in date, Recruiter may be in integer, Friendcount may be in integer, Testimonials may be in integer, Weeklypdates may be in y/n, Notifications may be in y/n, Photomode may be in integer and/or Type may be in integer.

The locations data 1904 may clarify the location details in formatted approach. For example Zip code may be formatted as integer, City may be in text and/or State may be in text. The zip codes data 1906 may provide information of a user location in formatted manner. For example Zip code may be formatted as text, Latitude may be in integer and/or Longitude may be in integer. The profile data 1908 may clutch personnel descriptive data that may be formatted.

For examples ID may be formatted as integer, Interests may be in text, Favoritemusic may be in text, Favaoritebooks may be in text, Favoritetv may be in text, Favoritemovies may be in text, Aboutme may be in text, Wanttommet may be in text, Ethnicity may be in integer, Hair may be in integer, Eyes may be in integer, Height may be in integer, Body may be in integer, Education may be in integer, Income may be in integer, Religion may be in integer, Politics may be in integer Smoking may be in integer, Drinking may be in integer and/or Kids may be in integer.

The photos data 1910 may represent a digital image and/or a photograph of the user formatted in certain approach. For example Id may be formatted as integer, User may be in integer, Fileid may be in integer and/or Moderation may be in integer. The testimonials data 1912 may allow users to write "testimonials" 1912, or comments, about each other and in these testimonials, users may describe their relationship to an individual and their comments about that individual. For example the user might write a testimonial that states "Rohan has been a friend of mine since graduation days. He is smart, intelligent, and a talented person." The elements of testimonials data 1912 may be formatted as Id may be in integer, User may be in integer, Sender may be integer, Approved may be in y/n, Date may be in date and/or Body may be formatted in text.

The search parameters data 1914 may be preference data referring to the data that may describe preferences one user has with respect to another (For example, the user may indicate that he is looking for a female who is seeking a male for a serious relationship). The elements of the search parameters data 1914 may be formatted as User 1902 may be in integer, Photosonly may be in y/n, Justphotos may be in y/n, Male may be in y/n, Female may be in y/n, Men may be in y/n, Women may be in y/n, Helptohelp may be in y/n, Friends may be in y/n, Dating may be in y/n, Serious may be in y/n, Activity may be in y/n, Minage may be in integer, Maxage may be in integer, Distance may be in integer, Single may be in y/n, Relationship may be in y/n, Married may be in y/n and/or Openmarriage may be in y/n.

The neighbor's data 1916 may generally refer to relationships among registered users of the global neighborhood environment 1800 (e.g., the privacy server 2900 of FIG. 29) that have been verified and the user has requested another individual to join the system as neighbor 1916, and the request may be accepted. The elements of the neighbors data 1916 may be formatted as user1 may be in integer and/or user2 may be in integer. The friend requests data 1918 may tracks requests by users within the neighborhood (e.g., the neighborhood 2902A-N of FIG. 29) to other individuals, which requests have not yet been accepted and may contain elements originator and/or respondent formatted in integer. The invites data 1920 may describe the status of a request by the user to invite an individual outside the neighborhood (e.g., the neighborhood 2902A-N of FIG. 29) to join the neighborhood (e.g., the neighborhood 2902A-N of FIG. 29) and clarify either the request has been accepted, ignored and/or pending.

The elements of the invites data 1920 may be formatted as Id may be in integer, Key may be in integer, Sender may be in integer, Email may be in text, Date may be in date format, Clicked may be in y/n, Joined may be in y/n and/or Joineduser may be in integer. The bookmarks data 1922 may be provide the data for a process allowed wherein a registered user of the global neighborhood environment 1800 (e.g., the privacy server 2900 of FIG. 29) may indicate an interest in the profile of another registered user. The bookmark data 1922 elements may be formatted as Owner may be in integer, User may be in integer and/or Visible may be in y/n. The message data 1924 may allow the users to send one another private messages.

The message data 1924 may be formatted as Id may be in integer, User may be in integer, Sender may be in integer, New may be in y/n, Folder may be in text, Date may be in date format, Subject may be in text and/or Body may be in text format. The bulletin board data 1926 may supports the function of a bulletin board that users may use to conduct online discussions, conversation and/or debate. The claimable data 1928 may share the user profiles (e.g., the user profile 29200 of FIG. 40A) in the neighborhood (e.g., the neighborhood 2902A-N of FIG. 29) and its elements may be formatted as claimablesinputed and/or others may be in text format.

Figure 20:
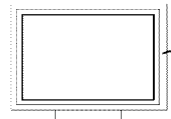
FIG. 20 is an exemplary graphical user interface view for data collection, according to one embodiment.

FIG. 20 is an exemplary graphical user interface view for data collection, according to one embodiment. Particularly FIG. 20 illustrates exemplary screens 2002, 2004 that may be provided to the user (e.g., the user 2916 of FIG. 29) through a user interface 1802 may be through the network (e.g., Internet), to obtain user descriptive data. The screen 2002 may collect data allowing the user (e.g., the user 2916 of FIG. 29) to login securely and be identified by the neighborhood (e.g., the neighborhood 2902A-N of FIG. 29). This screen 2002 may allow the user to identify the reason he/she is joining the neighborhood. For example, a user may be joining the neighborhood for "neighborhood watch". The screen 2004 may show example of how further groups may be joined. For example, the user (e.g., the user 2916 of FIG. 29) may be willing to join a group "Scrapbook Club". It may also enclose the data concerning Dob, country, zip/postal code, hometown, occupation and/or interest.

Figure 21:
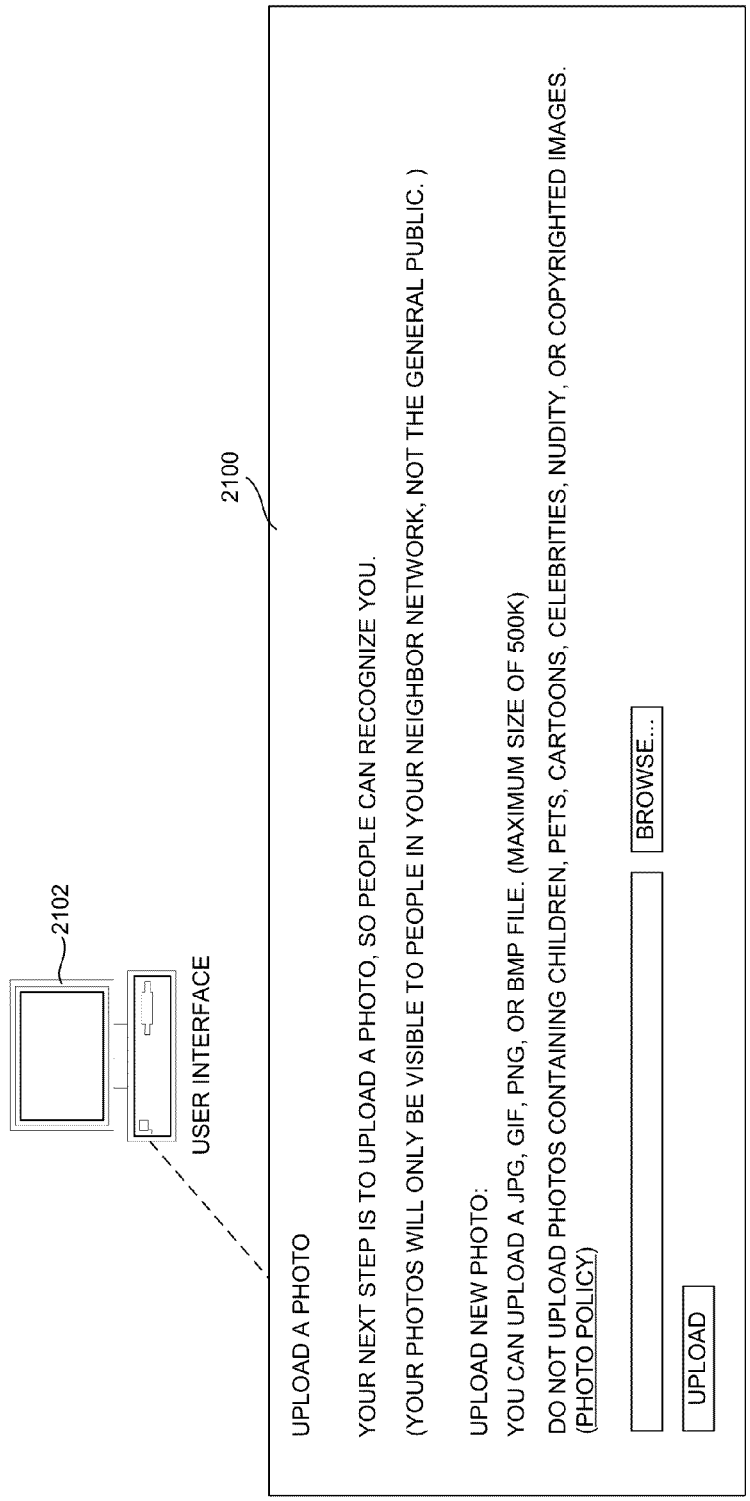
FIG. 21 is an exemplary graphical user interface view of image collection, according to one embodiment.

FIG. 21 is an exemplary graphical user interface view of image collection, according to one embodiment. A screen 2100 may be interface provided to the user (e.g., the user 2916 of FIG. 29) over the network (e.g., internet) may be to obtain digital images from system user. The interface 2102 may allow the user (e.g., the user 2916 of FIG. 29) to browse files on his/her computer, select them, and then upload them to the neighborhood (e.g., the neighborhood 2902A-N of FIG. 29). The user (e.g., the user 2916 of FIG. 29) may upload the digital images and/or photo that may be visible to people in the neighbor (e.g., the neighbor 2920 of FIG. 29) network and not the general public. The user may be able to upload a JPG, GIF, PNG and/or BMP file in the screen 2100.

Figure 22:
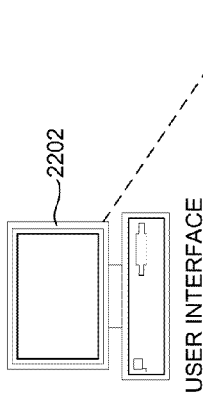
FIG. 22 is an exemplary graphical user interface view of an invitation, according to one embodiment.

FIG. 22 is an exemplary graphical user interface view of an invitation, according to one embodiment. An exemplary screen 2200 may be provided to a user through a user interface 2202 may be over the network (e.g., internet) to allow users to invite neighbor or acquaintances to join the neighborhood (e.g., the neighborhood 2902A-N of FIG. 29). The user interface 2202 may allow the user (e.g., the user 2916 of FIG. 29) to enter one or a plurality of e-mail addresses for friends they may like to invite to the neighborhood (e.g., the neighborhood 2902A-N of FIG. 29). The exemplary screen 2200 may include the "subject", "From", "To", "Optional personnel message", and/or "Message body" sections. In the "Subject" section a standard language text may be included for joining the neighborhood (e.g., Invitation to join Fatdoor from John Doe, a neighborhood.).

The "From" section may include the senders email id (e.g., user@domain.com). The "To" section may be provided to add the email id of the person to whom the sender may want to join the neighborhood (e.g., the neighborhood 2902A-N of FIG. 29). The message that may be sent to the friends and/or acquaintances may include standard language describing the present neighborhood, the benefits of joining and the steps required to join the neighborhood (e.g., the neighborhood 2902A-N of FIG. 29). The user (e.g., the user 2916 of FIG. 29) may choose to include a personal message, along with the standard invitation in the "Optional personal message" section. In the "Message body" section the invited friend or acquaintance may initiate the process to join the system by clicking directly on an HTML link included in the e-mail message (e.g., http://www.fatdoor.com/joinjsp?Invite=140807). In one embodiment, the user (e.g., the user 2916 of FIG. 29) may import e-mail addresses from a standard computerized address book. The system may further notify the inviting user when her invitee accepts or declines the invitation to join the neighborhood (e.g., the neighborhood 2902A-N of FIG. 29).

Figure 23:
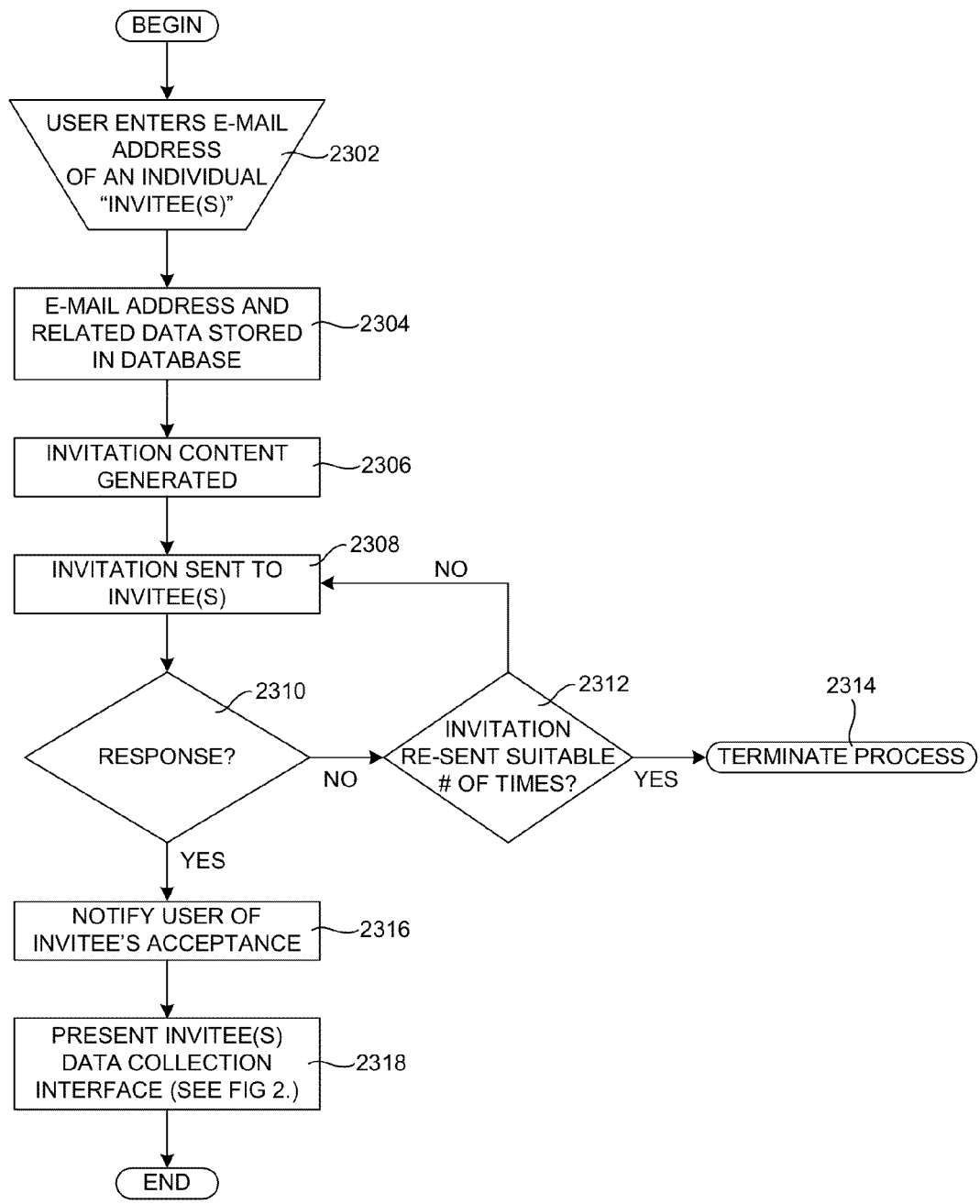
FIG. 23 is a flowchart of inviting the invitee(s) by the registered user, notifying the registered user upon the acceptance of the invitation by the invitee(s) and, processing and storing the input data associated with the user in the database, according to one embodiment.

FIG. 23 is a flowchart of inviting the invitee(s) by the registered user, notifying the registered user upon the acceptance of the invitation by the invitee(s) and, processing and storing the input data associated with the user (e.g., the user 2916 of FIG. 29) in the database, according to one embodiment. In operation 2302, the verified registered user (e.g., the verified registered user 4110 of FIG. 41A-B, the verified registered user 4110 of FIG. 16) willing to invite the individual enters the email addresses of an individual "invitee". In operation 2304, the email address and the related data of the invitee may be stored in the database. In operation 2306, the invitation content for inviting the invitee may be generated from the data stored in the database. In operation 2308, the registered user sends invitation to the invitee(s).

In operation 2310, response from the user (e.g., the user 2916 of FIG. 29) may be determined. The operation 2312, if the invitee doesn't respond to invitation sent by the registered user then registered user may resend the invitation for a predefined number of times. In operation 2314, if the registered user resends the invitation to the same invitee for predefined number of times and if the invitee still doesn't respond to the invitation the process may be terminated automatically.

In operation 2316, if the invitee accepts the invitation sent by the registered user then system may notify the registered user that the invitee has accepted the invitation. In operation 2318, the input from the present invitee(s) that may contain the descriptive data about the friend (e.g., registered user) may be processed and stored in the database.

For example, each registered user associated e-mail addresses of individuals who are not registered users may be stored and identified by each registered user as neighbors. An invitation to become a new user (e.g., the user 2916 of FIG. 29) may be communicated out to neighbor (e.g., the neighbors neighbor of FIG. 29) of the particular user. An acceptance of the neighbor (e.g., the neighbor 2920 of FIG. 29) to whom the invitation was sent may be processed.

Figure 41A:
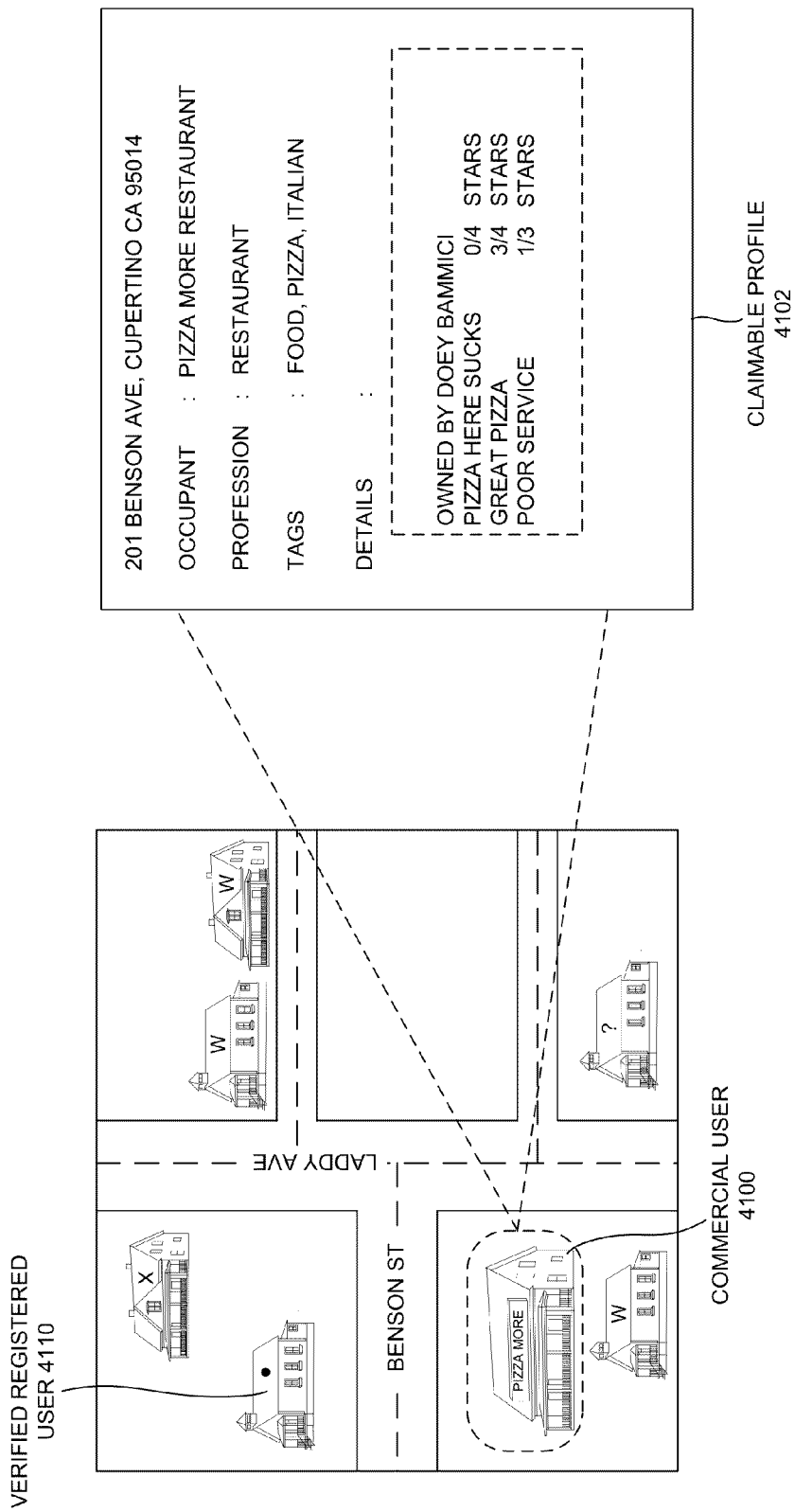
FIG. 41A is a user interface view of mapping of a claimable profile of the commercial user, according to one embodiment.
Figure 41B:
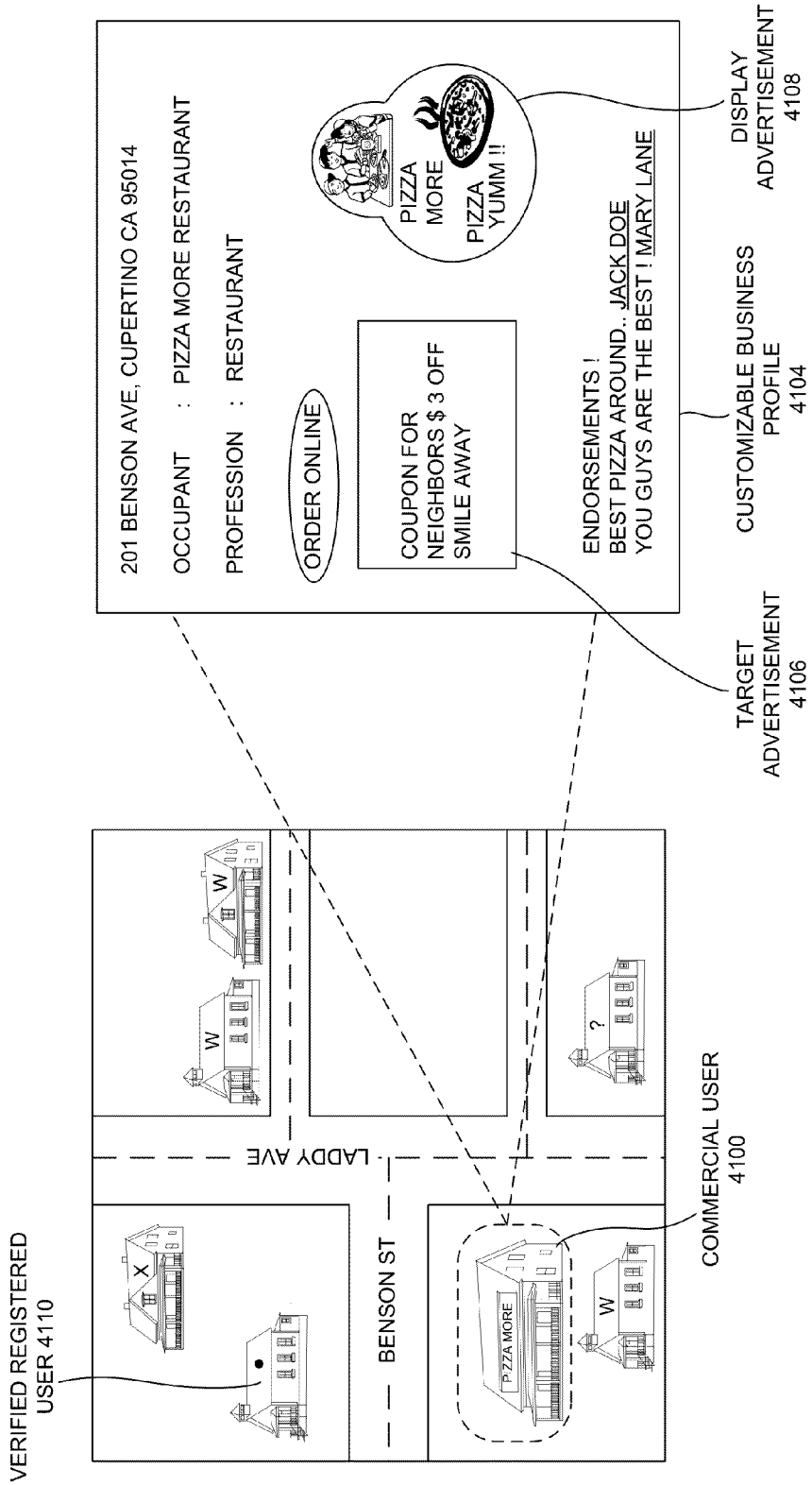
FIG. 41B is a user interface view of mapping of customizable business profile of the commercial user, according to one embodiment.

The neighbor (e.g., the neighbor 2920 of FIG. 29) may be added to a database and/or storing of the neighbor (e.g., the neighbor 2920 of FIG. 29), a user ID and a set of user IDs of registered users who are directly connected to the neighbor (e.g., the neighbor 2920 of FIG. 29), the set of user IDs stored of the neighbor (e.g., the neighbor 2920 of FIG. 29) including at least the user ID of the verified registered user (e.g., the verified registered user 4110 of FIG. 41A-B, the verified registered user 4110 of FIG. 16). Furthermore, the verified registered user may be notified that the invitation to the neighbor (e.g., the neighbor 2920 of FIG. 29) has been accepted when an acceptance is processed. Also, inputs from the neighbor (e.g., the neighbor 2920 of FIG. 29) having descriptive data about the friend may be processed and the inputs in the database may be stored.

Figure 24:
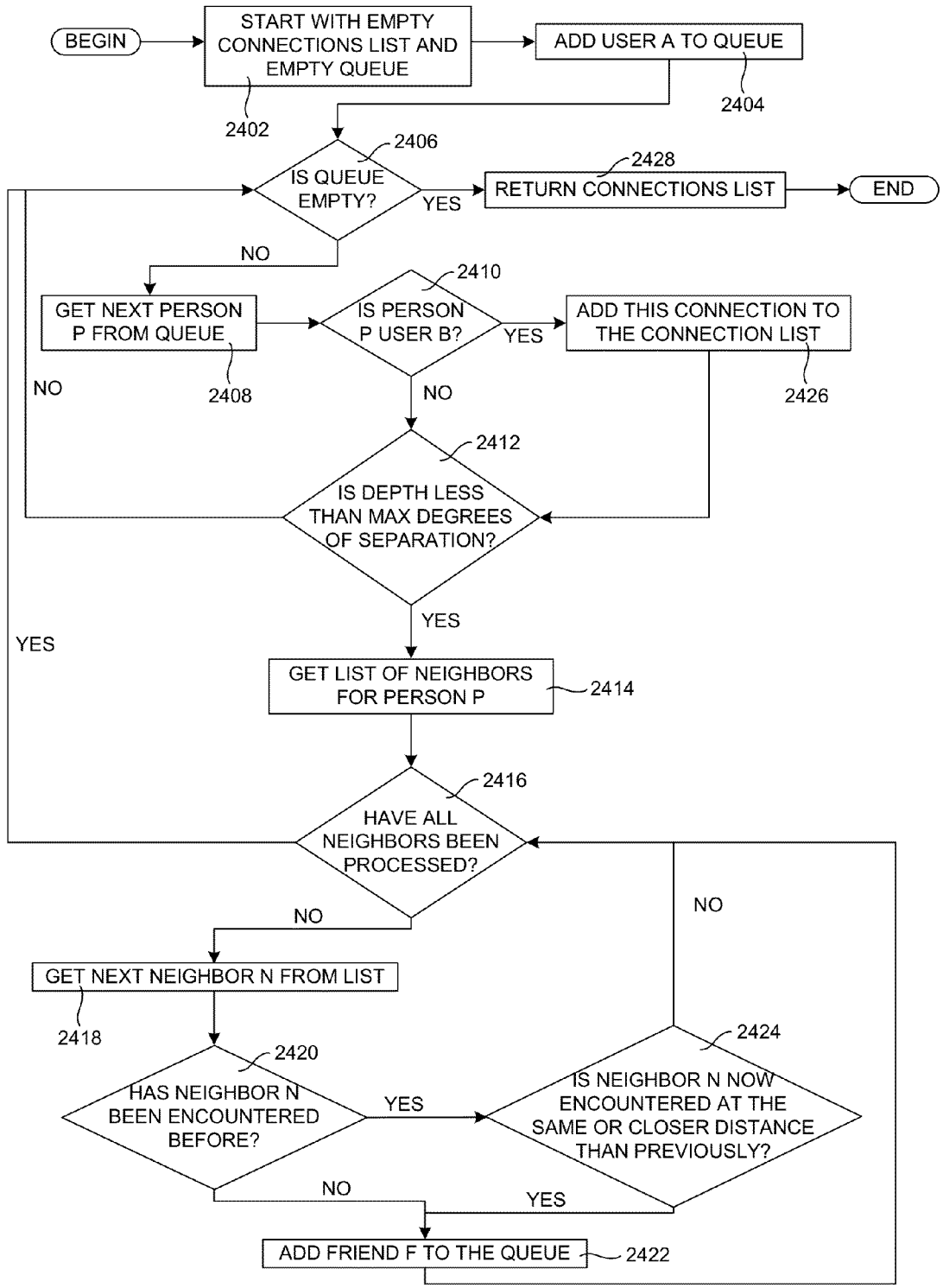
FIG. 24 is a flowchart of adding the neighbor to the queue, according to one embodiment.

FIG. 24 is a flowchart of adding the neighbor (e.g., the neighbor 2920 of FIG. 29) to the queue, according to one embodiment. In operation 2402, the system may start with the empty connection list and empty queue. In operation 2404, the user may be added to the queue. In operation 2406, it is determined whether the queue is empty. In operation 2408, if it is determined that the queue is not empty then the next person P may be taken from the queue. In operation 2410, it may be determined whether the person P from the queue is user B or not. In operation 2412, if the person P is not user B then it may be determined whether the depth of the geographical location is less than maximum degrees of separation.

If it is determined that depth is more than maximum allowable degrees of separation then it may repeat the operation 2406. In operation 2414, if may be determined that the depth of the geographical location (e.g., the geographical location 4004 of FIG. 40A) is less than maximum degrees of separation then the neighbors (e.g., the neighbor 2920 of FIG. 29) list for person P may be processed. In operation 2416, it may be determined whether all the neighbors (e.g., the neighbor 2920 of FIG. 29) in the neighborhood (e.g., the neighborhood 2902A-N of FIG. 29) have been processed or not. If all the friends are processed it may be determined the queue is empty.

In operation 2418, if all the neighbors (e.g., the neighbor 2920 of FIG. 29) for person P are not processed then next neighbor N may be taken from the list. In operation 2420, it may be determined whether the neighbor (e.g., the neighbor 2920 of FIG. 29) N has encountered before or not. In operation 2422, if the neighbor (e.g., the neighbor 2920 of FIG. 29) has not been encountered before then the neighbor may be added to the queue. In operation 2424, if the neighbor N has been encountered before it may be further determined whether the geographical location (e.g., the geographical location 4004 of FIG. 40A) from where the neighbor (e.g., the neighbor 2920 of FIG. 29) has encountered previously is the same place or closer to that place.

If it is determined that the neighbor (e.g., the neighbor 2920 of FIG. 29) has encountered at the same or closer place then the friend may be added to the queue. If it may be determined that friend is not encountered at the same place or closer to that place then it may be again checked that all the friends have processed. In operation 2426, if it is determined that the person P is user B than the connection may be added to the connection list and after adding the connection to connection list it follows the operation 2412. In operation 2428, if it may be determined that queue is empty then the operation may return the connections list.

For example, a first user ID with the verified registered user (e.g., the verified registered user 4110 of FIG. 41A-B, the verified registered user 4110 of FIG. 16) and a second user ID may be applied to the different registered user. The verified registered user (e.g., the verified registered user 4110 of FIG. 41A-B, the verified registered user 4110 of FIG. 16) with the different registered user may be connected with each other through at least one of a geo-positioning data associated with the first user ID and the second user ID. In addition, a maximum degree of separation (Nmax) of at least two that is allowed for connecting any two registered users, (e.g., the two registered users who may be directly connected may be deemed to be separated by one degree of separation and two registered users who may be connected through no less than one other registered user may be deemed to be separated by two degrees of separation and two registered users who may be connected through not less than N other registered users may be deemed to be separated by N+1 degrees of separation).

Furthermore, the user ID of the different registered user may be searched (e.g., the method limits the searching of the different registered user in the sets of user IDs that may be stored as registered users who are less than Nmax degrees of separation away from the verified registered user (e.g., the verified registered user 4110 of FIG. 41A-B, the verified registered user 4110 of FIG. 16), such that the verified registered user (e.g., the verified registered user 4110 of FIG.

41A-B, the verified registered user 4110 of FIG. 16) and the different registered user who may be separated by more than Nmax degrees of separation are not found and connected.) in a set of user IDs that may be stored of registered users who are less than Nmax degrees of separation away from the verified registered user (e.g., the verified registered user 4110 of FIG. 41A-B, the verified registered user 4110 of FIG. 16), and not in the sets of user IDs that may be stored for registered users who are greater than or equal to Nmax degrees of separation away from the verified registered user (e.g., the verified registered user 4110 of FIG. 41A-B, the verified registered user 4110 of FIG. 16), until the user ID of the different registered user may be found in one of the searched sets. Also, the verified registered user (e.g., the verified registered user 4110 of FIG. 41A-B, the verified registered user 4110 of FIG. 16) may be connected to the different registered user if the user ID of the different registered user may be found in one of the searched sets.

Moreover, the sets of user IDs that may be stored of registered users may be searched initially who are directly connected to the verified registered user (e.g., the verified registered user 4110 of FIG. 41A-B, the verified registered user 4110 of FIG. 16). A profile of the different registered user may be communicated to the verified registered user (e.g., the verified registered user 4110 of FIG. 41A-B, the verified registered user 4110 of FIG. 16) to display through a marker associating the verified registered user (e.g., the verified registered user 4110 of FIG. 41A-B, the verified registered user 4110 of FIG. 16) with the different registered user. A connection path between the verified registered user (e.g., the verified registered user 4110 of FIG. 41A-B, the verified registered user 4110 of FIG. 16) and the different registered user, the connection path indicating at least one other registered user may be stored through whom the connection path between the verified registered user (e.g., the verified registered user 4110 of FIG. 41A-B, the verified registered user 4110 of FIG. 16) and the different registered user is made.

In addition, the connection path between the verified registered user (e.g., the verified registered user 4110 of FIG. 41A-B, the verified registered user 4110 of FIG. 16) and the different registered user may be communicated to the verified registered user to display. A hyperlink in the connection path of each of the at least one registered users may be embedded through whom the connection path between the verified registered user (e.g., the verified registered user 4110 of FIG. 41A-B, the verified registered user 4110 of FIG. 16) and the different registered user is made.

Figure 25:
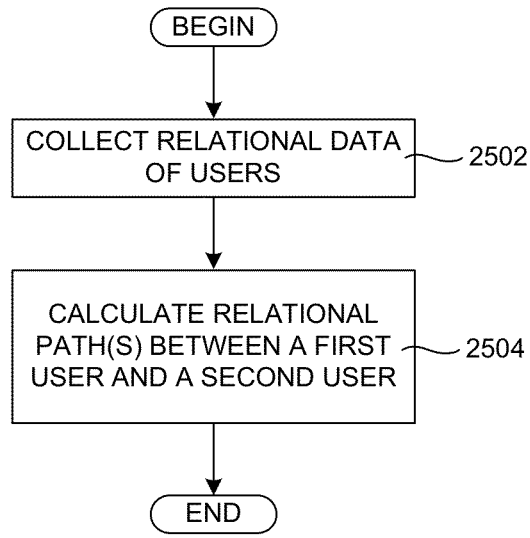
FIG. 25 is a flowchart of communicating brief profiles of the registered users, processing a hyperlink selection from the verified registered user and calculating and ensuring the Nmax degree of separation of the registered users away from verified registered users, according to one embodiment.

FIG. 25 is a flowchart of communicating brief profiles of the registered users, processing a hyperlink selection from the verified registered user (e.g., the verified registered user 4110 of FIG. 41A-B, the verified registered user 4110 of FIG. 16) and calculating and ensuring the Nmax degree of separation of the registered users away from verified registered users (e.g., the verified registered user 4110 of FIG. 41A-B, the verified registered user 4110 of FIG. 16), according to one embodiment. In operation 2502, the data of the registered users may be collected from the database. In operation 2504, the relational path between the first user and the second user may be calculated (e.g., the Nmax degree of separation between verified registered user (e.g., the verified registered user 4110 of FIG. 41A-B, the verified registered user 4110 of FIG. 16) and the registered user).

For example, the brief profiles of registered users, including a brief profile of the different registered user, to the verified registered user (e.g., the verified registered user 4110 of FIG. 41A-B, the verified registered user 4110 of FIG. 16) for display, each of the brief profiles including a hyperlink to a corresponding full profile may be communicated.

Furthermore, the hyperlink selection from the verified registered user (e.g., the verified registered user 4110 of FIG. 41A-B, the verified registered user 4110 of FIG. 16) may be processed (e.g., upon processing the hyperlink selection of the full profile of the different registered user, the full profile of the different registered user may be communicated to the verified registered user (e.g., the verified registered user 4110 of FIG. 41A-B, the verified registered user 4110 of FIG. 16) for display). In addition, the brief profiles of those registered users may be ensured who are more than Nmax degrees of separation away from the verified registered user (e.g., the verified registered user 4110 of FIG. 41A-B, the verified registered user 4110 of FIG. 16) are not communicated to the verified registered user (e.g., the verified registered user 4110 of FIG. 41A-B, the verified registered user 4110 of FIG. 16) for display.

Figure 26:
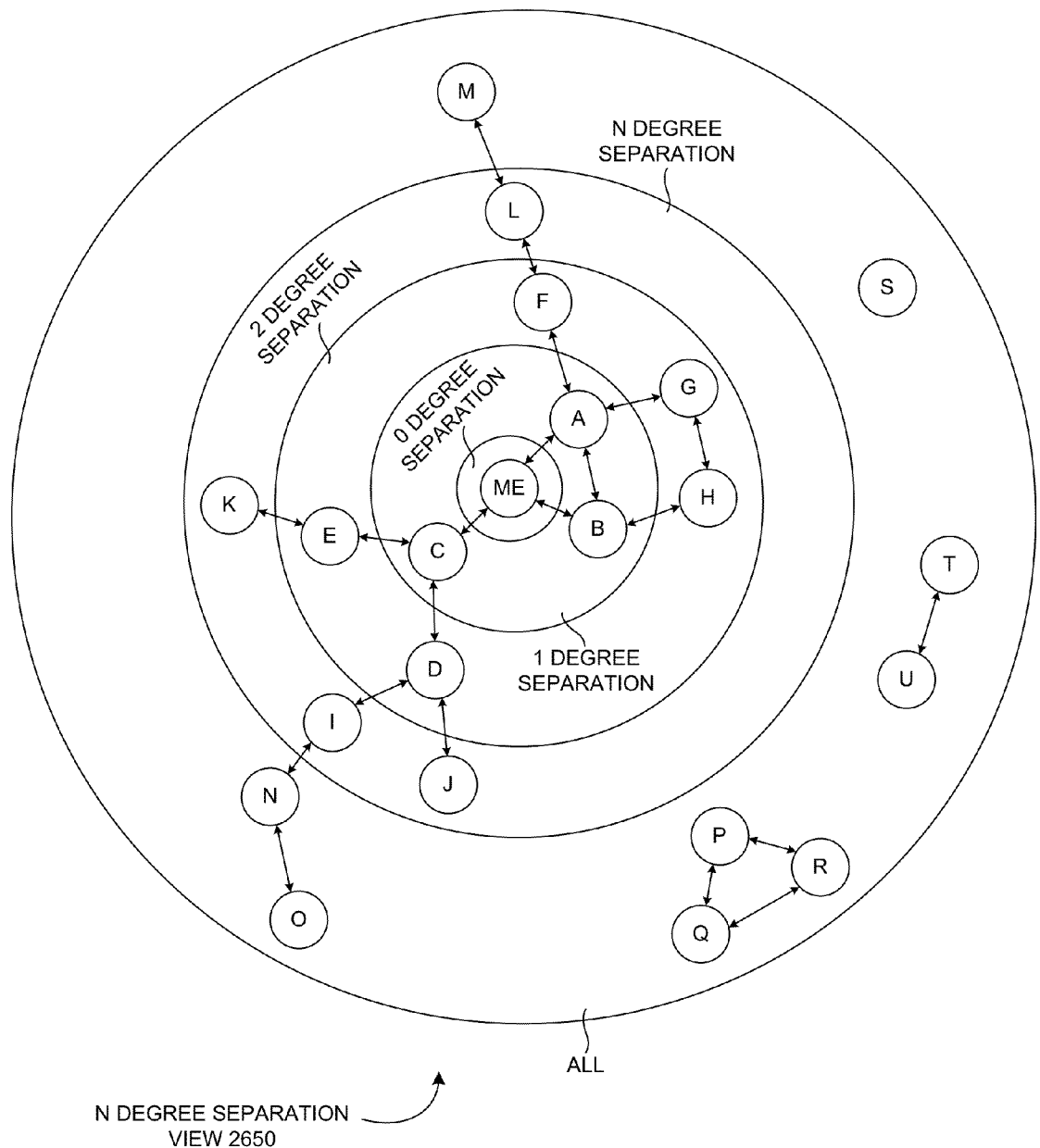
FIG. 26 is an N degree separation view, according to one embodiment.

FIG. 26 is an N degree separation view 2650, according to one embodiment. ME may be a verified registered user (e.g., the verified registered user 4110 of FIG. 41A-B, the verified registered user 4110 of FIG. 16) of the global neighborhood environment 1800 (e.g., the privacy server 2900 of FIG. 29) centered in the neighborhood network. A, B, C, D, E, F, G, H, I, J, K, L, M, N, O, P, Q, R, S, T, and/or U may be the other registered user of the neighborhood network. The member of the neighborhood network may be separated from the centered verified registered user (e.g., the verified registered user 4110 of FIG. 41A-B, the verified registered user 4110 of FIG. 16) ME of the neighborhood network by certain degree of separation. The registered user A, B and C may be directly connected and are deemed to be separated by one degree of separation from verified registered user (e.g., the verified registered user 4110 of FIG. 41A-B, the verified registered user 4110 of FIG. 16) ME. The registered user D, E, F, G, and H may be connected through no less than one other registered user may be deemed to be separated by two degree of separation from verified registered user (e.g., the verified registered user 4110 of FIG. 41A-B, the verified registered user 4110 of FIG. 16) ME. The registered user I, J, K, and L may be connected through no less than N−1 other registered user may be deemed to be separated by N degree of separation from verified registered user (e.g., the verified registered user 4110 of FIG. 41A-B, the verified registered user 4110 of FIG. 16) ME. The registered user M, N, O, P, Q, R S, T and U may be all registered user.

Figure 27:
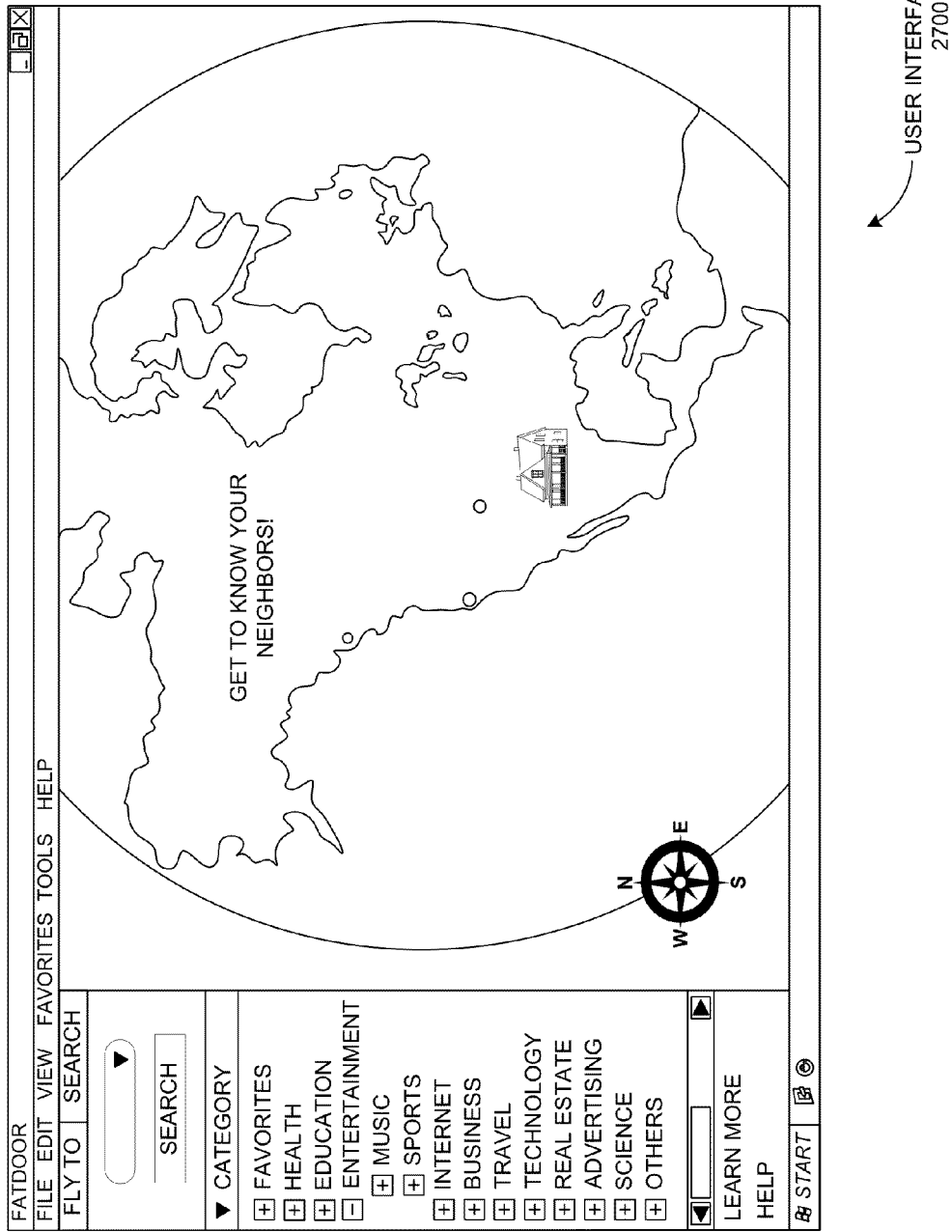
FIG. 27 is a user interface view showing a map, according to one embodiment.

FIG. 27 is a user interface view 2700 showing a map, according to one embodiment. Particularly FIG. 27 illustrates a satellite photo of a physical world. The registered user of the global neighborhood environment 1800 (e.g., the privacy server 2900 of FIG. 29) may use this for exploring the geographical location (e.g., the geographical location 4004 of FIG. 40A) of the neighbors (e.g., the neighbor 2920 of FIG. 29). The registered user (e.g., the verified registered user 4110 of FIG. 41A-B, the verified registered user 4110 of FIG. 16) may navigate, zoom, explore and quickly find particular desired geographical locations of the desired neighbors (e.g., the neighbor 2920 of FIG. 29). This may help the registered user to read the map and/or plot the route of the neighbors (e.g., the neighbor 2920 of FIG. 29) on the world map.

Figure 28A:
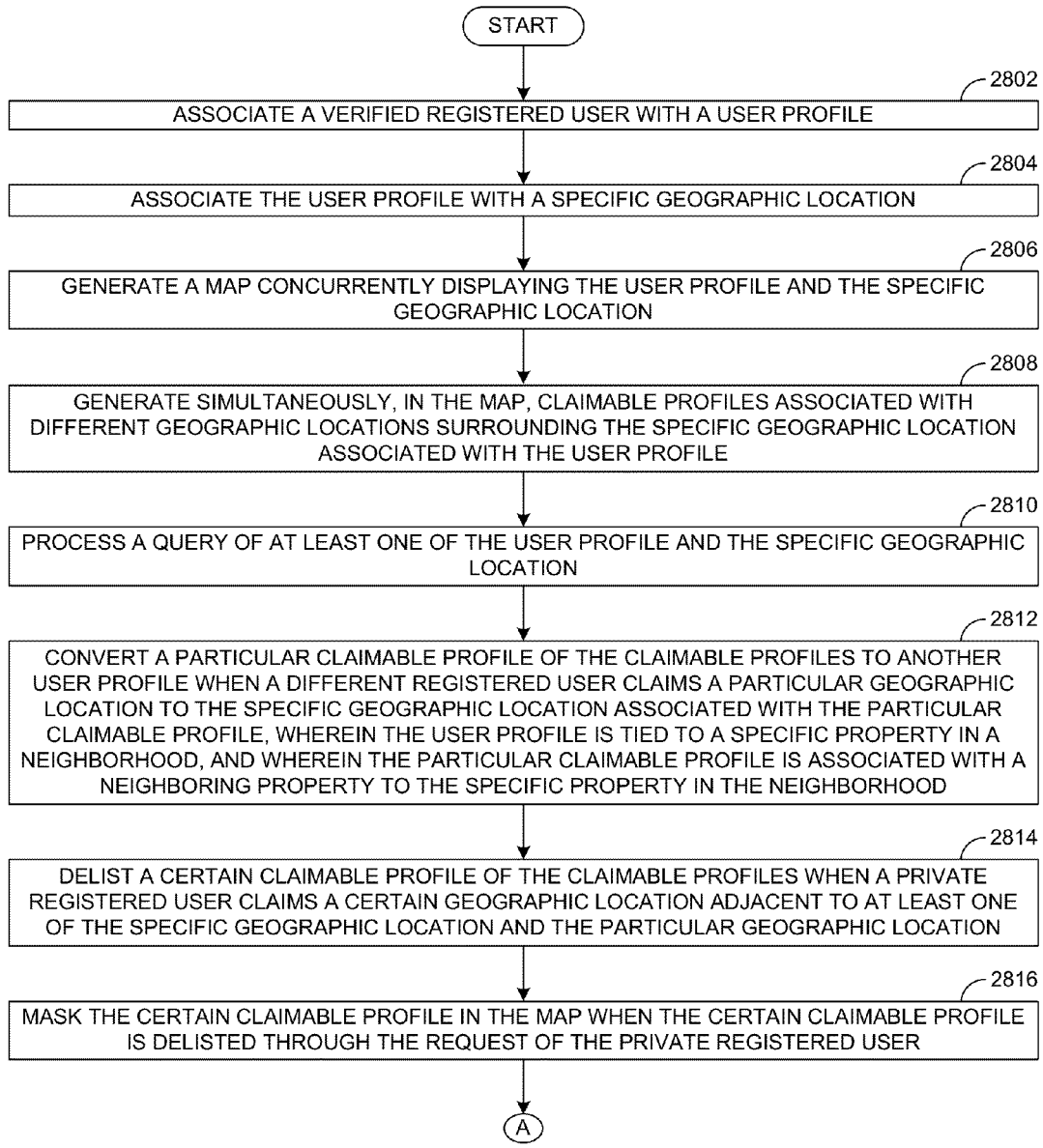
FIG. 28A is a process flow chart of searching a map based community and neighborhood contribution, according to one embodiment.

FIG. 28A is a process flow of searching map based community and neighborhood contribution, according to one embodiment. In operation 2802, a verified registered user (e.g., a verified registered user 4110 of FIG. 41A-13B, a verified registered user 4110 of FIG. 16) may be associated with a user profile (e.g., a user profile 29200 of FIG. 40A). In operation 2804, the user profile (e.g., the user profile 29200 of FIG. 40A) may be associated with a verified geographic location (e.g., a geographic location 4004 of FIG. 40A).

Figure 40A:
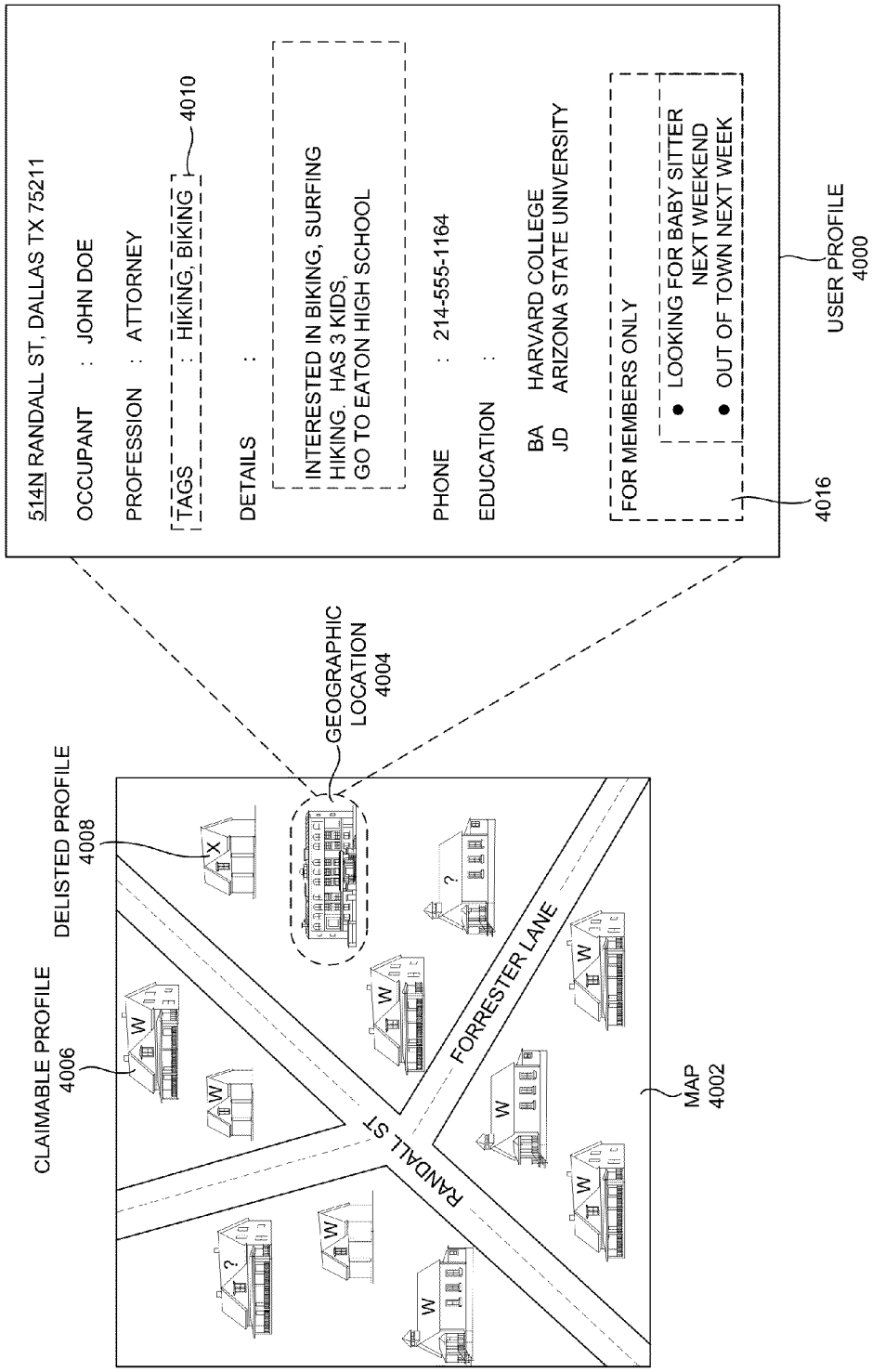
FIG. 40A is a user interface view of mapping user profile of the geographical location, according to one embodiment.

In operation 2806, a map (e.g., a map 4002 of FIG. 40B-41A, a map 1400 of FIG. 14, a map 1600 of FIG. 16, a map 1701 of FIG. 17) may be generated concurrently displaying the user profile (e.g., the user profile 29200 of FIG. 40A) and the verified geographic location (e.g., the geographic location 4004 of FIG. 40A). In operation, 2808, in the map, claimable profiles (e.g., a claimable profile 4006 of FIG. 40A-B, a claimable profile 4102 of FIG. 41A, a claimable profile 1704 of FIG. 17) associated with different geographic locations may be simultaneously generated surrounding the verified geographic location (e.g., the geographic location 4004 of FIG. 40A) associated with the user profile (e.g., the user profile 29200 of FIG. 40A).

In operation 2810, a query of at least one of the user profile (e.g., the user profile 29200 of FIG. 40A) and the verified geographic location (e.g., the geographic location 4004 of FIG. 40A) may be processed. In operation 2812, a particular claimable profile of the claimable profiles (e.g., the claimable profile 4006 of FIG. 40A-B, the claimable profile 4102 of FIG. 41A, the claimable profile 1704 of FIG. 17) may be converted to another user profile (e.g., the user profile 29200 of FIG. 40A) when a different registered user claims a particular geographic location to the verified geographic location (e.g., the geographic location 4004 of FIG. 40A) associated with the particular claimable profile (e.g., the claimable profile 4006 of FIG. 40A-B, the claimable profile 4102 of FIG. 41A, the claimable profile 1704 of FIG. 17), wherein the user profile (e.g., the user profile 29200 of FIG. 40A) may be tied to a specific property in a neighborhood (e.g., a neighborhood 2902A-2902N of FIG. 29), and wherein the particular claimable profile (e.g., the claimable profile 4006 of FIG. 40B-41A, the claimable profile 4102 of FIG. 41A, the claimable profile 1704 of FIG. 17) may be associated with a neighboring property to the specific property in the neighborhood (e.g., the neighborhood 2920A-2920N of FIG. 29).

In operation 2814, a certain claimable profile (e.g., the claimable profile 4006 of FIG. 40B-41A, the claimable profile 4102 of FIG. 41A, the claimable profile 1704 of FIG. 17) of the claimable profiles (e.g., the claimable profile 4006 of FIG. 40A-B, the claimable profile 4102 of FIG. 41A, the claimable profile 1704 of FIG. 17) may be delisted when a private registered user claims a certain geographic location (e.g., the geographic location 4004 of FIG. 40A) adjacent to at least one of the verified geographic location and the particular geographic location (e.g., the geographic location 4004 of FIG. 40A).

In operation 2816, the certain claimable profile (e.g., the claimable profile 4006 of FIG. 40A-B, the claimable profile 4102 of FIG. 41A, the claimable profile 1704 of FIG. 17) in the map (e.g., the map 4002 of FIG. 40A-B, the map 1400 of FIG. 14, the map 1600 of FIG. 16, the map 1701 of FIG. 17) when the certain claimable profile may be delisted and/or be masked through the request of the private registered user.

Figure 28B:
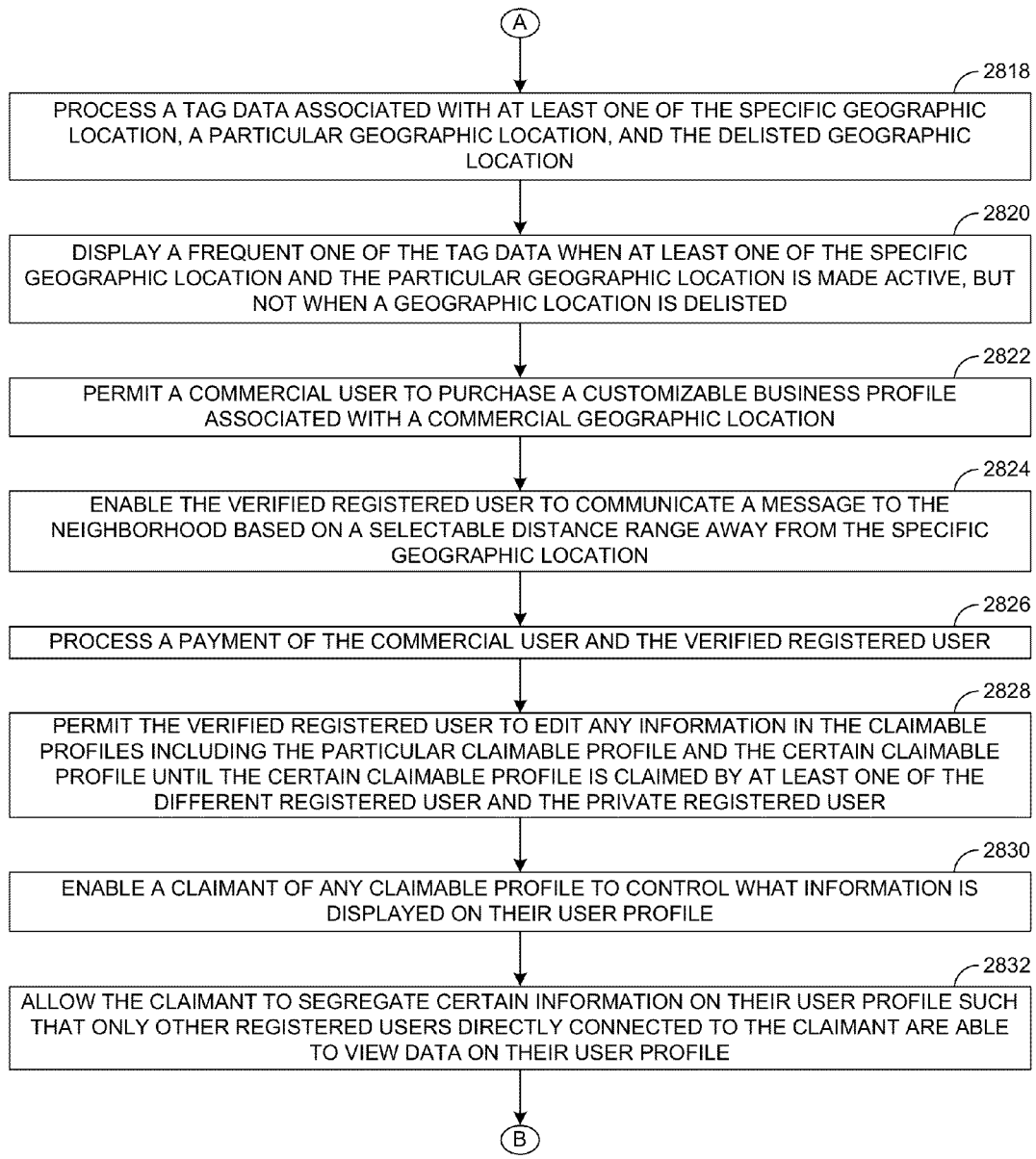
FIG. 28B is a continuation of process flow of FIG. 28A showing additional processes, according to one embodiment.

FIG. 28B is a continuation of process flow of FIG. 28A showing additional processes, according to one embodiment. In operation 2818, a tag data associated with at least one of the verified geographic location, the particular geographic location (e.g., the geographic location 4004 of FIG. 40A), and the delisted geographic location may be processed. In operation 2820, a frequent one of the tag data may be displayed when at least one of the verified geographic location and the particular geographic location (e.g., the geographic location 4004 of FIG. 40A) may be made active, but not when the geographic location (e.g., the geographic location 4004 of FIG. 40A) may be delisted.

In operation 2822, a commercial user (e.g., a commercial user 4100 of FIG. 41A-B) may be permitted to purchase a customizable business profile (e.g., a customizable business profile 4104 of FIG. 41B) associated with a commercial geographic location. In operation 2824, the verified registered user (e.g., the verified registered user 4110 of FIG. 41A-B, the verified registered user 4110 of FIG. 16) to communicate a message to the neighborhood (e.g., the neighborhood 2902A-2902N of FIG. 29) may be enabled based on a selectable distance range away from the verified geographic location.

In operation 2826, a payment of the commercial user (e.g., the commercial user 4100 of FIG. 41A-B) and the verified registered user (e.g., the verified registered user 4110 of FIG. 41A-B, the verified registered user 4110 of FIG. 16) may be processed. In operation 2828, the verified registered user (e.g., the verified registered user 4110 of FIG. 41A-B, the verified registered user 4110 of FIG. 16) may be permitted to edit any information in the claimable profiles (e.g., the claimable profile 4006 of FIG. 40A-B, the claimable profile 4102 of FIG. 41A, the claimable profile 1704 of FIG. 17) including the particular claimable profile and the certain claimable profile until the certain claimable profile may be claimed by at least one of the different registered user and the private registered user.

In operation 2830, a claimant of any claimable profile (e.g., the claimable profile 4006 of FIG. 40A-B, the claimable profile 4102 of FIG. 41A, the claimable profile 1704 of FIG. 17) may be enabled to control what information is displayed on their user profile (e.g., the user profile 29200 of FIG. 40A). In operation 2832, the claimant to segregate certain information on their user profile (e.g., the user profile 29200 of FIG. 40A) may be allowed such that only other registered users directly connected to the claimant are able to view data on their user profile (e.g., the user profile 29200 of FIG. 40A).

Figure 28C:
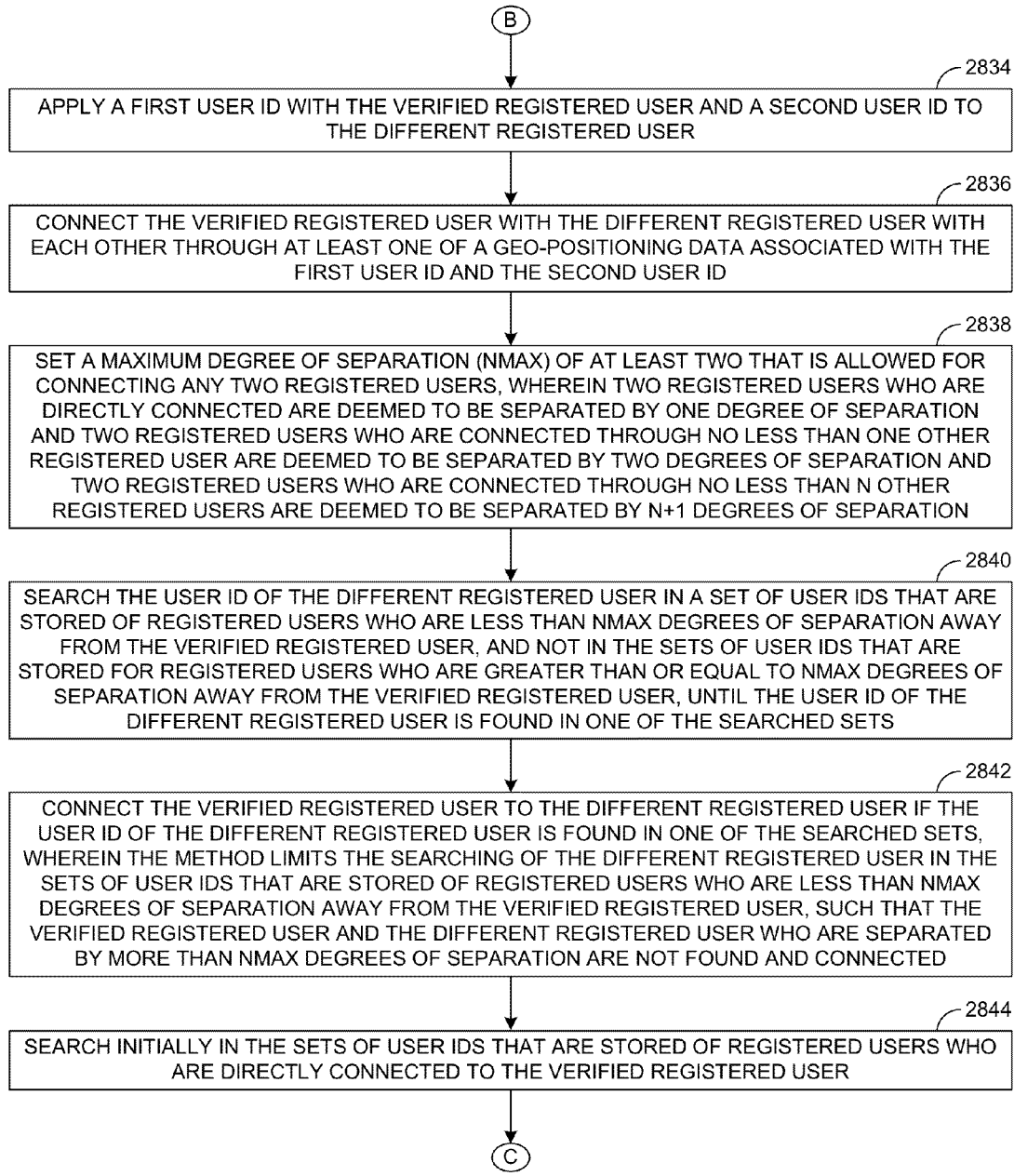
FIG. 28C is a continuation of process flow of FIG. 28B showing additional processes, according to one embodiment.

FIG. 28C is a continuation of process flow of FIG. 28B showing additional processes, according to one embodiment. In operation 2834, a first user ID with the verified registered user (e.g., the verified registered user 4110 of FIG. 41A-B, the verified registered user 4110 of FIG. 16) and a second user ID to the different registered user may be applied. In operation 2836, the verified registered user (e.g., the verified registered user 4110 of FIG. 41A-B, the verified registered user 4110 of FIG. 16) with the different registered user with each other may be connected through at least one of associated with the first user ID and the second user ID.

In operation 2838, a maximum degree of separation (Nmax) of at least two may be set that is allowed for connecting any two registered users, wherein two registered users who are directly connected may be deemed to be separated by one degree of separation and two registered users who are connected through no less than one other registered user may be deemed to be separated by two degrees of separation and two registered users who may be connected through no less than N other registered users are deemed to be separated by N+1 degrees of separation. In operation 2840, the user ID of the different registered user may be searched in a set of user IDs that are stored of registered users who are less than Nmax degrees of separation away from the verified registered user (e.g., the verified registered user 4110 of FIG. 41A-B, the verified registered user 4110 of FIG. 16), and not in the sets of user IDs that are stored for registered users who may be greater than or equal to Nmax degrees of separation away from the verified registered user (e.g., the verified registered user 4110 of FIG. 41A-B, the verified registered user 4110 of FIG. 16), until the user ID of the different registered user may be found in one of the searched sets.

In operation 2842, the verified registered user (e.g., the verified registered user 4110 of FIG. 41A-B, the verified registered user 4110 of FIG. 16) may be connected to the different registered user if the user ID of the different registered user may be found in one of the searched sets, wherein the method limits the searching of the different registered user in the sets of user IDs that may be stored of registered users who may be less than Nmax degrees of separation away from the verified registered user (e.g., the verified registered user 4110 of FIG. 41A-B, the verified registered user 4110 of FIG. 16), such that the verified registered user (e.g., the verified registered user 4110 of FIG. 41A-B, the verified registered user 4110 of FIG. 16) and the different registered user who may be separated by more than Nmax degrees of separation are not found and connected. In operation 2844, initially in the sets of user IDs that are stored of registered users who may be directly connected to the verified registered user (e.g., the verified registered user 4110 of FIG. 41A-B, the verified registered user 4110 of FIG. 16) may be initially searched.

Figure 28D:
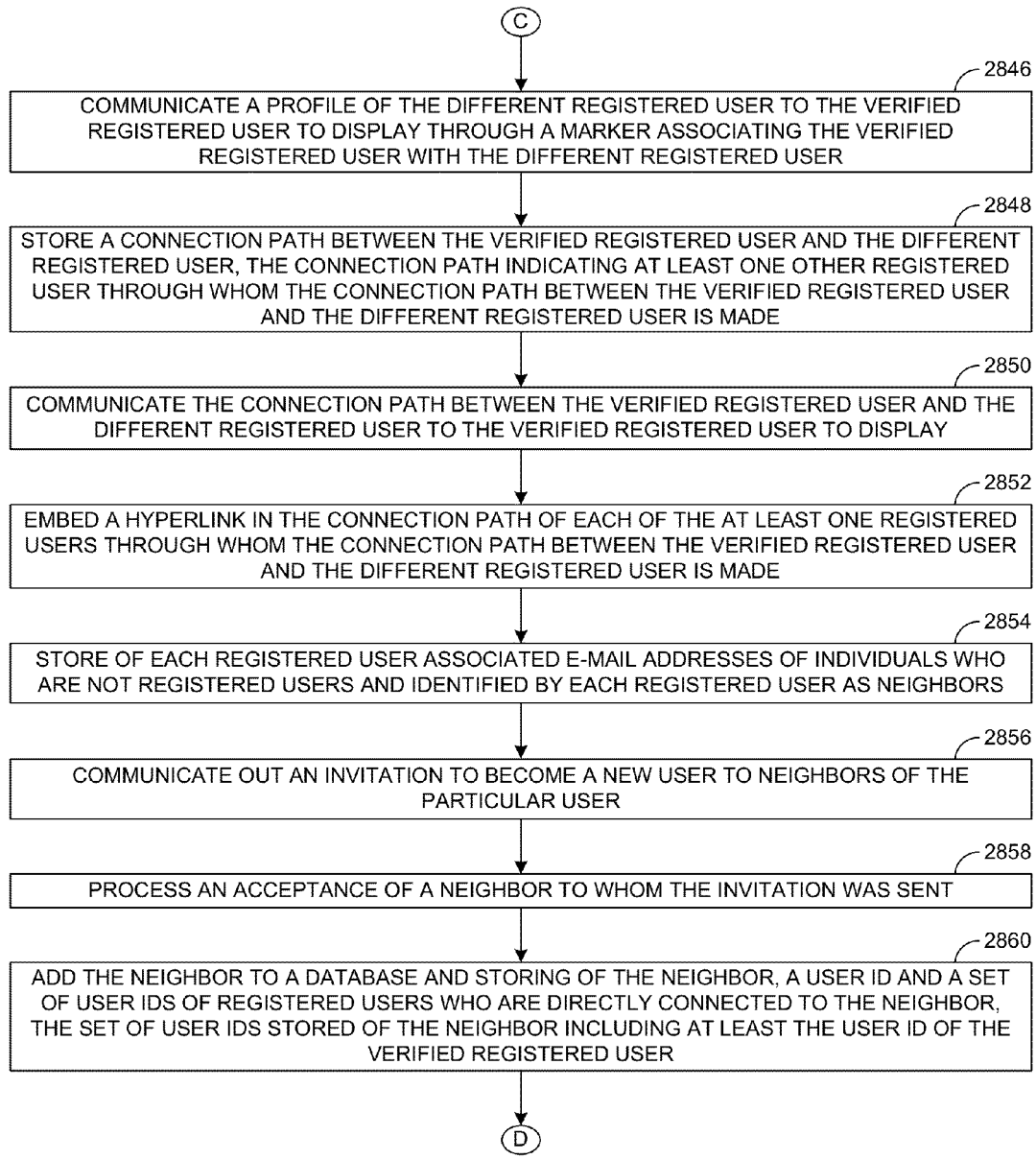
FIG. 28D is a continuation of process flow of FIG. 28C showing additional processes, according to one embodiment.

FIG. 28D is a continuation of process flow of FIG. 28C showing additional processes, according to one embodiment. In operation 2846, a profile of the different registered user to the verified registered user (e.g., the verified registered user 4110 of FIG. 41A-B, the verified registered user 4110 of FIG. 16) to display may be communicated through a marker associating the verified registered user (e.g., the verified registered user 4110 of FIG. 41A-B, the verified registered user 4110 of FIG. 16) with the different registered user.

In operation 2848, a connection path between the verified registered user (e.g., the verified registered user 4110 of FIG. 41A-B, the verified registered user 4110 of FIG. 16) and the different registered user, the connection path indicating at least one other registered user may be stored through whom the connection path between the verified registered user (e.g., the verified registered user 4110 of FIG. 41A-B, the verified registered user 4110 of FIG. 16) and the different registered user may be made.

In operation 2850, the connection path between the verified registered user (e.g., the verified registered user 4110 of FIG. 41A-B, the verified registered user 4110 of FIG. 16) and the different registered user to the verified registered user (e.g., the verified registered user 4110 of FIG. 41A-B, the verified registered user 4110 of FIG. 16) may be communicated to display.

In operation 2852, a hyperlink in the connection path of each of the at least one registered users may be embedded through whom the connection path between the verified registered user (e.g., the verified registered user 4110 of FIG. 41A-B, the verified registered user 4110 of FIG. 16) and the different registered user may be made. In operation 2854, each registered user associated e-mail addresses of individuals who are not registered users may be stored and identified by each registered user as neighbors (e.g., a neighbor 2920 of FIG. 29).

In operation 2856, an invitation may be communicated to become a new user (e.g., a user 2916 of FIG. 29) to neighbors (e.g., the neighbor 2920 of FIG. 29) of the particular user. In operation 2858, an acceptance of the neighbor (e.g., the neighbor 2920 of FIG. 29) to whom the invitation was sent may be processed. In operation 2860, the neighbor (e.g., the neighbor 2920 of FIG. 29) to a database and storing of the neighbor (e.g., the neighbor 2920 of FIG. 29), a user ID and the set of user IDs of registered users may be added who are directly connected to the neighbor (e.g., the neighbor 2920 of FIG. 29), the set of user IDs stored of the neighbor (e.g., the neighbor 2920 of FIG. 29) including at least the user ID of the verified registered user (e.g., the verified registered user 4110 of FIG. 41A-B, the verified registered user 4110 of FIG. 16).

Figure 28E:
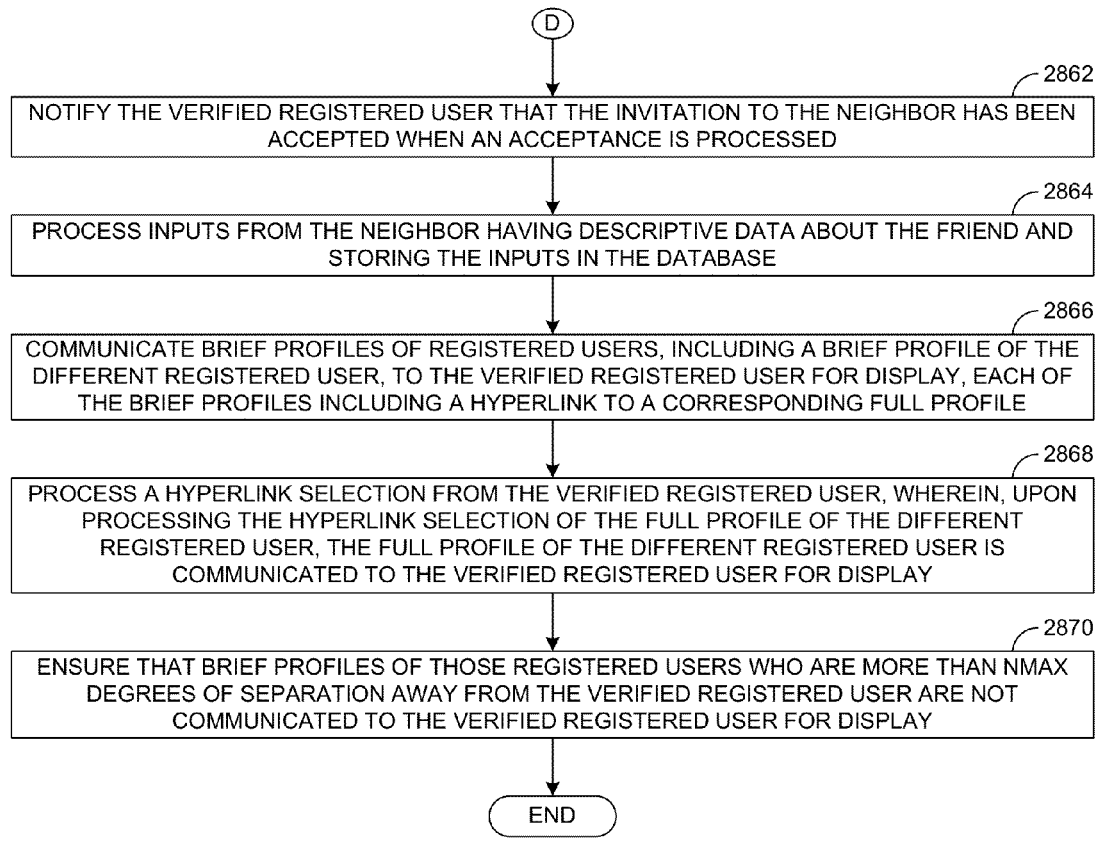
FIG. 28E is a continuation of process flow of FIG. 28D showing additional processes, according to one embodiment.

FIG. 28E is a continuation of process flow of FIG. 28D showing additional processes, according to one embodiment. In operation 2862, the verified registered user (e.g., the verified registered user 4110 of FIG. 41A-B, the verified registered user 4110 of FIG. 16) that the invitation to the neighbor (e.g., the neighbor 2920 of FIG. 29) has been accepted may be notified when the acceptance is processed.

In operation 2864, inputs from the neighbor (e.g., the neighbor 2920 of FIG. 29) having descriptive data about the friend and storing the inputs in the database may be processed. In operation 2866, brief profiles of registered users, including a brief profile of the different registered user may be communicated, to the verified registered user (e.g., the verified registered user 4110 of FIG. 41A-B, the verified registered user 4110 of FIG. 16) for display, each of the brief profiles including the hyperlink to a corresponding full profile.

In operation 2868, the hyperlink selection from the verified registered user (e.g., the verified registered user 4110 of FIG. 41A-B, the verified registered user 4110 of FIG. 16) may be processed, wherein, upon processing the hyperlink selection of the full profile of the different registered user, the full profile of the different registered user is communicated to the verified registered user (e.g., the verified registered user 4110 of FIG. 41A-B, the verified registered user 4110 of FIG. 16) for display.

In operation 2870, brief profiles of those registered users who may be more than Nmax degrees of separation away from the verified registered user (e.g., the verified registered user 4110 of FIG. 41A-B, the verified registered user 4110 of FIG. 16) may not communicated to the verified registered user (e.g., the verified registered user 4110 of FIG. 41A-B, the verified registered user 4110 of FIG. 16) may be ensured for display.

In one embodiment, a neighborhood communication system 2950 is described. This embodiment includes a privacy server 2900 to apply an address verification algorithm (e.g., using verify algorithm 3006 of FIG. 30) associated with each user of the online community (e.g., as shown in the social community view 3650 of FIG. 36 formed through the neighborhood network algorithm as described in FIG. 38) to verify that each user lives at a residence associated with a claimable residential address (e.g., using sub-algorithms of the claimable algorithm 2910 as described in FIG. 31) of an online community (e.g., as shown in the social community view 3650 of FIG. 36 formed through the neighborhood network algorithm as described in FIG. 38) formed through a social community algorithm 2906 of the privacy server 2900 using a processor 3902 and a memory (e.g., as described in FIG. 39).

Figure 31:
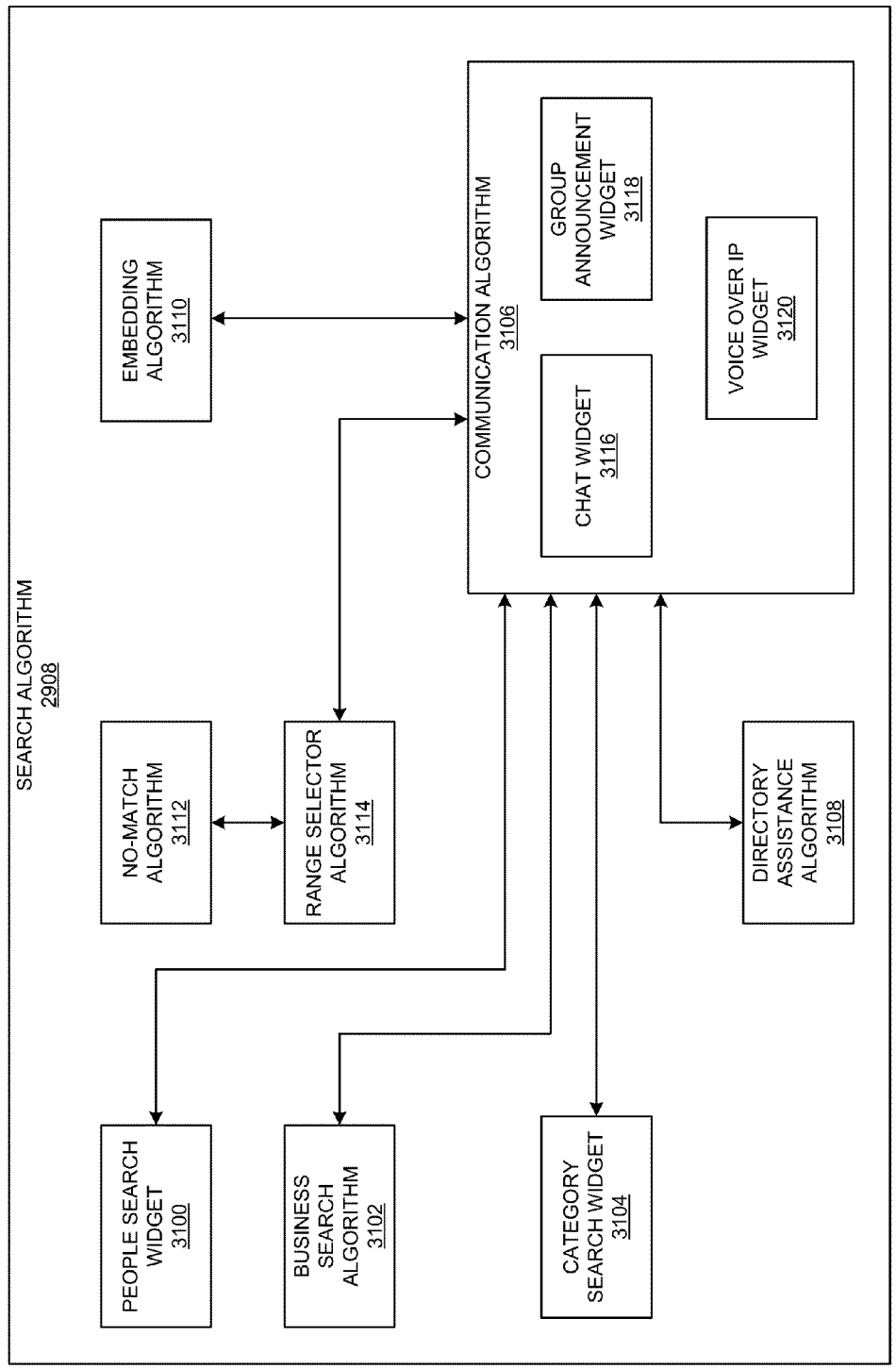
FIG. 31 is an exploded view of a search algorithm of FIG. 29, according to one embodiment.

A network 2904, and a mapping server 2926 (e.g., providing global map data) communicatively coupled with the privacy server 2900 through the network 2904 generate a latitudinal data and a longitudinal data associated with each claimable residential address (e.g., using sub-algorithms of the claimable algorithm 2910 as described in FIG. 31) of the online community (e.g., as shown in the social community view 3650 of FIG. 36 formed through the neighborhood network algorithm as described in FIG. 38) associated with each user of the online community (e.g., as shown in the social community view 3650 of FIG. 36 formed through the neighborhood network algorithm as described in FIG. 38) in this embodiment.

It will be appreciated that the neighborhood communication system 2950 may operate the various multi-copters 100 of FIG. 1 in a peer-to-peer topology. Particularly, the peer-to-peer (P2P) networks formed in the various embodiments described in FIGS. 1-41B may include a type of decentralized and distributed network architecture in which individual multi-copters (e.g., the multi-copters of FIG. 1) and client side devices (e.g., mobile devices of neighbors, desktop computers of neighbors) in the network (e.g., "peers") act as both suppliers and consumers of resources, in contrast to the centralized client-server model where client nodes request access to resources provided by central servers, according to one embodiment. Through a peer-to-peer methodology of neighborhood multi-copters, each connected through a common centralized communication system (e.g., a cloud based communication system), collisions between multi-copters can be minimized by relaying positional information between a series of multi-copters and client devices presently in flight, according to one embodiment (e.g., redundant paths and communications can be simultaneously handled). In this embodiment, controlling the multi-copter 100 functions may be are shared amongst multiple interconnected peers who each make a portion of their resources (such as processing power, disk storage or network bandwidth) directly available to other network participants, without the need for centralized coordination by servers, according to one embodiment.

The privacy server 2900 automatically determines a set of access privileges in the online community (e.g., as shown in the social community view 3650 of FIG. 31 formed through the neighborhood network algorithm as described in FIG. 38) associated with each user of the online community (e.g., as shown in the social community view 3650 of FIG. 36 formed through the neighborhood network algorithm as described in FIG. 38) by constraining access in the online community (e.g., as shown in the social community view 3650 of FIG. 36 formed through the neighborhood network algorithm as described in FIG. 38) based on a neighborhood boundary determined using a Bezier curve algorithm 3040 of the privacy server 2900 in this embodiment.

The privacy server 2900 (e.g., a hardware device of a global neighborhood environment 1800) may transform the claimable residential address (e.g., using sub-algorithms of the claimable algorithm 2910 as described in FIG. 31) into a claimed address upon an occurrence of an event. The privacy server 2900 may instantiate the event when a particular user 2916 is associated with the claimable residential address (e.g., using sub-algorithms of the claimable algorithm 2910 as described in FIG. 31) based on a verification of the particular user 2916 as living at a particular residential address (e.g., associated with the residence 2918 of FIG. 29) associated with the claimable residential address (e.g., using sub-algorithms of the claimable algorithm 2910 as described in FIG. 31) using the privacy server 2900. The privacy server 2900 may constrain the particular user 2916 to communicate through the online community (e.g., as shown in the social community view 3650 of FIG. 36 formed through the neighborhood network algorithm as described in FIG. 38) only with a database of neighbors 2928 (e.g., such as the neighbor 2920 of FIG. 29 forming an occupant data) having verified addresses using the privacy server 2900. The privacy server 2900 may define the database of neighbors 2928 (e.g., such as the neighbor 2920 of FIG. 29) as other users of the online community (e.g., as shown in the social community view 3650 of FIG. 36 formed through the neighborhood network algorithm as described in FIG. 38) that have each verified their addresses in the online community (e.g., as shown in the social community view 3650 of FIG. 36 formed through the neighborhood network algorithm as described in FIG. 38) using the privacy server 2900 and/or which have each claimed residential addresses that are in a threshold radial distance from the claimed address of the particular user 2916.

The privacy server 2900 may constrain the threshold radial distance to be less than a distance of the neighborhood boundary using the Bezier curve algorithm 3040. The privacy server 2900 may permit the neighborhood boundary to take on a variety of shapes based on an associated geographic connotation, a historical connotation, a political connotation, and/or a cultural connotation of neighborhood boundaries. The privacy server 2900 may apply a database of constraints (e.g., the databases of FIG. 30 including the places database 3018) associated with neighborhood boundaries that are imposed on a map view of the online community (e.g., as shown in the social community view 3650 of FIG. 36 formed through the neighborhood network algorithm as described in FIG. 38) when permitting the neighborhood boundary to take on the variety of shapes.

Figure 36:
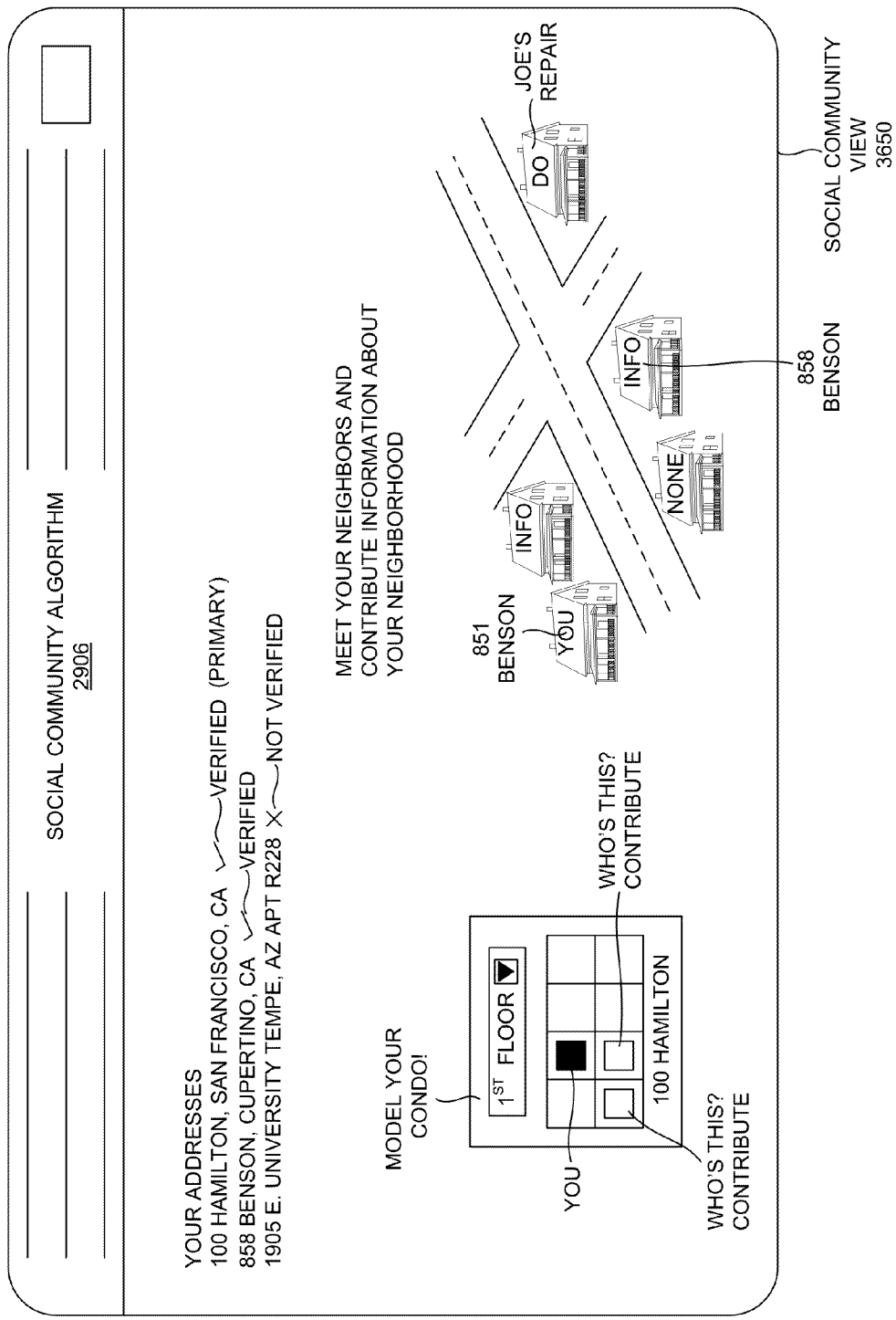
FIG. 36 is a social community view of a social community algorithm, according to one embodiment.
Figure 38:
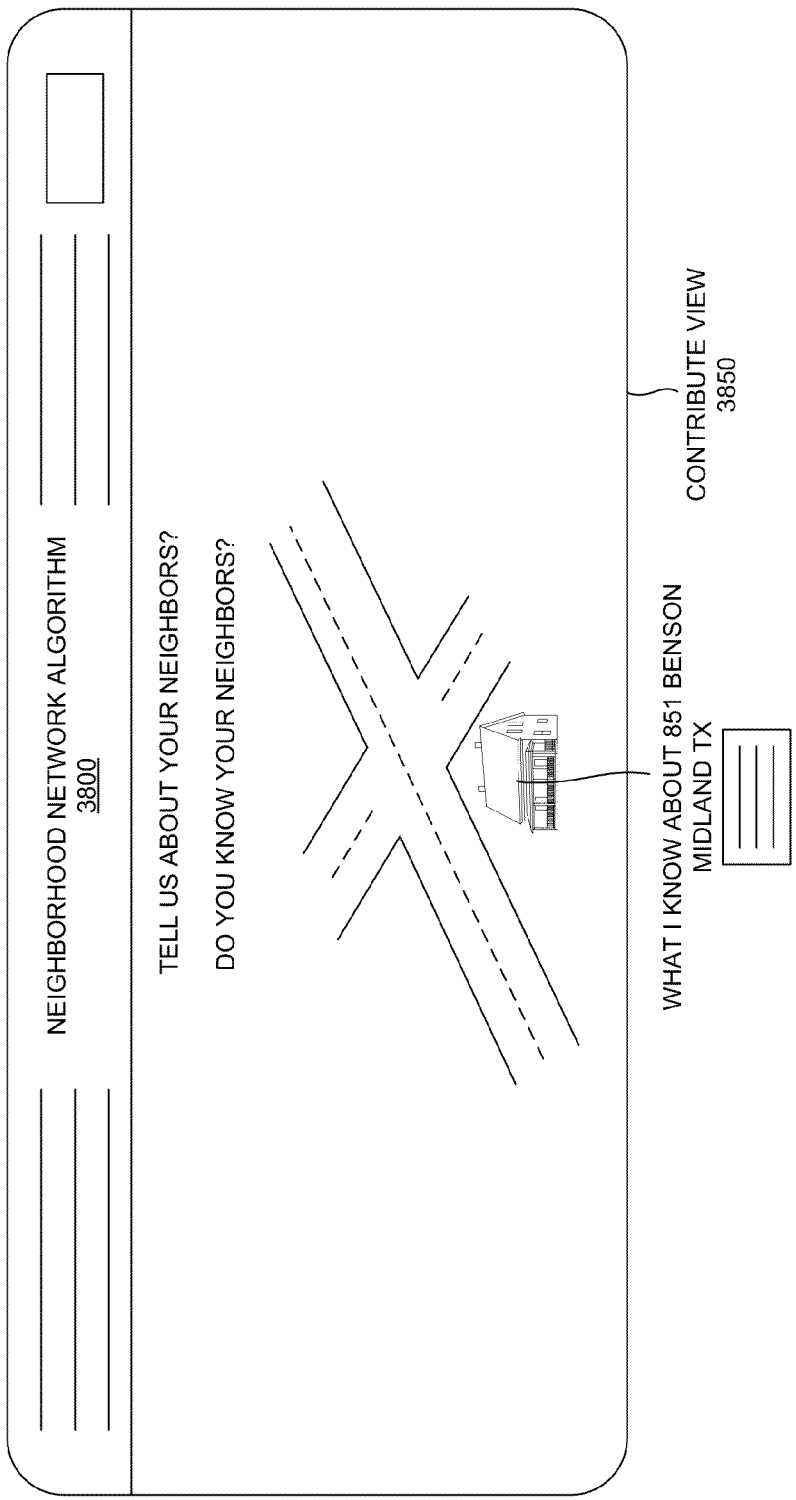
FIG. 38 is a contribute view of a neighborhood network algorithm, according to one embodiment.

The privacy server 2900 may generate a user-generated boundary in a form of a polygon describing geo spatial boundaries defining the particular neighborhood when a first user of a particular neighborhood that verifies a first residential address of the particular neighborhood using the privacy server 2900 prior to other users in that particular neighborhood verifying their addresses in that particular neighborhood places a set of points defining the particular neighborhood using a set of drawing tools in the map view of the online community (e.g., as shown in the social community view 3650 of FIG. 36 formed through the neighborhood network algorithm as described in FIG. 38). The privacy server 2900 may optionally extend the threshold radial distance to an adjacent boundary of an adjacent neighborhood based a request of the particular user 2916. The privacy server 2900 may generate a separate login to the online community (e.g., as shown in the social community view 3650 of FIG. 36 formed through the neighborhood network algorithm as described in FIG. 38) designed to be usable by a police department, a municipal agency, a neighborhood association, and/or a neighborhood leader associated with the particular neighborhood.

The separate login may permit the police department, the municipal agency, the neighborhood association, and/or the neighborhood leader to: (1) invite residents of the particular neighborhood themselves (e.g., see the user interface view of FIG. 22) using the privacy server 2900 using a self-authenticating access code that permits new users that enter the self-authenticating access code in the online community (e.g., as shown in the social community view 3650 of FIG. 36 formed through the neighborhood network algorithm as described in FIG. 38) to automatically join the particular neighborhood as verified users (e.g., the verified user 4110 of FIG. 41A), (2) generate a virtual neighborhood watch group and/or an emergency preparedness group restricted to users verified in the particular neighborhood using the privacy server 2900, (3) conduct high value crime and/or safety related discussions from local police and/or fire officials that is restricted to users verified in the particular neighborhood using the privacy server 2900, (4) broadcast information across the particular neighborhood, and (5) receive and/or track neighborhood level membership and/or activity to identify leaders from the restricted group of users verified in the particular neighborhood using the privacy server 2900.

The privacy server 2900 may permit each of the restricted group of users verified in the particular neighborhood using the privacy server 2900 to: (1) share information about a suspicious activity that is likely to affect several neighborhoods, (2) explain about a lost pet that might have wandered into an adjoining neighborhood, (3) rally support from neighbors 2920 (e.g., such as the neighbor 2920 of FIG. 29) from multiple neighborhoods to address civic issues, (4) spread information about events comprising a local theater production and/or a neighborhood garage sale, and/or (5) solicit advice and/or recommendations from the restricted group of users verified in the particular neighborhood and/or optionally in the adjacent neighborhood.

The privacy server 2900 may flag a neighborhood feed from the particular neighborhood and/or optionally from the adjacent neighborhood as being inappropriate. The privacy server 2900 may suspend users that repeatedly communicate self-promotional messages that are inappropriate as voted based on a sensibility of any one of the verified users (e.g., the verified user 4110 of FIG. 41A) of the particular neighborhood and/or optionally from the adjacent neighborhood. The privacy server 2900 may personalize which nearby neighborhoods that verified users (e.g., the verified user 4110 of FIG. 41A) are able to communicate through based on a request of the particular user 2916. The privacy server 2900 may permit the neighborhood leader to communicate privately with leaders of an adjoining neighborhood to plan and/or organize on behalf of an entire constituency of verified users (e.g., a plurality of the verified user 4110 of FIG. 41A) of the particular neighborhood associated with the neighborhood leader.

The privacy server 2900 may filter feeds to only display messages from the particular neighborhood associated with each verified user. The privacy server 2900 may restrict posts only in the particular neighborhood to verified users (e.g., the verified user 4110 of FIG. 41A) having verified addresses within the neighborhood boundary (e.g., the claim view 1550 of FIG. 15 describes a claiming process of an address). The address verification algorithm (e.g., using verify algorithm 3006 of FIG. 30) of the privacy server 2900 utilizes a set of verification methods to perform verification of the particular user 2916 through any of a: (1) a postcard verification method through which the privacy server 2900 generates a physical postcard that is postal mailed to addresses of requesting users in the particular neighborhood and/or having a unique alphanumeric sequence in a form of an access code printed thereon which authenticates users that enter the access code to view and/or search privileges in the particular neighborhood of the online community (e.g., as shown in the social community view 3650 of FIG. 36 formed through the neighborhood network algorithm as described in FIG. 38), (2) a credit card verification method through which the privacy server 2900 verifies the claimable residential address (e.g., using sub-algorithms of the claimable algorithm 2910 as described in FIG. 31) when at least one a credit card billing address and/or a debit card billing address is matched with an inputted address through an authentication services provider, (3) a privately-published access code method through which the privacy server 2900 communicates to user profiles of the police department, the municipal agency, the neighborhood association, and/or the neighborhood leader an instant access code that is printable at town hall meetings and/or gatherings sponsored by any one of the police department, the municipal agency, the neighborhood association, and/or the neighborhood leader, (4) a neighbor vouching method through which the privacy server 2900 authenticates new users when existing verified users (e.g., the verified user 4110 of FIG. 41A) agree to a candidacy of new users in the particular neighborhood, (5) a phone verification method through which the privacy server 2900 authenticates new users whose phone number is matched with an inputted phone number through the authentication services provider, and (6) a social security verification method through which the privacy server 2900 authenticates new users whose social security number is matched with an inputted social security number through the authentication services provider.

The privacy server 2900 may initially set the particular neighborhood to a pilot phase status in which the online community (e.g., as shown in the social community view 3650 of FIG. 36 formed through the neighborhood network algorithm as described in FIG. 38) of the particular neighborhood is provisionally defined until a minimum number of users verify their residential addresses in the particular neighborhood through the privacy server 2900. The privacy server 2900 may automatically delete profiles of users that remain unverified after a threshold window of time. The neighborhood communication system 2950 may be designed to create private websites to facilitate communication among neighbors 2920 (e.g., such as the neighbor 2920 of FIG. 29) and/or build stronger neighborhoods.

In another embodiment a method of a neighborhood communication system 2950 is described. The method includes applying an address verification algorithm (e.g., using verify algorithm 3006 of FIG. 30) associated with each user of the online community (e.g., as shown in the social community view 3650 of FIG. 36 formed through the neighborhood network algorithm as described in FIG. 38) using a privacy server 2900, verifying that each user lives at a residence associated with a claimable residential address (e.g., using sub-algorithms of the claimable algorithm 2910 as described in FIG. 31) of an online community (e.g., as shown in the social community view 3650 of FIG. 36 formed through the neighborhood network algorithm as described in FIG. 38) formed through a social community algorithm 2906 of the privacy server 2900 using a processor 3902 and a memory (e.g., as described in FIG. 39), generating a latitudinal data and a longitudinal data associated with each claimable residential address (e.g., using sub-algorithms of the claimable algorithm 2910 as described in FIG. 31) of the online community (e.g., as shown in the social community view 3650 of FIG. 36 formed through the neighborhood network algorithm as described in FIG. 38) associated with each user of the online community (e.g., as shown in the social community view 3650 of FIG. 36 formed through the neighborhood network algorithm as described in FIG. 38), and determining a set of access privileges in the online community (e.g., as shown in the social community view 3650 of FIG. 36 formed through the neighborhood network algorithm as described in FIG. 38) associated with each user of the online community (e.g., as shown in the social community view 3650 of FIG. 36 formed through the neighborhood network algorithm as described in FIG. 38) by constraining access in the online community (e.g., as shown in the social community view 3650 of FIG. 36 formed through the neighborhood network algorithm as described in FIG. 38) based on a neighborhood boundary determined using a Bezier curve algorithm 3040 of the privacy server 2900.

The method may transform the claimable residential address (e.g., using sub-algorithms of the claimable algorithm 2910 as described in FIG. 31) into a claimed address upon an occurrence of an event. The method may instantiate the event when a particular user 2916 is associated with the claimable residential address (e.g., using sub-algorithms of the claimable algorithm 2910 as described in FIG. 31) based on a verification of the particular user 2916 as living at a particular residential address (e.g., associated with the residence 2918 of FIG. 29) associated with the claimable residential address (e.g., using sub-algorithms of the claimable algorithm 2910 as described in FIG. 31) using the privacy server 2900.

The method may constrain the particular user 2916 to communicate through the online community (e.g., as shown in the social community view 3650 of FIG. 36 formed through the neighborhood network algorithm as described in FIG. 38) only with a database of neighbors 2928 (e.g., such as the neighbor 2920 of FIG. 29) having verified addresses using the privacy server 2900. The method may define the database of neighbors 2928 (e.g., such as the neighbor 2920 of FIG. 29) as other users of the online community (e.g., as shown in the social community view 3650 of FIG. 36 formed through the neighborhood network algorithm as described in FIG. 38) that have each verified their addresses in the online community (e.g., as shown in the social community view 3650 of FIG. 36 formed through the neighborhood network algorithm as described in FIG. 38) using the privacy server 2900 and/or which have each claimed residential addresses that are in a threshold radial distance from the claimed address of the particular user 2916.

The method may constrain the threshold radial distance to be less than a distance of the neighborhood boundary using the Bezier curve algorithm 3040.

In addition, the method may define a neighborhood boundary to take on a variety of shapes based on an associated geographic connotation, a historical connotation, a political connotation, and/or a cultural connotation of neighborhood boundaries. The method may apply a database of constraints (e.g., the databases of FIG. 30 including the places database 3018) associated with neighborhood boundaries that are imposed on a map view of the online community (e.g., as shown in the social community view 3650 of FIG. 36 formed through the neighborhood network algorithm as described in FIG. 38) when permitting the neighborhood boundary to take on the variety of shapes.

The method may generate a user-generated boundary in a form of a polygon describing geospatial boundaries defining the particular neighborhood when a first user of a particular neighborhood that verifies a first residential address of the particular neighborhood using the privacy server 2900 prior to other users in that particular neighborhood verifying their addresses in that particular neighborhood places a set of points defining the particular neighborhood using a set of drawing tools in the map view of the online community (e.g., as shown in the social community view 3650 of FIG. 36 formed through the neighborhood network algorithm as described in FIG. 38). The method may optionally extend the threshold radial distance to an adjacent boundary of an adjacent neighborhood based a request of the particular user 2916.

The method may generate a separate login to the online community (e.g., as shown in the social community view 3650 of FIG. 36 formed through the neighborhood network algorithm as described in FIG. 38) designed to be usable by a police department, a municipal agency, a neighborhood association, and/or a neighborhood leader associated with the particular neighborhood.

The method may permit the police department, the municipal agency, the neighborhood association, and/or the neighborhood leader to: (1) invite residents of the particular neighborhood themselves (e.g., see the user interface view of FIG. 22) using the privacy server 2900 using a self-authenticating access code that permits new users that enter the self-authenticating access code in the online community (e.g., as shown in the social community view 3650 of FIG. 36 formed through the neighborhood network algorithm as described in FIG. 38) to automatically join the particular neighborhood as verified users (e.g., the verified user 4110 of FIG. 41A), (2) generate a virtual neighborhood watch group and/or an emergency preparedness group restricted to users verified in the particular neighborhood using the privacy server 2900, (3) conduct high value crime and/or safety related discussions from local police and/or fire officials that is restricted to users verified in the particular neighborhood using the privacy server 2900, (4) broadcast information across the particular neighborhood, and/or (5) receive and/or track neighborhood level membership and/or activity to identify leaders from the restricted group of users verified in the particular neighborhood using the privacy server 2900.

The method may permit each of the restricted group of users verified in the particular neighborhood using the privacy server 2900 to: (1) share information about a suspicious activity that is likely to affect several neighborhoods, (2) explain about a lost pet that might have wandered into an adjoining neighborhood, (3) rally support from neighbors 2920 (e.g., such as the neighbor 2920 of FIG. 29) from multiple neighborhoods to address civic issues, (4) spread information about events comprising a local theater production and/or a neighborhood garage sale, and/or (5) solicit advice and/or recommendations from the restricted group of users verified in the particular neighborhood and/or optionally in the adjacent neighborhood.

The method may flag a neighborhood feed from the particular neighborhood and/or optionally from the adjacent neighborhood as being inappropriate. The method may suspend users that repeatedly communicate self-promotional messages that are inappropriate as voted based on a sensibility of any one of the verified users (e.g., the verified user 4110 of FIG. 41A) of the particular neighborhood and/or optionally from the adjacent neighborhood. The method may personalize which nearby neighborhoods that verified users (e.g., the verified user 4110 of FIG. 41A) are able to communicate through based on a request of the particular user 2916. The method may permit the neighborhood leader to communicate privately with leaders of an adjoining neighborhood to plan and/or organize on behalf of an entire constituency of verified users of the particular neighborhood associated with the neighborhood leader.

The method may filter feeds to only display messages from the particular neighborhood associated with each verified user. The method may restrict posts only in the particular neighborhood to verified users (e.g., the verified user 4110 of FIG. 41A) having verified addresses within the neighborhood boundary (e.g., the claim view 1550 of FIG. 15 describes a claiming process of an address). The method may utilize a set of verification methods to perform verification of the particular user 2916 through: (1) generating a physical postcard that is postal mailed to addresses of requesting users in the particular neighborhood and/or having a unique alphanumeric sequence in a form of an access code printed thereon which authenticates users that enter the access code to view and/or search privileges in the particular neighborhood of the online community (e.g., as shown in the social community view 3650 of FIG. 36 formed through the neighborhood network algorithm as described in FIG. 38). (2) verifying the claimable residential address (e.g., using sub-algorithms of the claimable algorithm 2910 as described in FIG. 31) when at least one a credit card billing address and/or a debit card billing address is matched with an inputted address through an authentication services provider. (3) communicating to user profiles of the police department, the municipal agency, the neighborhood association, and/or the neighborhood leader an instant access code that is printable at town hall meetings and/or gatherings sponsored by any one of the police department, the municipal agency, the neighborhood association, and/or the neighborhood leader. (4) authenticating new users when existing verified users (e.g., the verified user 4110 of FIG. 41A) agree to a candidacy of new users in the particular neighborhood. (5) authenticating new users whose phone number is matched with an inputted phone number through the authentication services provider. (6) authenticating new users whose social security number is matched with an inputted social security number through the authentication services provider.

The method may initially set the particular neighborhood to a pilot phase status in which the online community (e.g., as shown in the social community view 3650 of FIG. 36 formed through the neighborhood network algorithm as described in FIG. 38) of the particular neighborhood is provisionally defined until a minimum number of users verify their residential addresses in the particular neighborhood through the privacy server 2900. The method may automatically delete profiles of users that remain unverified after a threshold window of time. The neighborhood communication system 2950 may be designed to create private websites to facilitate communication among neighbors 2920 (e.g., such as the neighbor 2920 of FIG. 29) and/or build stronger neighborhoods.

In yet another embodiment, another neighborhood communication system 2950 is described. This embodiment includes a privacy server 2900 to apply an address verification algorithm (e.g., using verify algorithm 3006 of FIG. 30) associated with each user of the online community (e.g., as shown in the social community view 3650 of FIG. 36 formed through the neighborhood network algorithm as described in FIG. 38) to verify that each user lives at a residence associated with a claimable residential address (e.g., using sub-algorithms of the claimable algorithm 2910 as described in FIG. 31) of an online community (e.g., as shown in the social community view 3650 of FIG. 36 formed through the neighborhood network algorithm as described in FIG. 38) formed through a social community algorithm 2906 of the privacy server 2900 using a processor 3902 and a memory (e.g., as described in FIG. 39), a network 2904, and a mapping server 2926 (e.g., providing global map data) communicatively coupled with the privacy server 2900 through the network 2904 to generate a latitudinal data and a longitudinal data associated with each claimable residential address (e.g., using sub-algorithms of the claimable algorithm 2910 as described in FIG. 31) of the online community (e.g., as shown in the social community view 3650 of FIG. 36 formed through the neighborhood network algorithm as described in FIG. 38) associated with each user of the online community (e.g., as shown in the social community view 3650 of FIG. 36 formed through the neighborhood network algorithm as described in FIG. 38). The privacy server 2900 automatically determines a set of access privileges in the online community (e.g., as shown in the social community view 3650 of FIG. 36 formed through the neighborhood network algorithm as described in FIG. 38) associated with each user of the online community (e.g., as shown in the social community view 3650 of FIG. 36 formed through the neighborhood network algorithm as described in FIG. 38) by constraining access in the online community (e.g., as shown in the social community view 3650 of FIG. 36 formed through the neighborhood network algorithm as described in FIG. 38) based on a neighborhood boundary determined using a Bezier curve algorithm 3040 of the privacy server 2900 in this embodiment.

In addition, in this yet another embodiment the privacy server 2900 transforms the claimable residential address (e.g., using sub-algorithms of the claimable algorithm 2910 as described in FIG. 31) into a claimed address upon an occurrence of an event. The privacy server 2900 instantiates the event when a particular user 2916 is associated with the claimable residential address (e.g., using sub-algorithms of the claimable algorithm 2910 as described in FIG. 31) based on a verification of the particular user 2916 as living at a particular residential address (e.g., associated with the residence 2918 of FIG. 29) associated with the claimable residential address (e.g., using sub-algorithms of the claimable algorithm 2910 as described in FIG. 31) using the privacy server 2900 in this yet another embodiment. The privacy server 2900 constrains the particular user 2916 to communicate through the online community (e.g., as shown in the social community view 3650 of FIG. 36 formed through the neighborhood network algorithm as described in FIG. 38) only with a database of neighbors 2928 (e.g., such as the neighbor 2920 of FIG. 29) having verified addresses using the privacy server 2900 in this yet another embodiment. The privacy server 2900 defines the database of neighbors 2928 (e.g., such as the neighbor 2920 of FIG. 29) as other users of the online community (e.g., as shown in the social community view 3650 of FIG. 36 formed through the neighborhood network algorithm as described in FIG. 38) that have each verified their addresses in the online community (e.g., as shown in the social community view 3650 of FIG. 36 formed through the neighborhood network algorithm as described in FIG. 38) using the privacy server 2900 and which have each claimed residential addresses that are in a threshold radial distance from the claimed address of the particular user 2916 in this yet another embodiment.

FIG. 29 is a system view of a privacy server 2900 communicating with neighborhood(s) 2902A-N through a network 2904, an advertiser(s) 2924, a mapping server 2926, an a database of neighbors 2928 (e.g., occupant data), according to one embodiment. Particularly FIG. 29 illustrates the privacy server 2900, the neighborhood 2902A-N, the network 2904, advertiser(s) 2924, mapping server 2926, and the database of neighbors 2928 (e.g., occupant data), according to one embodiment. The privacy server 2900 may contain a social community algorithm 2906, a search algorithm 2908, a claimable algorithm 2910, a commerce algorithm 2912, and a map algorithm 2914. The neighborhood may include a user 2916, a community center 2921, a residence 2918, a neighbor 2920 and a business 2922, according to one embodiment.

The privacy server 2900 may include any number of neighborhoods having registered users and/or unregistered users. The neighborhood(s) 2902 may be a geographically localized community in a larger city, town, and/or suburb. The network 2904 (e.g., the network 104 of FIG. 1) may be search engines, blogs, social networks, professional networks and static website that may unite individuals, groups and/or community. The social community algorithm 2906 may generate a building creator in which the registered users may create and/or modify empty claimable profiles (e.g., a claimable profile 4006 of FIG. 40B-41A, a claimable profile 4102 of FIG. 41A, a claimable profile 1704 of FIG. 17). The search algorithm 2908 may include searching of information of an individual, group and/or community.

The social community algorithm 2906 (e.g., that applies the Bezier curve algorithm 3040 of FIG. 30 using a series of algorithms working in concert as described in FIG. 30), as a function/algorithm of the emergency response server, may determine the location of the user 2916, the distance between the user 2916 and other verified users (e.g., the verified user 4110 of FIG. 41A), and the distance between the user 2916 and locations of interest. With that information, the social community algorithm 2906 (e.g., that applies the Bezier curve algorithm 3040 of FIG. 30 using a series of algorithms working in concert as described in FIG. 30) may further determine which verified users (e.g., the verified user 4110 of FIG. 41A) are within a predetermined vicinity of a user 2916.

This set of verified users within the vicinity of another verified user may then be determined to be receptive to broadcasts transmitted by the user 2916 and to be available as transmitters of broadcasts to the user 2916.

The social community algorithm 2906 (e.g., that applies the Bezier curve algorithm 3040 of FIG. 30 using a series of algorithms working in concert as described in FIG. 30) in effect may create a link between verified users of the network 2904 (e.g., the network 104) that allows the users to communicate with each other, and this link may be based on the physical distance between the users as measured relative to a current geospatial location of the device (e.g., the device 1806, the device 1808 of FIG. 18) with a claimed and verified (e.g., through a verification mechanism such as a postcard verification, a utility bill verification, and/or a vouching of the user with other users) non-transitory location (e.g., a home location, a work location) of the user and/or other users. In an alternate embodiment, the transitory location of the user (e.g., their current location, a current location of their vehicle and/or mobile phone) and/or the other users may also be used by the radial algorithm (e.g., the Bezier curve algorithm 3040 of FIG. 30) to determine an appropriate threshold distance for broadcasting a message.

Furthermore, the social community algorithm 2906 (e.g., that applies the Bezier curve algorithm 3040 of FIG. 30 using a series of algorithms working in concert as described in FIG. 30) may automatically update a set of pages associated with profiles of individuals and/or businesses that have not yet joined the network based on preseeded address information. In effect, the social community algorithm 2906 (e.g., that applies the Bezier curve algorithm 3040 of FIG. 30 using a series of algorithms working in concert as described in FIG. 30) may update preseeded pages in a geo-constrained radial distance from where a broadcast originates (e.g., using an epicenter calculated from the current location of the device (e.g., the device 1806, the device 1808 of FIG. 18) (e.g., a mobile version of the device 1806 of FIG. 18 (e.g., a mobile phone, a tablet computer) with information about the neighborhood broadcast data. In effect, through this methodology, the social community algorithm 2906 (e.g., the community network algorithm 106) may leave 'inboxes' and/or post 'alerts' on pages created for users that have not yet signed up based on a confirmed address of the users through a public and/or a private data source (e.g., from Infogroup®, from a white page directory, etc.).

The social community algorithm 2906 (e.g., that applies the Bezier curve algorithm 3040 of FIG. 30 using a series of algorithms working in concert as described in FIG. 30) of the privacy server 2900 may be different from previous implementations because it is the first implementation to simulate the experience of local radio transmission between individuals using the internet and non-radio network technology by basing their network broadcast range on the proximity of verified users to one another, according to one embodiment.

The Bezier curve algorithm 3040 may operate as follows, according to one embodiment. The radial algorithm (e.g., the Bezier curve algorithm 3040 of FIG. 30) may utilize a radial distribution function (e.g., a pair correlation function)

$$g(r)$$

In the neighborhood communication system 2950. The radial distribution function may describe how density varies as a function of distance from a user 2916, according to one embodiment.

If a given user 2916 is taken to be at the origin O (e.g., the epicenter), and if $$\rho = N/V$$

is the average number density of recipients (e.g., other users of the neighborhood communication system 2950 such as neighbors 2920 of FIG. 29) in the neighborhood communication system 2950, then the local time-averaged density at a distance r from O is $$\rho g(r)$$

according to one embodiment. This simplified definition may hold for a homogeneous and isotropic type of recipients (e.g., other users of the neighborhood communication system 2950 such as neighbors 2920 of FIG. 29), according to one embodiment of the Bezier curve algorithm 3040.

A more anisotropic distribution (e.g., exhibiting properties with different values when measured in different directions) of the recipients (e.g., other users of the neighborhood communication system 2950 such as neighbors 2920 of FIG. 29) will be described below, according to one embodiment of the Bezier curve algorithm 3040. In simplest terms it may be a measure of the probability of finding a recipient at a distance of r away from a given user 2916, relative to that for an ideal distribution scenario, according to one embodiment. The anisotropic algorithm involves determining how many recipients (e.g., other users of the neighborhood communication system 2950 such as neighbors 2920 of FIG. 29) are within a distance of r and r+dr away from the user 2916, according to one embodiment. The Bezier curve algorithm 3040 may be determined by calculating the distance between all user pairs and binning them into a user histogram, according to one embodiment.

The histogram may then be normalized with respect to an ideal user at the origin o, where user histograms are completely uncorrelated, according to one embodiment. For three dimensions (e.g., such as a building representation in the privacy server 2900 in which there are multiple residents in each floor), this normalization may be the number density of the system multiplied by the volume of the spherical shell, which mathematically can be expressed as $$g(r)_f = 4\pi r^2 \rho dr,$$

where ρ may be the user density, according to one embodiment of the Bezier curve algorithm 3040.

The radial distribution function of the Bezier curve algorithm 3040 can be computed either via computer simulation methods like the Monte Carlo method, or via the Ornstein-Zernike equation, using approximative closure relations like the Percus-Yevick approximation or the Hypernetted Chain Theory, according to one embodiment.

This may be important because by confining the broadcast reach of a verified user in the neighborhood communication system 2950 to a specified range, the social community algorithm 2906 (e.g., that applies the Bezier curve algorithm 3040 of FIG. 30 using a series of algorithms working in concert as described in FIG. 30) may replicate the experience of local radio broadcasting and enable verified users to communicate information to their immediate neighbors as well as receive information from their immediate neighbors in areas that they care about, according to one embodiment. Such methodologies can be complemented with hyperlocal advertising targeted to potential users of the privacy server 2900 on preseeded profile pages and/or active user pages of the privacy server 2900. Advertisement communications thus may become highly specialized and localized resulting in an increase in their value and interest to the local verified users of the network through the privacy server 2900. For example, advertisers may wish to communicate helpful home security devices to a set of users located in a geospatial area with a high concentration of home break-in broadcasts.

The social community algorithm 2906 (e.g., that applies the Bezier curve algorithm 3040 of FIG. 30 using a series of algorithms working in concert as described in FIG. 30) may also have wide application as it may solve the problem of trying to locate a receptive audience to a verified user's broadcasts, whether that broadcast may a personal emergency, an one's personal music, an advertisement for a car for sale, a solicitation for a new employee, and/or a recommendation for a good restaurant in the area. This social community algorithm 2906 (e.g., that applies the Bezier curve algorithm 3040 of FIG. 30 using a series of algorithms working in concert as described in FIG. 30) may eliminate unnecessarily broadcasting that information to those who are not receptive to it, both as a transmitter and as a recipient of the broadcast. The radial algorithm (e.g., the Bezier curve algorithm 3040 of FIG. 30) saves both time (which may be critical and limited in an emergency context) and effort of every user involved by transmitting information only to areas that a user cares about, according to one embodiment.

In effect, the radial algorithm (e.g., the Bezier curve algorithm 3040 of FIG. 30) of the emergency response server enables users to notify people around locations that are cared about (e.g., around where they live, work, and/or where they are physically located). In one embodiment, the user 2916 can be provided 'feedback' and/or a communication that the neighbor 2920 may be responding to the emergency after the neighborhood broadcast data may be delivered to the recipients (e.g., other users of the neighborhood communication system 2950 such as neighbors 2920 of FIG. 29) and/or to the neighborhood services using the social community algorithm 2906 (e.g., that applies the Bezier curve algorithm 3040 of FIG. 30 using a series of algorithms working in concert as described in FIG. 30) of the privacy server 2900. For example, after the neighborhood broadcast data may be delivered, the device (e.g., the device 1806, the device 1808 of FIG. 18) (e.g., a mobile version of the device 1806 of FIG. 18 (e.g., a mobile phone, a tablet computer)) may display a message saying: "3256 neighbors around a 1 radius from you have been notified on their profile pages of your crime broadcast in Menlo Park and 4 people are responding" and/or "8356 neighbors and two hospitals around a 2.7 radius from you have been notified of your medical emergency."

The various embodiments described herein of the privacy server 2900 using the social community algorithm 2906 (e.g., that applies the Bezier curve algorithm 3040 of FIG. 30 using a series of algorithms working in concert as described in FIG. 30) may solve a central problem of internet radio service providers (e.g., Pandora) by retaining cultural significance related to a person's locations of association. For example, the social community algorithm 2906 (e.g., that applies the Bezier curve algorithm 3040 of FIG. 30 using a series of algorithms working in concert as described in FIG. 30) may be used to 'create' new radio stations, television stations, and/or mini alert broadcasts to a geospatially constrained area on one end, and provide a means for those 'tuning in' to consume information posted in a geospatial area that the listener cares about and/or associates themselves with. The information provided can be actionable in that the user 2916 may be able to secure new opportunities through face to face human interaction and physical meeting not otherwise possible in internet radio scenarios.

The radial algorithm (e.g., the Bezier curve algorithm 3040 of FIG. 30) may be a set of instructions that may enable users (e.g., verified users, non-verified users) of the Nextdoor.com and Fatdoor.com websites and applications to broadcast their activities (e.g., garage sale, t-shirt sale, crime alert) to surrounding neighbors within a claimed neighborhood and to guests of a claimed neighborhood, according to one embodiment. The radial algorithm (e.g., the Bezier curve algorithm 3040 of FIG. 30) may be new because current technology does not allow for users of a network (e.g., Nextdoor.com, Fatdoor.com) to locally broadcast their activity to a locally defined geospatial area. With the radial algorithm (e.g., the Bezier curve algorithm 3040 of FIG. 30), users of the network may communicate with one another in a locally defined manner, which may present more relevant information and activities, according to one embodiment. For example, if a verified user of the network broadcasts an emergency, locally defined neighbors of the verified user may be much more interested in responding than if they observed an emergency on a general news broadcast on traditional radio, according to one embodiment. The social community algorithm 2906 (e.g., the community network algorithm 106 of FIG. 1) may solve the problem of neighbors living in the locally defined geospatial area who don't typically interact, and allows them to connect within a virtual space that did not exist before, according to one embodiment. Community boards (e.g., stolen or missing item boards) may have been a primary method of distributing content in a surrounding neighborhood effectively prior to the disclosures described herein. However, there was no way to easily distribute content related to exigent circumstances and/or with urgency in a broadcast-like manner to those listening around a neighborhood through mobile devices until the various embodiments applying the social community algorithm 2906 as described herein.

A Bezier curve algorithm 3040 may be a method of calculating a sequence of operations, and in this case a sequence of radio operations, according to one embodiment. Starting from an initial state and initial input, the Bezier curve algorithm 3040 describes a computation that, when executed, proceeds through a finite number of well-defined successive states, eventually producing radial patterned distribution (e.g., simulating a local radio station), according to one embodiment.

The privacy server 2900 may solve technical challenges through the social community algorithm 2906 (e.g., that applies the Bezier curve algorithm 3040 of FIG. 30 using a series of algorithms working in concert as described in FIG. 30) by implementing a vigorous screening process to screen out any lewd or vulgar content in one embodiment. For example, what may be considered lewd content sometimes could be subjective, and verified users could argue that the operator of the privacy server 2900 is restricting their constitutional right to freedom of speech (e.g., if the emergency response server is operated by a government entity) through a crowd-moderation capability enabled by the social community algorithm 2906 (e.g., that applies the Bezier curve algorithm 3040 of FIG. 30 using a series of algorithms working in concert as described in FIG. 30), according to one embodiment. In one embodiment, verified users may sign an electronic agreement to screen their content and agree that the neighborhood communication system 2950 may delete any content that it deems inappropriate for broadcasting, through the social community algorithm 2906 (e.g., that applies the Bezier curve algorithm 3040 of FIG. 30 using a series of algorithms working in concert as described in FIG. 30) according to one embodiment. For example, it may be determined that a lost item such as a misplaced set of car keys does not qualify as an "emergency" that should be broadcast.

The social community algorithm 2906 (e.g., that applies the Bezier curve algorithm 3040 of FIG. 30 using a series of algorithms working in concert as described in FIG. 30), in addition to neighborhood broadcasts (e.g., such as emergency broadcasts), may allow verified users to create and broadcast their own radio show, e.g., music, talk show, commercial, instructional contents, etc., and to choose their neighborhood(s) for broadcasting based on a claimed location, according to one embodiment. The social community algorithm 2906 (e.g., that applies the Bezier curve algorithm 3040 of FIG. 30 using a series of algorithms working in concert as described in FIG. 30) may allow users to choose the neighborhoods that they would want to receive the broadcasts, live and recorded broadcasts, and/or the types and topics (e.g., minor crimes, property crimes, medical emergencies) of broadcasts that interest them.

The social community algorithm 2906 (e.g., that applies the Bezier curve algorithm 3040 of FIG. 30 using a series of algorithms working in concert as described in FIG. 30) based approach of the privacy server 2900 may be a completely different concept from the currently existing neighborhood (e.g., geospatial) social networking options. The social community algorithm 2906 (e.g., that applies the Bezier curve algorithm 3040 of FIG. 30 using a series of algorithms working in concert as described in FIG. 30) may also allow the user to create his/her own radio station, television station and/or other content such as the neighborhood broadcast data and distribute this content around locations to users and pre-seeded profiles around them. For example, the user may wish to broadcast their live reporting of a structure fire or interview eye-witnesses to a robbery. The social community algorithm 2906 (e.g., that applies the Bezier curve algorithm 3040 of FIG. 30 using a series of algorithms working in concert as described in FIG. 30) can allow verified users to create their content and broadcast in the selected geospatial area. It also allows verified listeners to listen to only the relevant local broadcasts of their choice.

The social community algorithm 2906 (e.g., that applies the Bezier curve algorithm 3040 of FIG. 30 using a series of algorithms working in concert as described in FIG. 30) may be important because it may provide any verified user the opportunity to create his/her own radial broadcast message (e.g., can be audio, video, pictorial and/or textual content) and distribute this content to a broad group. Social community algorithm 2906 (e.g., that applies the Bezier curve algorithm 3040 of FIG. 30 using a series of algorithms working in concert as described in FIG. 30) may also allow verified listeners to listen to any missed live broadcasts through the prerecorded features, according to one embodiment. Through this, the social community algorithm 2906 (e.g., that applies the Bezier curve algorithm 3040 of FIG. 30 using a series of algorithms working in concert as described in FIG. 30) changes the way social networks (e.g., Nextdoor®, Fatdoor®, Facebook®, Path®, etc.) operate by enabling location centric broadcasting to regions that a user cares about, according to one embodiment. Social community algorithm 2906 (e.g., that applies the Bezier curve algorithm 3040 of FIG. 30 using a series of algorithms working in concert as described in FIG. 30) may solve a technical challenge by defining ranges based on a type of an emergency type, a type of neighborhood, and/or boundary condition of a neighborhood by analyzing whether the neighborhood broadcast data may be associated with a particular kind of recipient, a particular neighborhood, a temporal limitation, and/or through another criteria.

By using the social community algorithm 2906 (e.g., that applies the Bezier curve algorithm 3040 of FIG. 30 using a series of algorithms working in concert as described in FIG. 30) of the privacy server 2900 the user 2916 may be able to filter irrelevant offers and information provided by broadcasts. In one embodiment, only the broadcasting user (e.g., the user 2916) may be a verified user to create accountability for a particular broadcast and/or credibility of the broadcaster. In this embodiment, recipients (e.g., other users of the neighborhood communication system 2950 such as neighbors 2920 of FIG. 29) of the broadcast may not need to be verified users of the emergency response network. By directing traffic and organizing the onslaught of broadcasts, the social community algorithm 2906 (e.g., that applies the Bezier curve algorithm 3040 of FIG. 30 using a series of algorithms working in concert as described in FIG. 30) of the privacy server 2900 may be able to identify the origins and nature of each group of incoming information and locate recipients (e.g., other users of the neighborhood communication system 2950 such as neighbors 2920 of FIG. 29) that are relevant/interested in the neighborhood broadcast data, maximizing the effective use of each broadcast. For example, the neighbor 2920 may be able to specify that they own a firearm so that they would be a relevant neighbor 2920 for broadcast data to respond to a school shooting. In another example, the neighbor 2920 may specify that they are a medical professional (e.g., paramedic, physician) such that they may receive medical emergency broadcasts, according to one embodiment.

The social community algorithm 2906 (e.g., that applies the Bezier curve algorithm 3040 of FIG. 30 using a series of algorithms working in concert as described in FIG. 30) of the privacy server 2900 may process the input data from the device (e.g., the device 1806, the device 1808 of FIG. 18) (e.g., a mobile version of the device 1806 of FIG. 18 (e.g., a mobile phone, a tablet computer)) in order to identify which notification(s) to broadcast to which individual(s). This may be separate from a traditional radio broadcast as it not only geographically constrains broadcasters and recipients (e.g., other users of the neighborhood communication system 2950 such as neighbors 2920 of FIG. 29) but also makes use of user preferences in order to allow broadcasters to target an optimal audience and allow recipients (e.g., other users of the neighborhood communication system 2950 such as neighbors 2920 of FIG. 29) to alter and customize what they consume. The user 2916 may associate him/herself with a non-transitory address in order to remain constantly connected to their neighborhood and/or neighbors even when they themselves or their neighbors are away. The Bezier curve algorithm 3040 may be also unique from a neighborhood social network (e.g., the privacy server 2900) as it permits users to broadcast emergencies, information, audio, video etc. to other users, allowing users to create their own stations.

In order to implement the social community algorithm 2906 (e.g., that applies the Bezier curve algorithm 3040 of FIG. 30 using a series of algorithms working in concert as described in FIG. 30), geospatial data may need to be collected and amassed in order to create a foundation on which users may sign up and verify themselves by claiming a specific address, associating themselves with that geospatial location. The social community algorithm 2906 (e.g., that applies the Bezier curve algorithm 3040 of FIG. 30 using a series of algorithms working in concert as described in FIG. 30) may then be able to utilize the geospatial database 2922 to filter out surrounding noise and deliver only relevant data to recipients (e.g., other users of the neighborhood communication system 2950 such as neighbors 2920 of FIG. 29). In order to accomplish this, the social community algorithm 2906 (e.g., that applies the Bezier curve algorithm 3040 of FIG. 30 using a series of algorithms working in concert as described in FIG. 30) may be able to verify the reliability of geospatial coordinates, time stamps, and user information associated with the device (e.g., the device 1806, the device 1808 of FIG. 18) (e.g., a a mobile version of the device 1806 of FIG. 18 (e.g., a mobile phone, a tablet computer)). In addition, threshold geospatial radii, private neighborhood boundaries, and personal preferences may be established in the privacy server 2900 and accommodated using the social community algorithm 2906 (e.g., that applies the Bezier curve algorithm 3040 of FIG. 30 using a series of algorithms working in concert as described in FIG. 30). The geospatial database 2922 may work in concert with the social community algorithm 2906 (e.g., that applies the Bezier curve algorithm 3040 of FIG. 30 using a series of algorithms working in concert as described in FIG. 30) to store, organize, and manage broadcasts, pushpins, user profiles, preseeded user profiles, metadata, and epicenter locations associated with the privacy server 2900 (e.g., a neighborhood social network such as Fatdoor.com, Nextdoor.com).

The Bezier curve algorithm 3040 may be used to calculate relative distances between each one of millions of records as associated with each placed geo-spatial coordinate in the privacy server 2900 (e.g., a neighborhood social network such as Fatdoor.com, Nextdoor.com). Calculations of relative distance between each geospatial coordinate can be a large computational challenge because of the high number of reads, writes, modify, and creates associated with each geospatial coordinate added to the privacy server 2900 and subsequent recalculations of surrounding geospatial coordinates associated with other users and/or other profile pages based a relative distance away from a newly added set of geospatial coordinates (e.g., associated with the neighborhood broadcast data and/or with other pushpin types). To overcome this computational challenge, the radial algorithm (e.g., the Bezier curve algorithm 3040 of FIG. 30) may leverage a massively parallel computing architecture through which processing functions are distributed across a large set of processors accessed in a distributed computing system through the network 2904.

In order to achieve the utilization of the massively parallel computing architecture in a context of a radial distribution function of a privacy server 2900, a number of technical challenges have been overcome in at least one embodiment. Particularly, the social community algorithm 2906 constructs a series of tables based on an ordered geospatial ranking based on frequency of interaction through a set of 'n' number of users simultaneously interacting with the privacy server 2900, in one preferred embodiment. In this manner, sessions of access between the privacy server 2900 and users of the privacy server 2900 (e.g., the user 2916) may be monitored based on geospatial claimed areas of the user (e.g., a claimed work and/or home location of the user), and/or a present geospatial location of the user. In this manner, tables associated with data related to claimed geospatial areas of the user and/or the present geospatial location of the user may be anticipatorily cached in the memory 2924 to ensure that a response time of the privacy server 2900 may be not constrained by delays caused by extraction, retrieval, and transformation of tables that are not likely to be required for a current and/or anticipated set of sessions between users and the privacy server 2900.

In a preferred embodiment, an elastic computing environment may be used by the social community algorithm 2906 to provide for increase/decreases of capacity within minutes of a database function requirement. In this manner, the social community algorithm 2906 can adapt to workload changes based on number of requests of processing simultaneous and/or concurrent requests associated with neighborhood broadcast data by provisioning and de-provisioning resources in an autonomic manner, such that at each point in time the available resources match the current demand as closely as possible.

The social community algorithm 2906 (e.g., that applies the Bezier curve algorithm 3040 of FIG. 30 using a series of algorithms working in concert as described in FIG. 30) may be a concept whereby a server communicating data to a dispersed group of recipients (e.g., other users of the neighborhood communication system 2950 such as neighbors 2920 of FIG. 29) over a network 2904, which may be an internet protocol based wide area network (as opposed to a network communicating by radio frequency communications) communicates that data only to a geospatially-constrained group of recipients (e.g., other users of the neighborhood communication system 2950 such as neighbors 2920 of FIG. 29). The social community algorithm 2906 (e.g., that applies the Bezier curve algorithm 3040 of FIG. 30 using a series of algorithms working in concert as described in FIG. 30) may apply a geospatial constraint related to a radial distance away from an origin point, or a constraint related to regional, state, territory, county, municipal, neighborhood, building, community, district, locality, and/or other geospatial boundaries.

The social community algorithm 2906 (e.g., that applies the Bezier curve algorithm 3040 of FIG. 30 using a series of algorithms working in concert as described in FIG. 30) may be new as applied to data traveling over wide area networks using internet protocol topology in a geospatial social networking and commerce context, according to one embodiment. While radio broadcasts, by their nature, are transmitted in a radial pattern surrounding the origin point, there may be no known mechanism for restricting access to the data only to verified users of a service subscribing to the broadcast. As applied to wired computer networks, while techniques for applying geospatial constraints have been applied to search results, and to other limited uses, there has as yet been no application of geospatial constraint as applied to the various embodiments described herein using the social community algorithm 2906 (e.g., that applies the Bezier curve algorithm 3040 of FIG. 30 using a series of algorithms working in concert as described in FIG. 30).

The social community algorithm 2906 (e.g., that applies the Bezier curve algorithm 3040 of FIG. 30 using a series of algorithms working in concert as described in FIG. 30) may be roughly analogous to broadcast radio communications such as a) in broadcast radio, b) in wireless computer networking, and c) in mobile telephony. However, all of these systems broadcast their information promiscuously, making the data transmitted available to anyone within range of the transmitter who may be equipped with the appropriate receiving device. In contrast, the social community algorithm 2906 (e.g., that applies the Bezier curve algorithm 3040 of FIG. 30 using a series of algorithms working in concert as described in FIG. 30) herein describes a system in which networks are used to transmit data in a selective manner in that information may be distributed around a physical location of homes or businesses in areas of interest/relevancy.

The social community algorithm 2906 (e.g., that applies the Bezier curve algorithm 3040 of FIG. 30 using a series of algorithms working in concert as described in FIG. 30) may solve a problem of restricting data transmitted over networks to specific users who are within a specified distance from the individual who originates the data. In a broad sense, by enabling commerce and communications that are strictly limited within defined neighborhood boundaries, the social community algorithm 2906 (e.g., that applies the Bezier curve algorithm 3040 of FIG. 30 using a series of algorithms working in concert as described in FIG. 30) may enable the privacy server 2900 (e.g., a neighborhood social network such as Fatdoor.com, Nextdoor.com) communications, attacking the serious social conditions of anonymity and disengagement in community that afflict the nation and, increasingly, the world.

The social community algorithm 2906 (e.g., that applies the Bezier curve algorithm 3040 of FIG. 30 using a series of algorithms working in concert as described in FIG. 30) may comprise one or more algorithms that instruct the privacy server 2900 to restrict the broadcasting of the neighborhood broadcast data to one or more parts of the geospatial area 117. For example, in the embodiment of FIG. 29, the social community algorithm 2906 (e.g., that applies the Bezier curve algorithm 3040 of FIG. 30 using a series of algorithms working in concert as described in FIG. 30) may instruct the privacy server 2900 to broadcast the neighborhood broadcast data to the recipients (e.g., other users of the neighborhood communication system 2950 such as neighbors 2920 of FIG. 29) but not to the area outside the threshold radial distance.

In one or more embodiments, the social community algorithm 2906 (e.g., that applies the Bezier curve algorithm 3040 of FIG. 30 using a series of algorithms working in concert as described in FIG. 30) may allow the privacy server 2900 to function in manner that simulates a traditional radio broadcast (e.g., using a radio tower to transmit a radio frequency signal) in that both the privacy server 2900 and the radio broadcast are restricted in the geospatial scope of the broadcast transmission. In one or more embodiments, the social community algorithm 2906 (e.g., that applies the Bezier curve algorithm 3040 of FIG. 30 using a series of algorithms working in concert as described in FIG. 30) may prevent the broadcast of the neighborhood broadcast data to any geospatial area to which the user 2916 does not wish to transmit the neighborhood broadcast data, and/or to users that have either muted and/or selectively subscribed to a set of broadcast feeds.

The social community algorithm 2906 (e.g., that applies the Bezier curve algorithm 3040 of FIG. 30 using a series of algorithms working in concert as described in FIG. 30) may analyze the neighborhood broadcast data to determine which recipients (e.g., other users of the neighborhood communication system 2950 such as neighbors 2920 of FIG. 29) may receive notification data within the threshold radial distance (e.g., set by the user 2916 and/or auto calculated based on a type of emergency posting). The social community algorithm 2906 (e.g., that applies the Bezier curve algorithm 3040 of FIG. 30 using a series of algorithms working in concert as described in FIG. 30) may use a variety of parameters, including information associated with the neighborhood broadcast data (e.g., location of the broadcast, type of broadcast, etc.) to determine the threshold radial distance.

The social community algorithm 2906 (e.g., that applies the Bezier curve algorithm 3040 of FIG. 30 using a series of algorithms working in concert as described in FIG. 30) may also determine which verified addresses associated with recipients (e.g., other users of the neighborhood communication system 2950 such as neighbors 2920 of FIG. 29) having verified user profiles are located within the threshold radial distance. The social community algorithm 2906 (e.g., that applies the Bezier curve algorithm 3040 of FIG. 30 using a series of algorithms working in concert as described in FIG. 30) may then broadcast the notification data to the profiles and/or mobile devices of the verified users having verified addresses within the threshold radial distance.

The social community algorithm 2906 (e.g., that applies the Bezier curve algorithm 3040 of FIG. 30 using a series of algorithms working in concert as described in FIG. 30) may therefore simulate traditional radio broadcasting (e.g., from a radio station transmission tower) over the IP network. Thus, the social community algorithm 2906 (e.g., that applies the Bezier curve algorithm 3040 of FIG. 30 using a series of algorithms working in concert as described in FIG. 30) may allow the broadcast to include information and data that traditional radio broadcasts may not be able to convey, for example geospatial coordinates and/or real-time bi-directional communications. Additionally, the social community algorithm 2906 (e.g., that applies the Bezier curve algorithm 3040 of FIG. 30 using a series of algorithms working in concert as described in FIG. 30) may allow individual users low-entry broadcast capability without resort to expensive equipment and/or licensing by the Federal Communications Commission (FCC).

Another advantage of this broadcast via the social community algorithm 2906 (e.g., that applies the Bezier curve algorithm 3040 of FIG. 30 using a series of algorithms working in concert as described in FIG. 30) may be that it may bypass obstructions that traditionally disrupt radio waves such as mountains and/or atmospheric disturbances. Yet another advantage of the social community algorithm 2906 (e.g., that applies the Bezier curve algorithm 3040 of FIG. 30 using a series of algorithms working in concert as described in FIG. 30) may be that it may expand the physical distance of broadcast capability without resort to the expense ordinarily associated with generating powerful carrier signals. In yet another advantage, the social community algorithm 2906 (e.g., that applies the Bezier curve algorithm 3040 of FIG. 30 using a series of algorithms working in concert as described in FIG. 30) may allow for almost unlimited channels and/or stations as compared to traditional radio where only a narrow band of electromagnetic radiation has been appropriated for use among a small number of entities by government regulators (e.g., the FCC).

The claimable algorithm 2910 may enable the registered users to create and/or update their information. A 'claimable' (e.g., may be enabled through the claimable algorithm 2910) can be defined as a perpetual collective work of many authors. Similar to a blog in structure and logic, a claimable allows anyone to edit, delete or modify content that has been placed on the Web site using a browser interface, including the work of previous authors. In contrast, a blog (e.g., or a social network page), typically authored by an individual, may not allow visitors to change the original posted material, only add comments to the original content. The term claimable refers to either the web site or the software used to create the site. The term 'claimable' also implies fast creation, ease of creation, and community approval in many software contexts (e.g., claimable means "quick" in Hawaiian).

The commerce algorithm may provide an advertisement system to a business that may enable the users to purchase location in the neighborhood(s) 2902. The map algorithm 2914 (e.g., the map algorithm 108 of FIG. 1) may be indulged in study, practice, representing and/or generating maps, or globes. The user 2916 may be an individuals and/or households that may purchase and/or use goods and services and/or be an active member of any group or community and/or resident and/or a part of any neighborhood(s) 2902. The residence 2918 may be a house, a place to live and/or like a nursing home in a neighborhood(s) 2902.

The community center 2921 may be public locations where members of a community may gather for group activities, social support, public information, and other purposes. The business 2922 may be a customer service, finance, sales, production, communications/public relations and/or marketing organization that may be located in the neighborhood(s) 2902. The advertiser(s) 2924 may be an individual and/or a firm drawing public who may be responsible in encouraging the people attention to goods and/or services by promoting businesses, and/or may perform through a variety of media. The mapping server 2926 may contain the details/maps of any area, region and/or neighborhood. The social community algorithm 2906 of the privacy server 2900 may communicate with the neighborhood(s) 2902 through the network 2904 and/or the search algorithm 2908. The social community algorithm 2906 of the privacy server 2900 may communicate with the advertiser(s) 2924 through the commerce algorithm, the database of neighbors 2928 (e.g., occupant data) and/or mapping server 2926 through the map algorithm 2914.

For example, the neighborhoods 2902A-N may have registered users and/or unregistered users of a privacy server 2900. Also, the social community algorithm 2906 of the privacy server 2900 may generate a building creator (e.g., building builder 1602 of FIG. 16) in which the registered users may create and/or modify empty claimable profiles, building layouts, social network pages, and/or floor levels structures housing residents and/or businesses in the neighborhood.

In addition, the claimable algorithm 2910 of the privacy server 2900 may enable the registered users to create a social network page of themselves, and/or may edit information associated with the unregistered users identifiable through a viewing of physical properties in which, the unregistered users reside when the registered users have knowledge of characteristics associated with the unregistered users.

Furthermore, the search algorithm 2908 of the privacy server 2900 may enable a people search (e.g., the people search widget 3100 of FIG. 31), a business search (e.g., the business search algorithm 3102 of FIG. 31), and/or a category search (e.g., the category search widget 3104 of FIG. 31) of any data in the social community algorithm 2906 and/or may enable embedding of any content in the privacy server 2900 in other search engines, blogs, social networks, professional networks and/or static websites.

The commerce algorithm of the privacy server 2900 may provide an advertisement system to a business who purchase their location in the privacy server 2900 in which the advertisement may be viewable concurrently with a map indicating a location of the business, and/or in which revenue may be attributed to the privacy server 2900 when the registered users and/or the unregistered users click-in on a simultaneously displayed data of the advertisement along with the map indicating a location of the business.

Moreover, a map algorithm 2914 (e.g., the map algorithm 108 of FIG. 1) of the privacy server 2900 may include a map data associated with a satellite data (e.g., generated by the satellite data algorithm 3400 of FIG. 34) which may serve as a basis of rendering the map in the privacy server 2900 and/or which includes a simplified map generator which may transform the map to a fewer color and/or location complex form using a parcel data which identifies some residence, civic, and/or business locations in the satellite data.

In addition, a first instruction set may enable a social network to reside above a map data, in which the social network may be associated with specific geographical locations identifiable in the map data. Also, a second instruction set integrated with the first instruction set may enable users of the social network to create profiles of other people through a forum which provides a free form of expression of the users sharing information about any entities and/or people residing in any geographical location identifiable in the satellite map data, and/or to provide a technique of each of the users to claim a geographic location (e.g., a geographic location 29024 of FIG. 40A) to control content in their respective claimed geographic locations (e.g., a geographic location 29024 of FIG. 40A).

Furthermore, a third instruction set integrated with the first instruction set and the second instruction set may enable searching of people in the privacy server 2900 by indexing each of the data shared by the user 2916 of any of the people and/or the entities residing in any geographic location (e.g., a geographic location 29024 of FIG. 40A). A fourth instruction set may provide a moderation of content about each other posted of the users 2916 through trusted users of the privacy server 2900 who have an ability to ban specific users and/or delete any offensive and libelous content in the privacy server 2900.

Also, a fifth instruction set may enable an insertion of any content generated in the privacy server 2900 in other search engines through a syndication and/or advertising relationship between the privacy server 2900 and/or other internet commerce and search portals.

Moreover, a sixth instruction set may grow the social network through neighborhood groups, local politicians, block watch communities, issue activism groups, and neighbor(s) 2920 who invite other known parties and/or members to share profiles of themselves and/or learn characteristics and information about other supporters and/or residents in a geographic area of interest through the privacy server 2900.

Also, a seventh instruction set may determine quantify an effect on at least one of a desirability of a location, a popularity of a location, and a market value of a location based on an algorithm that considers a number of demographic and social characteristics of a region surrounding the location through a reviews algorithm.

Figure 30:
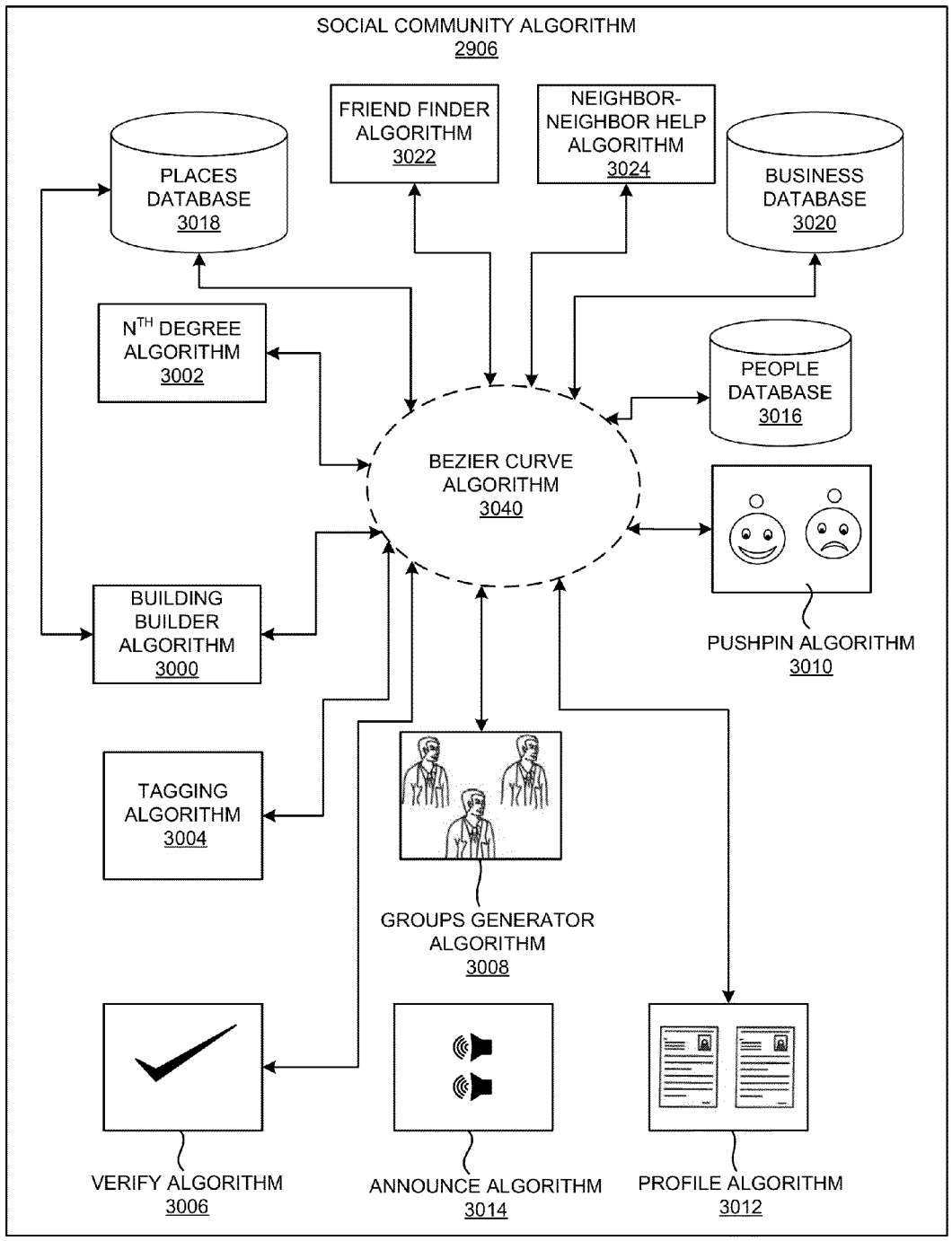
FIG. 30 is an exploded view of a social community algorithm of FIG. 29, according to one embodiment.

FIG. 30 is an exploded view of the social community algorithm 2906 of FIG. 29, according to one embodiment. Particularly FIG. 30 illustrates a building builder algorithm 3000, an $N^{th}$ degree algorithm 3002, a tagging algorithm 3004, a verify algorithm 3006, a groups generator algorithm 3008, a pushpin algorithm 3010, a profile algorithm 3012, an announce algorithm 3014, a people database 3016, a places database 3018, a business database 3020, a friend finder algorithm 3022 and a neighbor-neighbor help algorithm 3024, according to one embodiment.

The $N^{th}$ degree algorithm 3002 may enable the particular registered user to communicate with an unknown registered user through a common registered user who may be a friend and/or a member of a common community. The tagging algorithm 3004 may enable the user 2916 to leave brief comments on each of the claimable profiles (e.g., the claimable profile 4006 of FIG. 40B-41A, the claimable profile 4102 of FIG. 41A, the claimable profile 1704 of FIG. 17) and social network pages in the global neighborhood environment 1800 (e.g., the privacy server 2900 of FIG. 29).

The verify algorithm 3006 may validate the data, profiles and/or email addresses received from various registered user(s) before any changes may be included. The groups generator algorithm 3008 may enable the registered users to form groups may be depending on common interest, culture, style, hobbies and/or caste. The pushpin algorithm 3010 may generate customized indicators of different types of users, locations, and interests directly in the map. The profile algorithm 3012 may enable the user to create a set of profiles of the registered users and to submit media content of themselves, identifiable through a map.

The announce algorithm 3014 may distribute a message in a specified range of distance away from the registered users when a registered user purchases a message to communicate to certain ones of the registered users surrounding a geographic vicinity adjacent to the particular registered user originating the message. The people database 3016 may keep records of the visitor/users (e.g., a user 2916 of FIG. 29). The places database algorithm 3018 may manage the data related to the location of the user (e.g., address of the registered user). The business database 3020 may manage an extensive list of leading information related to business. The friend finder algorithm 3022 may match the profile of the registered user with common interest and/or help the registered user to get in touch with new friends or acquaintances.

For example, the verify algorithm 3006 of the social community algorithm 2906 of FIG. 29 may authenticate an email address of a registered user prior to enabling the registered user to edit information associated with the unregistered users through an email response and/or a digital signature technique. The groups generator algorithm 3008 of the social community algorithm (e.g., the social community algorithm 2906 of FIG. 29) may enable the registered users to form groups with each other surrounding at least one of a common neighborhood (e.g., a neighborhood 2902A-N of FIG. 29), political, cultural, educational, professional and/or social interest.

In addition, the tagging algorithm 3004 of the social community algorithm (e.g., the social community algorithm 2906 of FIG. 29) may enable the registered users and/or the unregistered users to leave brief comments on each of the claimable profiles (e.g., the claimable profile 4006 of FIG. 40B-41A, the claimable profile 4102 of FIG. 41A, the claimable profile 1704 of FIG. 17) and/or social network pages in the global neighborhood environment 1800 (e.g., the privacy server 2900 of FIG. 29), in which the brief comments may be simultaneously displayed when a pointing device rolls over a push-pin indicating a physical property associated with any of the registered users and/or the unregistered users. Also, the push-pin algorithm 3010 of the social community algorithm 2906 of FIG. 29 may be generating customized indicators of different types of users, locations, and/or interests directly in the map.

Further, the announce algorithm 3014 of the social community algorithm 2906 of FIG. 29 may distribute a message in a specified range of distance away from the registered users when a registered user purchases a message to communicate to certain ones of the registered users surrounding a geographic vicinity adjacent to the particular registered user originating the message, wherein the particular registered user purchases the message through a governmental currency and/or a number of tokens collected by the particular user (e.g. the user 2916 of FIG. 29) through a creation of content in the global neighborhood environment 1800 (e.g., the privacy server 2900 of FIG. 29).

In addition, the $N^{th}$ degree algorithm 3002 of the social community algorithm 2906 of FIG. 29 may enable the particular registered user to communicate with an unknown registered user through a common registered user known by the particular registered user and/or the unknown registered user that is an $N^{th}$ degree of separation away from the particular registered user and/or the unknown registered user.

Moreover, the profile algorithm 3012 of the social community algorithm 2906 of FIG. 29 may create a set of profiles of each one of the registered users and to enable each one of the registered users to submit media content of themselves, other registered users, and unregistered users identifiable through the map.

FIG. 31 is an exploded view of the search algorithm 2908 of FIG. 29, according to one embodiment. Particularly FIG. 31 illustrates a people search widget 300, a business search algorithm 3102, a category search widget 3104, a communication algorithm 3106, a directory assistance algorithm 3108, an embedding algorithm 3110, a no-match algorithm 3112, a range selector algorithm 3114, a chat widget 3116, a group announcement widget 3118, a Voice Over IP widget 3120, according to one embodiment.

The people search widget 3100 may help in getting the information like the address, phone number and/or e-mail id of the people of particular interest from a group and/or community. The business search algorithm 3102 may help the users (e.g., the user 2916 of FIG. 29) to find the companies, products, services, and/or business related information they need to know about.

The category search widget 3104 may narrow down searches from a broader scope (e.g., if one is interested in information from a particular center, one can go to the category under the center and enter one's query there and it will return results from that particular category only). The communication algorithm 3106 may provide/facilitate multiple by which one can communicate, people to communicate with, and subjects to communicate about among different members of the global neighborhood environment 1800 (e.g., the privacy server 2900 of FIG. 29).

The directory assistance algorithm 3108 may provide voice response assistance to users (e.g., the user 2916 of FIG. 29) assessable through a web and telephony interface of any category, business and search queries of user's of any search engine contents. The embedding algorithm 3110 may automatically extract address and/or contact info from other social networks, search engines, and content providers.

The no-match algorithm 3112 may request additional information from a verified registered user (e.g., a verified registered user 4110 of FIG. 41A-B, a verified registered user 4110 of FIG. 16) about a person, place, and business having no listing in the global neighborhood environment 1800 (e.g., the privacy server 2900 of FIG. 29) when no matches are found in a search query of the verified registered user (e.g., a verified registered user 4110 of FIG. 41A-B, a verified registered user 4110 of FIG. 16).

The chat widget 3116 may provide people to chat online, which is a way of communicating by broadcasting messages to people on the same site in real time. The group announcement widget 3118 may communicate with a group and/or community in may be by Usenet, Mailing list, calling and/or E-mail message sent to notify subscribers. The Voice over IP widget 3120 may help in routing of voice conversations over the Internet and/or through any other IP-based network. The communication algorithm 3106 may communicate directly with the people search widget 3001, the business search algorithm 3102, the category search widget 3104, the directory assistance algorithm 3108, the embedding algorithm 3110 may communicate with the no-match algorithm 3112 through the range selector algorithm 3114.

For example, a search algorithm 2908 of the global neighborhood environment 1800 (e.g., the privacy server 2900 of FIG. 29) may enable the people search, the business search, and the category search of any data in the social community algorithm (e.g., the social community algorithm 2906 of FIG. 29) and/or may enable embedding of any content in the global neighborhood environment 1800 (e.g., the privacy server 2900 of FIG. 29) in other search engines, blogs, social networks, professional networks and/or static websites.

In addition, the communicate algorithm 3106 of the search algorithm 2906 may enable voice over internet, live chat, and/or group announcement functionality in the global neighborhood environment 1800 (e.g., the privacy server 2900 of FIG. 29) among different members of the global neighborhood environment 1800 (e.g., the privacy server 2900 of FIG. 29).

Also, the directory assistance algorithm 3108 of the search algorithm 2908 may provide voice response assistance to users (e.g., the user 2916 of FIG. 29) assessable through a web and/or telephony interface of any category, business, community, and residence search queries of users (e.g., the user 2916 of FIG. 29) of any search engine embedding content of the global neighborhood environment 1800 (e.g., the privacy server 2900 of FIG. 29).

The embedding algorithm 3110 of the search algorithm 2908 may automatically extract address and/or contact info from other social networks, search engines, and content providers, and/or to enable automatic extraction of group lists from contact databases of instant messaging platforms.

Furthermore, the no-match algorithm 3112 of the search algorithm 2908 to request additional information from the verified registered user (e.g., the verified registered user 4110 of FIG. 41A-B) about a person, place, and/or business having no listing in the global neighborhood environment 1800 (e.g., the privacy server 2900 of FIG. 29) when no matches are found in a search query of the verified registered user (e.g., the verified registered user 4110 of FIG. 41A-B, the verified registered user 4110 of FIG. 16) and to create a new claimable page based on a response of the verified registered user (e.g., the verified registered user 4110 of FIG. 41A-B, the verified registered user 4110 of FIG. 16) about the at least one person, place, and/or business not previously indexed in the global neighborhood environment 1800 (e.g., the privacy server 2900 of FIG. 29).

Figure 32:
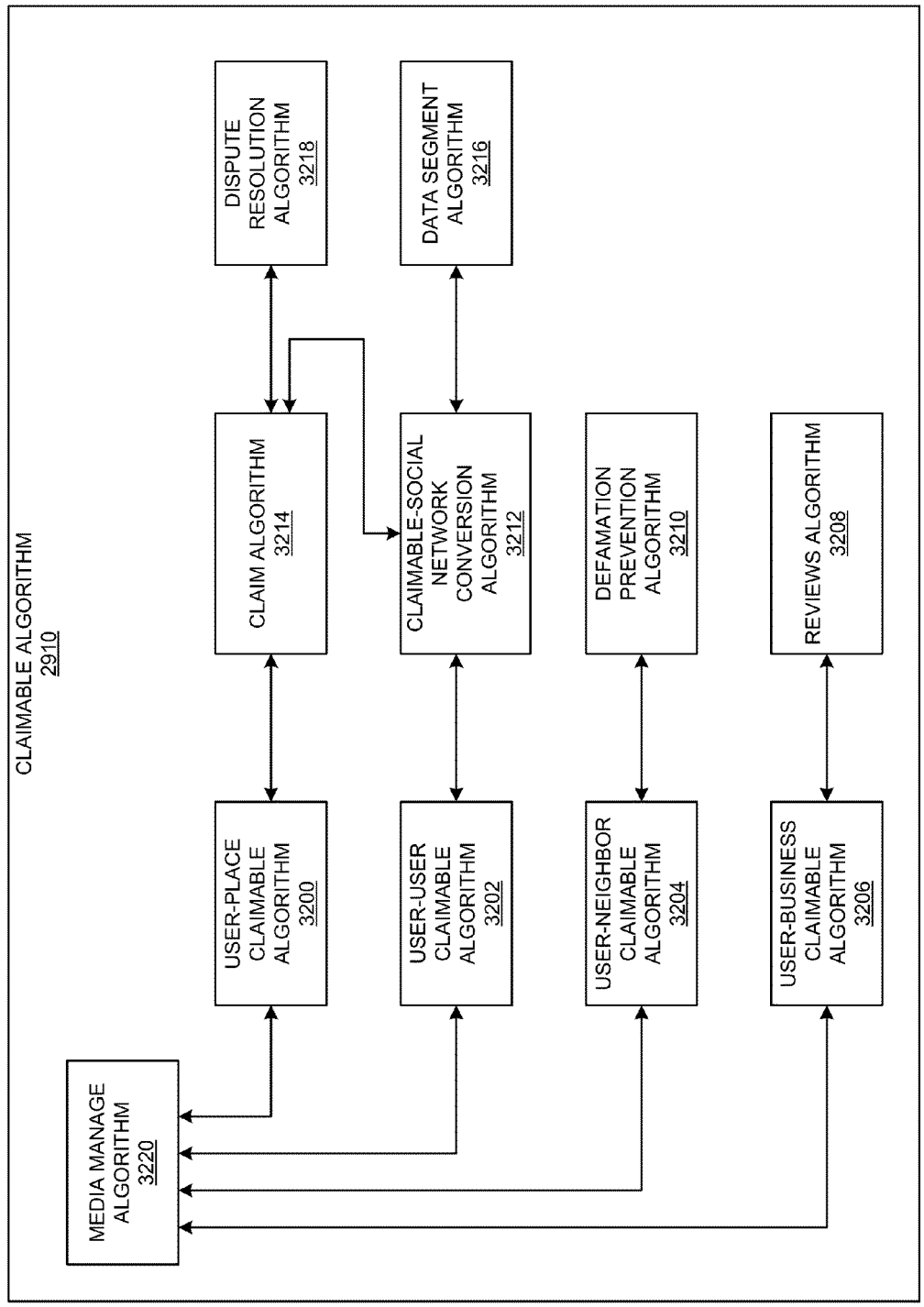
FIG. 32 is an exploded view of a claimable algorithm of FIG. 29, according to one embodiment.

FIG. 32 is an exploded view of the claimable algorithm 2910 of FIG. 29, according to one embodiment. Particularly FIG. 32 illustrates a user-place claimable algorithm 3200, a user-user claimable algorithm 3202, a user-neighbor claimable algorithm 3204, a user-business claimable algorithm 3206, a reviews algorithm 3208, a defamation prevention algorithm 3210, a claimable-social network conversion algorithm 3212, a claim algorithm 3214, a data segment algorithm 3216, a dispute resolution algorithm 3218 and a media manage algorithm 3220, according to one embodiment.

The user-place claimable algorithm 3200 may manage the information of the user (e.g., the user 2916 of FIG. 29) location in the global neighborhood environment 1800 (e.g., the privacy server 2900 of FIG. 29). The user-user claimable algorithm 3202 may manage the user (e.g., the user 2916 of FIG. 29) to view a profile of another user and geographical location in the neighborhood. The user-neighbor claimable algorithm 3204 may manage the user (e.g., the users 2916 of FIG. 29) to view the profile of the registered neighbor and/or may trace the geographical location of the user in the global neighborhood environment 1800 (e.g., the privacy server 2900 of FIG. 29). The user-business claimable algorithm 3206 may manage the profile of the user (e.g., the user 2916 of FIG. 29) managing a commercial business in the neighborhood environment. The reviews algorithm 3208 may provide remarks, local reviews and/or ratings of various businesses as contributed by the users (e.g., the user 2916 of FIG. 29) of the global neighborhood environment 1800 (e.g., the privacy server 2900 of FIG. 29). The defamation prevention algorithm 3210 may enable the registered users to modify the information associated with the unregistered users identifiable through the viewing of the physical properties.

The claimable-social network conversion algorithm 3212 of the claimable algorithm 2910 of FIG. 29 may transform the claimable profiles (e.g., the claimable profile 4006 of FIG. 40B-41A, the claimable profile 4102 of FIG. 41A, the claimable profile 1704 of FIG. 17) to social network profiles when the registered users claim the claimable profiles (e.g., the claimable profile 4006 of FIG. 40B-41A, the claimable profile 4102 of FIG. 41A, the claimable profile 1704 of FIG. 17).

The claim algorithm 3214 may enable the unregistered users to claim the physical properties associated with their residence (e.g., the residence 2918 of FIG. 29). The dispute resolution algorithm 3218 may determine a legitimate user among different unregistered users who claim a same physical property. The media manage algorithm 3220 may allow users (e.g., the user 2916 of FIG. 29) to manage and/or review a list any product from product catalog using a fully integrated, simple to use interface.

The media manage algorithm 3220 may communicate with the user-place claimable algorithm 3200, user-place claimable algorithm 3200, user-user claimable algorithm 3202, the user-neighbor claimable algorithm 3204 and the reviews algorithm 3208 through user-business claimable algorithm 3206. The user-place claimable algorithm 3200 may communicate with the dispute resolution algorithm 3218 through the claim algorithm 3214. The user-user claimable algorithm 3202 may communicate with the data segment algorithm 3216 through the claimable-social network conversion algorithm 3212. The user-neighbor claimable algorithm 3204 may communicate with the defamation prevention algorithm 3210. The user-business claimable algorithm 3206 may communicate with the reviews algorithm 3208. The claimable-social network conversion algorithm 3212 may communicate with the claim algorithm 3214.

For example, the claimable algorithm 2910 of the global neighborhood environment 1800 (e.g., the privacy server 2900 of FIG. 29) may enable the registered users to create the social network page of themselves, and may edit information associated with the unregistered users identifiable through a viewing of physical properties in which the unregistered users reside when the registered users have knowledge of characteristics associated with the unregistered users. Also, the claim algorithm 3214 of claimable algorithm 2910 may enable the unregistered users to claim the physical properties associated with their residence.

Furthermore, the dispute resolution algorithm 3218 of the claimable algorithm 2910 may determine a legitimate user of different unregistered users who claim a same physical property. The defamation prevention algorithm 3210 of the claimable algorithm 2910 may enable the registered users to modify the information associated with the unregistered users identifiable through the viewing of the physical properties, and/or to enable registered user voting of an accuracy of the information associated with the unregistered users.

Moreover, the reviews algorithm of the claimable algorithm 2910 may provide comments, local reviews and/or ratings of various businesses as contributed by the registered users and/or unregistered users of the global network environment (e.g., the privacy server 2900 of FIG. 29). The claimable-social network conversion algorithm 3212 of the claimable algorithm 2910 of FIG. 29 may transform the claimable profiles (e.g., the claimable profile 4006 of FIG. 40B-41A, the claimable profile 4102 of FIG. 41A, the claimable profile 1704 of FIG. 17) to social network profiles when the registered users claim the claimable profiles (e.g., the claimable profile 4006 of FIG. 40B-41A, the claimable profile 4102 of FIG. 41A, the claimable profile 1704 of FIG. 17).

Figure 33:
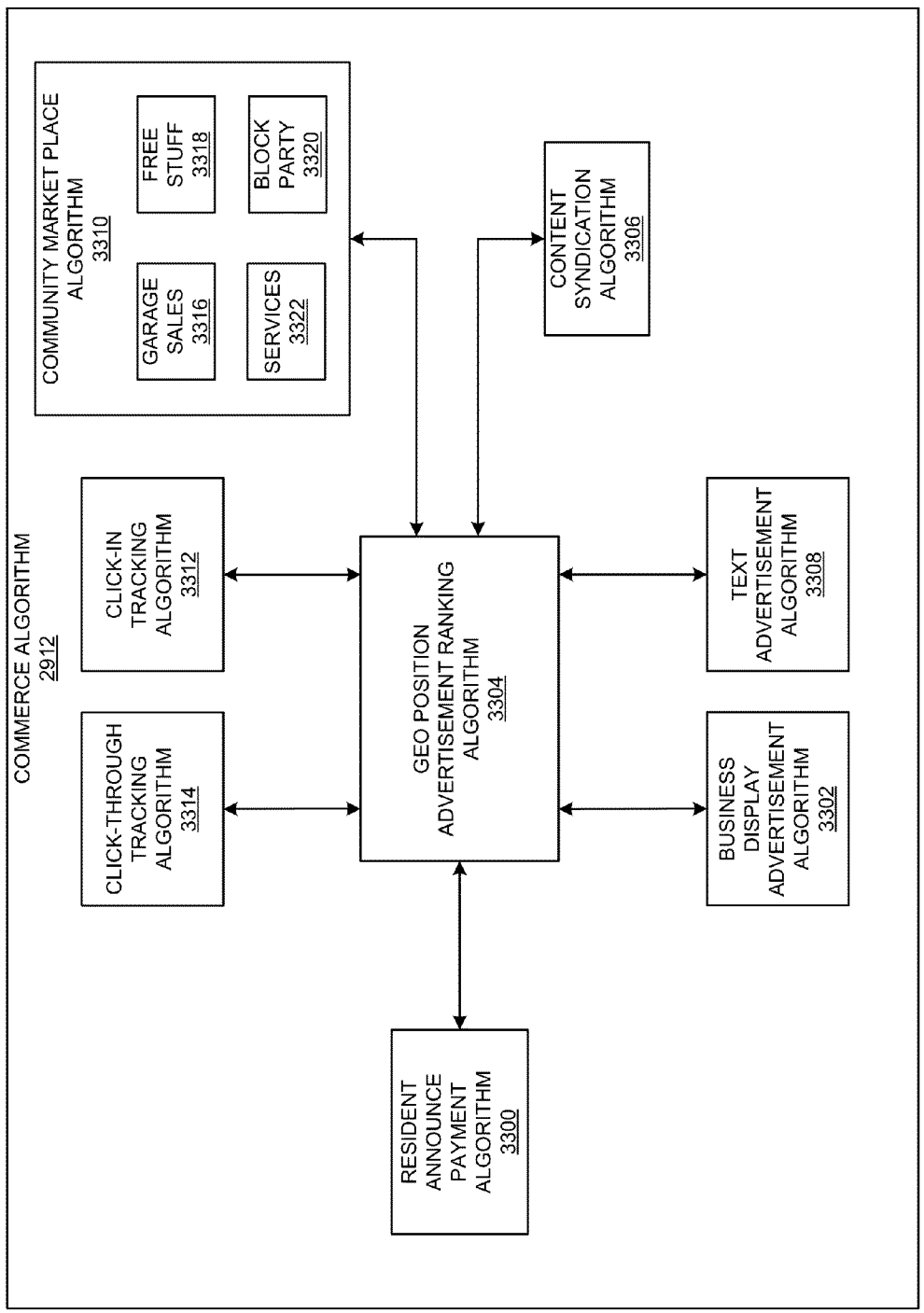
FIG. 33 is an exploded view of a commerce algorithm of FIG. 29, according to one embodiment.

FIG. 33 is an exploded view of the commerce algorithm of FIG. 29, according to one embodiment. Particularly FIG. 33 illustrates a resident announce payment algorithm 3300, a business display advertisement algorithm 3302, a geo position advertisement ranking algorithm 3304, a content syndication algorithm 3306, a text advertisement algorithm 3308, a community marketplace algorithm 3310, a click-in tracking algorithm 3312, a click-through tracking algorithm 3314, according to one embodiment.

The community marketplace algorithm 3310 may contain garage sales 3316, a free stuff 3318, a block party 3320 and a services 3322, according to one embodiment. The geo-position advertisement ranking algorithm 3304 may determine an order of the advertisement in a series of other advertisements provided in the global neighborhood environment 1800 (e.g., the privacy server 2900 of FIG. 29) by other advertisers. The click-through tracking algorithm 3314 may determine a number of clicks-through from the advertisement to a primary website of the business.

A click-in tracking algorithm 3312 may determine a number of user (e.g., the user 2916 of FIG. 29) who clicked in to the advertisement simultaneously. The community marketplace algorithm 3310 may provide a forum in which the registered users can trade and/or announce messages of trading events with at least each other. The content syndication algorithm 3306 may enable any data in the commerce algorithm (e.g., the commerce algorithm of FIG. 29) to be syndicated to other network based trading platforms.

The business display advertisement algorithm 3302 may impart advertisements related to business (e.g., the business 2922 of FIG. 29), public relations, personal selling, and/or sales promotion to promote commercial goods and services. The text advertisement algorithm 3308 may enable visibility of showing advertisements in the form of text in all dynamically created pages in the directory. The resident announce payment algorithm 3300 may take part as component in a broader and complex process, like a purchase, a contract, etc.

The block party 3320 may be a large public celebration in which many members of a single neighborhood (e.g., the neighborhood 2902A-N of FIG. 29) congregate to observe a positive event of some importance. The free stuff 3318 may be the free services (e.g., advertisement, links, etc.) available on the net. The garage sales 3316 may be services that may be designed to make the process of advertising and/or may find a garage sale more efficient and effective. The services 3322 may be non-material equivalent of a good designed to provide a list of services that may be available for the user (e.g., the user 2916 of FIG. 29).

The geo position advertisement ranking algorithm 3304 may communicate with the resident announce payment algorithm 3300, the business display advertisement algorithm 3302, the content syndication algorithm 3306, the text advertisement algorithm 3308, the community marketplace algorithm 3310, the click-in tracking algorithm 3312 and the click-through tracking algorithm 3314.

For example, the commerce algorithm 2908 of the global neighborhood environment 1800 (e.g., the privacy server 2900 of FIG. 29) may provide an advertisement system to a business which may purchase their location in the global neighborhood environment 1800 (e.g., the privacy server 2900 of FIG. 29) in which the advertisement may be viewable concurrently with a map indicating a location of the business, and/or in which revenue may be attributed to the global neighborhood environment 1800 (e.g., the privacy server 2900 of FIG. 29) when the registered users and/or the unregistered users click-in on a simultaneously displayed data of the advertisement along with the map indicating a location of the business.

Also, the geo-position advertisement ranking algorithm 3304 of the commerce algorithm to determine an order of the advertisement in a series of other advertisements provided in the global neighborhood environment 1800 (e.g., the privacy server 2900 of FIG. 29) by other advertisers, wherein the advertisement may be a display advertisement, a text advertisement, and/or an employment recruiting portal associated with the business that may be simultaneously displayed with the map indicating the location of the business.

Moreover, the click-through tracking algorithm 3314 of the commerce algorithm of FIG. 29 may determine a number of click-through from the advertisement to a primary website of the business. In addition, the click in tracking algorithm 3312 of the commerce algorithm may determine the number of users (e.g., the user 2916 of FIG. 29) who clicked in to the advertisement simultaneously displayed with the map indicating the location of the business.

The community marketplace algorithm 3310 of the commerce algorithm of FIG. 29 may provide a forum in which the registered users may trade and/or announce messages of trading events with certain registered users in geographic proximity from each other.

Also, the content syndication algorithm 3306 of the commerce algorithm of the FIG. 29 may enable any data in the commerce algorithm to be syndicated to other network based trading platforms.

Figure 34:
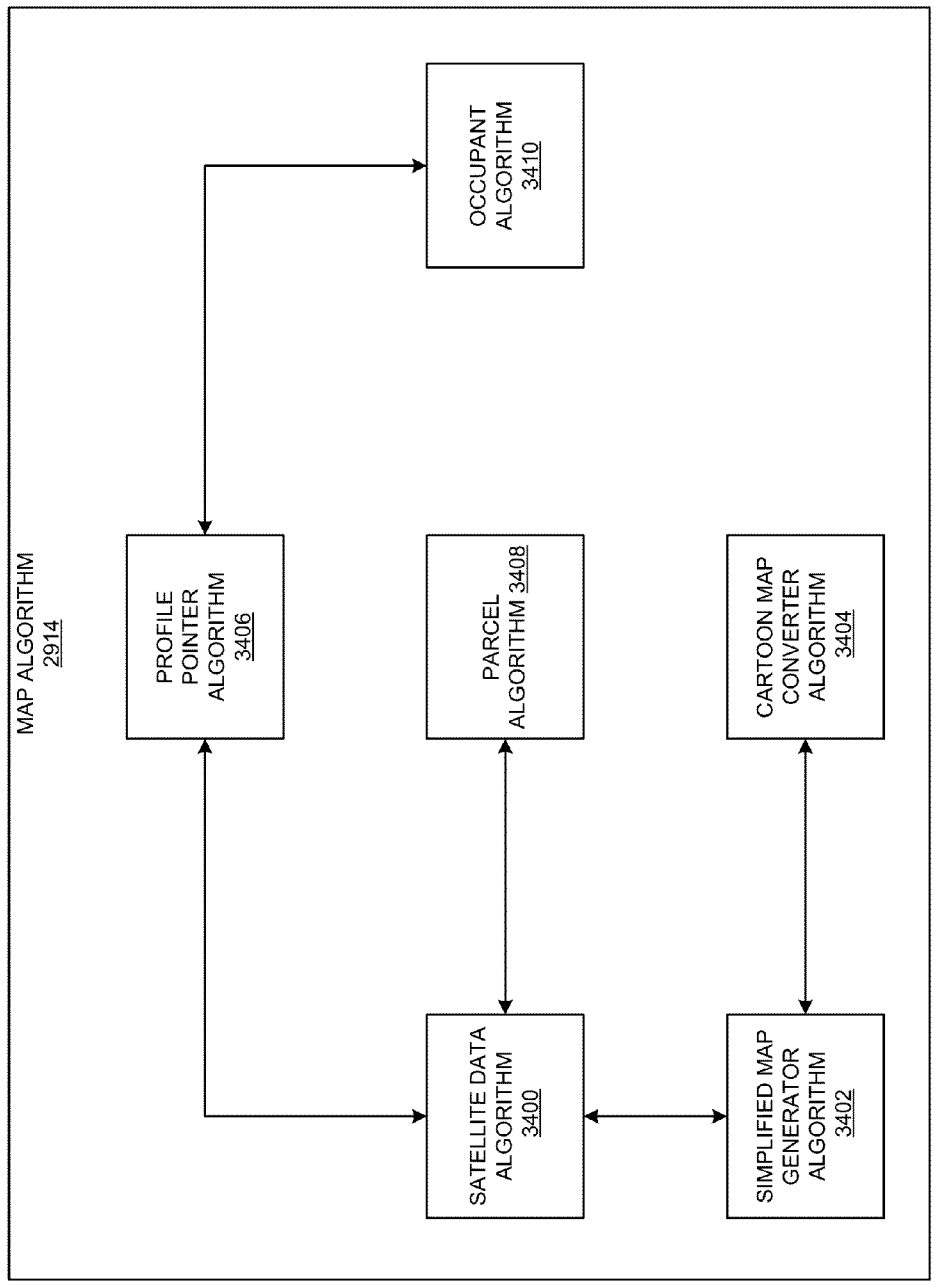
FIG. 34 is an exploded view of a map algorithm of FIG. 29, according to one embodiment.

FIG. 34 is an exploded view of a map algorithm 2914 of FIG. 29, according to one embodiment. Particularly FIG. 34 may include a satellite data algorithm 3400, a simplified map generator algorithm 3402, a cartoon map converter algorithm 3404, a profile pointer algorithm 3406, a parcel algorithm 3408 and occupant algorithm 3410, according to one embodiment. The satellite data algorithm 3400 may help in mass broadcasting (e.g., maps) and/or as telecommunications relays in the map algorithm 2914 of FIG. 29.

The simplified map generator algorithm 3402 may receive the data (e.g., maps) from the satellite data algorithm 3400 and/or may convert this complex map into a simplified map with fewer colors. The cartoon map converter algorithm 3404 may apply a filter to the satellite data (e.g., data generated by the satellite data algorithm 3400 of FIG. 34) into a simplified polygon based representation.

The parcel algorithm 3408 may identify some residence, civic, and business locations in the satellite data (e.g., the satellite data algorithm 3400 of FIG. 34). The occupant algorithm 3410 may detect the geographical location of the registered user in the global neighborhood environment 1800 (e.g., the privacy server 2900 of FIG. 29). The profile pointer algorithm 3406 may detect the profiles of the registered user via the data received from the satellite. The cartoon map converter algorithm 3404 may communicate with, the satellite data algorithm 3400, the simplified map generator algorithm 3402, the profile pointer algorithm 3406 and the occupant algorithm 3410. The parcel algorithm 3408 may communicate with the satellite data algorithm 3400.

For example, a map algorithm 2914 of the global neighborhood environment 1800 (e.g., the privacy server 2900 of FIG. 29) may include a map data associated with a satellite data (e.g., data generated by the satellite data algorithm 3400 of FIG. 34) which serves as a basis of rendering the map in the global neighborhood environment 1800 (e.g., the privacy server 2900 of FIG. 29) and/or which includes a simplified map generator (e.g., the simplified map generator algorithm 3402 of FIG. 34) which may transform the map to a fewer color and location complex form using a parcel data which identifies residence, civic, and business locations in the satellite data.

Also, the cartoon map converter algorithm 3404 in the map algorithm 2914 may apply a filter to the satellite data (e.g., data generated by the satellite data algorithm 3400 of FIG. 34) to transform the satellite data into a simplified polygon based representation using a Bezier curve algorithm that converts point data of the satellite data to a simplified form.

FIG. 35 is a table view of user address details, according to one embodiment. Particularly the table 3550 of FIG. 35 illustrates a user field 3500, a verified? field 3502, a range field 3504, a principle address field 3506, a links field 3508, a contributed? field 3510 and an others field 3512, according to one embodiment. The table 3550 may include the information related to the address verification of the user (e.g., the user 2916 of FIG. 29). The user field 3500 may include information such as the names of the registered users in a global neighborhood environment 1800 (e.g., a privacy server 2900 of FIG. 29).

The verified? field 3502 may indicate the status whether the data, profiles and/or email address received from various registered user are validated or not. The range field 3504 may correspond to the distance of a particular registered user geographical location in the global neighborhood environment 1800 (e.g., the privacy server 2900 of FIG. 29).

The principal address field 3506 may display primary address of the registered user in the global neighborhood environment 1800 (e.g., the privacy server 2900 of FIG. 29). The links field 3508 may further give more accurate details and/or links of the address of the user (e.g., the user 2916 of FIG. 29). The contributed? field 3510 may provide the user with the details of another individual and/or users contribution towards the neighborhood environment (e.g., the privacy server 2900 of FIG. 29). The other(s) field 3512 may display the details like the state, city, zip and/or others of the user's location in the global neighborhood environment 1800 (e.g., the privacy server 2900 of FIG. 29).

The user field 3500 displays "Joe" in the first row and "Jane" in the second row of the user field 3500 column of the table 3550 illustrated in FIG. 7. The verified field? 3502 displays "Yes" in the first row and "No" in the second row of the verified? field 3502 column of the table 3550 illustrated in FIG. 7. The range field 3504 displays "5 miles" in the first row and "Not enabled" in the second row of the range field 3504 column of the table 3550 illustrated in FIG. 7. The principal address field 3506 displays "500 Clifford Cupertino, Calif." in the first row and "500 Johnson Cupertino, Calif." in the second row of the principle address field 3506 column of the table 3550 illustrated in FIG. 7. The links field 3508 displays "859 Bette, 854 Bette" in the first row and "851 Bette 2900 Steven's Road" in the second row of the links field 3508 column of the table 3550 illustrated in FIG. 7.

The contributed? field 3510 displays "858 Bette Cupertino, Calif., Farallone, Calif." in the first row and "500 Hamilton, Palo Alto, Calif., 1905E. University" in the second row of the contributed field 3510 column of the table 3550 illustrated in FIG. 7. The other(s) field 3512 displays "City, State, Zip, other" in the first row of the other(s) field 3512 column of the table 3550 illustrated in FIG. 7.

FIG. 36 is a user interface view of the social community algorithm 2906, according to one embodiment. The social community view 3650 may display the information associated with the social community algorithm (e.g., the social community algorithm 2906 of FIG. 29). The social community view 3650 may display map of the verified geographic location associated with the user profile of the social community algorithm (e.g., the social community algorithm 2906 of FIG. 29). The social community view 3650 may display the map based geographic location associated with the user profile (e.g., the user profile 4000 of FIG. 40A) only after verifying the address of the registered user of the global neighborhood environment 1800 (e.g., the privacy server 2900 of FIG. 29).

In addition, the social community view 3650 may provide a building creator (e.g., the building builder 1602 of FIG. 16), in which the registered users of the global neighborhood environment 1800 (e.g., the privacy server 2900 of FIG. 29) may create and/or modify empty claimable profiles (e.g., a claimable profile 4006 of FIG. 40B-41A, a claimable profile 4102 of FIG. 41A, a claimable profile 1704 of FIG. 17), building layouts, social network pages, etc. The social community view 3650 of the social community algorithm 2906 may enable access to the user (e.g., the user 2916 of FIG. 29) to model a condo on any floor (e.g., basement, ground floor, first floor, etc.) selected through the drop down box by the registered user of the global neighborhood environment 1800 (e.g., the privacy server 2900 of FIG. 29). The social community view 3650 of the social community algorithm (e.g., the social community algorithm 2906 of FIG. 29) may enable the registered user of the global neighborhood environment 1800 (e.g., the privacy server 2900 of FIG. 29) to contribute information about their neighbors (e.g., the neighbor 2920 of FIG. 29).

Figure 37:
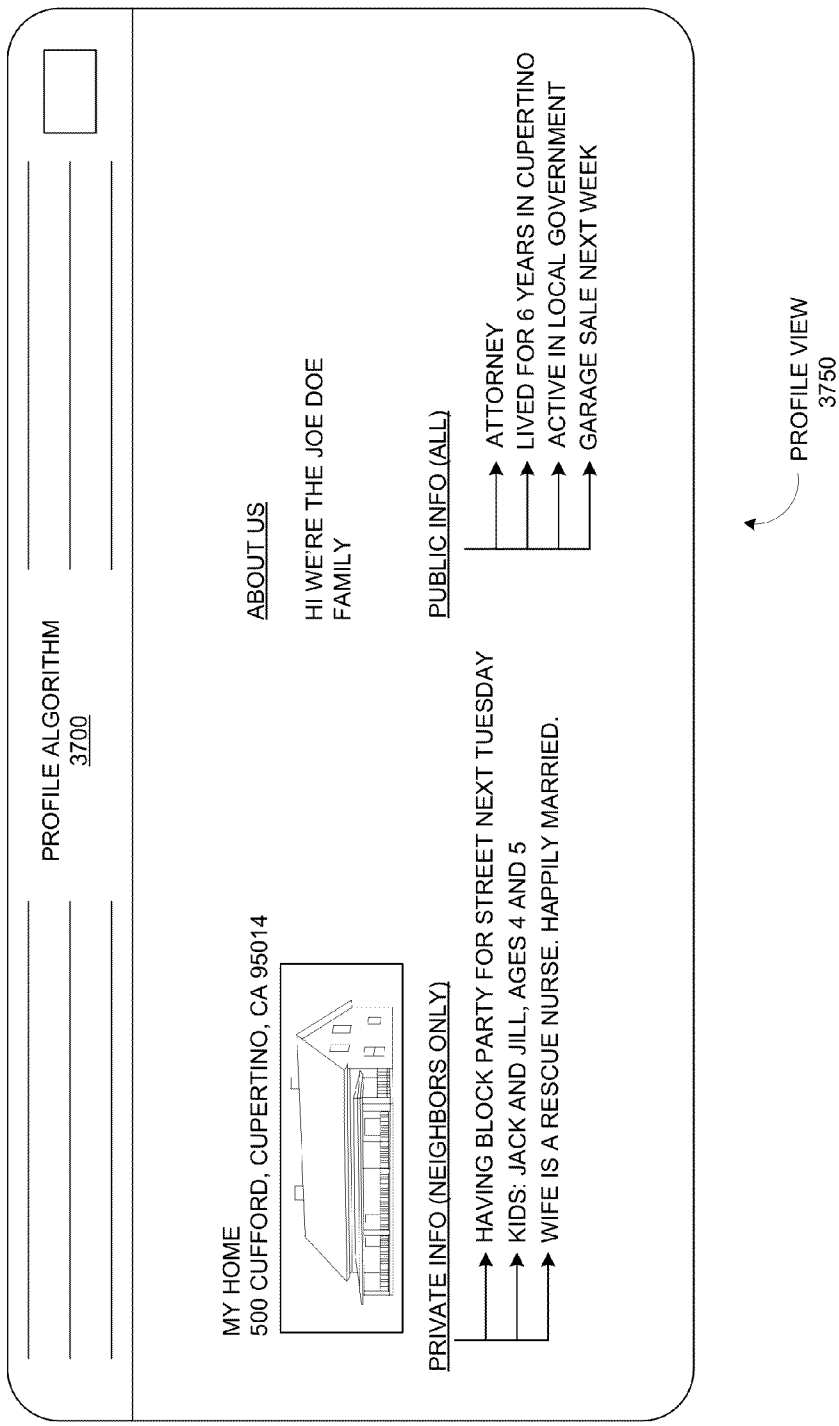
FIG. 37 is a profile view of a profile algorithm, according to one embodiment.

FIG. 37 is a profile view 3750 of a profile algorithm 3700, according to one embodiment. The profile view 3750 of profile algorithm 3700 may offer the registered user to access the profile about the neighbors (e.g., the neighbor 2920 of FIG. 29). The profile view 3750 of profile algorithm 3700 may indicate the information associated with the profile of the registered user of the global neighborhood environment 1800 (e.g., the privacy server 2900 of FIG. 29). The profile view 3750 may display the address of the registered user. The profile view 3750 may also display events organized by the neighbors (e.g., the neighbor 2920 of FIG. 29), history of the neighbors (e.g., the neighbor 2920 of FIG. 29), and/or may also offer the information (e.g., public, private, etc.) associated with the family of the neighbors (e.g., the neighbor 2920 of FIG. 29) located in the locality of the user (e.g., the user(s) 2916 of FIG. 29) of the global neighborhood environment 1800 (e.g., the privacy server 2900 of FIG. 29).

FIG. 38 is a contribute view 3850 of a neighborhood network algorithm 3800, according to one embodiment. The contribute view 3850 of the neighborhood network algorithm 3800 may enable the registered user of the global neighborhood environment 1800 (e.g., the privacy server 2900 of FIG. 29) to add information about their neighbors in the neighborhood network. The contribute view 3850 of the neighborhood network algorithm 3800 may offer registered user of the global neighborhood environment 1800 (e.g., the privacy server 2900 of FIG. 29) to add valuable notes associated with the family, events, private information, etc.

Figure 39:
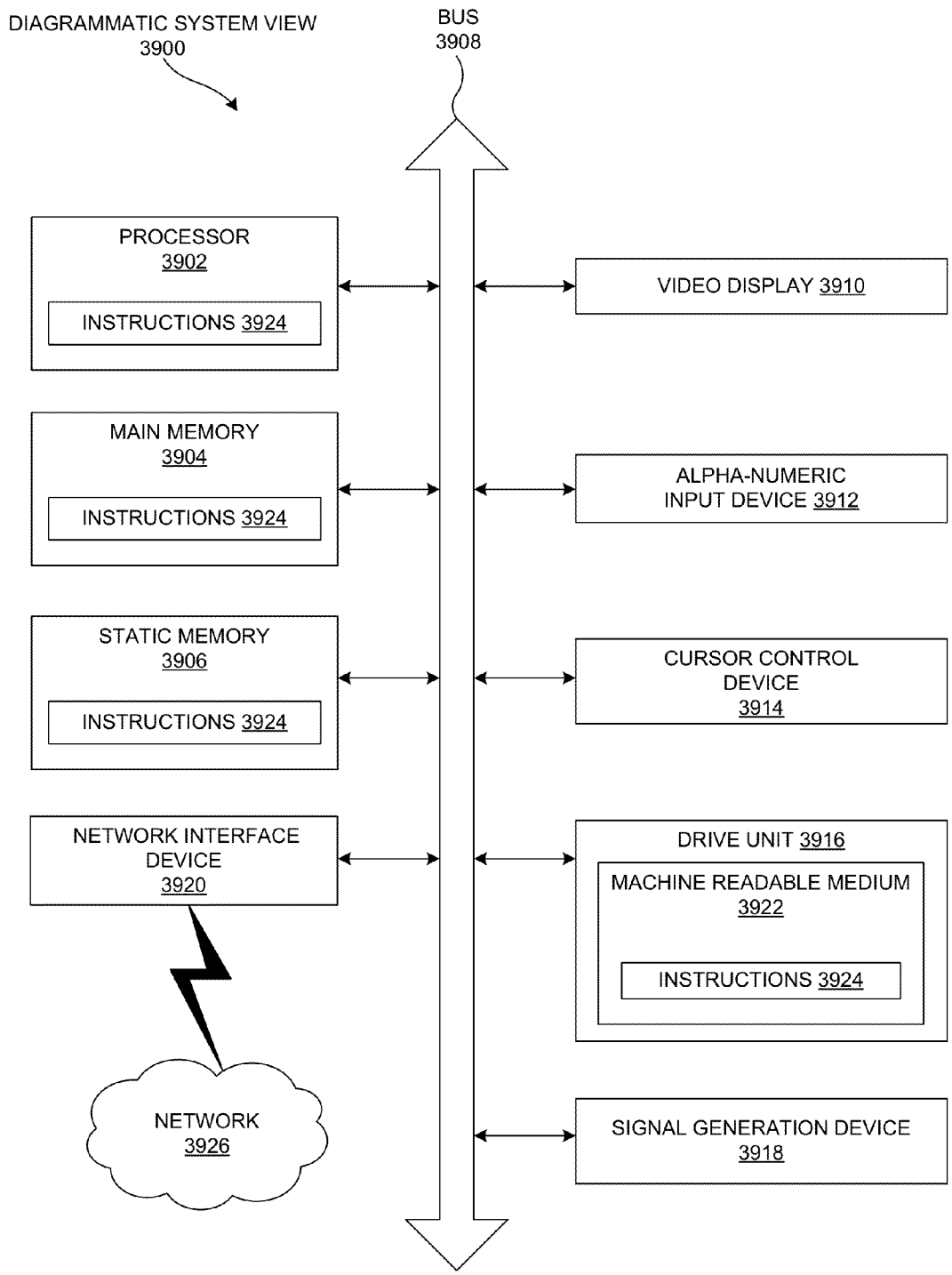
FIG. 39 is a diagrammatic system view of a data processing system in which any of the embodiments disclosed herein may be performed, according to one embodiment.

FIG. 39 is a diagrammatic system view, according to one embodiment. FIG. 39 is a diagrammatic system view 3900 of a data processing system in which any of the embodiments disclosed herein may be performed, according to one embodiment. Particularly, the system view 3900 of FIG. 39 illustrates a processor 3902, a main memory 3904, a static memory 3906, a bus 3908, a video display 3910, an alpha-numeric input device 3912, a cursor control device 3914, a drive unit 3916, a signal generation device 3918, a network interface device 3920, a machine readable medium 3922, instructions 3924, and a network 3926, according to one embodiment.

The diagrammatic system view 3900 may indicate a personal computer and/or a data processing system in which one or more operations disclosed herein are performed. The processor 3902 may be microprocessor, a state machine, an application specific integrated circuit, a field programmable gate array, etc. (e.g., Intel® Pentium® processor). The main memory 3904 may be a dynamic random access memory and/or a primary memory of a computer system.

The static memory 3906 may be a hard drive, a flash drive, and/or other memory information associated with the data processing system. The bus 3908 may be an interconnection between various circuits and/or structures of the data processing system. The video display 3910 may provide graphical representation of information on the data processing system. The alpha-numeric input device 3912 may be a keypad, keyboard and/or any other input device of text (e.g., a special device to aid the physically handicapped). The cursor control device 3914 may be a pointing device such as a mouse.

The drive unit 3916 may be a hard drive, a storage system, and/or other longer term storage subsystem. The signal generation device 3918 may be a bios and/or a functional operating system of the data processing system. The machine readable medium 3922 may provide instructions on which any of the methods disclosed herein may be performed. The instructions 3924 may provide source code and/or data code to the processor 3902 to enable any one/or more operations disclosed herein.

FIG. 40A is a user interface view of mapping a user profile 4000 of the geographic location 4004, according to one embodiment. In the example embodiment illustrated in FIG. 40A, the user profile 4000 may contain the information associated with the geographic location 4004. The user profile 4000 may contain the information associated with the registered user. The user profile 4000 may contain information such as address user of the verified geographic location, name of the occupant, profession of the occupant, details, phone number, educational qualification, etc.

The map 4002 may indicate the global neighborhood environment 1800 (e.g., the privacy server 2900 of FIG. 29) of the geographical location 4004, a claimable profile 4006 (e.g., the claimable profile 4102 of FIG. 41A, the claimable profile 1704 of FIG. 17), and a delisted profile 4008. The geographical location 4004 may be associated with the user profile 4000. The claimable profile 4006 may be the claimable profile 4006 associated with the neighboring property surrounding the geographic location 4004. The delisted profile 4008 illustrated in example embodiment of FIG. 40A, may be the claimable profile 4006 that may be delisted when the registered user claims the physical property. The tag 4010 illustrated in the example embodiment of FIG. 40A may be associated with hobbies, personal likes, etc. The block 4016 may be associated with events, requirements, etc. that may be displayed by the members of the global neighborhood environment 1800 (e.g., the privacy server 2900 of FIG. 29).

For example, a verified registered user (e.g., a verified registered user 4110 of FIG. 41A-B, a verified registered user 4110 of FIG. 16) may be associated with a user profile 4000. The user profile 4000 may be associated with a verified geographic location. A map concurrently displaying the user profile 4000 and the verified geographic location 4004 may be generated. Also, the claimable profiles 4006 associated with different geographic locations surrounding the verified geographic location associated with the user profile 4000 may be simultaneously generated in the map. In addition, a query of the user profile 4000 and/or the verified geographic location may be processed.

Similarly, a tag data (e.g., the tags 4010 of FIG. 40A) associated with the verified geographic locations, a particular geographic location, and the delisted geographic location may be processed. A frequent one of the tag data (e.g., the tags 4010 of FIG. 40A) may be displayed when the verified geographic location and/or the particular geographic location is made active, but not when a geographic location is delisted.

Figure 40B:
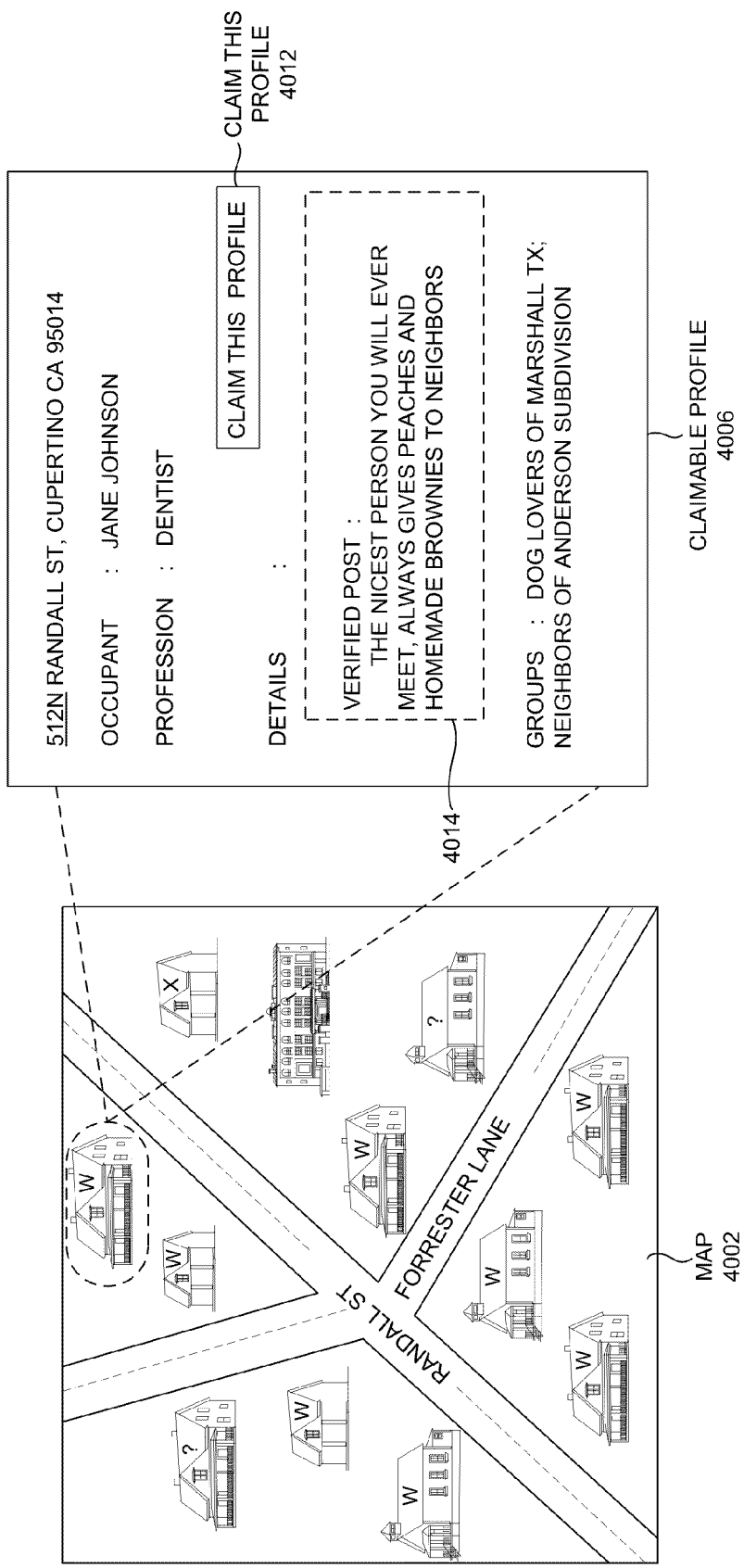
FIG. 40B is a user interface view of mapping of the claimable profile, according to one embodiment.

FIG. 40B is a user interface view of mapping of the claimable profile 4006, according to one embodiment. In the example embodiment illustrated in FIG. 40B, the map 4002 may indicate the geographic locations in the global neighborhood environment 1800 (e.g., the privacy server 2900 of FIG. 29) and/or may also indicate the geographic location of the claimable profile 4006. The claimable profile 4006 may display the information associated with the registered user of the global neighborhood environment 1800 (e.g., the privacy server 2900 of FIG. 29). The link claim this profile 4012 may enable the registered user to claim the claimable profile 4006 and/or may also allow the verified registered user (e.g., the verified registered user 4110 of FIG. 41A-B) to edit any information in the claimable profiles 4006. The block 4014 may display the information posted by any of the verified registered users (e.g., the verified registered user 4110 of FIG. 41A-B, the verified registered user 4110 of FIG. 16) of the global neighborhood environment 1800 (e.g., the privacy server 2900 of FIG. 29).

For example, a particular claimable profile (e.g., the particular claimable profile may be associated with a neighboring property to the specific property in the neighborhood) of the claimable profiles (e.g., the claimable profile 4102 of FIG. 41A, the claimable profile 1704 of FIG. 17) may be converted to another user profile (e.g., the user profile may be tied to a specific property in a neighborhood) when a different registered user (e.g., the user 2916 of FIG. 29) claims a particular geographic location to the verified geographic location associated with the particular claimable profile.

In addition, a certain claimable profile of the claimable profiles may be delisted when a private registered user claims a certain geographic location (e.g., the geographical location 4004 of FIG. 40A) adjacent to the verified geographic location and/or the particular geographic location. Also, the certain claimable profile in the map 4002 may be masked when the certain claimable profile is delisted through the request of the private registered user.

Furthermore, a tag data (e.g., the tags 4010 of FIG. 40A) associated with the verified geographic location, the particular geographic location, and the delisted geographic location may be processed. A frequent one of the tag data may be displayed when the verified geographic location and/or the particular geographic location are made active, but not when a geographic location is delisted.

Moreover, the verified registered user (e.g., the verified registered user 4110 of FIG. 41A-B, the verified registered user 4110 of FIG. 16) may be permitted to edit any information in the claimable profiles 4006 including the particular claimable profile 4006 and/or the certain claimable profile until the certain claimable profile may be claimed by the different registered user and/or the private registered user. In addition, a claimant of any claimable profile 4006 may be enabled to control what information is displayed on their user profile. Also, the claimant may be allowed to segregate certain information on their user profile 4000 such that only other registered users directly connected to the claimant are able to view data on their user profile 4000.

FIG. 41A is a user interface view of mapping of a claimable profile 4102 of the commercial user 4100, according to one embodiment. In the example embodiment illustrated in FIG. 41A, the commercial user 4100 may be associated with the customizable business profile 4104 located in the commercial geographical location. The claimable profile 4102 may contain the information associated with the commercial user 4100. The claimable profile 4102 may contain the information such as address, name, profession, tag, details (e.g., ratings), and educational qualification etc. of the commercial user 4100. The verified registered user 4110 may be user associated with the global neighborhood environment 1800 (e.g., the privacy server 2900 of FIG. 29) and may communicate a message to the neighborhood commercial user 4100.

For example, a payment of the commercial user 4100 and the verified registered user 4110 may be processed.

FIG. 41B is a user interface view of mapping of customizable business profile 4104 of the commercial user 4100, according to one embodiment. In the example embodiment illustrated in FIG. 41B, the commercial user 4100 may be associated with the customizable business profile 4104. The customizable business profile 4104 may be profile of any business firm (e.g., restaurant, hotels, supermarket, etc.) that may contain information such as address, occupant name, profession of the customizable business. The customizable business profile 4104 may also enable the verified registered user 4110 to place online order for the products.

For example, the commercial user 4100 may be permitted to purchase a customizable business profile 4104 associated with a commercial geographic location. Also, the verified registered user 4110 may be enabled to communicate a message to the global neighborhood environment 1800 (e.g., the privacy server 2900 of FIG. 29) based on a selectable distance range away from the verified geographic location. In addition, a payment of the commercial user 4100 and/or the verified registered user 4110 may be processed.

A target advertisement 4106 may display the information associated with the offers and/or events of the customizable business. The display advertisement 4108 may display ads of the products of the customizable business that may be displayed to urge the verified registered user 4110 to buy the products of the customizable business. The verified registered user 4110 may be user associated with the global neighborhood environment 1800 (e.g., the privacy server 2900 of FIG. 29) that may communicate a message to the commercial user 4100 and/or may be interested in buying the products of the customizable business.

People in suburbia and urban cities now may not even know who their neighbors are. Communities have become more insular. There may be a few active people in each neighborhood who know about their neighborhood and are willing to share what they know with others. They should be able to share this information with others through the Internet. Many people want to know who their neighbors are and express themselves and their families through the internet. People want to also know about recommendations and what kind of civic and cultural things are in the neighborhood. What is contemplated includes: A social network for people who want to get to know their neighbors and/or neighborhoods. Particularly, one in which a set of maps of neighborhoods (e.g., such as those on Zillow.com or provided through Google® or Microsoft®) are used as a basis on which a user can identify themselves with a particular address. This address may be verified through one or more of the algorithms on FIG. 29. Particularly, this address may be the current address of the user is living, a previous address where the user used to live, etc.

The address may be verified through a credit check of the user, or a copy of the user's drivers license. Once the user is approved in a particular home/location, the user can leave their comments about their home. They can mark their home information proprietary, so that no one else can contribute to their info without their permission. They can have separate private and public sections, in which the private section is shared with only verified addresses of neighbors, and the public section is shared with anybody viewing their profile. The user can then create separate social networking pages for homes, churches, locations, etc. surrounding his verified address. As such, the user can express him/herself through their profile, and contribute information about what they're neighborhood is like and who lives there. Only verified individuals or entities might be able to view information in that neighborhood.

The more information the user contributes, the higher his or her status will be in the neighborhood through a marker (e.g., a number of stars), or through additional services offered to the neighbor, such as the ability to search a profiles of neighbors in a larger distance range from a verified address of the user. For example, initially, the user may only be able to search profiles within 1 mile on their principal, current home after being verified as living in there. When they create a profiles for themselves and/or contribute profiles of other people, they may widen their net of private profiles they may be allowed to search (e.g., because they become a trusted party in the neighborhood by offering civic information). Neighbors can leave feedback for each other, and arrange private block parties, etc. through their private profile. All these features may possible through one or more of the embodiments and/or algorithms illustrated in FIGS. 1-41B. Through their public profile, neighbors can know if there is a doctor living down the street, or an attorney around the corner. The FIGS. 1-41B illustrate various embodiments that may be realized. While a description is given here, a self-evident description can be derived for the software and various methods, software, and hardware directly from the attached Figures.

A neighborhood expression and user contribution system is disclosed. In one aspect, the technology allows users to see the value of millions of homes across the United States and/or the world, not just those that the user themselves own or live in, because they can share information about their neighbors. People living in apartments or condos can use the apartment/condo modeler wizard (e.g., as illustrated in FIG. 29) to create models (e.g. 2 or 3d) of their building and share information about their apartment/home and of their neighbors with others. The technology has an integrated targeted advertising system for enabling advertisers to make money through the social community algorithm 2900 by delivering targeted and non-targeted advertisements.

Aside from giving user generated content of information of homes, the system may also provide value estimates of homes it may also offers several unique features including value changes of each home in a given time frame (e.g. 1, 5, or 10 years) and aerial views of homes as well as the price of the surrounding homes in the area. It may also provides basic data of a given home such as square footage and the number of bedrooms and bathrooms. Users may can also obtain current estimates of homes if there was a significant change made such as recently modeled kitchen.

In the example systems and methods illustrated in FIGS. 1-41B, neighbors may get to know each other and their surrounding businesses more easily through the Internet. The user interface view of the social community algorithm may include a searchable map interface and/or a social networking page on the right when one clicks a particular home/location. The map interface may/may not include information about prices of a home, or information about the number of bedrooms of a home, etc. In essence, certain critical input information may be divided as follows:

Residential location: (1) name of the persons/family living in that residence (2) Their profession if any 3) Their educational background if any (4) Their recreational interests (5) About their family description box (6) Anything else people want to post about that person including their interests, hobbies, etc. (7) An ability for users to leave endorsements.

Business location or civic location (e.g., park, govt. building, church, etc.): (1) name of the business/location (2) email of the manager of the business/location (3) phone number of the business/location if known (4) anything else people want to say about the business (good or bad), for example, contributable through a claimable.

These two will be the primary types. Various features differentiate example embodiments of the social community algorithm from other social networks. These differentiators include (1) interface driven by address (2) maps that can be viewed, zoomed in on, tied to a parcel #, etc. (3) Anyone can populate anyone's social network page. (4) Anybody can post in one of the boxes. They can post anonymously or publicly (5) If someone wants to override information that already has been established, they will need to have an identity (e.g., user name), to override published posting information.

However, according to one embodiment, if an owner of an entity location wishes to mark their location private, and uneditable by the public without their permission, they will need to pay (e.g., a monthly fixed fee) through the social community algorithm. Alternatively, the owner of the entity location may not need to pay to mark the location as private and uneditable by the public without the owner's permission. Example embodiments of the social community algorithm may feature info about businesses. They may also feature info about people that live in the homes, and may/may not display information on prices, number of bedrooms, etc.

The social community algorithm (e.g., as described in FIG. 29) may be a search engine (e.g., Google®, Yahoo®, etc.) that uses maps (e.g., satellite map views) instead of text displays to show information, user profiles, reviews, promotions, ads, directions, events, etc. relevant to user searches.

The example systems and methods illustrated in FIGS. 1-41B may facilitate a social network membership that spreads virally by users inviting their friends. For example, every person that registers has their own profile, but registration may not be required to contribute content. However, registration may be required to "own" content on your own home, and have override permission to delete things that you don't like about yourself listed about you by others. In one embodiment, the social community algorithm may need to confirm the user's identity and address (e.g., using digital signature tools, drivers license verification, etc.), and/or the user may need to pay a monthly fixed fee (e.g., through a credit card) to control their identity.

For example, they can get a rebate, and not have to pay the monthly fee for a particular month, if they invite at least 15 people that month AND contribute information about at least 10 of their neighbors, friends, civic, or business locations in their neighborhood. People can post pics of their family, their business, their home, etc. on their profile once they 'own' their home and register. In another embodiment, endorsements for neighbors by others will be published automatically. People can search for other people by descriptors (e.g., name, profession, distance away from me, etc.)

Profiles of users may be created and/or generated on the fly, e.g., when one clicks on a home.

People may be able to visually see directions to their neighborhood businesses, rather than reading directions through text in a first phase. After time, directions (e.g., routes) can be offered as well. Users can leave their opinions on businesses, but the social community algorithm also enables users to leave opinions on neighbors, occupants or any entity having a profile on the map display. The social community algorithm may not attempt to restrict freedom of speech by the users, but may voluntarily delete slanderous, libelous information on the request of an owner manually at any time.

In one embodiment, the methods and systems illustrated in FIGS. 1-41B enable people to search for things they want e.g. nearby pizzas etc. (e.g., by distance away). Advertisers can 'own' their listing by placing a display ad on nextdoor.com. Instead of click-through revenues when someone leaves the site, revenues will be realized when the link is clicked and someone views a preview html on the right of the visual map. Targeted advertisements may also be placed when someone searches a particular street, name, city, etc.

In another example embodiment, the social community algorithm may enable users of the social network to populate profiles for apartments, buildings, condos, etc. People can create floors, layout, etc. of their building, and add social network pages on the fly when they click on a location that has multiple residents, tenants, or lessees.

A user interface associated with the social community algorithm 2900 may be clean, simple, and uncluttered (e.g., Simple message of "get to know your neighbors"). For example, the map interface shows neighbors. Methods and systems associated with the features described may focus on user experience, e.g., ensuring a compelling message to invite friends and/or others to join. A seed phase for implementation of the methods and systems illustrated in FIGS. 1-41B may be identified for building a membership associated with the social community algorithm.

For example, a user having extensive networks in a certain area (e.g., a city) may seed those communities as well. The social network may encourage user expression, user content creation, ease of use on site to get maximum users/distribution as quickly as possible. In another embodiment, the social community algorithm may ensure that infrastructure associated with operation of the social community algorithm (e.g., servers) are able to handle load (e.g., data traffic) and keep up with expected growth.

For example, the user interface view illustrated in the various figures shows an example embodiment of the social community algorithm of FIG. 29. The user interface view may include a publicly editable profile wall section allowing public postings that owners of the profile can edit. For example, any user may be able to post on an empty profile wall, but a user must claim the location to own the profile (e.g., may minimize barriers to users posting comments on profile walls).

Names featured on the profile wall may be links to the user profiles on the map (e.g., giving an immediate sense for the location of admirers (or detractors) relative to user location). In one embodiment, an action (e.g., mouse-over) on a comment would highlight the comment user's house on the map and names linking to user profiles. The user interface view may also utilize the mapping interface to link comments to locations.

For example, the various embodiments illustrate a comment announcing a garage sale, that is tied to a mappable location on the mapping interface. (e.g., allows people to browse references directly from people's profiles.). In the various figures, an example display of the mapping interface is illustrated. In this example display, houses are shown in green, a church is shown in white, the red house shows the selected location and/or the profile owner's house, question marks indicate locations without profile owners, blue buildings are commercial locations, and the pink building represents an apartment complex.

Houses with stars indicate people associated with (e.g., "friends") of the current user. In one embodiment, a user action (e.g., mouse-over) on a commercial property displayed in the mapping interface may pull up a star (e.g., "***") rating based on user reviews, and/or a link to the profile for the property. A mouse-over action on the apartment complex may pull up a building schematic for the complex with floor plans, on which the user can see friends/profiles for various floors or rooms. Question marks indicated in the display may prompt users to own that profile or post comments on the wall for that space. A user action on any house displayed in the mapping interface may pull up a profile link, summary info such as status, profession, interests, etc. associated with the profile owner, a link to add the person as a friend, and/or a link to send a message to the user (e.g., the profile owner).

In another embodiment, a default profile view shown is that of the current user (e.g., logged in), and if the user clicks on any other profile, it may show their profile in that space instead (with few text changes to indicate different person). The events in your area view of the profile display in may have a default radius for notification of events (e.g., by street, by block, by neighborhood, county, etc.) Events are associated with user profiles and may link to locations displayed on the mapping interfaces. The hot picks section may be an ad/promotional zone, with default settings for radius of alerts also configurable.

For example, the "Find a Friend" section may permit users to search by name, address, interests, status, profession, favorite movies/music/food etc. Users are also able to search within a given radius of their location. In one embodiment, the user interface view may include a link for the user to invite other people to join the network (e.g., may encourage users who see a question-mark on a house or a location on the mapping interface that corresponds to a real location associated with someone they know to contact that person and encourage them to join and own that profile through the social community algorithm).

Some of the reasons we believe these embodiments are unique include:

Search engine that provides a visual map (e.g., rather than text) display of information relevant to user queries.

Users can search on the map for other people having certain professional, educational, personal, extracurricular, cultural, political and/or family etc. profiles or interests, within any location range.

Users can search for information on the map, that is accessible directly through profile displays. For example, the user may search for information about a certain subject and be directed to a profile of another user having information about the subject. Alternatively, the user may view the search subject itself as a visible item (e.g., if applicable to the search query) having a profile on the map display, along with additional information associated with the item (e.g., contributed by other users).

Allows users to search, browse and view information posted by other users about an entity location such as a home, a business property, a condo, an apartment complex, etc. directly on a map display Allows users to browse, form and join groups and communities based on location, preferences, interests, friend requests, etc.

Users can send messages to other people through their profiles within the map display Users can find friends, business associates, vendors, romantic partners, etc. on the map within any location range (e.g., in their neighborhood, street, subdivision, etc.) by browsing the map display or searching for people with certain profile characteristics and/or similar interests.

Users can view, browse and post comments/information/reviews about entity locations and/or people associated with those locations (e.g., occupants of a house, families, apartment residents, businesses, non-governmental entities, etc.), even for locations that do not have a profile owner. For example, all entity locations visible on the map display may link to a profiles on which any user can post comments. To own the profile and edit the information posted about an entity location or the occupant(s), the occupant(s) would have to join the network associated with the social community algorithm and become the owner of the profile. The profile owner would then become visible in the map display (e.g., entity locations without profile owners may only be visible as questions marks on the map, having blank profiles but public comment sections).

Users can share their comments and opinions about locations, preferences and/or interests on their profiles that are visible and searchable on the map display Automatically notifies users of events and promotions in an area (e.g., scope of area can be selected by the user), and highlights venues and user profiles on the map.

Users can post reviews about entity locations (e.g., businesses) such that ratings for entity locations are visible on the map. Other users can trace the location of the users that posted the comments on the map.

Users who post comments on other profiles can be traced directly on the map through their comments. Alternatively, users can choose to submit anonymous postings or comments on other user/entity profiles, and/or may choose not to be traceable on the map through their comments.

For entity locations having more than one residency unit (e.g., apartment complexes), people can create and post on profiles for any room/floor of the location (e.g., by entering information on a schematic view of the location that is visible on the map).

Users can visually determine routes/directions/orientation to locations that they can browse within the map display. Additionally, users can generate written driving, walking or public transit directions between points of interest (e.g., from the user's house to a friend's house) within the map display.

Users can communicate (e.g., through live chat) directly with other users in the area based on an association determined through their profiles Business entity locations can generate targeted ads and promotions within locations on the map display (e.g., virtual billboards).

The social community algorithm can realize revenue based on ad clickthroughs by users, without the users being directed away from the interface. For example, when a user clicks on any targeted ad/promotion displayed on the map, the profile of the entity associated with the ad/promotion may be generated alongside the map display.

Neighborhood or neighborhood (see spelling differences) is a geographically localized community located within a larger city or suburb. The residents of a given neighborhood are called neighbors (or neighbors), although this term may also be used across much larger distances in rural areas.

Traditionally, a neighborhood is small enough that the neighbors are all able to know each other. However in practice, neighbors may not know one another very well at all. Villages aren't divided into neighborhoods, because they are already small enough that the villagers can all know each other.

The system however may work in any country and any geography of the world. In Canada and the United States, neighborhoods are often given official or semi-official status through neighborhood associations, neighborhood watches, or block watches. These may regulate such matters as lawn care and fence height, and they may provide such services as block parties, neighborhood parks, and community security. In some other places the equivalent organization is the parish, though a parish may have several neighborhoods within it depending on the area.

In localities where neighborhoods do not have an official status, questions can arise as to where one neighborhood begins and another ends, such as in the city of Philadelphia, Pa. Many cities may use districts and wards as official divisions of the city, rather than traditional neighborhood boundaries.

In the mainland of the People's Republic of China, the term is generally used for the urban administrative unit usually found immediately below the district level, although an intermediate, sub-district level exists in some cities. They are also called streets (administrative terminology may vary from city to city). Neighborhoods encompass 2,000 to 10,000 families. Within neighborhoods, families are grouped into smaller residential units or quarters of 2900 to 3400 families and supervised by a residents' committee; these are subdivided into residents' small groups of fifteen to forty families. In most urban areas of China, neighborhood, community, residential community, residential unit, residential quarter have the same meaning: 社区 or 小区, or 居民区 or 居 住区, and is the direct sublevel of a subdistrict (街道办事处), which is the direct sublevel of a district (区), which is the direct sublevel of a city (市). (See Political divisions of China.

The system and methods may be distributed through neighborhood associations. A neighborhood or neighborhood (see spelling differences) is a geographically localized community located within a larger city or suburb. The residents of a given neighborhood are called neighbors (or neighbors), although this term may also be used across much larger distances in rural areas.

Traditionally, a neighborhood is small enough that the neighbors are all able to know each other. However in practice, neighbors may not know one another very well at all. Villages aren't divided into neighborhoods, because they are already small enough that the villagers can all know each other. Each of the technologies and concepts disclosed herein may be embodied in software and/or hardware through one or more of the algorithms/embodiments discussed in FIGS. 1-41B.

A block party is a large public celebration in which many members of a single neighborhood congregate to observe a positive event of some importance. Many times, there will be celebration in the form of playing music and dance. Block parties gained popularity in the United States during the 1970s. Block Parties were often held outdoors and power for the DJ's sound system was taken illegally from street lights. This was famously referenced in the song "South Bronx" by KRS-One with the line:

"Power from a street light made the place dark. But yo, they didn't care, they turned it out." It is also interesting to note that many inner city block parties were actually held illegally, as they might be described as loitering. However, police turned a blind eye to them, reasoning that if everyone from the neighborhood was gathered in one place there was less chance of crime being committed elsewhere.

In the suburbs, block parties are commonly held on holidays such as Fourth of July or Labor Day. Sometimes the occasion may be a theme such a "Welcome to the Neighborhood" for a new family or a recent popular movie. Often block parties involve barbecuing, lawn games such as Simon Says and group dancing such as the Electric Slide, the Macarena or line dancing.

In other usage, a block party has come to mean any informal public celebration. For example, a block party can be conducted via television even though there is no real block in the observance. The same is true for the Internet. The block party is closely related to the beach party. The British equivalent is the street party.

The systems and methods illustrated in FIGS. 1-41B may have software to emulate a block party or a neighborhood watch. A neighborhood watch (also called a crime watch or neighborhood crime watch) is a citizens' organization devoted to crime and vandalism prevention within a neighborhood. It is not a vigilante organization, since members are expected not to directly intervene in possible criminal activity. Instead, neighborhood watch members are to stay alert to unusual activity and contact the authorities. It builds on the concept of a town watch from Colonial America.

The current American system of neighborhood watches began developing in the late 1960s as a response to the rape and murder of Kitty Genovese in Queens, N.Y. People became outraged that three dozen witnesses did nothing to save Genovese or to apprehend her killer. Some locals formed groups to watch over their neighborhoods and to look out for any suspicious activity in their areas. Shortly thereafter, the National Sheriffs' Association began a concerted effort in 1972 to revitalize the "watch group" effort nationwide.

A neighborhood watch (also called a crime watch or neighborhood crime watch) is a citizens' organization devoted to crime and vandalism prevention within a neighborhood. It is not a vigilante organization, since members are expected not to directly intervene in possible criminal activity. Instead, neighborhood watch members are to stay alert to unusual activity and contact the authorities. It builds on the concept of a town watch from Colonial America.

The current American system of neighborhood watches began developing in the late 1960s as a response to the rape and murder of Kitty Genovese in Queens, N.Y. People became outraged that three dozen witnesses did nothing to save Genovese or to apprehend her killer. Some locals formed groups to watch over their neighborhoods and to look out for any suspicious activity in their areas. Shortly thereafter, the National Sheriffs' Association began a concerted effort in 1972 to revitalize the "watch group" effort nationwide.

The various methods, systems, and apparatuses disclosed herein and illustrated and described using the attached FIGS. 1-41B can be applied to creating online community organizations of neighborhoods of any form. During human growth and maturation, people encounter sets of other individuals and experiences. Infants encounter first, their immediate family, then extended family, and then local community (such as school and work). They thus develop individual and group identity through associations that connect them to life-long community experiences.

As people grow, they learn about and form perceptions of social structures. During this progression, they form personal and cultural values, a world view and attitudes toward the larger society. Gaining an understanding of group dynamics and how to "fit in" is part of socialization. Individuals develop interpersonal relationships and begin to make choices about whom to associate with and under what circumstances.

During adolescence and adulthood, the individual tends to develop a more sophisticated identity, often taking on a role as a leader or follower in groups. If associated individuals develop the intent to give of themselves, and commit to the collective well-being of the group, they begin to acquire a sense of community.

Socialization: The process of learning to adopt the behavior patterns of the community is called socialization. The most fertile time of socialization is usually the early stages of life, during which individuals develop the skills and knowledge and learn the roles necessary to function within their culture and social environment. For some psychologists, especially those in the psychodynamic tradition, the most important period of socialization is between the ages of 1 and 10. But socialization also includes adults moving into a significantly different environment, where they must learn a new set of behaviors.

Socialization is influenced primarily by the family, through which children first learn community norms. Other important influences include school, peer groups, mass media, the workplace and government. The degree to which the norms of a particular society or community are adopted determines one's willingness to engage with others. The norms of tolerance, reciprocity and trust are important "habits of the heart," as de Tocqueville put it, in an individual's involvement in community.

Continuity of the connections between leaders, between leaders and followers, and among followers is vital to the strength of a community. Members individually hold the collective personality of the whole. With sustained connections and continued conversations, participants in communities develop emotional bonds, intellectual pathways, enhanced linguistic abilities, and even a higher capacity for critical thinking and problem-solving. It could be argued that successive and sustained contact with other people might help to remove some of the tension of isolation, due to alienation, thus opening creative avenues that would have otherwise remained impassable.

Conversely, sustained involvement in tight communities may tend to increase tension in some people. However, in many cases, it is easy enough to distance oneself from the "hive" temporarily to ease this stress. Psychological maturity and effective communication skills are thought to be a function of this ability. In nearly every context, individual and collective behaviors are required to find a balance between inclusion and exclusion; for the individual, a matter of choice; for the group, a matter of charter. The sum of the creative energy (often referred to as "synergy") and the strength of the mechanisms that maintain this balance is manifest as an observable and resilient sense of community.

McMillan and Chavis (1986) identify four elements of "sense of community": 1) membership, 2) influence, 3) integration and fulfillment of needs, and 4) shared emotional connection. They give the following example of the interplay between these factors: Someone puts an announcement on the dormitory bulletin board about the formation of an intramural dormitory basketball team. People attend the organizational meeting as strangers out of their individual needs (integration and fulfillment of needs). The team is bound by place of residence (membership boundaries are set) and spends time together in practice (the contact hypothesis). They play a game and win (successful shared valent event). While playing, members exert energy on behalf of the team (personal investment in the group). As the team continues to win, team members become recognized and congratulated (gaining honor and status for being members). Someone suggests that they all buy matching shirts and shoes (common symbols) and they do so (influence).

A Sense of Community Index (SCI) has been developed by Chavis and his colleagues (1986). Although originally designed to assess sense of community in neighborhoods, the index has been adapted for use in schools, the workplace and a variety of types of communities.

Communitarianism as a group of related but distinct philosophies (or ideologies) began in the late 20th century, opposing classical liberalism, capitalism and socialism while advocating phenomena such as civil society. Not necessarily hostile to social liberalism, communitarianism rather has a different emphasis, shifting the focus of interest toward communities and societies and away from the individual. The question of priority, whether for the individual or community, must be determined in dealing with pressing ethical questions about a variety of social issues, such as health care, abortion, multiculturalism, and hate speech.

Effective communication practices in group and organizational settings are important to the formation and maintenance of communities. How ideas and values are communicated within communities are important to the induction of new members, the formulation of agendas, the selection of leaders and many other aspects. Organizational communication is the study of how people communicate within an organizational context and the influences and interactions within organizational structures. Group members depend on the flow of communication to establish their own identity within these structures and learn to function in the group setting. Although organizational communication, as a field of study, is usually geared toward companies and business groups, these may also be seen as communities. The principles can also be applied to other types of communities.

If the sense of community exists, both freedom and security exist as well. The community then takes on a life of its own, as people become free enough to share and secure enough to get along. The sense of connectedness and formation of social networks comprise what has become known as social capital.

Azadi Tower is a town square in modern Iran. Social capital is defined by Robert D. Putnam as "the collective value of all social networks (who people know) and the inclinations that arise from these networks to do things for each other (norms of reciprocity)." Social capital in action can be seen in groups of varying formality, including neighbors keeping an eye on each others' homes. However, as Putnam notes in Bowling Alone: The Collapse and Revival of American Community (30000), social capital has been falling in the United States. Putnam found that over the past 25 years, attendance at club meetings has fallen 58 percent, family dinners are down 33 percent, and having friends visit has fallen 45 percent.

Western cultures are thus said to be losing the spirit of community that once were found in institutions including churches and community centers 2921. Sociologist Ray Oldenburg states in The Great Good Place that people need three places: 1) The home, 2) the workplace, and, 3) the community hangout or gathering place.

With this philosophy in mind, many grassroots efforts such as The Project for Public Spaces are being started to create this "Third Place" in communities. They are taking form in independent bookstores, coffeehouses, local pubs and through many innovative means to create the social capital needed to foster the sense and spirit of community.

Community development is often formally conducted by universities or government agencies to improve the social well-being of local, regional and, sometimes, national communities. Less formal efforts, called community building or community organizing, seek to empower individuals and groups of people by providing them with the skills they need to effect change in their own communities. These skills often assist in building political power through the formation of large social groups working for a common agenda. Community development practitioners must understand both how to work with individuals and how to affect communities' positions within the context of larger social institutions.

Formal programs conducted by universities are often used to build a knowledge base to drive curricula in sociology and community studies. The General Social Survey from the National Opinion Research Center at the University of Chicago and the Saguaro Seminar at the John F. Kennedy School of Government at Harvard University are examples of national community development in the United States. In The United Kingdom, Oxford University has led in providing extensive research in the field through its Community Development Journal, used worldwide by sociologists and community development practitioners.

At the intersection between community development and community building are a number of programs and organizations with community development tools. One example of this is the program of the Asset Based Community Development Institute of Northwestern University. The institute makes available downloadable tools to assess community assets and make connections between non-profit groups and other organizations that can help in community building. The Institute focuses on helping communities develop by "mobilizing neighborhood assets"—building from the inside out rather than the outside in.

Community building and organizing: M. Scott Peck is of the view that the almost accidental sense of community which exists at times of crisis, for example in New York City after the attacks of Sep. 11, 2001, can be consciously built. Peck believes that the process of "conscious community building" is a process of building a shared story, and consensual decision making, built upon respect for all individuals and inclusivity of difference. He is of the belief that this process goes through four stages:

Pseudo-community: Where participants are "nice with each other", playing-safe, and presenting what they feel is the most favorable sides of their personalities. Chaos: When people move beyond the inauthenticity of pseudo-community and feel safe enough to present their "shadow" selves. This stage places great demands upon the facilitator for greater leadership and organization, but Peck believes that "organizations are not communities", and this pressure should be resisted.

Emptying: This stage moves beyond the attempts to fix, heal and convert of the chaos stage, when all people become capable of acknowledging their own woundedness and brokenness, common to us all as human beings. Out of this emptying comes Authentic community: the process of deep respect and true listening for the needs of the other people in this community. This stage Peck believes can only be described as "glory" and reflects a deep yearning in every human soul for compassionate understanding from one's fellows.

More recently Scott Peck has remarked that building a sense of community is easy. It is maintaining this sense of community that is difficult in the modern world. The Ithaca Hour is an example of community-based currency. Community building can use a wide variety of practices, ranging from simple events such as potlucks and small book clubs to larger-scale efforts such as mass festivals and construction projects that involve local participants rather than outside contractors. Some communities have developed their own "Local Exchange Trading Systems" (LETS) and local currencies, such as the Ithaca Hours system, to encourage economic growth and an enhanced sense of community.

Community building that is geared toward activism is usually termed "community organizing." In these cases, organized community groups seek accountability from elected officials and increased direct representation within decision-making bodies. Where good-faith negotiations fail, these constituency-led organizations seek to pressure the decision-makers through a variety of means, including picketing, boycotting, sit-ins, petitioning, and electoral politics. The ARISE Detroit! coalition and the Toronto Public Space Committee are examples of activist networks committed to shielding local communities from government and corporate domination and inordinate influence.

Community organizing is sometimes focused on more than just resolving specific issues. Organizing often means building a widely accessible power structure, often with the end goal of distributing power equally throughout the community. Community organizers generally seek to build groups that are open and democratic in governance. Such groups facilitate and encourage consensus decision-making with a focus on the general health of the community rather than a specific interest group.

The three basic types of community organizing are grassroots organizing, coalition building, and faith-based community organizing (also called "institution-based community organizing," "broad-based community organizing" or "congregation-based community organizing").

Community service is usually performed in connection with a nonprofit organization, but it may also be undertaken under the auspices of government, one or more businesses, or by individuals. It is typically unpaid and voluntary. However, it can be part of alternative sentencing approaches in a justice system and it can be required by educational institutions.

The most common usage of the word "community" indicates a large group living in close proximity. Examples of local community include: A municipality is an administrative local area generally composed of a clearly defined territory and commonly referring to a town or village. Although large cities are also municipalities, they are often thought of as a collection of communities, due to their diversity.

A neighborhood is a geographically localized community, often within a larger city or suburb. A planned community is one that was designed from scratch and grew up more or less following the plan. Several of the world's capital cities are planned cities, notably Washington, D.C., in the United States, Canberra in Australia, and Brasilia in Brazil. It was also common during the European colonization of the Americas to build according to a plan either on fresh ground or on the ruins of earlier Amerindian cities. Identity: In some contexts, "community" indicates a group of people with a common identity other than location. Members often interact regularly. Common examples in everyday usage include: A "professional community" is a group of people with the same or related occupations. Some of those members may join a professional society, making a more defined and formalized group.

These are also sometimes known as communities of practice. A virtual community is a group of people primarily or initially communicating or interacting with each other by means of information technologies, typically over the Internet, rather than in person. These may be either communities of interest, practice or communion. (See below.) Research interest is evolving in the motivations for contributing to online communities.

Some communities share both location and other attributes. Members choose to live near each other because of one or more common interests. A retirement community is designated and at least usually designed for retirees and seniors—often restricted to those over a certain age, such as 55. It differs from a retirement home, which is a single building or small complex, by having a number of autonomous households.

An intentional community is a deliberate residential community with a much higher degree of social interaction than other communities. The members of an intentional community typically hold a common social, political or spiritual vision and share responsibilities and resources. Intentional communities include Amish villages, ashrams, cohousing, communes, ecovillages, housing cooperatives, kibbutzim, and land trusts.

Special nature of human community Music in Central Park, a public space. Definitions of community as "organisms inhabiting a common environment and interacting with one another," while scientifically accurate, do not convey the richness, diversity and complexity of human communities. Their classification, likewise is almost never precise. Untidy as it may be, community is vital for humans. M. Scott Peck expresses this in the following way: "There can be no vulnerability without risk; there can be no community without vulnerability; there can be no peace, and ultimately no life, without community." This conveys some of the distinctiveness of human community.

Embodiments described herein in FIGS. 14-41B govern a new kind of social network for neighborhoods, according to one embodiment (e.g., may be private and/or claimable-editable search engine based). It should be noted that in some embodiments, the address of an user may be masked from the public search (but still may be used for privacy considerations), according to one embodiment. Some embodiments have no preseeded data, whereas others might. Embodiments described herein may present rich, location specific information on individual residents and businesses.

A user can "Claim" one or more Business Pages and/or a Residential Pages, according to one embodiment. In order to secure their Claim, the user may verify their location associated with the Business Page and/or Residential page within 30 days, or the page becomes released to the community, according to one embodiment. A user can only have a maximum of 3 unverified Claims out at any given time, according to one embodiment. When a user clicks on "Claim this Page" on Business Profile page and/or a Residential Profile page, they can indicate the manner in which they intend to verify their claim, according to one embodiment. Benefits of Claiming a Business Page and/or Residential page may enable the user to mark their page 'Self-Editable only' from the default 'Fully Editable' status, and see "Private" listings in a claimed neighborhood around the verified location, according to one embodiment. Each edit by a user on a Residential Profile page and/or a Business Profile page may be made visible on the profile page, along with a date stamp, according to one embodiment.

Browse function: Based on the user's current location, the browse function may display a local map populated with pushpins for location-specific information, and a news feed, made up of business page edits, public people page edits, any recent broadcasts, etc., according to one embodiment. The news feed may show up on each Business Page and each Residential Page, based on activity in the surrounding area, according to one embodiment. Secure a Neighborhood function: May allow the user to identify and "secure" a neighborhood, restricting certain types of access to verified residents, according to one embodiment. Add a Pushpin function: May allow any registered or verified user to add any type of Pushpin (as described in FIG. 36), to one embodiment.

In addition to the map, the search results page may display a news feed, made up of business page edits, public people page edits, any recent broadcasts, and autogenerated alerts who has moved into the neighborhood, who has moved out of the neighborhood, any recent reviews in the neighborhood, any pushpins placed in the immediate area, etc., according to one embodiment. The news feed may prioritize entries relating to the search results, and will take into account privacy policies and preferences, according to one embodiment.

Example Newsfeeds may include:

Joe Smith moved into the neighborhood in September 2013. Welcome Joe! Like Share; 42 neighbors (hyperlink) moved in to the Cupertino library neighborhood in July 2013. Like Share; 12 neighbors (hyperlink) verified in to the Cupertino library neighborhood in July 2013. Like Share; Raj Abhyanker invited Paul Smith, a guest to the Cupertino neighborhood. Raj indicates Paul is a friend from college looking to move into the neighborhood. Welcome Paul!; Raj Abhyanker posted a Nissan Leaf for rent $35 a day, in mountain view Rent now. Like Share This content may feed each Profile Page and helps to increase Search Engine value for content on the site, according to one embodiment. Alerts may be created and curated (prioritized, filtered) automatically and/or through crowdsourcing, to keep each page vibrant and actively updating on a regular basis (ideally once a day or more), according to one embodiment.

A Multi-Family Residence page will display a list of residents in the entire building, according to one embodiment. Clicking on any resident will display a Single Family Residence page corresponding to the individual living unit where that person resides, according to one embodiment.

For example, suppose that John Smith and Jane Smith live in apartment 12 of a large building. Their names are included in the list of residents. When a user clicks on either John Smith or Jane Smith, we will display a "Single Family Residence" page showing both John and Jane, just as if apartment 12 was a separate structure, according to one embodiment.

The broadcast feature (e.g., associated with the neighborhood broadcast data and generated by the Bezier curve algorithm 3040 of the social community algorithm 2906) may be a "Radio" like function that uses the mobile device's current geospatial location to send out information to neighbors around the present geospatial location of the user, according to one embodiment. Broadcasts may be posted to neighbor pages in the geospatial vicinity (e.g., in the same neighborhood) on public and private pages in the geospatial social network, according to one embodiment. These broadcasts may enable any user, whether they live in a neighborhood or not to communicate their thoughts to those that live or work (or have claimed) a profile in the neighborhood around where the broadcaster is physically at, regardless of where the broadcaster lives, according to one embodiment. Broadcasts can be audio, video, pictures, and or text, according to one embodiment. For accountability, the broadcaster may be a verified user and their identity made public to all users who receive the broadcast in one embodiment.

This means that the broadcast feature may be restricted to be used only by devices (e.g., mobile phones) that have a GPS chip (or other geolocation device) that an identify a present location of where the broadcast is originating from, according to one embodiment. The broadcast may be sent to all users who have claimed a profile in the geo spatial vicinity where the broadcast originates, according to one embodiment. This can either be broadcast live to whoever is "tuned" in to a broadcast of video, audio, picture, and text in their neighborhood, or can be posted on each users profile if they do not hear the broadcast to the neighborhood in a live mode in one embodiment.

When a broadcast is made neighbors, around where the broadcast is made, they may receive a message that says something like:

Raj Abhyanker, a user in Menlo Park just broadcast "Japanese cultural program" video from the Cupertino Union church just now. Watch, Listen, View This broadcast may be shared with neighbors around Menlo park, and or in Cupertino. This way, Raj's neighbors and those in Cupertino can know what is happening in their neighborhoods, according to one embodiment. In one embodiment, the broadcast only goes to one area (Cupertino or Menlo park in the example above).

Broadcasts could be constrained to devices that have geospatial accuracy of present location and a current only (mobile devices for example). Otherwise, broadcasts won't mean much, according to one embodiment (would otherwise be just like thoughts/video upload without this). Broadcasts shouldn't be confused with 'upload videos', according to one embodiment. Different concepts. Why? Broadcasts have an accuracy of time and location that cannot be altered by a user, according to one embodiment, Hence, mobile is the most likely medium for this not desktop computer, according to one embodiment. We should not let the user set their own location for broadcasts (like other pushpin types), according to one embodiment. Also time is fixed, according to one embodiment. Fixing and not making these two variables editable give users confidence that the broadcast was associated with a particular time and place, and creates a very unique feature, according to one embodiment. For example, it would be not useful if the broadcast is untrusted as to location of origination, according to one embodiment. E.g., I broadcast when I am somewhere only about the location I am at, according to one embodiment.

Broadcasts are different that other pushpins because location of where a broadcast, and time of broadcast is *current location* and *current time*, according to one embodiment. They are initiated wherever a broadcaster is presently at, and added to the news feed in the broadcasters neighborhood and in the area wherever a broadcaster is presently at, according to one embodiment.

Broadcast rules may include:

1. If I post a Broadcast in my secured neighborhood, only my neighbors can see it, according to one embodiment.

2. If I post a Broadcast in different secured neighborhood then my own, my neighbors can see it (e.g., unless I turn this off in my privacy setting) and neighbors in the secured neighborhood can see it (e.g., default not turn-offable, but I can delete my broadcast), according to one embodiment.

3. If I post a Broadcast in different unsecured neighborhood then my own, my neighbors can see it (unless I turn this off in my privacy setting) and the broadcast is publicly visible on user pages of public user profiles in the unsecured neighborhood until profiles are claimed and/or the neighborhood is secured, according to one embodiment.

4. If an outsider in a secure neighborhood posts a broadcast in my secure neighborhood, it's not public, according to one embodiment.

5. If an outsider in a unsecure neighborhood posts a broadcast in my secure neighborhood, the system does not post on profiles in his unsecure neighborhood (to prevent stalking, burglary), but does post in my secure neighborhood, according to one embodiment.

Privacy settings. For each verified residential or business location, the user may set Privacy to Default, Public, Private, or Inactive, according to one embodiment. The Default setting (which is the default) means that the profile will be public, until the neighborhood is secured; in a secured neighborhood, the profile will be Private, according to one embodiment. By changing this setting, the user may force the profile to be Public or Private, regardless of whether the neighborhood is secured, according to one embodiment.

For each verified residential location, the user may set edit access to Group Editable or Self Editable, according to one embodiment.

Residential Privacy example. The residential profiles can be: Public: anyone can search, browse, or view the user profile, according to one embodiment. This is the default setting for unsecured neighborhoods (initially, all the content on the site), according to one embodiment. Private: only people in my neighborhood can search, browse, or view the user's profile, according to one embodiment. This is the default for secured neighborhoods, according to one embodiment. Inactive: nobody can search, browse, or view the profile, even within a secured neighborhood, according to one embodiment. A user may have at least one active (public or private), verified profile in order to have edit capabilities, according to one embodiment; if the user makes all profiles inactive, that user is treated (for edit purposes) as an unverified user, according to one embodiment.

Verified users can edit the privacy setting for their profile and override the default, according to one embodiment. Group Editable: anyone with access to a profile based on the privacy roles above can edit the profile, according to one embodiment. This is the default setting, according to one embodiment Self Editable, only the verified owner of a profile can edit that profile, according to one embodiment.

Exceptions Guest User. A verified user in another neighborhood is given "Guest" access to a neighborhood for a maximum of 340 days by a verified user in the neighborhood in which the guest access is given, according to one embodiment. In effect, the guest becomes a member of the neighborhood for a limited period, according to one embodiment. Friend. When a user has self-elected being friends with someone in a different neighborhood, they can view each other's profiles only (not their neighbors), according to one embodiment. One way for a user to verify a location is to submit a scanned utility bill, according to one embodiment.

When a moderator selects the Verify Utility Bills function, the screen will display a list of items for processing, according to one embodiment. Accept the utility bill as a means of verification, according to one embodiment. This will verify the user's location, and will also generate an e-mail to the user, according to one embodiment. Or Decline the utility bill as a means of verification, according to one embodiment. There will be a drop-down list to allow the moderator to select a reason, according to one embodiment; this reason will be included in an e-mail message to the user. Reasons may include: Name does not match, address does not match, name/address can't be read, not a valid utility bill, according to one embodiment.

In one embodiment, a method includes associating a verified registered user (e.g., a verified registered user 4110 of FIG. 41A-B, a verified registered user 4110 of FIG. 16) with a user profile, associating the user profile (e.g., the user profile 4000 of FIG. 40A) with a verified geographic location, generating a map (e.g., a map 1701 of FIG. 17) concurrently displaying the user profile and/or the verified geographic location and simultaneously generating, in the map (e.g., the map 1701 of FIG. 17), claimable profiles (e.g., a claimable profile 4006 of FIG. 40B-41A, a claimable profile 4102 of FIG. 41A, a claimable profile 1704 of FIG. 17) associated with different geographic locations surrounding the verified geographic location associated with the user profile (e.g., the user profile 4000 of FIG. 40A).

In another embodiment, a system includes a plurality of neighborhoods (e.g., the neighborhood(s) 2902A-N of FIG. 29) having registered users and/or unregistered users of a global neighborhood environment 1800 (e.g., a privacy server 2900 of FIG. 29), a social community algorithm (e.g., a social community algorithm 2906 of FIG. 29, a social community algorithm 2906 of FIG. 30) of the global neighborhood environment 1800 (e.g., the privacy server 2900 of FIG. 29) to generate a building creator (e.g., through building builder 3000 of FIG. 30) in which the registered users may create and/or modify empty claimable profiles (e.g., the claimable profile 4006 of FIG. 40A-40B, the claimable profile 4102 of FIG. 41A, the claimable profile 1704 of FIG. 17), building layouts, social network pages, and/or floor levels structures housing residents and businesses in the neighborhood (e.g., the neighborhood 2900 of FIG. 29), a claimable algorithm (e.g., a claimable algorithm 2910 of FIG. 29, a claimable algorithm 2910 of FIG. 32) of the global neighborhood environment 1800 (e.g., the privacy server 2900 of FIG. 29) to enable the registered users to create a social network page of themselves, and/or to edit information associated with the unregistered users identifiable through a viewing of physical properties in which the unregistered users reside when the registered users have knowledge of characteristics associated with the unregistered users.

In addition, the system may include search algorithm (e.g., a search algorithm 2908 of FIG. 29, a search algorithm 2908 of FIG. 31) of the global neighborhood environment 1800 (e.g., the privacy server 2900 of FIG. 29) to enable a people search (e.g., information stored in people database 3016 of FIG. 30), a business search (e.g., information stored in business database 3020 of FIG. 30), and a category search of any data in the social community algorithm (a social community algorithm 2906 of FIG. 29, a social community algorithm 2906 of FIG. 30) and/or to enable embedding of any content in the global neighborhood environment 1800 (e.g., the privacy server 2900 of FIG. 29) in other search engines, blogs, social networks, professional networks and/or static websites, a commerce algorithm (e.g., a commerce algorithm of FIG. 29, a commerce algorithm of FIG. 33) of the global neighborhood environment 1800 (e.g., the privacy server 2900 of FIG. 29).

The system may also provide an advertisement system to a business (e.g., through business display advertisement algorithm 3302 of FIG. 33) who purchase their location in the global neighborhood environment 1800 (e.g., the privacy server 2900 of FIG. 29) in which the advertisement is viewable concurrently with a map indicating a location of the business, and in which revenue is attributed to the global neighborhood environment 1800 (e.g., the privacy server 2900 of FIG. 29) when the registered users and/or the unregistered users click-in on a simultaneously displayed data of the advertisement along with the map indicating a location of the business, a map algorithm (a map algorithm 2914 of FIG. 29) of the global neighborhood environment 1800 (e.g., the privacy server 2900 of FIG. 29) to include a map data associated with a satellite data which serves as a basis of rendering the map in the global neighborhood environment 1800 (e.g., the privacy server 2900 of FIG. 29) and/or which includes a simplified map generator (e.g., simplified map generator algorithm 3402 of FIG. 34) which can transform the map to a fewer color and location complex form using a parcel data which identifies at least some residence, civic, and/or business locations in the satellite data.

In yet another embodiment, a global neighborhood environment 1800 (e.g., a privacy server 2900 of FIG. 29) includes a first instruction set to enable a social network to reside above a map data, in which the social network may be associated with specific geographical locations identifiable in the map data, a second instruction set integrated with the first instruction set to enable the users (e.g., the user 2916 of FIG. 29) of the social network to create profiles of other people through a forum which provides a free form of expression of the users sharing information about any entities and/or people residing in any geographical location identifiable in the satellite map data, and/or to provide a technique of each of the users (e.g., the user 2916 of FIG. 29) to claim a geographic location (a geographic location 4004 of FIG. 40A) to control content in their respective claimed geographic locations and a third instruction set integrated with the first instruction set and/or the second instruction set to enable searching of people in the global neighborhood environment 1800 (e.g., the privacy server 2900 of FIG. 29) by indexing each of the data shared by the users (e.g., the user 2916 of FIG. 29) of any of the people and entities residing in any geographic location (a geographic location 4004 of FIG. 40A).

A method and system of direct mailing in a geo-spatial environment 100 are disclosed.

In one aspect, a method includes generating a community network 200 of user profiles, each user profile of the user profiles associated with a verified geographic location 206 and a contact address 210. The method includes associating a first user with a first user profile of the user profiles, selecting a mail mode, and selecting a communication. The method further includes generating a first display view to include a map view 406 embodied by the community network 200, at least a portion of the user profiles represented at a location in the map view 406 associated with the verified geographic location 206 of the first user profile of the user profiles. The method includes selecting a second user profile from the at least a portion of the user profiles, and generating a mailing of the communication, in a format associated with the mail mode, between the first user profile of the user profiles and the contact address 210 associated with the second user profile of the user profiles, wherein the contact address 210 is based on the mail mode.

The selecting the mail mode may include selecting a physical mail mode, a facsimile mode, an email mode, and/or an instant message mode. The contact address 210 may be selected from a group including: a physical mailing address associated with the verified geographic location 206 of the user profile, a facsimile number, an email address, and/or an instant message user identifier. A physical mail mode may be selected.

The mailing of the communication may be generated in a physical format associated with the physical mail mode, between the first user profile of the user profiles and the contact address 210 associated with the second user profile of the user profiles. The contact address 210 may be based on a physical address associated with the second user profile of the user profiles. A facsimile mode may be selected. The mailing of the communication may be generated in a facsimile format associated with the facsimile mode, between the first user profile of the user profiles and the contact address 210 associated with the second user profile of the user profiles. The contact address 210 may be based on the facsimile number associated with the second user profile of the user profiles.

An email mode may be selected. The mailing of the communication may be generated in an email format associated with the email mode, between the first user profile of the user profiles and the contact address 210 associated with the second user profile of the user profiles. The contact address 210 may be based on the email address associated with the second user profile of the user profiles. An instant message mode may be selected. The mailing of the communication may be generated in an instant message format associated with the instant message mode, between the first user profile of the user profiles and the contact address 210 associated with the second user profile of the user profiles. The contact address 210 may be based on the instant message user identifier associated with the second user profile of the user profiles.

The location may be selected in the map view 406 from a group including: a street address, a city, a county, a state, and/or a country. A radius associated with the location in the map view 406 may be selected. User profiles of the at least a portion of the user profiles having verified geographic location 206s included in the radius may be selected. Demographics associated with the community network 200 may be provided. The demographics may be associated with each user profile of the user profiles. At least one demographic of the demographics may be selected. The user profiles of the at least a portion of the user profiles having verified geographic location 206s included in the radius and having the at least one demographic of the demographics may be selected.

The demographics may include an age, an age range, a gender, an occupation, an ethnicity, a location of a residence, a location of a business, a marital status, an ownership status, a language, mobility, income, a life cycle, a socioeconomic status, and/or a lifestyle. An online commerce transaction associated with the mailing of the communication may be generated. The generating the online commerce transaction may include generating an online transaction associated with payment of postage, and/or generating an online transaction associated with payment of services related to the mailing of the communication.

The mailing of the communication may be scheduled. The scheduling the mailing of the communication may include determining a number of mailings, determining a time period, and/or generating the number of mailings within the time period. The communication may be created. The method may be in a form of a machine-readable medium embodying a set of instructions that, when executed by a machine, causes the machine to perform the method.

In another aspect, a system includes a geo-spatial environment 100, a community network 200 algorithm of the geo-spatial environment 100, to include user profiles, using a processor and a memory, each user profile of the user profiles to include a verified geographic location 206 and a contact address 210. The system includes a map algorithm of the geo-spatial environment 100 to include map data which serves as a basis to render a map view 406 in the geo-spatial environment 100 which identifies residences, businesses, and civic structures having verified geographic location 206s. The system further includes a mail mode algorithm of the geo-spatial environment 100 to determine a mail mode, a communication algorithm of the geo-spatial environment 100 to select a communication, and a display algorithm of the geo-spatial environment 100 to generate a first display view to include a map view 406 embodied by a community network 200, at least a portion of the user profiles represented at locations in the map view 406 associated with the verified geographic location 206s of the at least a portion of the user profiles. The system also includes a recipient algorithm of the geo-spatial environment 100 to select a user profile from the at least a portion of the user profiles and a mail communication algorithm of the geo-spatial environment 100 to generate a mailing of the communication, in a format associated with the mail mode, to a contact address 210 associated with the user profile of the user profiles.

A commerce transaction algorithm 302 of the geo-spatial environment 100 may generate a commerce transaction associated with elements. A postage algorithm 302A of the geo-spatial environment 100 may generate an online transaction associated with payment of postage and/or a service payment algorithm of the geo-spatial environment 100 may generate an online transaction associated with payment of services related to mailing the communication. A location algorithm 304 may select the location. The location may be selected from a group including: a street address, a city, a county, a state, and/or a country.

A radius algorithm 306 may determine a radius based on the location and to display the at least a portion of the user profiles having verified geographic location 206s included in the radius. A demographic algorithm 308 may provide demographics associated with the user profiles, select demographic of the demographics, and/or determine a group of user profiles of the at least a portion of the user profiles. The demographics may be associated with each user profiles of the group of user profiles. The demographic may be selected from a group including an age, an age range, a gender, an occupation, an ethnicity, a location of a residence, a location of a business, a marital status, an ownership status, a language, mobility, income, a life cycle, a socioeconomic status, and a lifestyle.

A scheduler algorithm 310 may schedule the mailing. The schedule may be based on a selected number of mailings per a predetermined time period. A document creation algorithm 312 may enable creation of a document. A letter creation algorithm 312A may enable creation of letters and/or a marketing brochure creation algorithm may enable creation of marketing brochures. The mail mode may be selected from a group including a physical mail mode, a facsimile mode, an email mode, and/or an instant message mode. The contact address 210 may be selected from a group including a physical mailing address associated with the verified geographic location 206 of the user profile, a facsimile number, an email address, and/or an instant message user identifier.

In yet another aspect, a geo-spatial environment 100 includes a first instruction set to enable, using a processor and a memory, a community network 200 to include a map database associated with map data and a user database associated with user profiles, each user profile of the user profiles associated with a verified geographic location 206 identifiable in the map data and a contact address 210. The geo-spatial environment 100 includes a second instruction set integrated with the first instruction set to display a map view 406, embodied by the community network 200, to include representations of a portion of the user profiles. Each representation of a user profile of the portion of the user profiles is displayed at a location in the map view 406 corresponding to the verified geographic location 206 associated with the user profile. The geo-spatial environment 100 also includes a third instruction set integrated with the first instruction set and the second instruction set to determine a second user profile of the portion of the user profiles, a communication, and a mail mode. The geo-spatial environment 100 further includes a fourth instruction set integrated with the first instruction set and the second instruction set and the third instruction set to generate a mailing of the communication, in a format associated with the mail mode, to the contact address 210 associated with the second user profile of the user profiles, wherein the contact address 210 is based on the mail mode.

A fifth instruction set may generate a commerce transaction associated with the mailing of the communication. A sixth instruction set may schedule the mailing of the communication. A seventh instruction set may enable creation of the communication.

The methods, systems, and apparatuses disclosed herein may be implemented in any means for achieving various aspects, and may be executed in a form of a machine-readable medium embodying a set of instructions that, when executed by a machine, cause the machine to perform any of the operations disclosed herein. Other features will be apparent from the accompanying drawings and from the detailed description that follows.

An example embodiment will now be described. In one embodiment, Bob may be new to his neighborhood and/or may not know many of his neighbors well. Bob may be looking for advice about the neighborhood. Bob may not have a suitable way to contact his neighbors. Bob may live in a busy area in a city and/or may not be able to go door to door as Bob may not want to intrude on his new neighbors and/or many of his neighbors may not be available (e.g., may be at work). Many neighbors may not be listed in the phone book and/or Bob may not know the names of his neighbors (e.g., people living around his claimed location (e.g., residence).

Bob may be able to claim his profile on the community network (e.g., Fatdoor.com) and/or view profiles of users around his location. Bob may be able to select profiles and/or establish communications (e.g., by email, physical mail, by attaining a phone number) with his neighbors. Bob may be able to meet new individuals, get recommendations on restaurants, and/or create connections in his community (e.g., neighborhood) quickly and easily.

In another embodiment, Jenna may live in a large apartment complex in a metropolitan area. Jenna may not know many individuals living around her and/or may only know small pieces of information such as names of people. Jenna may not know which apartments certain people live in and/or may not have contact information for many people she sees around the apartment buildings. Jenna may find a lost item (e.g., a set of keys, a package, a cell phone) and may not have the means of returning the item to its owner.

Jenna may log onto a community network (e.g., the geospatial environment 100 and/or Fatdoor.com) and/or search and/or view profiles of people in her area (e.g., community and/or neighborhood). Jenna may locate the owner of the lost item and/or may be able to open a line of communication with the other user. Jenna may be able to return the lost item(s) to the owner more easily and quickly than she could have by posting flyers and/or going door to door. Jenna may be able to make connections with users she would otherwise not be able to connect with and/or may help to establish a sense of community by using the community network.

It will be understood with those skill in the art that in some embodiments, the social community algorithm 2906 may restrict dissemination of broadcast data by verified users to claimed neighborhoods in a private neighborhood social network (e.g. the privacy server 2900 may be a private social network, the neighborhood curation system described herein may also be part of the private neighborhood social network) in which the broadcaster resides (e.g., has a home) using the radial algorithm (e.g., the Bezier curve algorithm 3040 of FIG. 30). The privacy server 2900 may include online communities designed to easily create private websites to facilitate communication among neighbors and build stronger neighborhoods (e.g., to help neighbors build stronger and safer neighborhoods).

Further, it follows that the threshold radial distance generated through the Bezier curve algorithm 3040 of FIG. 30 may take on a variety of shapes other than purely circular and is defined to encompass a variety of shapes based on associated geographic, historical, political and/or cultural connotations of associated boundaries of neighborhoods and/or as defined by a city, municipality, government, and/or data provider (e.g., Maponics®, Urban Mapping®), in one embodiment. For example, the threshold radial distance may be based on a particular context, such as a school boundary, a neighborhood boundary, a college campus boundary, a subdivision boundary, a parcel boundary, and/or a zip code boundary. In an alternate embodiment, a first claiming user 2916 in a particular neighborhood may draw a polygon to indicate a preferred boundary.

In an alternative embodiment, the threshold radial distance generated using the Bezier curve algorithm 3040 by the privacy server 2900 may be restricted to a shared apartment building (e.g., and/or an office building). In addition, it will be understood with those skilled in the art that the privacy server 2900 may be operate as a function of the privacy server 2900 (e.g., a neighborhood social network).

In addition, it will be understood that in some embodiments, the neighborhood broadcast data is generated by the police department (e.g., and/or others of the neighborhood services) in the form of crime alerts, health alerts, fire alerts, and other emergency alerts and provided as a feed (e.g., a Real Simple Syndication (RSS) feed) to the privacy server 2900 for distribution to relevant ones of the claimed neighborhoods in the privacy server 2900. It will be understood that the neighborhood broadcast data may appear in a 'feed' provided to users of the privacy server 2900 (e.g., a private social network for neighbors) on their profile pages based on access control privileges set by the social community algorithm using the Bezier curve algorithm 3040. For example, access to the neighborhood broadcast data may be limited to just a claimed neighborhood (e.g., as defined by neighborhood boundaries) and/or optionally adjacent neighborhoods.

In one embodiment, the privacy server 2900 may provide police departments and other municipal agencies with a separate login in which they can invite neighbors themselves, provide for a virtual neighborhood watch and emergency preparedness groups, and conduct high value crime and safety related discussions from local police and fire officials without requiring any technical integration. This may provide police departments and municipalities with a single channel to easily broadcast information across neighborhoods that they manage, and receive and track neighborhood level membership and activity to identify leaders of a neighborhood.

For example, communications defined from one broadcasting user to an adjacent neighborhood o may involve sharing information about a suspicious activity that might affect several neighborhoods, explaining about a lost pet that might have wandered into an adjoining neighborhood, to rally support from neighbors from multiple neighborhoods to address civic issues, to spread the word about events like local theater production or neighborhood garage sales, and/or to ask for advice or recommendations from the widest range of people in a community). In one embodiment, the privacy server 2900 may prevent self-promotional messages that are inappropriate (e.g., a user sending such messages may be suspended from the geospatially constrained social network using the crowd sourced moderation algorithm 3004. In one embodiment, the user 2916 may personalize nearby neighborhoods so that the user can choose exactly which nearby neighborhoods (if any) they wish to communicate with. The user 2916 may be able to flag a neighborhood feeds from adjacent neighborhoods. In addition, leaders from a particular neighborhood may be able to communicate privately with leaders of an adjoining neighborhood to plan and organize on behalf of an entire constituency. Similarly, users 2906 may be able to filter feeds to only display messages from the neighborhood that they reside in. The user 2916 may be able to restrict posts (e.g., pushpin placements) only in the neighborhood they are presently in. In one embodiment, nearby neighbors may (or may not) be able to access profiles of adjacent neighborhoods.

It will also be understood that in some embodiments, that users may be 'verified through alternate means, for example through a utility bill verification (e.g., to verify that a user's address on a utility bill matches the residential address they seek to claim), a credit card verification (e.g., or debit card verification), a phone number verification (e.g., reverse phone number lookup), a privately-published access code (e.g., distributed to a neighborhood association president, and/or distributed at a neighborhood gathering), and a neighbor vouching method (e.g., in which an existing verified neighbor 'vouches' for a new neighbor as being someone that they personally know to be living in a neighborhood.

In one embodiment, the privacy server 2900 ensures a secure and trusted environment for a neighborhood website by requiring all members to verify their address. In this embodiment, verification may provide assurance the assurance that new members are indeed residing at the address they provided when registering for an account in the privacy server 2900. Once a neighborhood has launched out of pilot status, only members who have verified their address may be able access to their neighborhood website content.

It will be understood that among the various ways of verifying an address, a user of the privacy server 2900 may uses the following methods to verify the address of every member:

A. Postcard. The privacy server 2900 can send a postcard to the address listed on an account of the user 2916 with a unique code printed on it (e.g., using the Fatmail postcard campaign). The code may allow the user 2916 to log in and verify their account.

B. Credit or debit card. The privacy server 2900 may be able to verify a home address through a credit or debit card billing address. In one embodiment, billing address may be confirmed without storing personally identifiable information and/or charging a credit card.

C. Home phone. If a user 2916 has a landline phone, the user may receive an automated phone call from the privacy server 2900 that may provide with a unique code to verify an account of the user 2916.

D. Neighborhood leader. A neighborhood leader of the geo-spatially constrained social network can use a verify neighbors feature of the privacy server 2900 to vouch for and verify neighbors.

E. Mobile phone. A user 2916 may receive a call to a mobile phone associated with the user 2916 to verify their account.

F. Neighbor invitations. A neighbor who is a verified member of the privacy server 2900 can vouch for, and may invite another neighbor to join the privacy server 2900. Accepting such an invitation may allow the user 2916 to join the privacy server 2900 as a verified member, according to one embodiment.

H. Social Security Number (SSN). The privacy server 2900 can verify a home address when the user 2916 provides the last 4 digits of a SSN (e.g., not stored by the privacy server 2900 for privacy reasons).

It will be also understood that in a preferred embodiment neighborhood boundaries are defined by the social community algorithm 2906 using the Bezier curve algorithm 3040 of FIG. 30 may be constrained to work in neighborhoods having a threshold number of homes (e.g., 10 homes, alternatively 2900 homes in a neighborhood) and more (e.g., up to thousands of homes) as this may be needed to reach the critical mass of active posters that is needed to help the privacy server 2900 succeed. In one embodiment, 'groups' may be creatable in smaller neighborhoods having fewer than the threshold number of homes for communications in micro-communities within a claimed neighborhood.

It will also be appreciated that in some embodiments, a mobile device (e.g., the device 1806, the device 1808 of FIG. 18) may be a desktop computer, a laptop computer, and/or a non-transitory broadcasting algorithm. In addition, it will be understood that the prepopulated data (e.g., preseeded data) described herein may not be created through data licensed from others, but rather may be user generated content of organically created profiles in the geo-spatial social network created by different users who have each verified their profiles.

Although the present embodiments have been described with reference to specific example embodiments, it will be evident that various modifications and changes may be made to these embodiments without departing from the broader spirit and scope of the various embodiments. For example, the various devices, algorithms, analyzers, generators, etc. described herein may be enabled and operated using hardware circuitry (e.g., CMOS based logic circuitry), firmware, software and/or any combination of hardware, firmware, and/or software (e.g., embodied in a machine readable medium). For example, the various electrical structure and methods may be embodied using transistors, logic gates, and electrical circuits (e.g., application specific integrated ASIC circuitry and/or in Digital Signal; Processor DSP circuitry).

For example, the social community algorithm 2906, the search algorithm 2908, the claimable algorithm 2910, the commerce algorithm, the map algorithm 2914, the building builder algorithm 3000, the $N^{th}$ degree algorithm, the tagging algorithm 3004, the verify algorithm 3006, the groups generator algorithm 3008, the pushpin algorithm 3010, the profile algorithm 3012, the announce algorithm 3014, the friend finder algorithm 3022, the neighbor-neighbor help algorithm 3024, the business search algorithm 3102, the communicate algorithm 3106, the directory assistance algorithm 3108, the embedding algorithm 3110, the no-match algorithm 3112, the range selector algorithm 3114, the user-place claimable algorithm, the user-user claimable algorithm 3202, the user-neighbor claimable algorithm 3204, the user-business claimable algorithm 3206, the reviews algorithm 3208, the defamation prevention algorithm 3210, the claimable social network conversion algorithm 3212, the claim algorithm 3214, the data segment algorithm 3216, the dispute resolution algorithm 3218, the resident announce payment algorithm 3300, the business display advertisement algorithm 3302, the geo-position advertisement ranking algorithm 3304, the content syndication algorithm 3306, the text advertisement algorithm 3308, the community market place algorithm 3310, the click-in tracking algorithm 3312, the satellite data algorithm 3400, the cartoon map converter algorithm 3404, the profile pointer algorithm 3406, the parcel algorithm 3408 and the occupant algorithm 3410 of FIGS. 1-41B may be embodied through the social community circuit, the search circuit, the claimable circuit, the commerce circuit, the map circuit, the building builder circuit, the $N^{th}$ degree circuit, the tagging circuit, the verify circuit, the groups circuit, the pushpin circuit, the profile circuit, the announce circuit, the friends finder circuit, the neighbor-neighbor help circuit, the business search circuit, the communicate circuit, the embedding circuit, the no-match circuit, the range selector circuit, the user-place claimable circuit, the user-user claimable circuit, the user-neighbor claimable circuit, the user-business circuit, the reviews circuit, the defamation prevention circuit, the claimable social network conversion circuit, the claim circuit, the data segment circuit, the dispute resolution circuit, the resident announce payment circuit, the business display advertisement circuit, the geo-position advertisement ranking circuit, the content syndication circuit, the text advertisement circuit, the community market place circuit, the click-in tracking circuit, the satellite data circuit, the cartoon map converter circuit, the profile pointer circuit, the parcel circuit, the occupant circuit using one or more of the technologies described herein.

In addition, it will be appreciated that the various operations, processes, and methods disclosed herein may be embodied in a machine-readable medium and/or a machine accessible medium compatible with a data processing system (e.g., a computer system), and may be performed in any order. Accordingly, the specification and drawings are to be regarded in an illustrative rather than a restrictive sense.

What is claimed is:

1. A method, comprising:
generating a community network of user profiles, each user profile of the user profiles verified with a verified geographic location and at least one of a contact address based on a privacy preference;
associating a first user with a first user profile of the user profiles;
selecting a mail mode;
selecting a communication;
generating a first display view to include a map view embodied by the community network, at least a portion of the user profiles represented at a location in the map view associated with the verified geographic location of the first user profile of the user profiles;
selecting a second user profile from the at least a portion of the user profiles; and
generating a mailing of the communication, in a format associated with the mail mode, between the first user profile of the user profiles and the contact address associated with the second user profile of the user profiles, wherein the contact address is based on the mail mode.

2. The method of claim 1, wherein the selecting the mail mode comprises:
selecting at least one of a physical mail mode, a facsimile mode, an email mode, and an instant message mode.

3. The method of claim 1, wherein the contact address is selected from a group comprising: a physical mailing address associated with the verified geographic location of the user profile, a facsimile number, an email address, and an instant message user identifier.

4. The method of claim 3, further comprising:
selecting a physical mail mode; and
generating the mailing of the communication, in a physical format associated with the physical mail mode, between the first user profile of the user profiles and the contact address associated with the second user profile of the user profiles, wherein the contact address is based on a physical address associated with the second user profile of the user profiles.

5. The method of claim 3, further comprising:
selecting a facsimile mode; and
generating the mailing of the communication, in a facsimile format associated with the facsimile mode, between the first user profile of the user profiles and the contact address associated with the second user profile of the user profiles, wherein the contact address is based on the facsimile number associated with the second user profile of the user profiles.

6. The method of claim 3, further comprising:
selecting an email mode; and
generating the mailing of the communication, in an email format associated with the email mode, between the first user profile of the user profiles and the contact address associated with the second user profile of the user profiles, wherein the contact address is based on the email address associated with the second user profile of the user profiles.

7. The method of claim 3, further comprising:
selecting an instant message mode; and
generating the mailing of the communication, in an instant message format associated with the instant message mode, between the first user profile of the user profiles and the contact address associated with the second user profile of the user profiles, wherein the contact address is based on the instant message user identifier associated with the second user profile of the user profiles.

8. The method of claim 1, further comprising:
selecting the location in the map view from a group comprising: a street address, a city, a county, a state, and a country.

9. The method of claim 8, further comprising:
selecting a radius associated with the location in the map view; and
selecting user profiles of the at least a portion of the user profiles having verified geographic locations included in the radius.

10. The method of claim 9, further comprising:
providing demographics associated with the community network;
associating at least one of the demographics with each user profile of the user profiles;
selecting at least one demographic of the demographics; and
selecting the user profiles of the at least a portion of the user profiles having verified geographic locations included in the radius and having the at least one demographic of the demographics.

11. The method of claim 10, wherein the demographics include an age, an age range, a gender, an occupation, an ethnicity, a location of a residence, a location of a business, a marital status, an ownership status, a language, mobility, income, a life cycle, a socioeconomic status, and a lifestyle.

12. The method of claim 1, further comprising:
generating an online commerce transaction associated with the mailing of the communication.

13. The method of claim 12, wherein the generating the online commerce transaction comprises at least one of:
generating an online transaction associated with payment of postage; and
generating an online transaction associated with payment of services related to the mailing of the communication.

14. The method of claim 1, further comprising:
scheduling the mailing of the communication.

15. The method of claim 14, wherein the scheduling the mailing of the communication comprises:
determining a number of mailings;
determining a time period; and
generating the number of mailings within the time period.

16. The method of claim 1, further comprising:
creating the communication.

17. The method of claim 1 in a form of a machine-readable medium embodying a set of instructions that, when executed by a machine, causes the machine to perform the method of claim 1.

18. A system, comprising:
a geo-spatial environment;
a community network algorithm of the geo-spatial environment, to include user profiles, using a processor and a memory, each user profile of the user profiles to include a verified geographic location and a contact address based on a privacy preference;
a mail mode algorithm of the geo-spatial environment to determine a mail mode;
a communication algorithm of the geo-spatial environment to select a communication;

a display algorithm of the geo-spatial environment to generate a first display view to include a map view embodied by a community network, at least a portion of the user profiles represented at locations in the map view associated with the verified geographic locations of the at least a portion of the user profiles;

a recipient algorithm of the geo-spatial environment to select a user profile from the at least a portion of the user profiles; and a mail communication algorithm of the geo-spatial environment to generate a mailing of the communication, in a format associated with the mail mode, to a contact address associated with the user profile of the user profiles.

19. The system of claim 18, further comprising:
a map algorithm of the geo-spatial environment to include map data which serves as a basis to render a map view in the geo-spatial environment which identifies at least one residence, business, and civic structure having specific geographic locations; and
a commerce transaction algorithm of the geo-spatial environment to generate a commerce transaction associated with elements.

20. The system of claim 19, further comprising:
a postage algorithm of the geo-spatial environment to generate an online transaction associated with payment of postage; and
a service payment algorithm of the geo-spatial environment to generate an online transaction associated with payment of services related to mailing the communication.

21. The system of claim 18, further comprising:
a location algorithm to select the location, wherein the location is selected from a group comprising: a street address, a city, a county, a state, and a country.

22. The system of claim 18, further comprising:
a radius algorithm to determine a radius based on the location and to display the at least a portion of the user profiles having verified geographic locations included in the radius.

23. The system of claim 18, further comprising:
a demographic algorithm to provide demographics associated with the user profiles;
to select at least one demographic of the demographics, and to determine a group of user profiles of the at least a portion of the user profiles, wherein the at least one demographics is associated with each user profiles of the group of user profiles.

24. The system of claim 23, wherein the demographic is selected from a group comprising an age, an age range, a gender, an occupation, an ethnicity, a location of a residence, a location of a business, a marital status, an ownership status, a language, mobility, income, a life cycle, a socioeconomic status, and a lifestyle.

25. The system of claim 18, Further comprising:
a scheduler algorithm to schedule the mailing.

26. The system of claim 25, wherein the schedule is based on a selected number of mailings per a predetermined time period.

27. The system of claim 18, further comprising:
a document creation algorithm to enable creation of a document.

28. The system of claim 27, further comprising:
a letter creation algorithm to enable creation of letters; and
a marketing brochure creation algorithm to enable creation of marketing brochures.

29. The system of claim 18, wherein the mail mode is selected from a group comprising a physical mail mode, a facsimile mode, an email mode, and an instant message mode.

30. The system of claim 18, wherein the contact address is selected from a group comprising a physical mailing address associated with the specific geographic location of the user profile, a facsimile number, an email address, and an instant message user identifier.

31. A geo-spatial environment, comprising:
a first instruction set to enable, using a processor and a memory, a community network, to include a map database associated with map data and a user database associated with user profiles, each user profile of the user profiles associated with a verified geographic location identifiable in the map data and a contact address;
a second instruction set integrated with the first instruction embody a private neighborhood community network, to include representations of at least a portion of the user profiles, wherein each representation of a user profile of the at least a portion of the user profiles is displayed at a location in the map view corresponding to the verified geographic location associated with the user profile;
a third instruction set integrated with the first instruction set and the second instruction set to determine a second user profile of the at least a portion of the user profiles, a communication, and a mail mode; and
a fourth instruction set integrated with the first instruction set and the second instruction set and the third instruction set to generate a mailing of the communication, in a format associated with the mail mode, to the contact address associated with the second user profile of the user profiles, wherein the contact address is based on the mail mode.

32. The geo-spatial environment of claim 31, further comprising:
a fifth instruction set to generate a commerce transaction associated with the mailing of the communication.

33. The geo-spatial environment of claim 32, further comprising:
a sixth instruction set to schedule the mailing of the communication.

34. The geo-spatial environment of claim 33, further comprising:
a seventh instruction set to enable creation of the communication.

* * * * *